(12) United States Patent
Yamagata et al.

(10) Patent No.: US 10,857,582 B2
(45) Date of Patent: Dec. 8, 2020

(54) METHOD OF MANUFACTURING TOOTH-SHAPED COMPONENT, AND TOOTH-SHAPED COMPONENT

(71) Applicant: NIPPON STEEL & SUMITOMO METAL CORPORATION, Tokyo (JP)

(72) Inventors: Mitsuharu Yamagata, Chiba (JP); Shuji Yamamoto, Kitakyushu (JP); Yasushi Tsukano, Kitakyushu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 559 days.

(21) Appl. No.: 15/540,899

(22) PCT Filed: Jan. 7, 2016

(86) PCT No.: PCT/JP2016/050348
§ 371 (c)(1),
(2) Date: Jun. 29, 2017

(87) PCT Pub. No.: WO2016/117369
PCT Pub. Date: Jul. 28, 2016

(65) Prior Publication Data
US 2018/0021836 A1    Jan. 25, 2018

(30) Foreign Application Priority Data

Jan. 21, 2015 (JP) .................. 2015-009637
Jan. 21, 2015 (JP) .................. 2015-009710
(Continued)

(51) Int. Cl.
*B21D 22/30* (2006.01)
*B21D 53/28* (2006.01)
(Continued)

(52) U.S. Cl.
CPC ............. *B21D 22/30* (2013.01); *B21D 41/04* (2013.01); *B21D 51/12* (2013.01); *B21D 53/28* (2013.01);
(Continued)

(58) Field of Classification Search
CPC .... B21D 53/28; B21D 22/025; B21D 22/205; B21D 22/30; B21D 51/12; B21D 41/04;
(Continued)

(56) References Cited

U.S. PATENT DOCUMENTS 2,931,094 A * 4/1960 Teerlink ................. B21D 53/28
29/893.34
4,876,876 A * 10/1989 Ishida .................. B21D 53/261
72/348
(Continued)

FOREIGN PATENT DOCUMENTS

CN    103459062 A    12/2013
JP    53-77869 A     7/1978
(Continued)

OTHER PUBLICATIONS

Office Action dated Jul. 19, 2018, in Russian Patent Application No. 2017124992/02(043148), with English translation.
(Continued)

*Primary Examiner* — Gregory D Swiatocha
(74) *Attorney, Agent, or Firm* — Birch, Stewart, Kolasch & Birch, LLP

(57) ABSTRACT

A method of manufacturing a tooth-shaped component including a process of draw-forming a workpiece so as to obtain a cylindrical container, which has a bottom surface portion and a side surface portion; a diameter-reducing process of reducing the diameter of a particular part in which a tooth tip portion is to be formed in the side surface portion of the cylindrical container, so as to increase the thickness of
(Continued)

a corner portion such that an external shape of the corner portion between the bottom surface portion and the side surface portion satisfies the following conditional expression $(\Delta R+\Delta H) \leq 2t$; and a tooth shape-forming process of forming the tooth tip portion in the particular part of the cylindrical container reduced in diameter in the diameter-reducing process, so as to obtain a tooth-shaped component which has the bottom surface portion, the side surface portion, and the tooth tip portion.

27 Claims, 82 Drawing Sheets

(30) Foreign Application Priority Data

| | | |
|---|---|---|
| Jan. 21, 2015 | (JP) | 2015-009711 |
| Jan. 21, 2015 | (JP) | 2015-009719 |
| Nov. 18, 2015 | (JP) | 2015-225947 |
| Nov. 18, 2015 | (JP) | 2015-226009 |

(51) Int. Cl.

| | |
|---|---|
| *B21D 51/12* | (2006.01) |
| *B21D 41/04* | (2006.01) |
| *B21K 1/30* | (2006.01) |
| *F16H 55/17* | (2006.01) |
| *B21D 45/02* | (2006.01) |
| *B21D 22/02* | (2006.01) |
| *B21D 45/00* | (2006.01) |

(52) U.S. Cl.
CPC ............ *B21K 1/30* (2013.01); *F16H 55/17* (2013.01); *B21D 22/025* (2013.01); *B21D 45/003* (2013.01); *B21D 45/02* (2013.01)

(58) Field of Classification Search
CPC ........ B21D 45/02; B21D 45/003; B21K 1/30; F16H 55/17
See application file for complete search history.

(56) References Cited

U.S. PATENT DOCUMENTS

| | | | | |
|---|---|---|---|---|
| 6,095,006 | A | 8/2000 | Morita et al. | |
| 7,530,284 | B2* | 5/2009 | Sano | F16D 13/683 |
| | | | | 192/70.2 |
| 2012/0240405 | A1* | 9/2012 | Iwata | B21D 53/28 |
| | | | | 29/893.34 |
| 2013/0040161 | A1* | 2/2013 | Gerlach | B21J 5/08 |
| | | | | 428/603 |
| 2013/0059166 | A1* | 3/2013 | Nagata | B21D 53/28 |
| | | | | 428/600 |
| 2013/0081439 | A1* | 4/2013 | Nakashima | B21D 17/02 |
| | | | | 72/347 |
| 2015/0239029 | A1 | 8/2015 | Yamamoto et al. | |

FOREIGN PATENT DOCUMENTS

| | | |
|---|---|---|
| JP | 60-9537 A | 1/1985 |
| JP | 61-182837 A | 8/1986 |
| JP | 62-174724 U | 11/1987 |
| JP | 63-11126 U | 1/1988 |
| JP | 2885266 B2 | 4/1999 |
| JP | 2014-91146 A | 5/2014 |
| JP | 5610104 B1 | 10/2014 |
| RU | 2 056 211 C1 | 3/1996 |
| WO | WO 2012/127726 A1 | 9/2012 |

OTHER PUBLICATIONS

Extended European Search Report dated Aug. 10, 2018, in European Patent Application No. 16739976.5.
International Search Report for PCT/JP2016/050348 (PCT/ISA/210) dated Apr. 12, 2016.
Written Opinion of the International Searching Authority for PCT/JP2016/050348 (PCT/ISA/237) dated Apr. 12, 2016.
Office Action dated May 4, 2018, in Chinese Patent Application No. 201680005861.6, with partial English translation.

* cited by examiner

--PRIOR ART--

--PRIOR ART--

--PRIOR ART--

--PRIOR ART--

A-A CROSS SECTION

A-A CROSS SECTION

A-A CROSS SECTION

A-A CROSS SECTION

A-A CROSS SECTION

A-A CROSS SECTION

METHOD OF MANUFACTURING TOOTH-SHAPED COMPONENT, AND TOOTH-SHAPED COMPONENT

TECHNICAL FIELD OF THE INVENTION

The present invention relates to a method of manufacturing a tooth-shaped component and a tooth-shaped component.

Priorities are claimed on Japanese Patent Application No. 2015-9637, Japanese Patent Application No. 2015-9710, Japanese Patent Application No. 2015-9711, and Japanese Patent Application No. 2015-9719, filed on Jan. 21, 2015, and Japanese Patent Application No. 2015-226009 and Japanese Patent Application No. 2015-225947, filed on Nov. 18, 2015, the contents of which are incorporated herein by reference.

RELATED ART

In the related art, a method of manufacturing a metal tooth-shaped component through press forming is known. For example, Patent Document 1 discloses a method of integrally manufacturing a drive plate and a ring gear which are configuration components of a vehicular automatic transmission device, as one tooth-shaped component. The method includes a process of obtaining a bottomed cylindrical container by draw-forming a sheet metal material (workpiece), and a process of forming a tooth shape in a side wall portion while the side wall portion is increased in thickness through forging pressure forming in a state where an inner circumferential surface of the side wall portion of the cylindrical container is restricted.

As illustrated in FIG. 1D, a tooth-shaped component 11 includes a bottom surface portion 11a and a side wall portion 11b which is erected from an outer edge portion of the bottom surface portion 11a. In a method of manufacturing a tooth-shaped component in the related art, there are cases of an occurrence of a defect lie (hereinafter, will be referred to as superposition defect) which is formed in a boundary between an upper surface of the bottom surface portion 11a and the inner circumferential surface of the side wall portion 11b due to a portion of the inner circumferential surface of the side wall portion 11b being superposed on the upper surface of the bottom surface portion 11a.

Hereinafter, a mechanism of the occurrence of the superposition defect 11e will be described. In the following description, for convenience of the description, the same reference numeral 11 is also used for a cylindrical container obtained in a course of manufacturing a tooth-shaped component 11. As illustrated in FIG. 1A, a cylindrical container 11 obtained by draw-forming a workpiece is positioned on a die 14, and the bottom surface portion 11a of the cylindrical container 11 is restricted by a flat surface portion 12a of a restriction punch 12 and a flat surface portion 14a of the die 14. In this state, an opening end 11d of the cylindrical container 11 is pressed by a flat surface portion 13a of a forging punch 13, thereby forming a tooth shape. As illustrated in FIG. 1A, before the forging pressure forming, the plate thickness of a corner portion 11c of the cylindrical container 11 is thinner than the plate thicknesses of the bottom surface portion 11a and the side wall portion 11b. As illustrated in FIG. 1B, when the forging pressure forming starts, that is, when an operation of lowering the forging punch 13 starts, the side wall portion 11b is crushed downward, and the side wall portion 11b is thereby increased in thickness. Therefore, in a course of the forging pressure forming, a flow of materials occurs in the corner portion 11c in the direction of the arrow in the diagram. As a result, a gap 15 is generated between an inner surface side of the corner portion 11c and a shoulder R portion 12b of the restriction punch 12. Thereafter, as illustrated in FIG. 1C, when the opening end 11d of the cylindrical container 11 is further pressed by the forging punch 13, a portion of the inner circumferential surface of the side wall portion 11b swells and flows into the gap 15. As a result, as illustrated in FIG. 1D, after the forging pressure forming ends, the portion of the inner circumferential surface of the side wall portion 11b is superposed on the upper surface of the bottom surface portion 11a, and the superposition defect 11e is thereby formed in a boundary between the upper surface of the bottom surface portion 11a and the inner circumferential surface of the side wall portion 11b.

PRIOR ART DOCUMENT

Patent Document

[Patent Document 1] Japanese Patent No. 2885266

DISCLOSURE OF THE INVENTION

Problems to be Solved by the Invention

Recently, as a method of manufacturing a machine component requiring high dimensional accuracy and strength, such as a tooth-shaped component for an automatic transmission device, cold forging has attracted attention. Compared to hot forging, a machine component having high accuracy and high strength can be obtained through the cold forging. Moreover, the manufacturing cost is low and there is an advantage such as high yield.

However, a superposition defect occurring in the course of manufacturing a tooth-shaped component as described above causes deterioration of the yield. Therefore, it is not possible to sufficiently obtain the advantage of high yield originally obtained by employing the cold forging.

Therefore, even in a case of employing the cold forging as a method of manufacturing a tooth-shaped component requiring high dimensional accuracy and strength (that is, a tooth-shaped component requiring high quality), there has been a demand for a technology which can improve the yield of the tooth-shaped component by reducing the occurrence of a superposition defect in the manufacturing course.

The present invention has been made in consideration of the foregoing circumstances and an object thereof is to provide a method of manufacturing a tooth-shaped component in which a yield of a tooth-shaped component can be improved, and a high-quality tooth-shaped component.

Means for Solving the Problem

The present invention employs the following means for solving the problem and achieving the object.

(1) According to an aspect of the present invention, a method of manufacturing a tooth-shaped component is provided, including drawing process of draw-forming a workpiece so as to obtain a cylindrical container which has a bottom surface portion and a side surface portion; diameter-reducing process of reducing a diameter of a particular part in which a tooth tip portion is to be formed in the side surface portion of the cylindrical container, so as to increase a thickness of a corner portion between the bottom surface portion and the side surface portion; and tooth shape-forming process of forming the tooth tip portion in the particular part of the cylindrical container reduced in diameter in the diameter-reducing process, so as to obtain a tooth-shaped component which has the bottom surface portion, the side surface portion, and the tooth tip portion. In the diameter-reducing process, in a case where the cylindrical container is viewed in a cross section including a central axis direction and a radial direction of the cylindrical container, when an intersection point of a straight line L1 in parallel contact with the bottom surface portion of the cylindrical container and a straight line L2 in parallel contact with the side surface portion of the cylindrical container is defined as P0, a point at which the straight line L1 starts being separated from the bottom surface portion of the cylindrical container is defined as P1, a point at which the straight line L2 starts being separated from the side surface portion of the cylindrical container is defined as P2, the length between the intersection point P0 and the point P1 on the straight line L1 is defined as ΔR, and the length between the intersection point P0 and the point P2 on the straight line L2 is defined as ΔH, the corner portion is increased in thickness such that an external shape of the corner portion of the cylindrical container satisfies the following conditional expression (1) expressed by using a plate thickness t of the cylindrical container, and the lengths ΔR and ΔH.

$$(\Delta R + \Delta H) \leq 2t \quad (1)$$

(2) The method of manufacturing a tooth-shaped component according to (1) may further include diameter-increasing process of increasing a diameter of the particular part of the cylindrical container obtained through the drawing process, between the drawing process and the diameter-reducing process.

(3) In the method of manufacturing a tooth-shaped component according to (1) or (2), the tooth shape-forming process may include rough tooth shape-forming process of forming a rough tooth shape in the particular part of the cylindrical container reduced in diameter in the diameter-reducing process, and complete tooth shape-forming process of forming a complete tooth shape as the tooth tip portion in the particular part by processing the rough tooth shape.

(4) In the method of manufacturing a tooth-shaped component according to any one of (1) to (3), the workpiece may be a flat sheet which has peak portions and valley portions provided so as to alternately appear along a circumferential direction having a member axis as a center, and the peak portion may be a part which protrudes outward from the valley portion in a radial direction having the member axis as the center.

(5) In the method of manufacturing a tooth-shaped component according to any one of (1) to (3), the workpiece may be a circular flat sheet or a polygonal flat sheet.

(6) In the method of manufacturing a tooth-shaped component according to (1), the workpiece may be a flat sheet which has peak portions and valley portions provided so as to alternately appear along a circumferential direction having a member axis as a center, and the peak portion may be a part which protrudes outward from the valley portion in a radial direction having the member axis as the center. In the drawing process, the workpiece may be draw-formed such that the peak portion and the valley portion are included in the side surface portion of the cylindrical container. In the diameter-reducing process, the peak portion included in the side surface portion of the cylindrical container obtained through the drawing process may be reduced in diameter, as the particular part.

(7) In the method of manufacturing a tooth-shaped component according to (6), in the drawing process, a punch and a die, having coaxially disposed central axes may be used. The punch may have a punch flat surface portion parallel to a radial direction orthogonal to the central axis, and a punch side surface portion continued via the punch flat surface portion and a punch curved surface portion and extending in a first direction parallel to the central axis, and a peak site and a valley site elongated in the first direction may be formed in the punch side surface portion. The die may have a die flat surface portion parallel to a radial direction orthogonal to the central axis, and a die side surface portion continued to the die flat surface portion and extending in the first direction, and a peak site and a valley site elongated in the first direction may be formed in the die side surface portion. After the workpiece is positioned on the die such that the peak portion of the workpiece is positioned in the valley site of the die, the punch may be relatively moved in a direction of the die so as to obtain the cylindrical container in which the side surface portion stands upright with respect to the bottom surface portion.

(8) In the method of manufacturing a tooth-shaped component according to (6) or (7), in the diameter-reducing process, a punch, a counter punch, and a die disposed in an outer circumference of the counter punch, having coaxially disposed central axes may be used. The punch may have a punch flat surface portion parallel to a radial direction orthogonal to the central axis, and a punch side surface portion continued via the punch flat surface portion and a punch curved surface portion, extending in a first direction parallel to the central axis, and having a radius equal to an inner radius of the tooth tip portion of the tooth-shaped component. The counter punch may have a counter punch flat surface portion parallel to a radial direction orthogonal to the central axis, and a counter punch side surface portion continued to the counter punch flat surface portion, extending in an opposite direction of the first direction, and having a radius equal to an outer radius of the tooth tip portion of the tooth-shaped component. The die may have a die side surface portion extending in the first direction and having a radius equal to an outer radius of the tooth tip portion of the tooth-shaped component, and a die slope portion continued via the die side surface portion and a die curved surface portion and widened in a direction orthogonal to the central axis toward the first direction. In a state where the bottom surface portion of the cylindrical container obtained through the drawing process is interposed between the punch and the counter punch, the punch and the counter punch may be relatively moved in a direction of the die so as to cause the peak portion included in the side surface portion of the cylindrical container to be reduced in diameter as the particular part.

(9) In the method of manufacturing a tooth-shaped component according to any one of (6) to (8), in the tooth shape-forming process, an inner punch, an outer punch disposed in an outer circumference of the inner punch, a counter punch, and a die disposed in an outer circumference of the counter punch, having coaxially disposed central axes may be used. The inner punch may have an inner punch flat surface portion parallel to a radial direction orthogonal to the central axis, and an inner punch side surface portion continued via the inner punch flat surface portion and an inner punch curved surface portion and extending in a first direction parallel to the central axis, and an inner punch peak site and an inner punch valley site extending in the first direction may be formed in the inner punch side surface portion. The die may have a die side surface portion extending in the first direction and a die slope portion continued via the die side surface portion and a die curved surface portion and widened in a direction orthogonal to the central axis toward the first direction, and a die valley site and a die peak site extending in the first direction may be formed in the die side surface portion. The outer punch may have an outer punch flat surface portion parallel to a radial direction orthogonal to the central axis, an outer punch first side surface portion continued to the outer punch flat surface portion and extending in the first direction along the inner punch side surface portion, and an outer punch second side surface portion continued to the outer punch flat surface portion and extending in the first direction along the die side surface portion. The counter punch may have a counter punch side surface portion extending in the first direction along the die side surface portion, and a counter punch flat surface portion continued to the counter punch side surface portion and parallel to a radial direction orthogonal to the central axis. In a state where the bottom surface portion of the cylindrical container is interposed between the inner punch flat surface portion and the counter punch flat surface portion such that the peak portion of the cylindrical container reduced in diameter in the diameter-reducing process is positioned in the die valley site, after the outer punch flat surface portion is caused to abut an opening end of the cylindrical container, the inner punch, the outer punch, and the counter punch may be relatively moved in a direction of the die, and after the outer punch flat surface portion passes through the die curved surface portion, in a state where the inner punch, the counter punch, and the die are fixed, the outer punch may be relatively moved in a direction of the counter punch so as to form the tooth tip portion in the peak portion of the cylindrical container.

(10) In the method of manufacturing a tooth-shaped component according to any one of (6) to (8), the tooth shape-forming process may include rough tooth shape-forming process of forming a rough tooth shape in the peak portion of the cylindrical container reduced in diameter in the diameter-reducing process, and complete tooth shape-forming process of forming a complete tooth shape as the tooth tip portion in the peak portion by processing the rough tooth shape.

(11) In the method of manufacturing a tooth-shaped component according to (10), in the rough tooth shape-forming process, a rough tooth shape-forming inner punch, a rough tooth shape-forming outer punch disposed in an outer circumference of the rough tooth shape-forming inner punch, a rough tooth shape-forming counter punch, and a rough tooth shape-forming die disposed in an outer circumference of the rough tooth shape-forming counter punch, having coaxially disposed central axes may be used. The rough tooth shape-forming inner punch may have a rough tooth shape-forming inner punch flat surface portion parallel to a radial direction orthogonal to the central axis, a rough tooth shape-forming inner punch side surface portion continued via the rough tooth shape-forming inner punch flat surface portion and a rough tooth shape-forming inner punch curved surface portion and extending in a first direction parallel to the central axis, and a rough tooth shape-forming inner punch peak site and a rough tooth shape-forming inner punch valley site extending in the first direction may be formed in the rough tooth shape-forming inner punch side surface portion. The rough tooth shape-forming die may have a rough tooth shape-forming die side surface portion extending in the first direction, and a rough tooth shape-forming die slope portion continued via the rough tooth shape-forming die side surface portion and a rough tooth shape-forming die curved surface portion and widened in a direction orthogonal to the central axis toward the first direction, and a rough tooth shape-forming die valley site and a rough tooth shape-forming die peak site extending in the first direction may be formed in the rough tooth shape-forming die side surface portion. The rough tooth shape-forming outer punch may have a rough tooth shape-forming outer punch flat surface portion parallel to a radial direction orthogonal to the central axis, a rough tooth shape-forming outer punch first side surface portion continued to the rough tooth shape-forming outer punch flat surface portion and extending in the first direction along the rough tooth shape-forming inner punch side surface portion, and a rough tooth shape-forming outer punch second side surface portion continued to the rough tooth shape-forming outer punch flat surface portion and extending in the first direction along the rough tooth shape-forming die side surface portion. The rough tooth shape-forming counter punch may have a rough tooth shape-forming counter punch side surface portion extending in the first direction along the rough tooth shape-forming die side surface portion, and a rough tooth shape-forming counter punch flat surface portion continued to the rough tooth shape-forming counter punch side surface portion and parallel to a radial direction orthogonal to the central axis. In a state where the bottom surface portion of the cylindrical container is interposed between the rough tooth shape-forming inner punch flat surface portion and the rough tooth shape-forming counter punch flat surface portion such that the peak portion of the cylindrical container reduced in diameter in the diameter-reducing process is positioned in the rough tooth shape-forming die valley site, after the rough tooth shape-forming outer punch flat surface portion is caused to abut an opening end of the cylindrical container, the rough tooth shape-forming inner punch, the rough tooth shape-forming outer punch, and the rough tooth shape-forming counter punch may be relatively moved in a direction of the rough tooth shape-forming die so as to form the rough tooth shape in the peak portion of the cylindrical container.

(12) In the method of manufacturing a tooth-shaped component according to (11), in the complete tooth shape-forming process, a complete tooth shape-forming inner punch, a complete tooth shape-forming outer punch disposed in an outer circumference of the complete tooth shape-forming inner punch, and a complete tooth shape-forming die, having coaxially disposed central axes may be used. The complete tooth shape-forming inner punch may have a complete tooth shape-forming inner punch flat surface portion parallel to a radial direction orthogonal to the central axis, and a complete tooth shape-forming inner punch side surface portion continued via the complete tooth shape-forming inner punch flat surface portion and a complete tooth shape-forming inner punch curved surface portion and extending in a first direction parallel to the central axis, and the complete tooth shape-forming inner punch side surface portion may have the same shape and dimensions of a cross section orthogonal to the central axis as the rough tooth shape-forming inner punch side surface portion and have a complete tooth shape-forming inner punch peak site and a complete tooth shape-forming inner punch valley site elongated in the first direction. The complete tooth shape-forming die may have a complete tooth shape-forming die flat surface portion parallel to a radial direction orthogonal to the central axis, and a complete tooth shape-forming die side surface portion continued to the complete tooth shape-forming die flat surface portion and extending in the first direction, and the complete tooth shape-forming die side surface portion may have the same shape and dimensions of a cross section orthogonal to the central axis as the rough tooth shape-forming die side surface portion and have a complete tooth shape-forming die peak site and a complete tooth shape-forming die valley site elongated in the first direction. The complete tooth shape-forming outer punch may have a complete tooth shape-forming outer punch flat surface portion parallel to a radial direction orthogonal to the central axis, a complete tooth shape-forming outer punch first side surface portion continued to the complete tooth shape-forming outer punch flat surface portion and extending in the first direction along the complete tooth shape-forming inner punch side surface portion, and a complete tooth shape-forming outer punch second side surface portion continued to the complete tooth shape-forming outer punch flat surface portion and extending in the first direction along the complete tooth shape-forming die side surface portion. In a state where the bottom surface portion of the cylindrical container is interposed between the complete tooth shape-forming inner punch flat surface portion and the complete tooth shape-forming die flat surface portion such that the rough tooth shape formed in the peak portion of the cylindrical container in the rough tooth shape-forming process is positioned in the complete tooth shape-forming die valley site, the complete tooth shape-forming outer punch flat surface portion may be pressed to an opening end of the cylindrical container so as to form the complete tooth shape in the peak portion of the cylindrical container.

(13) The method of manufacturing a tooth-shaped component according to (1) may further include diameter-increasing process of increasing a diameter of the particular part of the cylindrical container obtained through the drawing process, between the drawing process and the diameter-reducing process. The workpiece may be a flat sheet which has peak portions and valley portions provided so as to alternately appear along a circumferential direction having a member axis as a center, and the peak portion may be a part which protrudes outward from the valley portion in a radial direction having the member axis as the center. In the drawing process, the workpiece may be draw-formed such that the peak portion and the valley portion are included in the side surface portion of the cylindrical container. In the diameter-increasing process, a projection portion realized by the deformed peak portion included in the side surface portion of the cylindrical container obtained through the drawing process may be increased in diameter, as the particular part. In the diameter-reducing process, the projection portion of the cylindrical container increased in diameter in the diameter-increasing process may be reduced in diameter.

(14) In the method of manufacturing a tooth-shaped component according to (13), the diameter-increasing process may include a first step using a first punch and a first die having coaxially disposed central axes, and a second step using a second punch and a second die having coaxially disposed central axes. The first punch may have a first punch flat surface portion parallel to a radial direction orthogonal to the central axis, a first punch slope portion continued via the first punch flat surface portion and a first punch first curved surface portion and widened in a radial direction orthogonal to the central axis toward a first direction parallel to the central axis, and a first punch side surface portion continued via the first punch slope portion and a first punch second curved surface portion and extending in the first direction, and a peak site and a valley site elongated in the first direction may be formed in the first punch side surface portion. The first die may have a first die flat surface portion parallel to a radial direction orthogonal to the central axis, and a first die side surface portion continued to the first die flat surface portion and extending in the first direction, a peak site and a valley site elongated in the first direction are formed in the first die side surface portion, and the first die side surface portion may be disposed in a form of being offset in a radial direction from the first punch side surface portion as much as a plate thickness of the workpiece. The second punch may have a second punch flat surface portion parallel to a radial direction orthogonal to the central axis, and a second punch side surface portion continued via the second punch flat surface portion and a second punch curved surface portion and extending in the first direction, and the second punch side surface portion may have the same shape and dimensions as the first punch side surface portion and have a peak site and a valley site elongated in the first direction and formed therein. The second die may have a second die flat surface portion parallel to a radial direction orthogonal to the central axis, and a second die side surface portion continued to the second die flat surface portion and extending in the first direction, and the second die side surface portion may have the same shape and dimensions as the first die side surface portion and have a peak site and a valley site elongated in the first direction and formed therein. In the first step, after the cylindrical container is positioned on the first die such that the projection portion realized by the deformed peak portion of the cylindrical container obtained through the drawing process is positioned in the valley site of the first die, the first punch may be relatively moved in a direction of the first die so as to increase a diameter of the projection portion. In the second step, after the cylindrical container is positioned on the second die such that the diameter-increased projection portion is positioned in the valley site of the second die, the second punch may be relatively moved in a direction of the second die so as to obtain the cylindrical container in which the side surface portion stands upright with respect to the bottom surface portion.

(15) In the method of manufacturing a tooth-shaped component according to (13) or (14), in the diameter-reducing process, a punch, a counter punch, and a die disposed in an outer circumference of the counter punch, having coaxially disposed central axes may be used. The punch may have a punch flat surface portion parallel to a radial direction orthogonal to the central axis, and a punch side surface portion continued via the punch flat surface portion and a punch curved surface portion, extending in a first direction parallel to the central axis, and having a radius equal to an inner radius of the tooth tip portion of the tooth-shaped component. The counter punch may have a counter punch flat surface portion parallel to a radial direction orthogonal to the central axis, and a counter punch side surface portion continued to the counter punch flat surface portion, extending in an opposite direction of the first direction, and having a radius equal to an outer radius of the tooth tip portion of the tooth-shaped component. The die may have a die side surface portion extending in the first direction and having a radius equal to an outer radius of the tooth tip portion of the tooth-shaped component, and a die slope portion continued via the die side surface portion and a die curved surface portion and widened in a direction orthogonal to the central axis toward the first direction. In a state where the bottom surface portion of the cylindrical container having the projection portion increased in diameter through the diameter-increasing process is interposed between the punch and the counter punch, the punch and the counter punch may be relatively moved in a direction of the die so as to cause the projection portion included in the side surface portion of the cylindrical container to be reduced in diameter.

(16) In the method of manufacturing a tooth-shaped component according to any one of (13) to (15), in the tooth shape-forming process, an inner punch, an outer punch disposed in an outer circumference of the inner punch, a counter punch, and a die disposed in an outer circumference of the counter punch, having coaxially disposed central axes may be used. The inner punch may have an inner punch flat surface portion parallel to a radial direction orthogonal to the central axis, and an inner punch side surface portion continued via the inner punch flat surface portion and an inner punch curved surface portion and extending in a first direction parallel to the central axis, and an inner punch peak site and an inner punch valley site extending in the first direction may be formed in the inner punch side surface portion. The die may have a die side surface portion extending in the first direction, and a die slope portion continued via the die side surface portion and a die curved surface portion and widened in a direction orthogonal to the central axis toward the first direction, and a die valley site and a die peak site extending in the first direction may be formed in the die side surface portion. The outer punch may have an outer punch flat surface portion parallel to a radial direction orthogonal to the central axis, an outer punch first side surface portion continued to the outer punch flat surface portion and extending in the first direction along the inner punch side surface portion, and an outer punch second side surface portion continued to the outer punch flat surface portion and extending in the first direction along the die side surface portion. The counter punch may have a counter punch side surface portion extending in the first direction along the die side surface portion, and a counter punch flat surface portion continued to the counter punch side surface portion and parallel to a radial direction orthogonal to the central axis. In a state where the bottom surface portion of the cylindrical container is interposed between the inner punch flat surface portion and the counter punch flat surface portion such that the projection portion reduced in diameter through the diameter-reducing process is positioned in the die valley site, after the outer punch flat surface portion is caused to abut an opening end of the cylindrical container, the inner punch, the outer punch, and the counter punch may be relatively moved in a direction of the die, and after the outer punch flat surface portion passes through the die curved surface portion, in a state where the inner punch, the counter punch, and the die are fixed, the outer punch may be relatively moved in a direction of the counter punch so as to form the tooth tip portion in the projection portion of the cylindrical container.

(17) In the method of manufacturing a tooth-shaped component according to any one of (13) to (15), the tooth shape-forming process may include rough tooth shape-forming process of forming a rough tooth shape in the projection portion of the cylindrical container reduced in diameter in the diameter-reducing process, and complete tooth shape-forming process of forming a complete tooth shape as the tooth tip portion in the projection portion by processing the rough tooth shape.

(18) In the method of manufacturing a tooth-shaped component according to (17), in the rough tooth shape-forming process, a rough tooth shape-forming inner punch, a rough tooth shape-forming outer punch disposed in an outer circumference of the rough tooth shape-forming inner punch, a rough tooth shape-forming counter punch, and a rough tooth shape-forming die disposed in an outer circumference of the rough tooth shape-forming counter punch, having coaxially disposed central axes may be used. The rough tooth shape-forming inner punch may have a rough tooth shape-forming inner punch flat surface portion parallel to a radial direction orthogonal to the central axis, a rough tooth shape-forming inner punch side surface portion continued via the rough tooth shape-forming inner punch flat surface portion and a rough tooth shape-forming inner punch curved surface portion and extending in a first direction parallel to the central axis, and a rough tooth shape-forming inner punch peak site and a rough tooth shape-forming inner punch valley site extending in the first direction may be formed in the rough tooth shape-forming inner punch side surface portion. The rough tooth shape-forming die may have a rough tooth shape-forming die side surface portion extending in the first direction, and a rough tooth shape-forming die slope portion continued via the rough tooth shape-forming die side surface portion and a rough tooth shape-forming die curved surface portion and widened in a direction orthogonal to the central axis toward the first direction, and a rough tooth shape-forming die valley site and a rough tooth shape-forming die peak site extending in the first direction may be formed in the rough tooth shape-forming die side surface portion. The rough tooth shape-forming outer punch may have a rough tooth shape-forming outer punch flat surface portion parallel to a radial direction orthogonal to the central axis, a rough tooth shape-forming outer punch first side surface portion continued to the rough tooth shape-forming outer punch flat surface portion and extending in the first direction along the rough tooth shape-forming inner punch side surface portion, and a rough tooth shape-forming outer punch second side surface portion continued to the rough tooth shape-forming outer punch flat surface portion and extending in the first direction along the rough tooth shape-forming die side surface portion. The rough tooth shape-forming counter punch may have a rough tooth shape-forming counter punch side surface portion extending in the first direction along the rough tooth shape-forming die side surface portion, and a rough tooth shape-forming counter punch flat surface portion continued to the rough tooth shape-forming counter punch side surface portion and parallel to a radial direction orthogonal to the central axis. In a state where the bottom surface portion of the cylindrical container is interposed between the rough tooth shape-forming inner punch flat surface portion and the rough tooth shape-forming counter punch flat surface portion such that the projection portion reduced in diameter through the diameter-reducing process is positioned in the rough tooth shape-forming die valley site, after the rough tooth shape-forming outer punch flat surface portion is caused to abut an opening end of the cylindrical container, the rough tooth shape-forming inner punch, the rough tooth shape-forming outer punch, and the rough tooth shape-forming counter punch may be relatively moved in a direction of the rough tooth shape-forming die so as to form the rough tooth shape in the projection portion of the cylindrical container.

(19) In the method of manufacturing a tooth-shaped component according to (18), in the complete tooth shape-forming process, a complete tooth shape-forming inner punch, a complete tooth shape-forming outer punch disposed in an outer circumference of the complete tooth shape-forming inner punch, and a complete tooth shape-forming die, having coaxially disposed central axes may be used. The complete tooth shape-forming inner punch may have a complete tooth shape-forming inner punch flat surface portion parallel to a radial direction orthogonal to the central axis, and a complete tooth shape-forming inner punch side surface portion continued via the complete tooth shape-forming inner punch flat surface portion and a complete tooth shape-forming inner punch curved surface portion and extending in a first direction parallel to the central axis, and the complete tooth shape-forming inner punch side surface portion may have the same shape and dimensions of a cross section orthogonal to the central axis as the rough tooth shape-forming inner punch side surface portion and have a complete tooth shape-forming inner punch peak site and a complete tooth shape-forming inner punch valley site elongated in the first direction. The complete tooth shape-forming die may have a complete tooth shape-forming die flat surface portion parallel to a radial direction orthogonal to the central axis, and a complete tooth shape-forming die side surface portion continued to the complete tooth shape-forming die flat surface portion and extending in the first direction, and the complete tooth shape-forming die side surface portion may have the same shape and dimensions of a cross section orthogonal to the central axis as the rough tooth shape-forming die side surface portion and have a complete tooth shape-forming die peak site and a complete tooth shape-forming die valley site elongated in the first direction. The complete tooth shape-forming outer punch may have a complete tooth shape-forming outer punch flat surface portion parallel to a radial direction orthogonal to the central axis, a complete tooth shape-forming outer punch first side surface portion continued to the complete tooth shape-forming outer punch flat surface portion and extending in the first direction along the complete tooth shape-forming inner punch side surface portion, and a complete tooth shape-forming outer punch second side surface portion continued to the complete tooth shape-forming outer punch flat surface portion and extending in the first direction along the complete tooth shape-forming die side surface portion. In a state where the bottom surface portion of the cylindrical container is interposed between the complete tooth shape-forming inner punch flat surface portion and the complete tooth shape-forming die flat surface portion such that the rough tooth shape formed in the projection portion of the cylindrical container in the rough tooth shape-forming process is positioned in the complete tooth shape-forming die valley site, the complete tooth shape-forming outer punch flat surface portion may be pressed to an opening end of the cylindrical container so as to form the complete tooth shape in the projection portion of the cylindrical container.

(20) The method of manufacturing a tooth-shaped component according to (1) may further include diameter-increasing process of increasing a diameter of the particular part of the cylindrical container obtained through the drawing process, between the drawing process and the diameter-reducing process. In the drawing process, the workpiece which is a circular flat sheet may be draw-formed so as to obtain the cylindrical container.

(21) In the method of manufacturing a tooth-shaped component according to (20), the diameter-increasing process may include a first step using a first punch and a first die having coaxially disposed central axes, and a second step using a second punch and a second die having coaxially disposed central axes. The first punch may have a first punch flat surface portion parallel to a radial direction orthogonal to the central axis, a first punch slope portion continued via the first punch flat surface portion and a first punch first curved surface portion and widened in a radial direction orthogonal to the central axis toward a first direction parallel to the central axis, and a first punch side surface portion continued via the first punch slope portion and a first punch second curved surface portion and elongated in the first direction, and a peak site and a valley site elongated in the first direction may be formed in the first punch side surface portion. The first die may have a first die first side surface portion elongated in the first direction, a first die flat surface portion continued to the first die first side surface portion and parallel to a radial direction orthogonal to the central axis, and a first die second side surface portion continued to the first die flat surface portion and elongated in the first direction, and the first die second side surface portion may have a peak site and a valley site which are offset in a radial direction from the first punch side surface portion as much as a plate thickness of the workpiece. The second punch may have a second punch flat surface portion parallel to a radial direction orthogonal to the central axis, and a second punch side surface portion continued via the second punch flat surface portion and a second punch curved surface portion and elongated in the first direction, and the second punch side surface portion may have the same shape and dimensions as the first punch side surface portion and have a peak site and a valley site elongated in the first direction and formed therein. The second die may have a second die first side surface portion elongated in the first direction, a second die flat surface portion continued to the second die first side surface portion and parallel to a radial direction orthogonal to the central axis, and a second die second side surface portion continued to the second die flat surface portion and elongated in the first direction, and the second die second side surface portion may have the same shape and dimensions as the first die second side surface portion and have a peak site and a valley site elongated in the first direction and formed therein. In the first step, after the cylindrical container obtained through the drawing process is positioned on the first die, the first punch may be relatively moved in a direction of the first die so as to increase a diameter of the particular part included in the side surface portion due to the peak site of the first punch. In the second step, after the cylindrical container is positioned on the second die flat surface portion such that the diameter-increased particular part is positioned in the valley site of the second die, the second punch may be relatively moved in a direction of the second die so as to obtain the cylindrical container in which the side surface portion stands upright with respect to the bottom surface portion.

(22) In the method of manufacturing a tooth-shaped component according to (20) or (21), in the diameter-reducing process, a punch, a counter punch having a central axis coaxially disposed with the punch, and a die disposed along an outer circumference of the counter punch may be used. The punch may have a punch flat surface portion parallel to a radial direction orthogonal to the central axis, and a punch side surface portion continued via the punch flat surface portion and a punch curved surface portion, elongated in a first direction parallel to the central axis along the central axis, and having a radius equal to an inner radius of the tooth tip portion of the tooth-shaped component. The counter punch may have a counter punch flat surface portion parallel to a radial direction orthogonal to the central axis, and a counter punch side surface portion continued to the counter punch flat surface portion, elongated in an opposite direction of the first direction, and having a radius equal to an outer radius of the tooth tip portion of the tooth-shaped component. The die may have a die side surface portion elongated in the first direction and having an inner radius equal to an outer radius of the tooth tip portion of the tooth-shaped component, and a die slope portion continued via the die side surface portion and a die curved surface portion and widened in a direction orthogonal to the central axis toward the first direction. In a state where the bottom surface portion of the cylindrical container having the particular part increased in diameter through the diameter-increasing process is interposed between the punch and the counter punch, the punch and the counter punch may be relatively moved in a direction of the die so as to cause the particular part included in the side surface portion of the cylindrical container to be reduced in diameter.

(23) In the method of manufacturing a tooth-shaped component according to any one of (20) to (22), in the tooth shape-forming process, an inner punch, an outer punch disposed along an outer circumference of the inner punch, a counter punch disposed so as to face the inner punch, and a die disposed along an outer circumference of the counter punch having central axes coaxially disposed with each other may be used. The inner punch may have an inner punch flat surface portion parallel to a radial direction orthogonal to the central axis, and an inner punch side surface portion continued via the inner punch flat surface portion and an inner punch curved surface portion and elongated in the first direction parallel to the central axis, and an inner punch peak site and an inner punch valley site extending in the first direction may be formed in the inner punch side surface portion. The die may have a die side surface portion elongated in the first direction, and a die slope portion continued via the die side surface portion and a die curved surface portion and widened in a direction orthogonal to the central axis toward the first direction, and a die valley site and a die peak site extending in the first direction may be formed in the die side surface portion. The outer punch may have an outer punch first side surface portion having a tubular shape and elongated in the first direction along the inner punch side surface portion, an outer punch flat surface portion continued to the outer punch first side surface portion and parallel to a radial direction orthogonal to the central axis, and an outer punch second side surface portion continued to the outer punch flat surface portion and elongated in the first direction along the die side surface portion of the die, and the outer punch flat surface portion may have a recess portion in which a part corresponding to a part between the tooth tip portions adjacent to each other is recessed. The counter punch may have a counter punch side surface portion elongated in the first direction along the die side surface portion, and a counter punch flat surface portion continued to the counter punch side surface portion and parallel to a radial direction orthogonal to the central axis. In a state where the bottom surface portion of the cylindrical container is interposed between the inner punch flat surface portion and the counter punch flat surface portion such that the particular part reduced in diameter through the diameter-reducing process is positioned in the die valley site, after the outer punch flat surface portion is caused to abut an opening end of the cylindrical container, the inner punch, the outer punch, and the counter punch may be relatively moved in a direction of the die, and after the outer punch flat surface portion passes through the die curved surface portion, in a state where the inner punch, the counter punch, and the die are fixed, the outer punch may be relatively moved in a direction of the counter punch so as to form the tooth tip portion in the particular part of the cylindrical container.

(24) In the method of manufacturing a tooth-shaped component according to any one of (20) to (22), the tooth shape-forming process may include rough tooth shape-forming process of forming a rough tooth shape in the particular part of the cylindrical container reduced in diameter in the diameter-reducing process, and complete tooth shape-forming process of forming a complete tooth shape as the tooth tip portion in the particular part by processing the rough tooth shape.

(25) In the method of manufacturing a tooth-shaped component according to (24), in the rough tooth shape-forming process, a rough tooth shape-forming inner punch, a rough tooth shape-forming outer punch disposed along an outer circumference of the rough tooth shape-forming inner punch, a rough tooth shape-forming counter punch disposed so as to face the rough tooth shape-forming inner punch, and a rough tooth shape-forming die disposed along an outer circumference of the rough tooth shape-forming counter punch having central axes coaxially disposed with each other may be used. The rough tooth shape-forming inner punch may have a rough tooth shape-forming inner punch flat surface portion parallel to a radial direction orthogonal to the central axis, and a rough tooth shape-forming inner punch side surface portion continued via the rough tooth shape-forming inner punch flat surface portion and a rough tooth shape-forming inner punch curved surface portion and elongated in the first direction parallel to the central axis, and a rough tooth shape-forming inner punch peak site and a rough tooth shape-forming inner punch valley site extending in the first direction may be formed in the rough tooth shape-forming inner punch side surface portion. The rough tooth shape-forming die may have a rough tooth shape-forming die side surface portion elongated in the first direction, and a rough tooth shape-forming die slope portion continued via the rough tooth shape-forming die side surface portion and a rough tooth shape-forming die curved surface portion and widened in a direction orthogonal to the central axis toward the first direction, and a rough tooth shape-forming die valley site and a rough tooth shape-forming die peak site extending in the first direction may be formed in the rough tooth shape-forming die side surface portion. The rough tooth shape-forming outer punch may have a rough tooth shape-forming outer punch first side surface portion having a tubular shape and elongated in the first direction along the rough tooth shape-forming inner punch side surface portion, a rough tooth shape-forming outer punch flat surface portion continued to the rough tooth shape-forming outer punch first side surface portion and parallel to a radial direction orthogonal to the central axis, and a rough tooth shape-forming outer punch second side surface portion continued to the rough tooth shape-forming outer punch flat surface portion and elongated in the first direction along the rough tooth shape-forming die side surface portion of the rough tooth shape-forming die, and the rough tooth shape-forming outer punch flat surface portion may have a recess portion in which a part corresponding to a part between the tooth tip portions adjacent to each other is recessed. The rough tooth shape-forming counter punch may have a rough tooth shape-forming counter punch side surface portion elongated in the first direction along the rough tooth shape-forming die side surface portion, and a rough tooth shape-forming counter punch flat surface portion continued to the rough tooth shape-forming counter punch side surface portion and parallel to a radial direction orthogonal to the central axis. In a state where the bottom surface portion of the cylindrical container is interposed between the rough tooth shape-forming inner punch flat surface portion and the rough tooth shape-forming counter punch flat surface portion such that the particular part reduced in diameter through the diameter-reducing process is positioned in the rough tooth shape-forming die valley site, after the rough tooth shape-forming outer punch flat surface portion is caused to abut an opening end of the cylindrical container, the rough tooth shape-forming inner punch, the rough tooth shape-forming outer punch, and the rough tooth shape-forming counter punch may be relatively moved in a direction of the rough tooth shape-forming die so as to form the rough tooth shape in the particular part of the cylindrical container.

(26) In the method of manufacturing a tooth-shaped component according to (25), in the complete tooth shape-forming process, a complete tooth shape-forming inner punch, a complete tooth shape-forming outer punch disposed along an outer circumference of the complete tooth shape-forming inner punch, a complete tooth shape-forming knockout disposed so as to face the complete tooth shape-forming inner punch, and a complete tooth shape-forming die disposed along an outer circumference of the complete tooth shape-forming knockout having central axes coaxially disposed with each other may be used. The complete tooth shape-forming inner punch may have a complete tooth shape-forming inner punch flat surface portion parallel to a radial direction orthogonal to the central axis, and a complete tooth shape-forming inner punch side surface portion continued via the complete tooth shape-forming inner punch flat surface portion and a complete tooth shape-forming inner punch curved surface portion and elongated in the first direction parallel to the central axis, and the complete tooth shape-forming inner punch side surface portion may have the same shape and dimensions of a cross section orthogonal to the central axis as the rough tooth shape-forming inner punch side surface portion and have a complete tooth shape-forming inner punch peak site and a complete tooth shape-forming inner punch valley site extending in the first direction. The complete tooth shape-forming die may have a complete tooth shape-forming die first side surface portion elongated in the first direction, a complete tooth shape-forming die flat surface portion continued to the complete tooth shape-forming die first side surface portion and parallel to a radial direction orthogonal to the central axis, a complete tooth shape-forming die second side surface portion continued to the complete tooth shape-forming die flat surface portion and elongated in the first direction, and the complete tooth shape-forming die second side surface portion may have the same shape and dimensions of a cross section orthogonal to the central axis as the rough tooth shape-forming die side surface portion and have a complete tooth shape-forming die peak site and a complete tooth shape-forming die valley site extending in the first direction. The complete tooth shape-forming outer punch may have a complete tooth shape-forming outer punch first side surface portion having a tubular shape and elongated in the first direction along the complete tooth shape-forming inner punch side surface portion, a complete tooth shape-forming outer punch flat surface portion continued to the complete tooth shape-forming outer punch first side surface portion and parallel to a radial direction orthogonal to the central axis, and a complete tooth shape-forming outer punch second side surface portion continued to the complete tooth shape-forming outer punch flat surface portion and elongated in the first direction along the complete tooth shape-forming die second side surface portion, and the complete tooth shape-forming outer punch flat surface portion may have a recess portion in which a part corresponding to a part between the tooth tip portions adjacent to each other is recessed. In a state where the bottom surface portion of the cylindrical container is interposed between the complete tooth shape-forming inner punch flat surface portion and the complete tooth shape-forming die flat surface portion such that the rough tooth shape formed in the particular part of the cylindrical container in the rough tooth shape-forming process is positioned in the complete tooth shape-forming die valley site, the complete tooth shape-forming outer punch flat surface portion may be pressed to an opening end of the cylindrical container so as to form the complete tooth shape in the particular part of the cylindrical container.

(27) The method of manufacturing a tooth-shaped component according to any one of (20) to (26) may further include flattening of machining an end portion of the tooth-shaped component after the tooth shape-forming process.

(28) According to another aspect of the present invention, a tooth-shaped component is provided which is manufactured through the method of forming a tooth-shaped component according to any one of (1) to (27).

(29) According to still another aspect of the present invention, a tooth-shaped component is provided including a bottom surface portion, a side surface portion that stands upright with respect to the bottom surface portion, and a tooth tip portion that is formed in the side surface portion. There is no draft. Dimensional accuracy of a thickness ranges from ±0.05 mm to ±0.3 mm.

Effects of the Invention

According to the method of manufacturing a tooth-shaped component in the above-described aspect of the present invention, an occurrence of a superposition defect can be reduced during a course of manufacturing a tooth-shaped component, and the yield of the tooth-shaped component can be improved. In addition, according to this manufacturing method, a high-quality tooth-shaped component having no superposition defect can be obtained. Moreover, when cold forging is applied to the method of manufacturing a tooth-shaped component, it is possible to obtain a higher quality tooth-shaped component having no draft and having the dimensional accuracy of the thickness ranging from ±0.05 mm to ±0.3 mm as well as having no superposition defect.

BRIEF DESCRIPTION OF THE DRAWINGS

FIG. 101 is a cross-sectional view illustrating a state after the drawing process of the method of manufacturing a tooth-shaped component according to the sixth embodiment.

FIG. 102 is a view illustrating a state before a first step of a diameter-increasing process of the method of manufacturing a tooth-shaped component according to the sixth embodiment and is an A-A cross-sectional view of FIG. 103.

FIG. 103 is a Y-directional plan view of FIG. 102 illustrating the state before the first step of the diameter-increasing process of the method of manufacturing a tooth-shaped component according to the sixth embodiment.

FIG. 104 is a cross-sectional view illustrating a state after the first step of the diameter-increasing process of the method of manufacturing a tooth-shaped component according to the sixth embodiment.

FIG. 105A is a plan view of a first diameter-increased cylindrical container after the first step of the diameter-increasing process.

FIG. 105B is a perspective view of the first diameter-increased cylindrical container after the first step of the diameter-increasing process.

FIG. 106 is a view illustrating a state before a second step of the diameter-increasing process of the method of manufacturing a tooth-shaped component according to the sixth embodiment and is an A-A cross-sectional view of FIG. 107.

FIG. 107 is a view illustrating the state before the second step of the diameter-increasing process of the method of manufacturing a tooth-shaped component according to the sixth embodiment and is a Y-directional plan view of FIG. 106.

FIG. 108 is a cross-sectional view illustrating a state after the second step of the diameter-increasing process of the method of manufacturing a tooth-shaped component according to the sixth embodiment.

FIG. 109 is a cross-sectional view illustrating a state before a diameter-reducing process of the method of manufacturing a tooth-shaped component according to the sixth embodiment.

FIG. 110A is a cross-sectional view illustrating a state after the diameter-reducing process of the method of manufacturing a tooth-shaped component according to the sixth embodiment.

FIG. 110B is a view describing an external shape of a corner portion of a diameter-reduced cylindrical container obtained through the diameter-reducing process.

Figure 111:
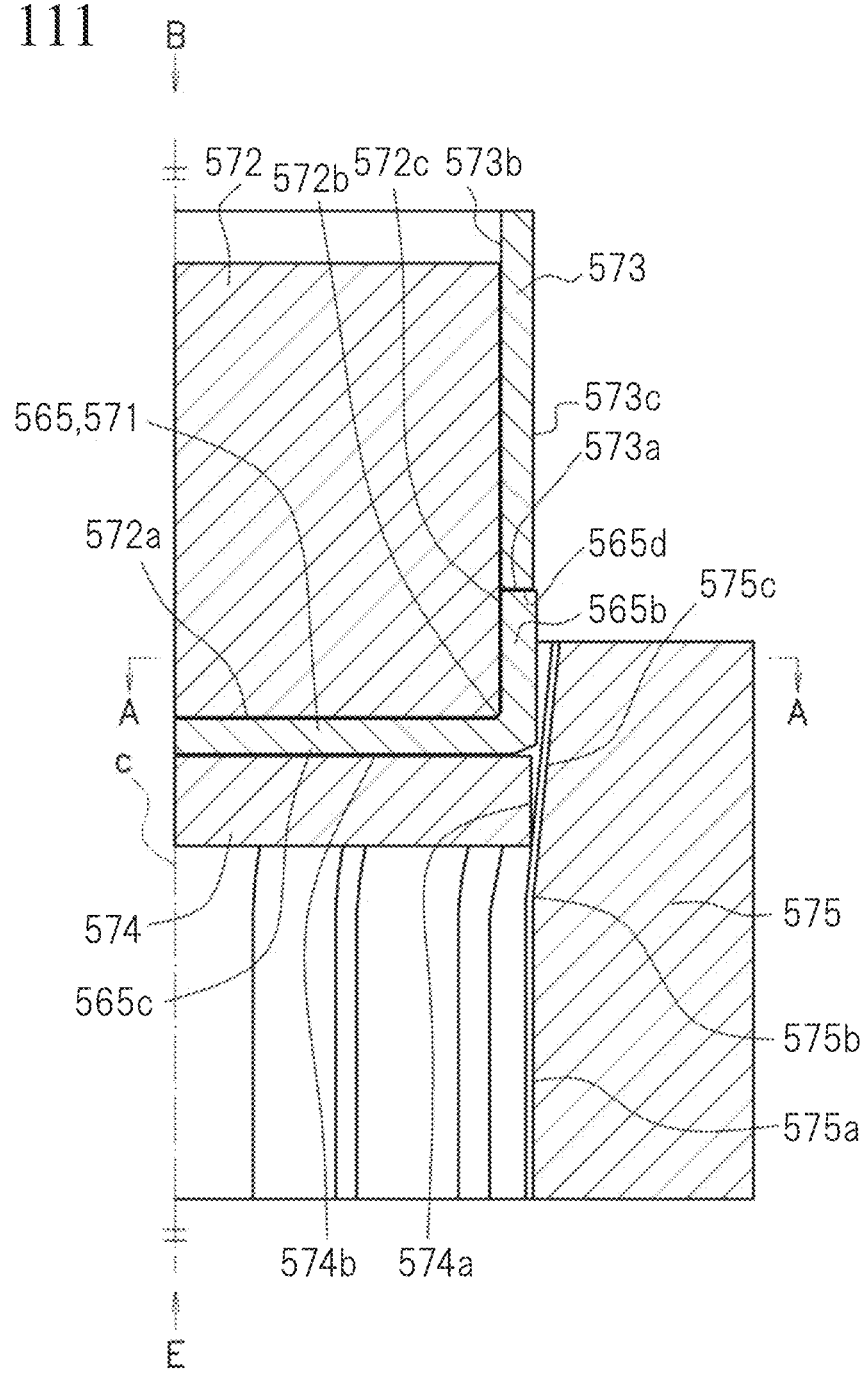
Figure 113:
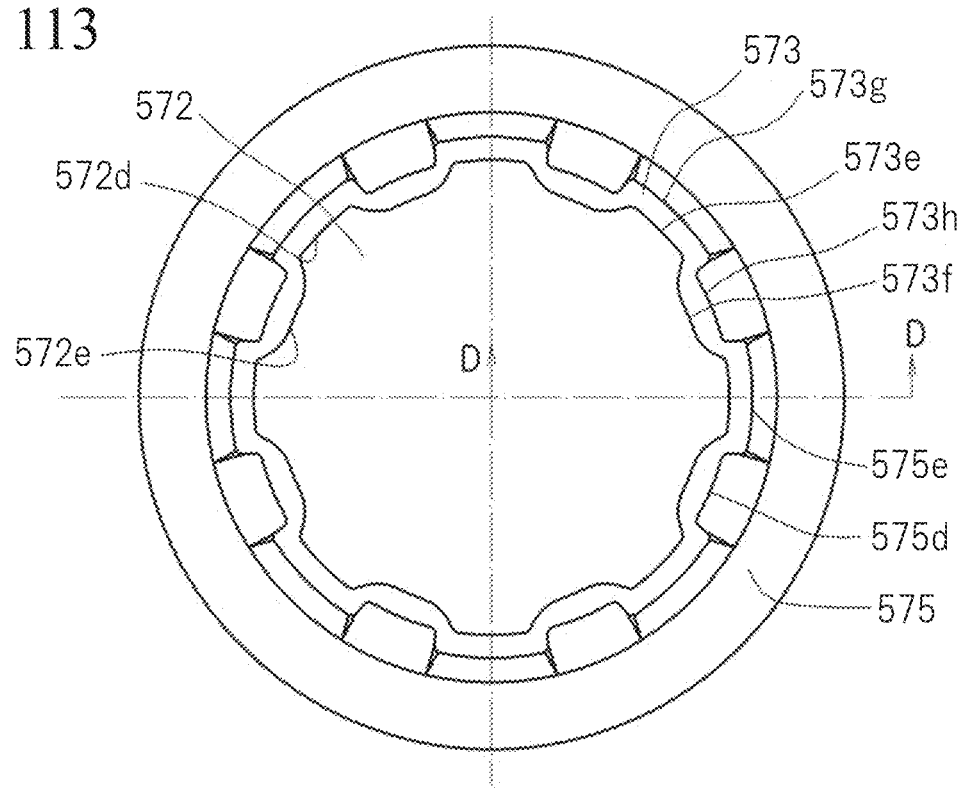

FIG. 111 is a view illustrating a state before a rough tooth shape-forming process of the method of manufacturing a tooth-shaped component according to the sixth embodiment and is a D-D cross-sectional view of FIG. 113.

Figure 112:
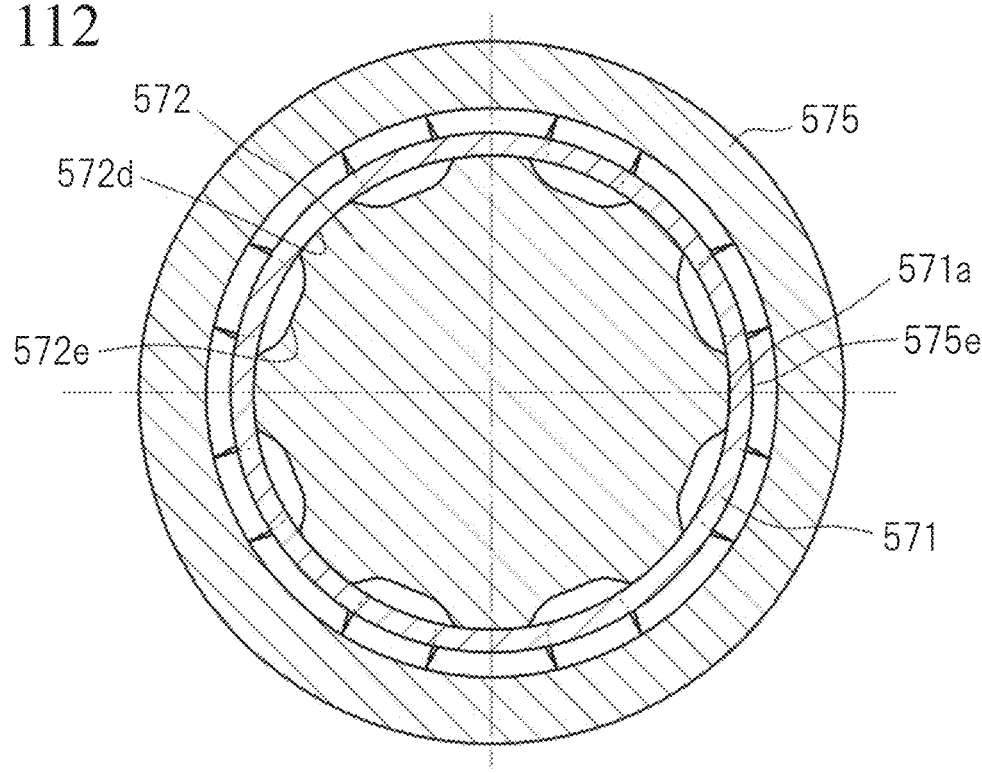

FIG. 112 is a view illustrating the state before the rough tooth shape-forming process of the method of forming a tooth-shaped component according to the sixth embodiment and is an A-A cross-sectional plan view of FIG. 111.

FIG. 113 is a view illustrating the state before the rough tooth shape-forming process of the method of manufacturing a tooth-shaped component according to the sixth embodiment and is a B-directional plan view of FIG. 111.

Figure 114:
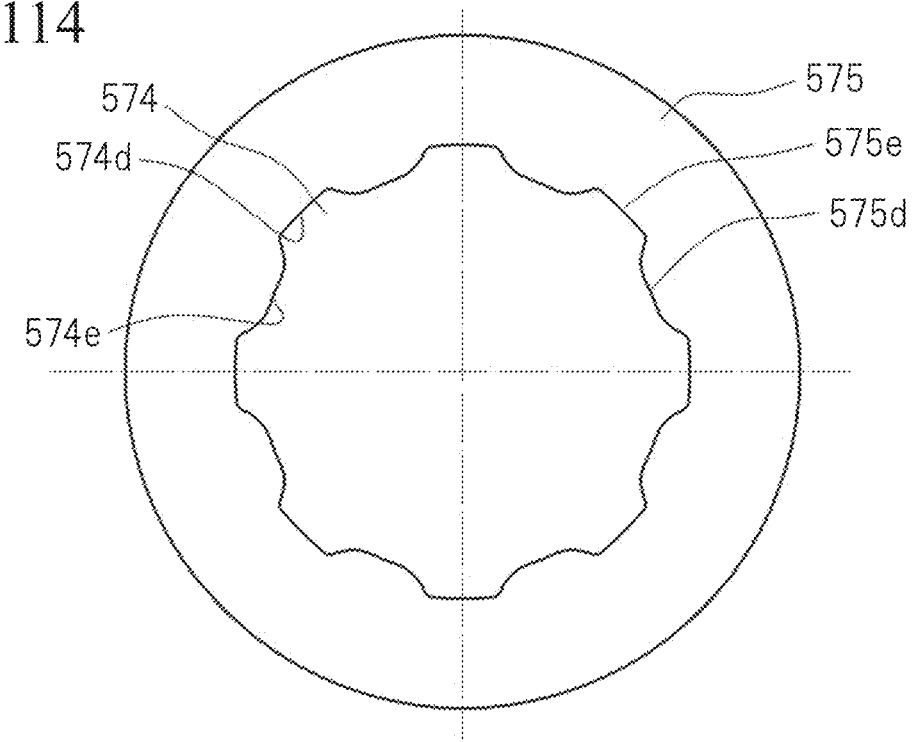

FIG. 114 is a view illustrating the state before the rough tooth shape-forming process of the method of manufacturing a tooth-shaped component according to the sixth embodiment and is an E-directional bottom view of FIG. 111.

Figure 115:
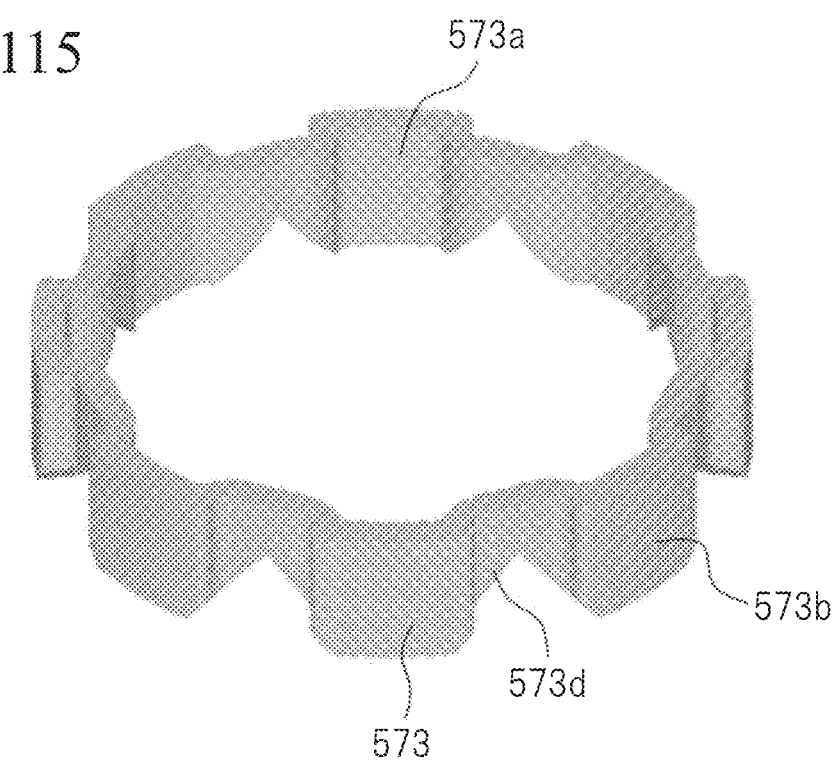

FIG. 115 is a perspective view of a rough tooth shape-forming outer punch of the method of manufacturing a tooth-shaped component according to the sixth embodiment.

Figure 116:
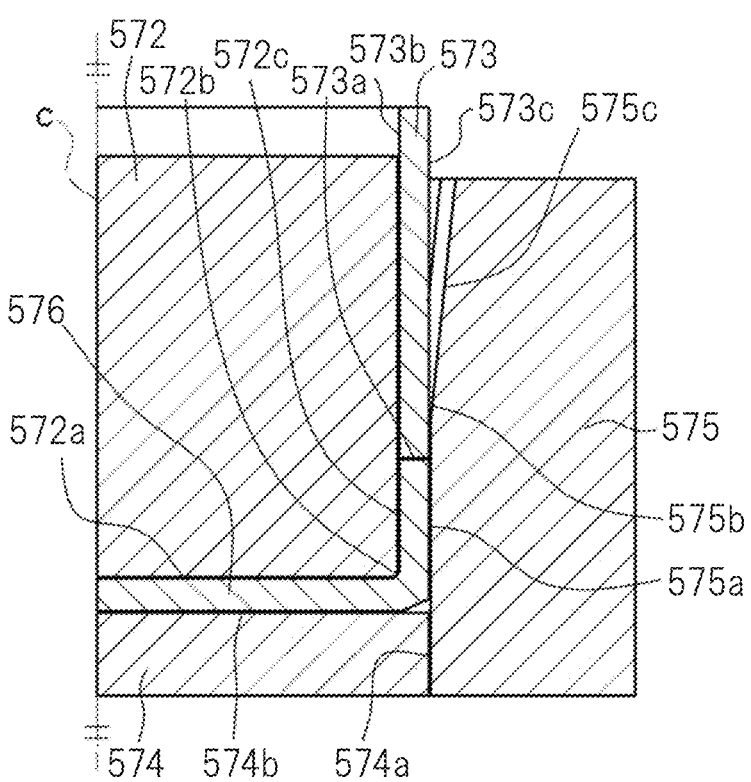

FIG. 116 is a cross-sectional view illustrating a state after the rough tooth shape-forming process of the method of manufacturing a tooth-shaped component according to the sixth embodiment.

Figure 117:
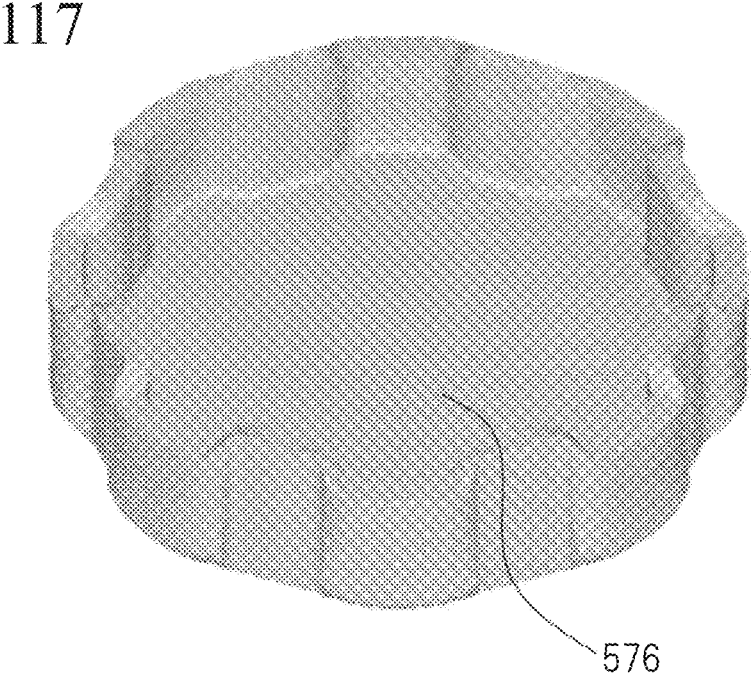

FIG. 117 is a perspective view of a formed product after the rough tooth shape-forming process of the method of manufacturing a tooth-shaped component according to the sixth embodiment.

Figure 118:
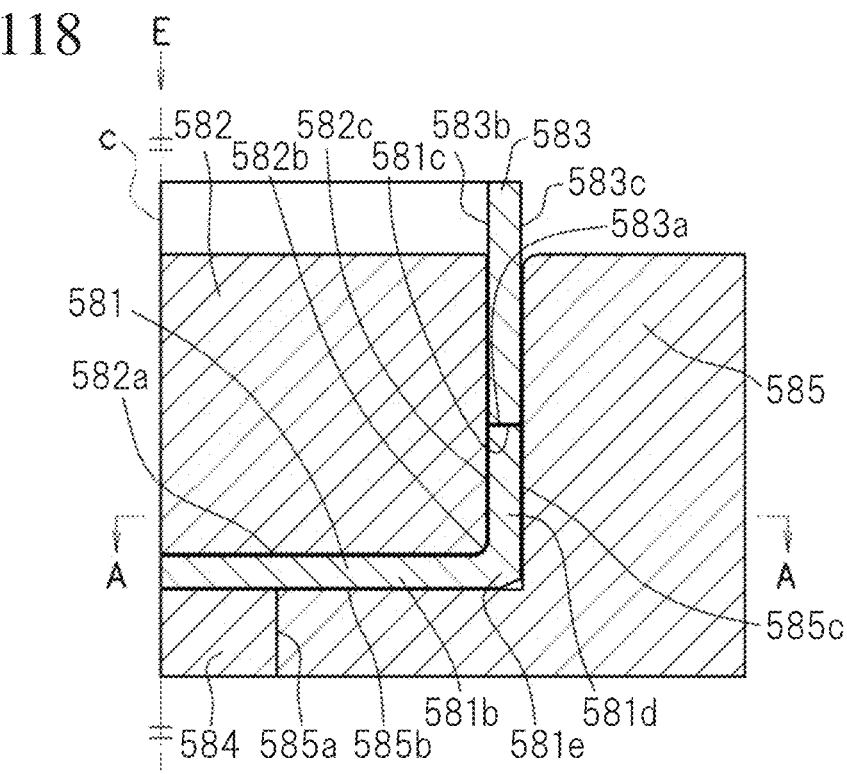
Figure 120:
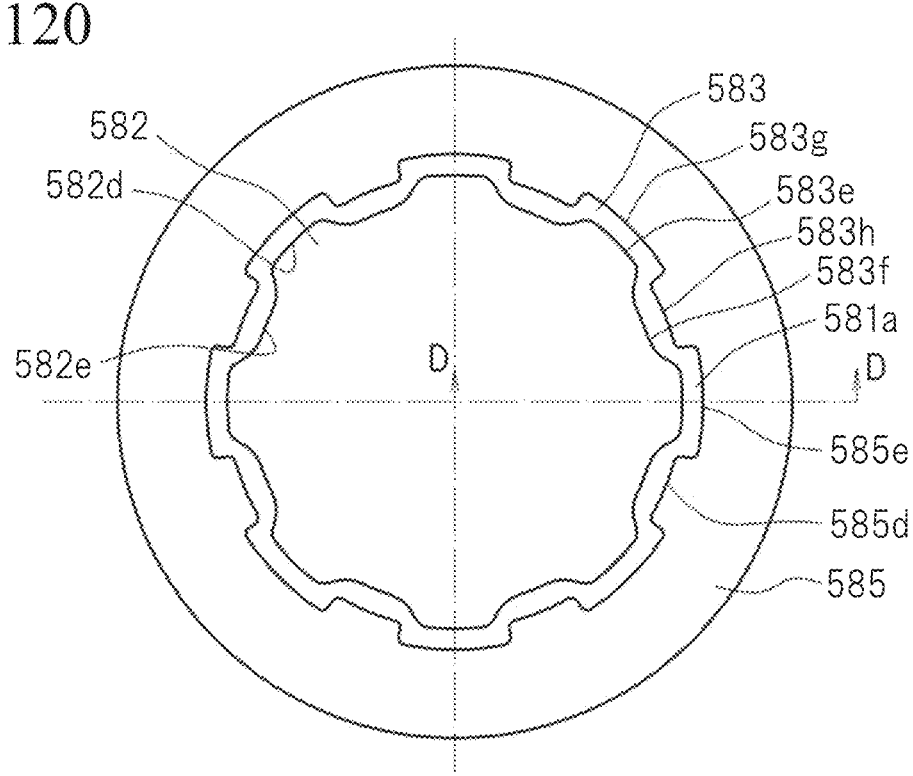

FIG. 118 is a view illustrating a state before a complete tooth shape-forming process of the method of manufacturing a tooth-shaped component according to the sixth embodiment and is a D-D cross-sectional view of FIG. 120.

Figure 119:
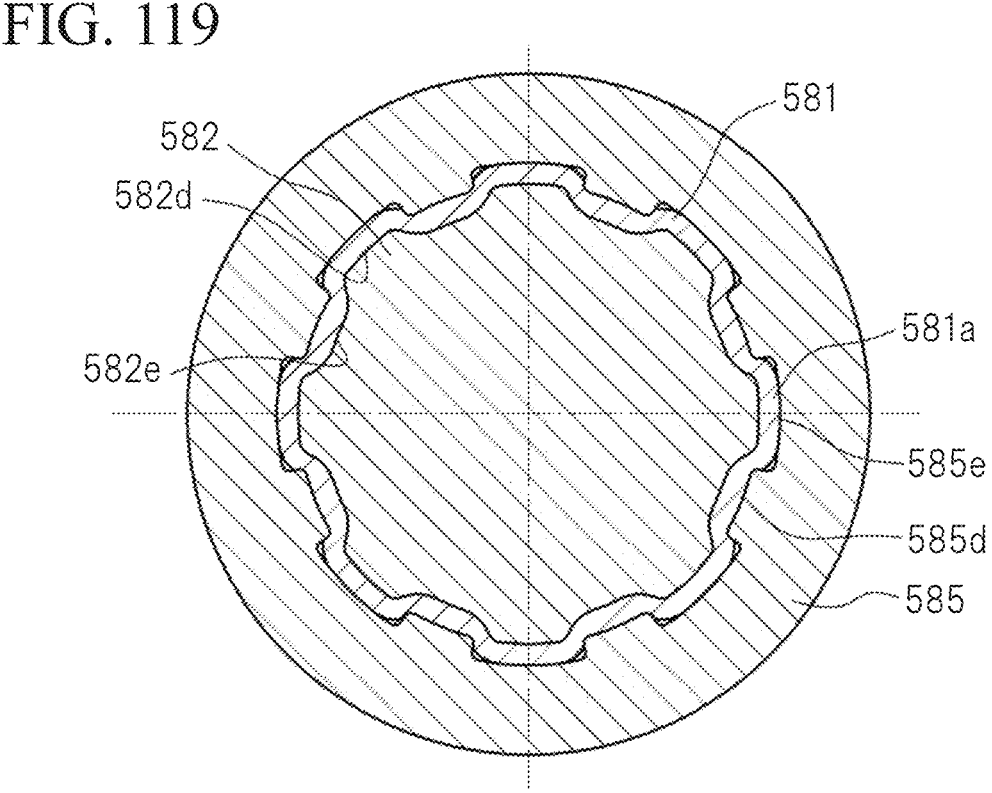

FIG. 119 is a view illustrating the state before the complete tooth shape-forming process of the method of manufacturing a tooth-shaped component according to the sixth embodiment and is an A-A cross-sectional plan view of FIG. 118.

FIG. 120 is a view illustrating the state before the complete tooth shape-forming process of the method of manufacturing a tooth-shaped component according to the sixth embodiment and is an E-directional plan view of FIG. 118.

Figure 121:
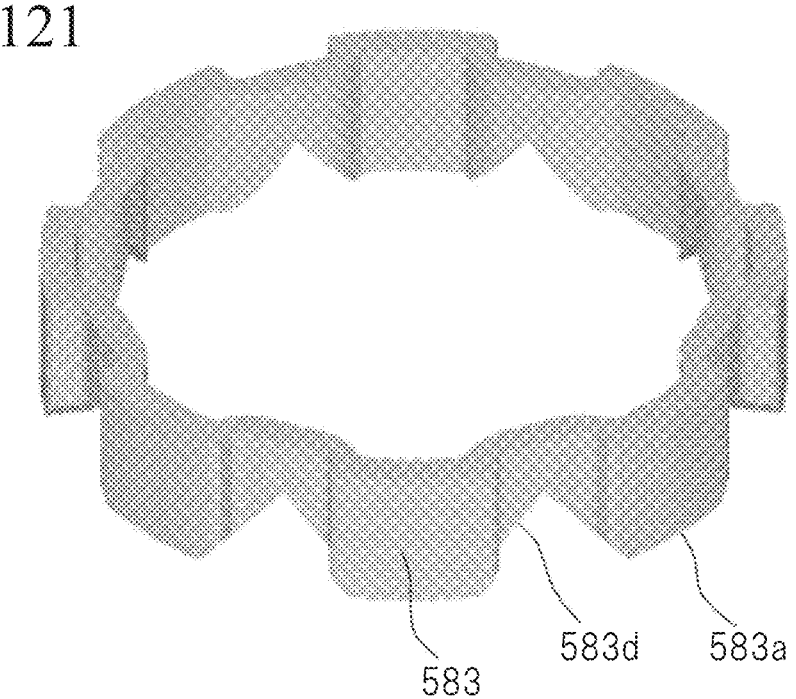

FIG. 121 is a perspective view of a complete tooth shape-forming outer punch of the method of manufacturing a tooth-shaped component according to the sixth embodiment.

Figure 122:
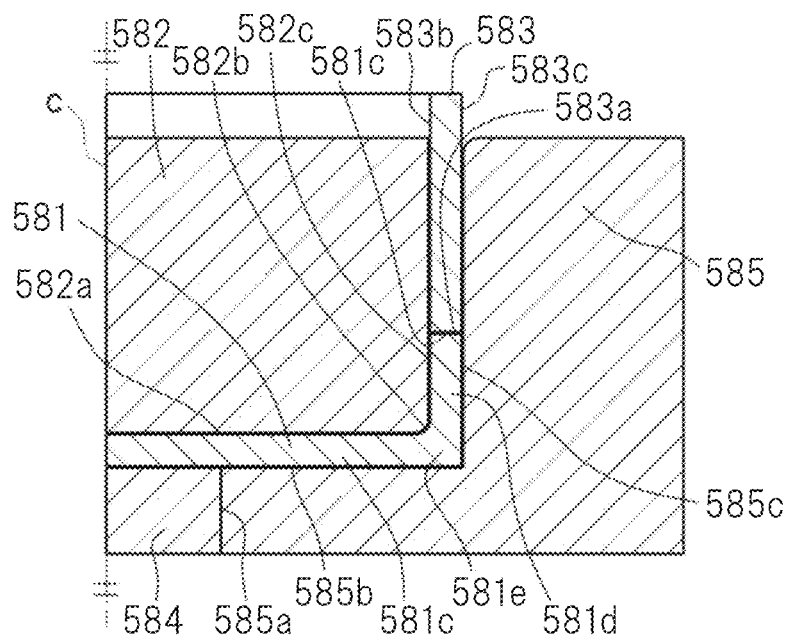

FIG. 122 is a cross-sectional view illustrating a state after the complete tooth shape-forming process of the method of manufacturing a tooth-shaped component according to the sixth embodiment.

Figure 123:
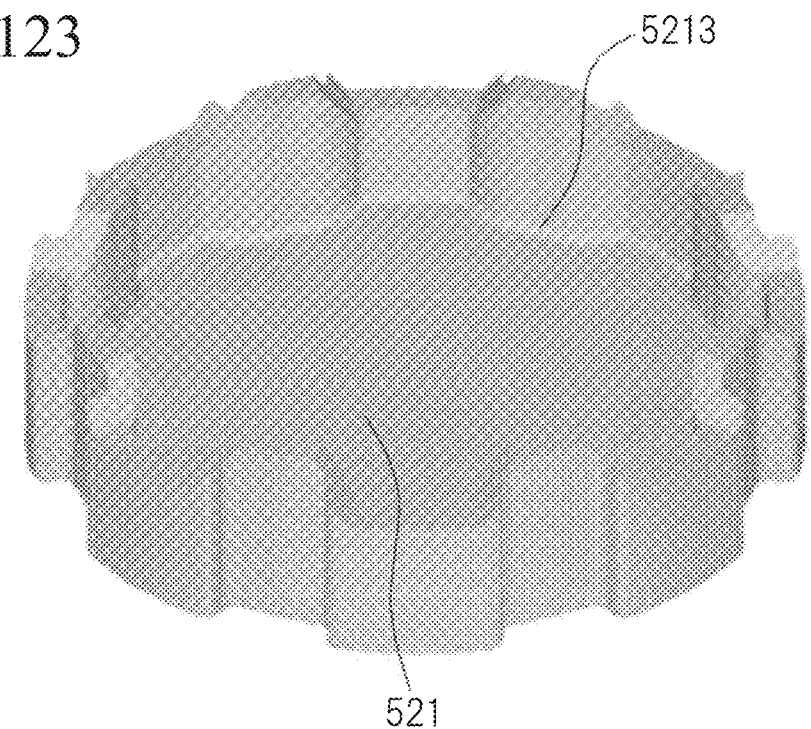

FIG. 123 is a perspective view of a tooth-shaped component after the complete tooth shape-forming process of the method of manufacturing a tooth-shaped component according to the sixth embodiment.

EMBODIMENTS OF THE INVENTION

Hereinafter, with reference to the accompanying drawings, preferable embodiments of the present invention will be described.

First Embodiment

First, a first embodiment of the present invention will be described.

Figure 1A:
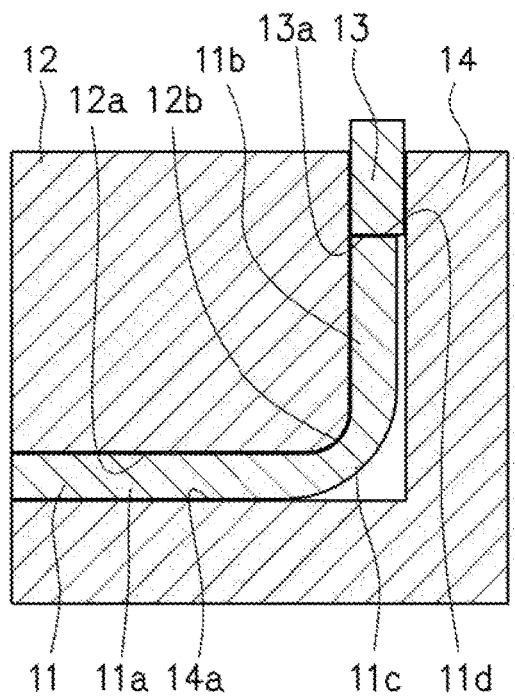
FIG. 1A is a view describing a method of manufacturing a tooth-shaped component in the related art and is a cross-sectional view illustrating a state before forming starts.
Figure 1B:
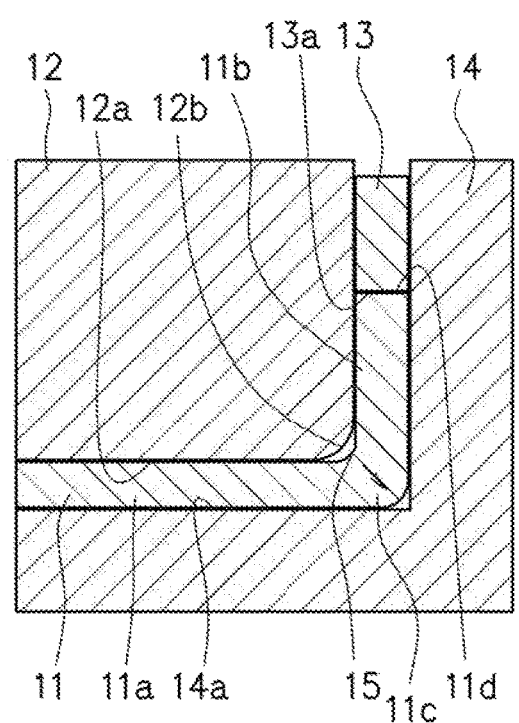
FIG. 1B is a view describing the method of manufacturing a tooth-shaped component in the related art and is a cross-sectional view illustrating a state in the middle of forming.
Figure 1C:
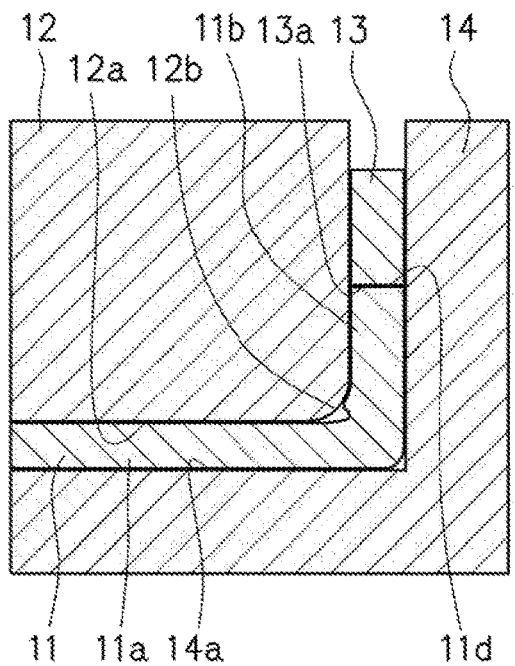
FIG. 1C is a view describing the method of manufacturing a tooth-shaped component in the related art and is a cross-sectional view illustrating another state in the middle of forming.
Figure 1D:
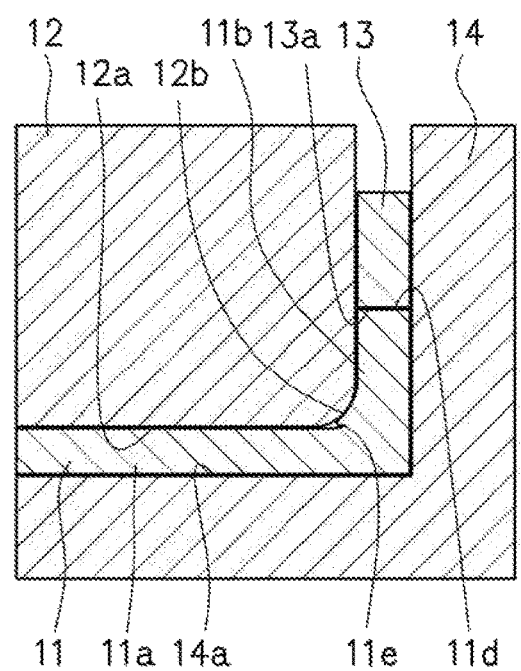
FIG. 1D is a view describing the method of manufacturing a tooth-shaped component in the related art and is a cross-sectional view illustrating a state after forming.
Figure 2A:
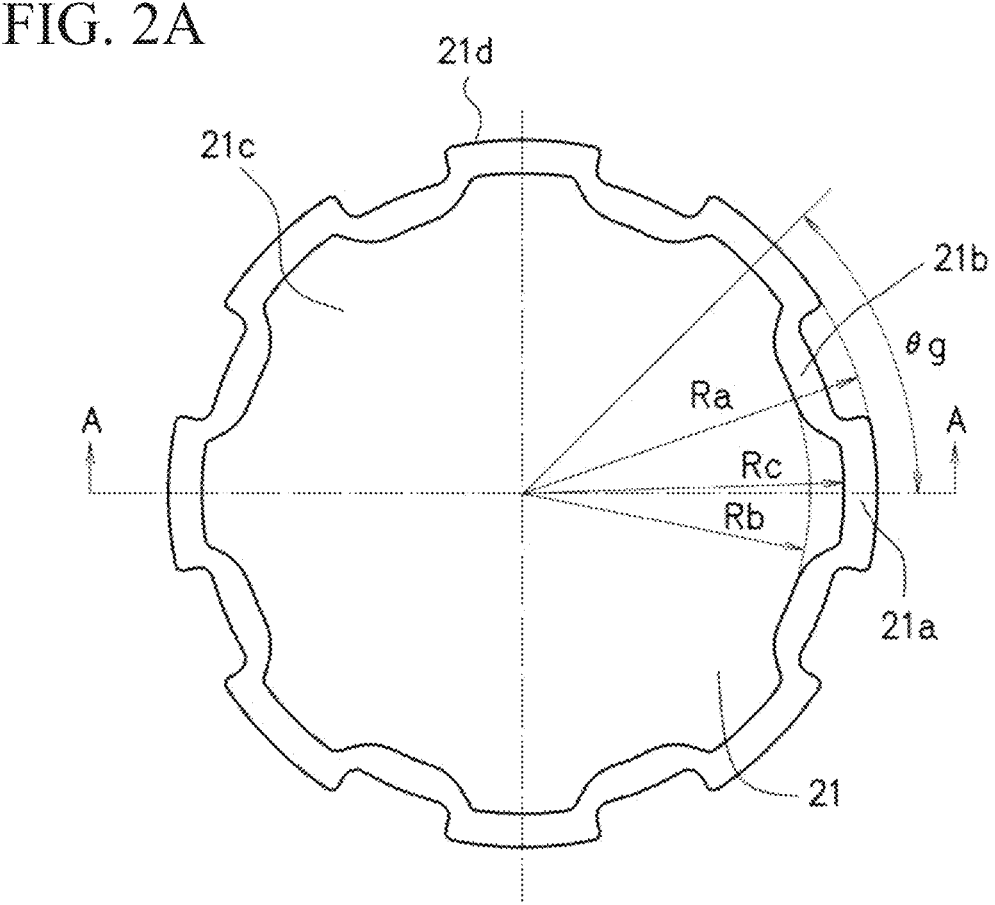
FIG. 2A is a plan view of a tooth-shaped component manufactured through a method of manufacturing a tooth-shaped component according to a first embodiment.
Figure 2B:
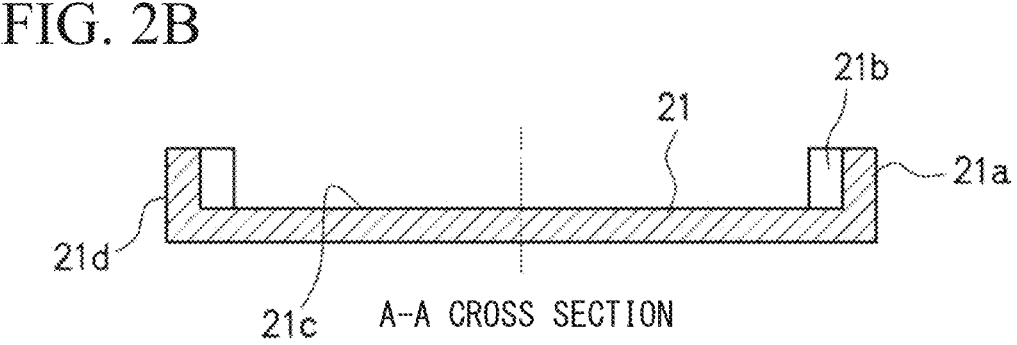
FIG. 2B is an A-A cross-sectional view of the tooth-shaped component illustrated in FIG. 2A.

FIG. 2A is a plan view of a tooth-shaped component 21 manufactured through a method of manufacturing a tooth-shaped component according to the first embodiment. FIG. 2B is an A-A cross-sectional view of the tooth-shaped component 21 illustrated in FIG. 2A. As illustrated in FIGS. 2A and 2B, the tooth-shaped component 21 is a component having a bottomed cylindrical shape of which one end portion is open and of which the other end portion is sealed in a direction of the member axis (the one-dot chain line illustrated in FIG. 2B).

The tooth-shaped component 21 has a bottom surface portion 21c and a side surface portion 21d which rises from an outer edge portion of the bottom surface portion 21c. An external angle of a corner portion formed by the bottom surface portion 21c and the side surface portion 21d is substantially a right angle. The side surface portion 21d has tooth tip portions 21a and tooth bottom portions 21b provided so as to alternately appear along a circumferential direction having the member axis as the center. The present embodiment illustrates a case where there are eight of the tooth tip portions 21a and the tooth bottom portions 21b each. However, the numbers of the tooth tip portions 21a and the tooth bottom portions 21b (that is, the number of teeth of the tooth-shaped component 21) are not limited to eight as long as there are a plurality thereof.

The tooth tip portions 21a are parts which protrude further outward than the tooth bottom portions 21b in a radial direction having the member axis as the center. More specifically, as illustrated in FIG. 2A, outer circumferential surfaces of the tooth tip portions 21a are positioned on the circumference of a radius Ra having the member axis as the center. Inner circumferential surfaces of the tooth tip portions 21a and outer circumferential surfaces of the tooth bottom portions 21b are positioned on the circumference of a radius Rc having the member axis as the center. Inner circumferential surfaces of the tooth bottom portions 21b are positioned on the circumference of a radius Rb having the member axis as the center. Hereinafter, the radius Ra will be referred to as an outer radius of the tooth tip portions 21a. The radius Rc will be referred to as an inner radius of the tooth tip portions 21a. The radius Rb will be referred to as an inner radius of the tooth bottom portions 21b.

In addition, in FIG. 2A, θg indicates an angle between the tooth tip portions 21a adjacent to each other in the circumferential direction having the member axis as the center.

The tooth-shaped component 21 manufactured through the method of manufacturing a tooth-shaped component according to the present embodiment is characterized by naturally having no superposition defect, having no draft, and having the dimensional accuracy in thickness ranging from ±0.05 mm to ±0.3 mm.

In the present embodiment, cold forging is employed as the method of manufacturing a tooth-shaped component (will be described later in detail). Therefore, compared to a tooth-shaped component manufactured through hot forging, it is possible to obtain the tooth-shaped component 21 having no draft and having the dimensional accuracy ten times more accurate in thickness, without performing a machining process. That is, according to the method of manufacturing a tooth-shaped component in the present embodiment, it is possible to obtain the high-quality tooth-shaped component 21 having no superposition defect and draft and having the dimensional accuracy in thickness ranging from ±0.05 mm to ±0.3 mm.

In order to manufacture such a tooth-shaped component 21, the method of manufacturing a tooth-shaped component according to the first embodiment includes a drawing process, a diameter-reducing process, and a tooth shape-forming process. Hereinafter, each of the processes will be described in detail. As described above, in the present embodiment, the cold forging is employed as the method of manufacturing a tooth-shaped component. Therefore, each of the processes is executed at a normal temperature.

(Drawing Process)

Figure 3:
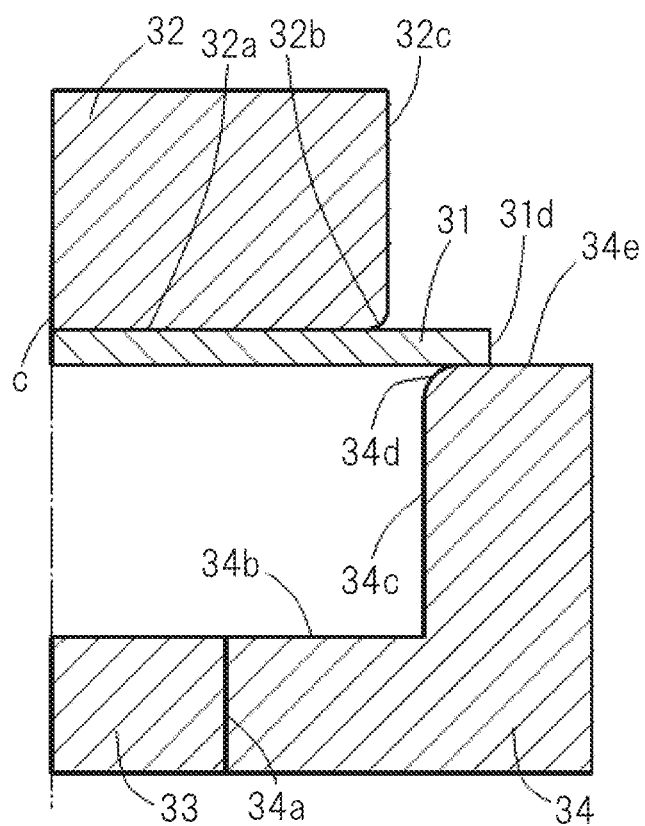
FIG. 3 is a cross-sectional view illustrating a state before forming starts in a drawing process of the method of manufacturing a tooth-shaped component according to the first embodiment.
Figure 4:
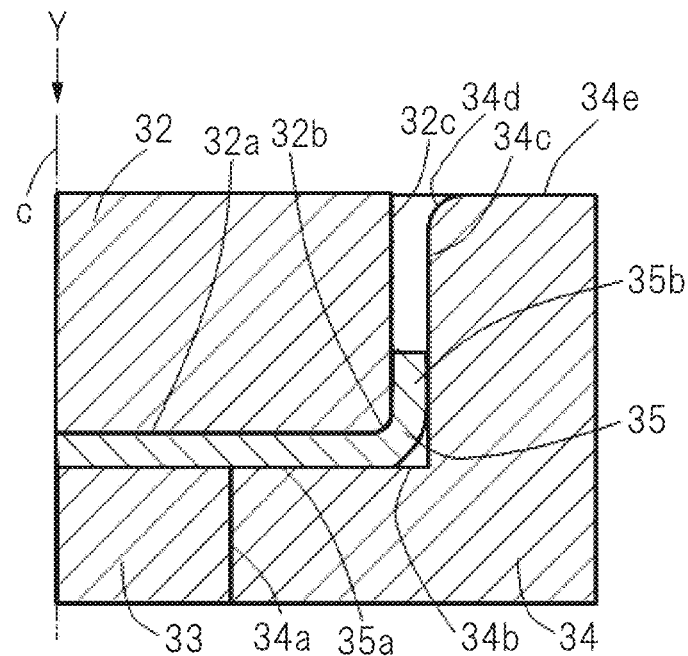
FIG. 4 is a cross-sectional view illustrating a state after forming in the drawing process of the method of manufacturing a tooth-shaped component according to the first embodiment.
Figure 5:
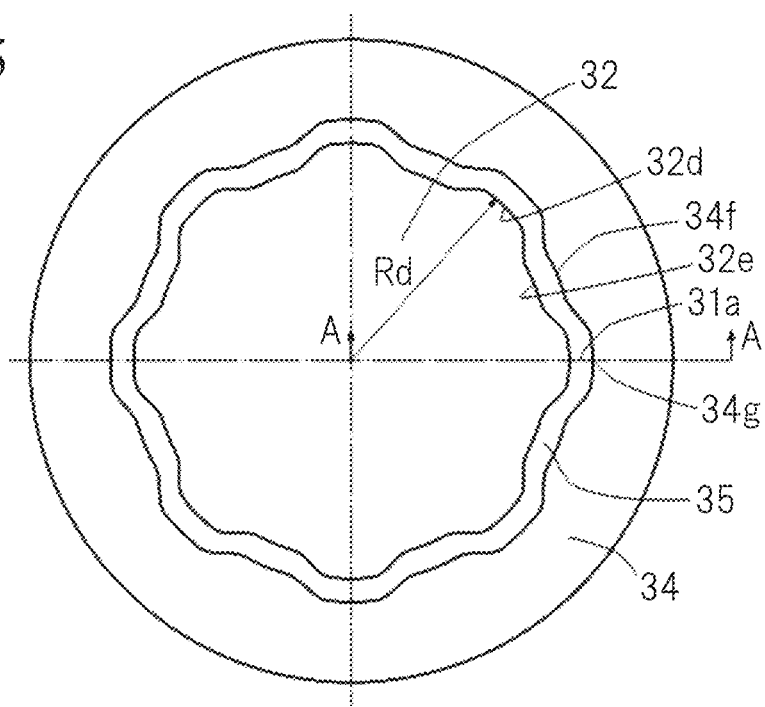
FIG. 5 is a view illustrating the state after forming in the drawing process of the method of manufacturing a tooth-shaped component according to the first embodiment and is a Y-directional plan view of FIG. 4.

FIG. 3 illustrates a state before forming starts in the drawing process, and FIGS. 4 and 5 illustrate states after forming in the drawing process. With reference to FIGS. 3 to 5, a press machine includes a punch 32, a knockout 33, and a die 34 having the coaxially disposed central axes C. The knockout 33 and the die 34 are disposed so as to face the punch 32.

Figure 7:
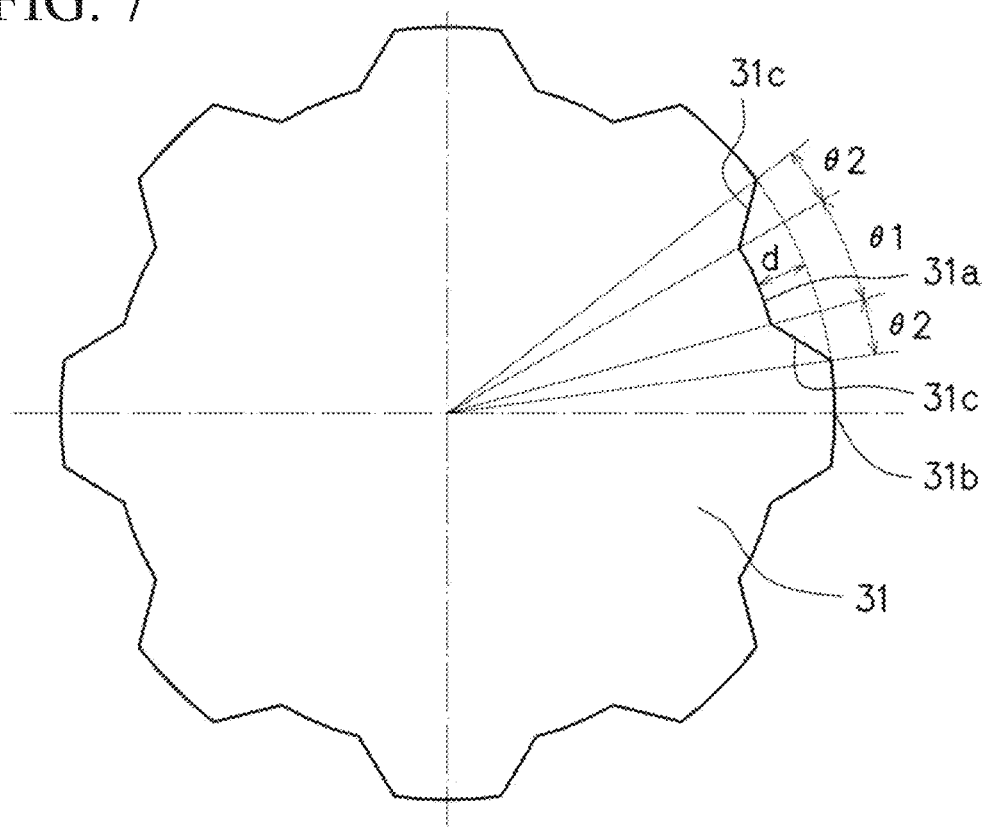
FIG. 7 is a plan view illustrating a metal sheet which is a workpiece in the drawing process.

As illustrated in FIG. 7, a workpiece 31 is a flat metal sheet (for example, a steel sheet) having valley portions 31a and peak portions 31b provided so as to alternately appear along the circumferential direction having the member axis (the central axis of the workpiece 31) as the center. The peak portions 31b are parts which protrude outward from the valley portions 31a in the radial direction having the member axis as the center. In addition, the workpiece 31 also has slope portions 31c each of which connects the peak portion 31b and the valley portion 31a together.

The valley portions 31a become parts corresponding to the tooth bottom portions 21b. The numbers of the peak portions 31b and the valley portions 31a coincide with the number of teeth of the tooth-shaped component 21, and the peak portions 31b, the slope portions 31c, and the valley portions 31a are formed with predetermined spaces among thereof along the circumferential direction having the member axis as the center.

In a case where a workpiece is a circularly-shaped sheet having the same outer diameters, when a tooth shape is formed in the tooth shape-forming process, the material of the workpiece remains at the tooth bottom portions of the tooth shape, and the inside of a space formed by a die and punch is filled in an early stage. Therefore, a forming load becomes excessive. In order to reduce the forming load, the parts corresponding to the tooth bottom portions 21b serve as the valley portions 31a. A depth d of the valley portion 31a with respect to the peak portion 31b (a length between an outer circumferential edge of the peak portion 31b and an outer circumferential edge of the valley portion 31a in the radial direction having the member axis as the center) may be set to approximately a length $\Delta r$ (=Ra−Rb) obtained by subtracting the inner radius Rb of the tooth bottom portions 21b from the outer radius Ra of the tooth tip portions 21a of the tooth-shaped component 21 illustrated in FIG. 2A. In addition, a regional angle θ1 of the valley portion 31a may be set to approximately ⅓ of the regional angle of one tooth (θg illustrated in FIG. 2A). In addition, a regional angle θ2 of the slope portion 31c may be set to approximately ⅙ of the regional angle of one tooth (θg illustrated in FIG. 2A).

The punch 32 has a flat surface portion 32a parallel to the radial direction orthogonal to the central axis C, a curved surface portion 32b provided at an outer circumferential edge of the flat surface portion 32a, and a side surface portion 32c continued via the flat surface portion 32a and the curved surface portion 32b and extending in an upward direction (a first direction) of FIG. 3 parallel to the central axis C. In the side surface portion 32c, peak sites 32d and valley sites 32e elongated in the first direction are alternately formed in the circumferential direction with predetermined spaces among thereof. The numbers of the peak sites 32d and the valley sites 32e coincide with the number of teeth of the tooth-shaped component 21. It is desirable that a radius Rd of the peak sites 32d (a length between outer circumferential surfaces of the peak sites 32d and the central axis C in the radial direction having the central axis C as the center) ranges from 1.08 times to 1.17 times the inner radius Rc of the tooth tip portions 21a. The reason will be described in the section of the diameter-reducing process. The punch 32 is a movable type which can be lifted and lowered by a mechanically driven-type (hydraulic-type, servo-motor-type, and the like) driving source (not illustrated).

The knockout 33 has a columnar shape and is used for detaching a formed product from the die and punch. The knockout 33 is a movable type which can be lifted and lowered by a driving source (not illustrated).

The die 34 has a first side surface portion 34a extending in the first direction, a flat surface portion 34b continued to the first side surface portion 34a and parallel to the radial direction orthogonal to the central axis C, a second side surface portion 34c continued to the flat surface portion 34b and extending in the first direction, and a flat surface portion 34e continued via the second side surface portion 34c and a curved surface portion 34d and parallel to the radial direction orthogonal to the central axis C. In the second side surface portion 34c, peak sites 34f and valley sites 34g elongated in the first direction are alternately formed in the circumferential direction with predetermined spaces among thereof. The numbers of the peak sites 34f and the valley sites 34g coincide with the number of teeth of the tooth shape. The second side surface portion 34c is disposed in a form of being offset in the radial direction from the side surface portion 32c of the punch 32 substantially as much as a plate thickness of the workpiece 31. The die 34 is a fixed type.

As illustrated in FIG. 5, the punch 32 and the die 34 are disposed such that the peak sites 32d of the punch 32 face the valley sites 34g of the die 34, in other words, the valley sites 32e of the punch 32 face the peak sites 34f of the die 34.

Figure 6A:
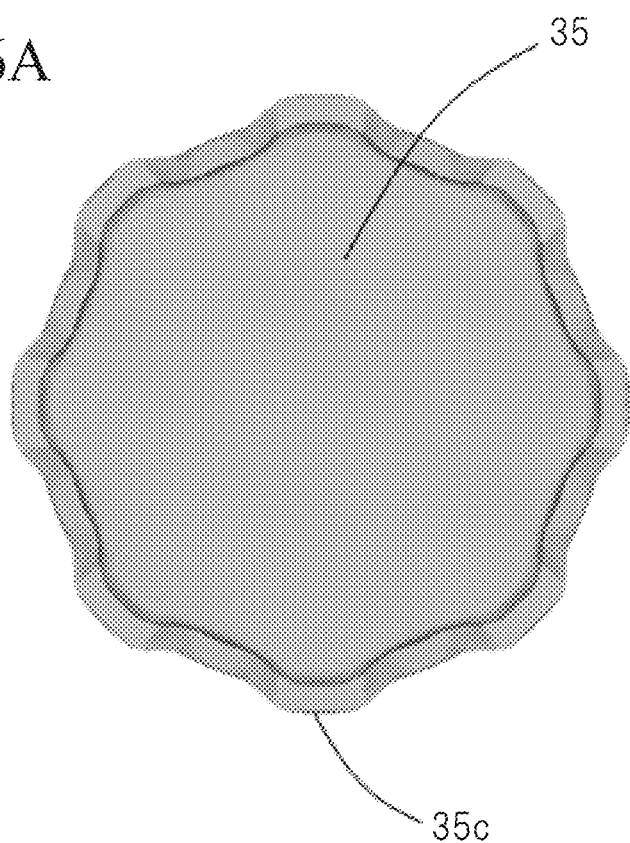
FIG. 6A is a plan view of a corrugated cylindrical container formed through the drawing process.
Figure 6B:
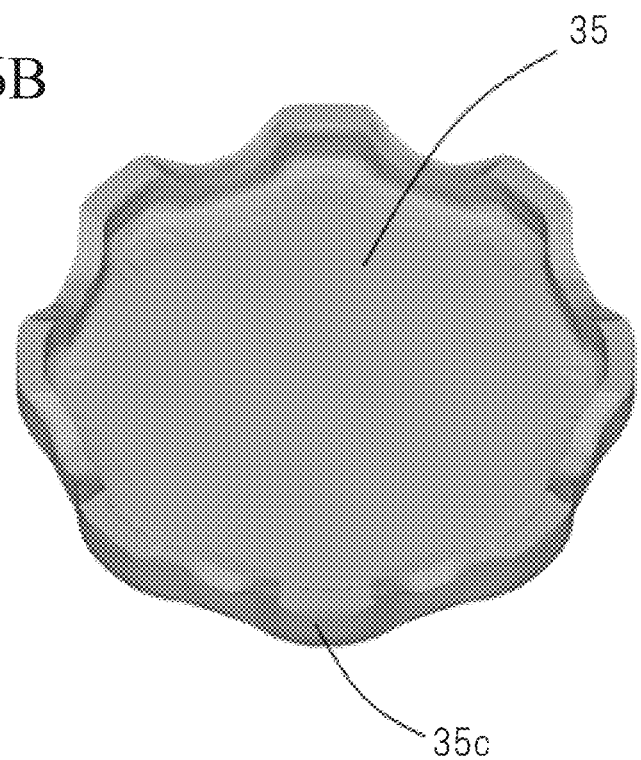
FIG. 6B is a perspective view of the corrugated cylindrical container formed through the drawing process.

As illustrated in FIG. 3, the workpiece 31 is positioned in the flat surface portion 34e of the die 34 such that the member axis of the workpiece 31 coincides with the central axis C of the press machine. In this case, the peak portions 31b of the workpiece 31 are positioned in the valley sites 34g of the die 34. In this state, the punch 32 is moved downward until an end portion 31d of the workpiece 31 passes through the curved surface portion 34d of the die 34, thereby performing draw-forming, and the punch 32 is moved downward until the flat surface portion 34b of the die 34 comes into contact with a bottom surface portion of the workpiece 31, thereby forming a corrugated cylindrical container 35, as illustrated in FIG. 4. A side surface portion 35b of the corrugated cylindrical container 35 has a shape standing upright with respect to a bottom surface portion 35a. After forming, the knockout 33 is lifted and the corrugated cylindrical container 35 is detached from the die 34. FIGS. 6A and 6B illustrate views of the appearance of the corrugated cylindrical container 35.

(Diameter-Reducing Process)

Figure 8:
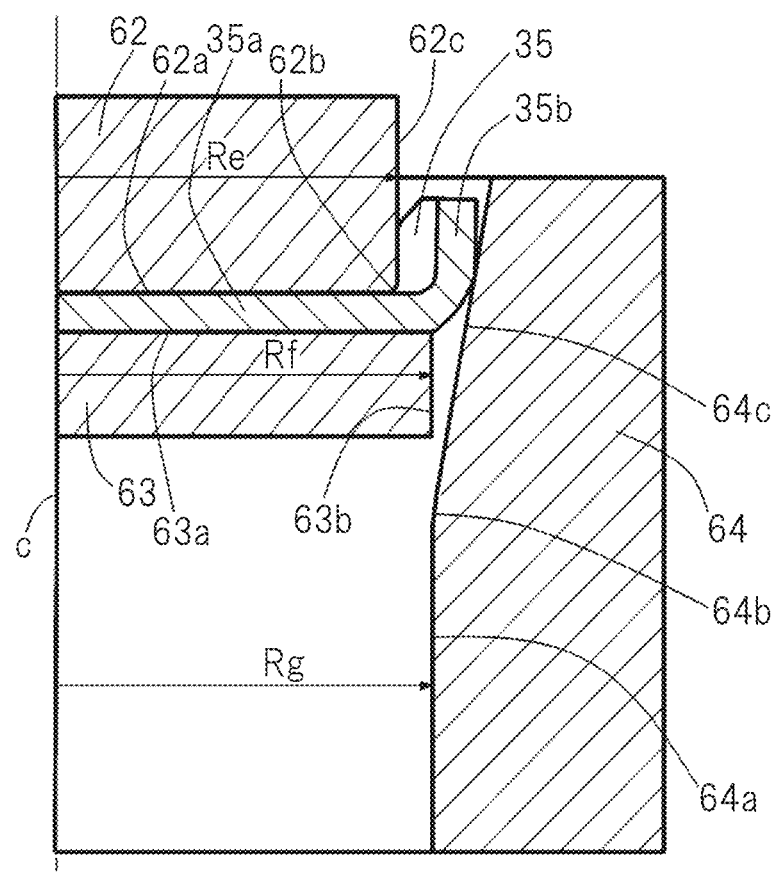
FIG. 8 is a cross-sectional view illustrating a state before forming starts in a diameter-reducing process of the method of manufacturing a tooth-shaped component according to the first embodiment.

FIG. 8 illustrates a state before forming starts in the diameter-reducing process. With reference to FIG. 8, the press machine includes a punch 62, a counter punch 63, and a die 64 disposed in an outer circumference of the counter punch 63, having the coaxially disposed central axes C. The counter punch 63 and the die 64 are disposed so as to face the punch 62.

The punch 62 has a flat surface portion 62a parallel to the radial direction orthogonal to the central axis C, a curved surface portion 62b provided at an outer circumferential edge of the flat surface portion 62a, and a side surface portion 62c continued via the flat surface portion 62a and the curved surface portion 62b and extending in an upward direction (a first direction) of FIG. 8 parallel to the central axis C. A radius Re of the side surface portion 62c is substantially equal to the inner radius Rc of the tooth tip portions 21a. The punch 62 is a movable type which can be lifted and lowered by a mechanically driven-type (hydraulic-type, servo-motor-type, and the like) driving source (not illustrated).

The counter punch 63 has a flat surface portion 63a parallel to the radial direction orthogonal to the central axis C, and a side surface portion 63b continued to the flat surface portion 63a and extending in a downward direction of FIG. 8 parallel to the central axis C. A radius Rf of the side surface portion 63b is substantially equal to the outer radius Ra of the tooth tip portions 21a. The counter punch 63 is a movable type which can be lifted and lowered by a mechanically driven-type (hydraulic-type, servo-motor-type, and the like) driving source (not illustrated).

The die 64 has a side surface portion 64a extending in the first direction, a curved surface portion 64b provided in an upper end portion of the side surface portion 64a, and a slope portion 64c continued via the side surface portion 64a and the curved surface portion 64b and widened in the radial direction orthogonal to the central axis C toward the first direction. A radius Rg of the side surface portion 64a is substantially equal to the outer radius Ra of the tooth tip portions 21a. The die 64 is a fixed type.

Figure 9A:
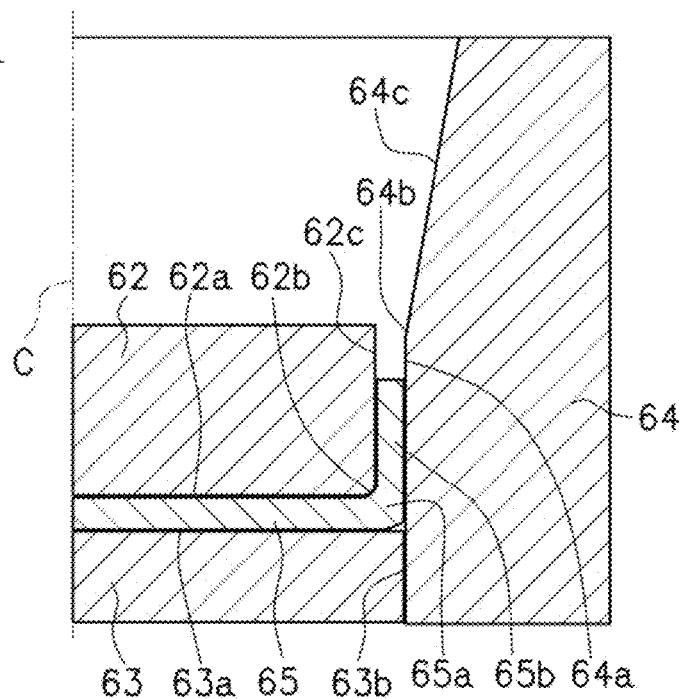
FIG. 9A is a cross-sectional view illustrating a state after forming in the diameter-reducing process of the method of manufacturing a tooth-shaped component according to the first embodiment.

As illustrated in FIG. 8, while having the corrugated cylindrical container 35 formed in the diameter-reducing process, as the workpiece, the corrugated cylindrical container 35 is positioned in the flat surface portion 63a of the counter punch 63 such that the member axis of the corrugated cylindrical container 35 coincides with the central axis C of the press machine, and the bottom surface portion 35a of the corrugated cylindrical container 35 is clamped between the flat surface portion 62a of the punch 62 and the flat surface portion 63a of the counter punch 63. In this state, the punch 62 and the counter punch 63 are moved downward, thereby forming a diameter-reduced cylindrical container 65, as illustrated in FIG. 9A. That is, as illustrated in FIG. 9A, in the side surface portion 35b of the corrugated cylindrical container 35 which is the workpiece, a peak portion side surface portion 35c (a particular part in which the tooth tip portion 21a is to be formed) corresponding to the peak portion 31b is reduced in diameter due to the slope portion 64c of the die 64 (hereinafter, this portion will be referred to as a diameter-reduced side surface portion 65b). A corner portion 65a of the diameter-reduced cylindrical container 65 is increased in thickness such that an external shape of the corner portion 65a of the diameter-reduced cylindrical container 65 satisfies the following conditional expression (1).

Figure 9B:
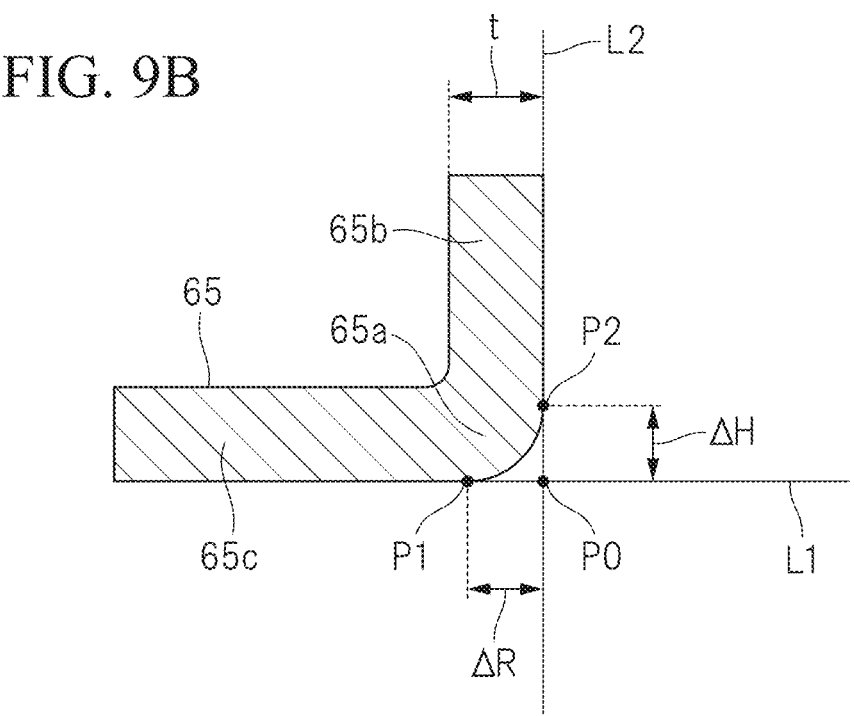
FIG. 9B is a view describing an external shape of a corner portion of a diameter-reduced cylindrical container obtained through the diameter-reducing process.

Here, as illustrated in FIG. 9B, in a case where the diameter-reduced cylindrical container 65 is viewed in a cross section including a central axis direction and a radial direction of the diameter-reduced cylindrical container 65, an intersection point of a straight line L1 in parallel contact with a bottom surface portion 65c of the diameter-reduced cylindrical container 65, and a straight line L2 in parallel contact with the side surface portion 65b of the diameter-reduced cylindrical container 65 is defined as P0. In addition, as illustrated in FIG. 9B, a point at which the straight line L1 starts being separated from the bottom surface portion 65c of the diameter-reduced cylindrical container 65 is defined as P1, and a point at which the straight line L2 starts being separated from the side surface portion 65b of the diameter-reduced cylindrical container 65 is defined as P2. Moreover, as illustrated in FIG. 9B, a length between the intersection point P0 and the point P1 on the straight line L1 is defined as $\Delta R$, and a length between the intersection point P0 and the point P2 on the straight line L2 is defined as $\Delta H$.

The conditional expression (1) is expressed as follows by using a plate thickness t of the diameter-reduced cylindrical container 65, and the lengths ΔR and ΔH.

$$(\Delta R + \Delta H) \leq 2t \quad (1)$$

That is, when the corner portion 65a of the diameter-reduced cylindrical container 65 is increased in thickness such that the external shape of the corner portion 65a of the diameter-reduced cylindrical container 65 satisfies the conditional expression (1), the external angle of the corner portion 65a has a value close to a right angle.

In order to cause the external angle of the corner portion 65a of the diameter-reduced cylindrical container 65 to have a value closer to a right angle, it is preferable that the corner portion 65a of the diameter-reduced cylindrical container 65 be increased in thickness such that the external shape of the corner portion 65a of the diameter-reduced cylindrical container 65 satisfies the following conditional expression (2).

$$(\Delta R + \Delta H) \leq 1.5t \quad (2)$$

The reason for causing the desirable value for the radius Rd of the peak sites 32d of the side surface portion 32c of the punch 32 in the drawing process to range from 1.08 times to 1.17 times the inner radius Rc of the tooth tip portions 21a will be described below. When the radius Rd of the peak sites 32d is less than 1.08 times the inner radius Re of the tooth tip portions 21a, the reduced amount of the diameter in the diameter-reducing process is small, and the corner portion 65a is insufficiently increased in thickness, thereby resulting in a superposition defect in the succeeding tooth shape-forming process. Meanwhile, when the radius Rd of the peak sites 32d exceeds 1.17 times the inner radius Rc of the tooth tips 21a, the side surface portion 35b is excessively thin in the drawing process. As a result, the corner portion 65a is insufficiently increased in thickness, thereby resulting in a superposition defect in the succeeding tooth shape-forming process.

(Tooth Shape-Forming Process)

FIGS. 10 to 13 illustrate states before forming starts in the tooth shape-forming process. With reference to FIGS. 10 to 13, the press machine includes an inner punch 72, an outer punch 73 disposed in an outer circumference of the inner punch 72, a counter punch 74, and a die 75 disposed in an outer circumference of the counter punch 74, having the coaxially disposed central axes C. The counter punch 74 and the die 75 are disposed so as to face the inner punch 72 and the outer punch 73.

Figure 10:
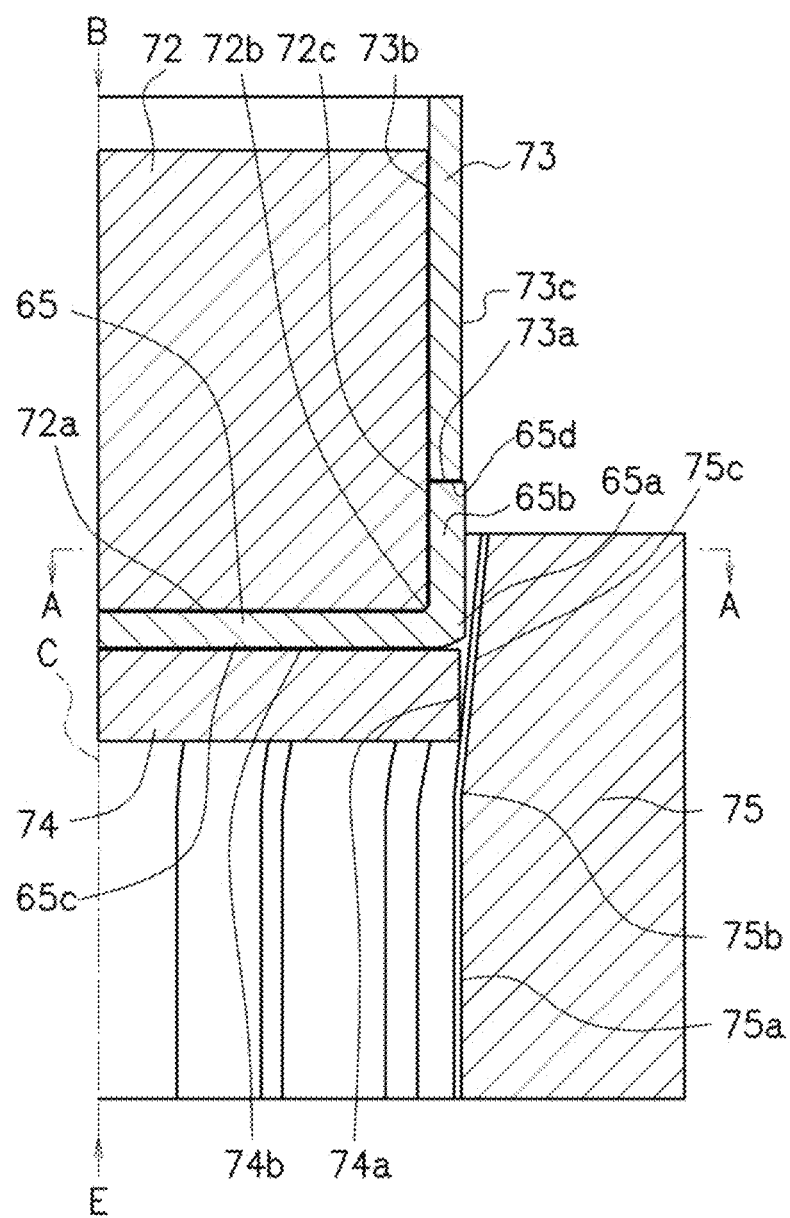
FIG. 10 is a view illustrating a state before forming starts in a tooth shape-forming process of the method of manufacturing a tooth-shaped component according to the first embodiment and is a D-D cross-sectional view of FIG. 12.
Figure 11:
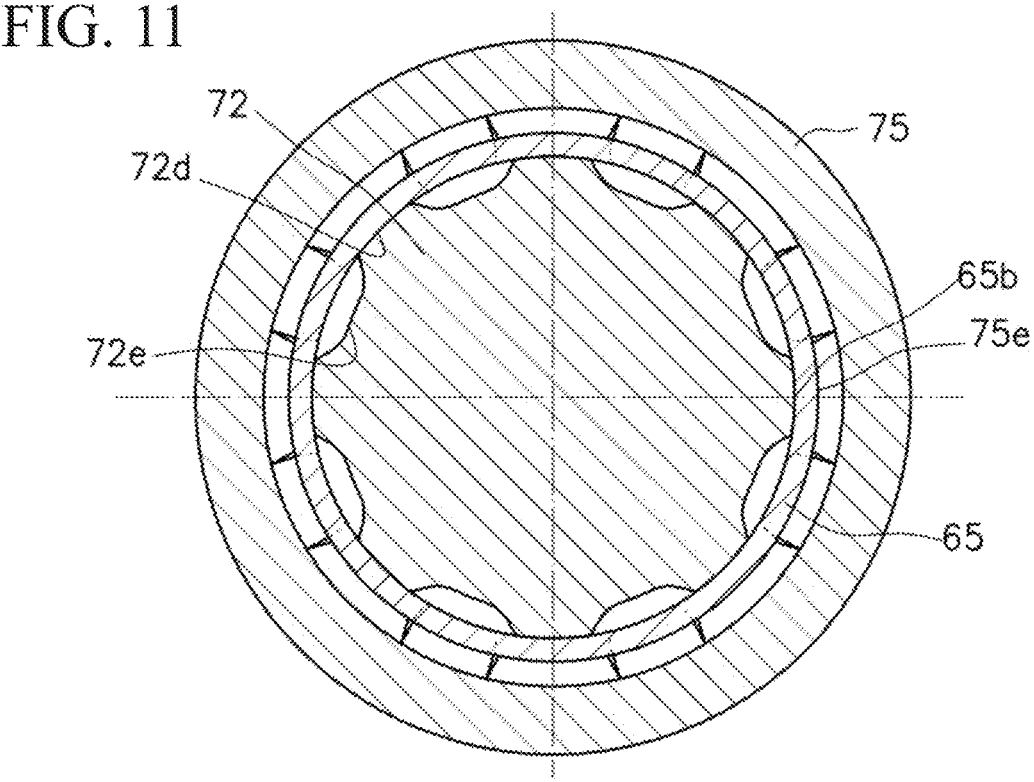
FIG. 11 is a view illustrating the state before forming starts in the tooth shape-forming process of the method of manufacturing a tooth-shaped component according to the first embodiment and is an A-A cross-sectional plan view of FIG. 10.

The inner punch 72 has a flat surface portion 72a parallel to the radial direction orthogonal to the central axis C, a curved surface portion 72b provided at an outer circumferential edge of the flat surface portion 72a, and a side surface portion 72c continued via the flat surface portion 72a and the curved surface portion 72b and extending in an upward direction (a first direction) of FIG. 10 parallel to the central axis C. In the side surface portion 72c, in order to form the tooth tip portions 21a and the tooth bottom portions 21b, peak sites 72d and valley sites 72e elongated in the first direction are alternately formed in the circumferential direction with predetermined spaces among thereof. The inner punch 72 is a movable type which can be lifted and lowered by a mechanically driven-type (hydraulic-type, servo-motor-type, and the like) driving source (not illustrated).

The die 75 has a side surface portion 75a extending in the first direction, a curved surface portion 75b provided in an upper end portion of the side surface portion 75a, and a slope portion 75c continued via the side surface portion 75a and the curved surface portion 75b and widened in the radial direction orthogonal to the central axis toward the first direction. In the side surface portion 75a, in order to form the tooth tip portions 21a and the tooth bottom portions 21b, peak sites 75d and valley sites 75e elongated in the first direction are alternately formed in the circumferential direction with predetermined spaces among thereof. The die 75 is a fixed type.

Figure 12:
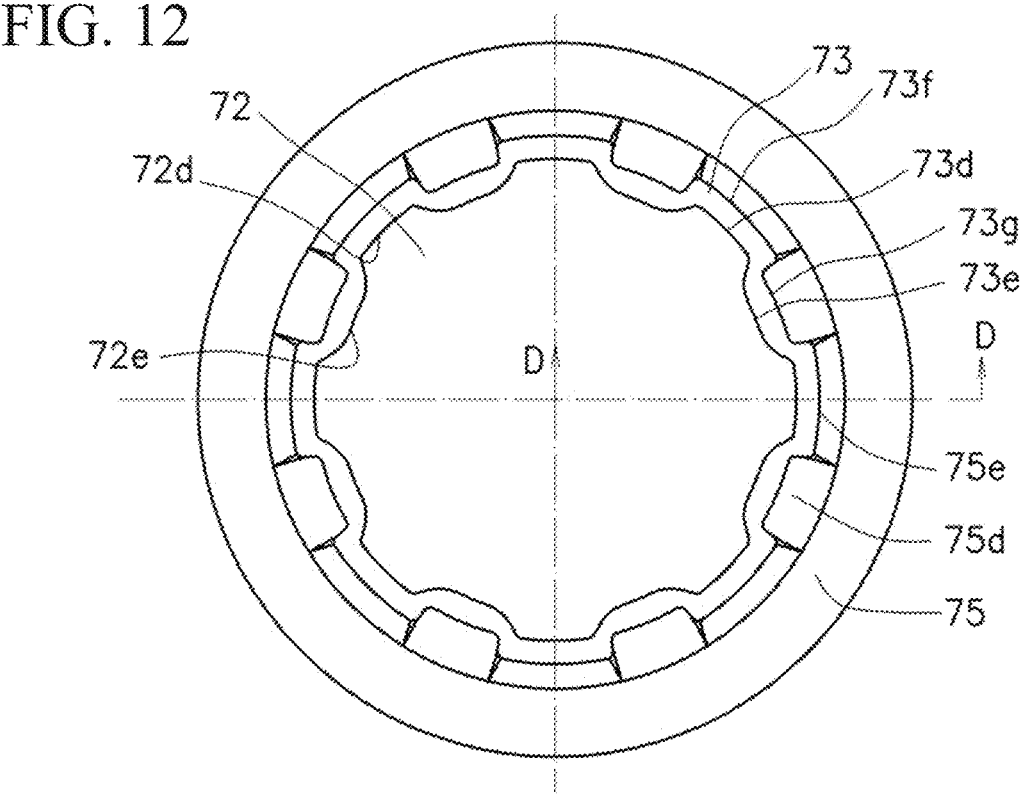
FIG. 12 is a view illustrating the state before forming starts in the tooth shape-forming process of the method of manufacturing a tooth-shaped component according to the first embodiment and is a B-directional plan view of FIG. 10.
Figure 13:
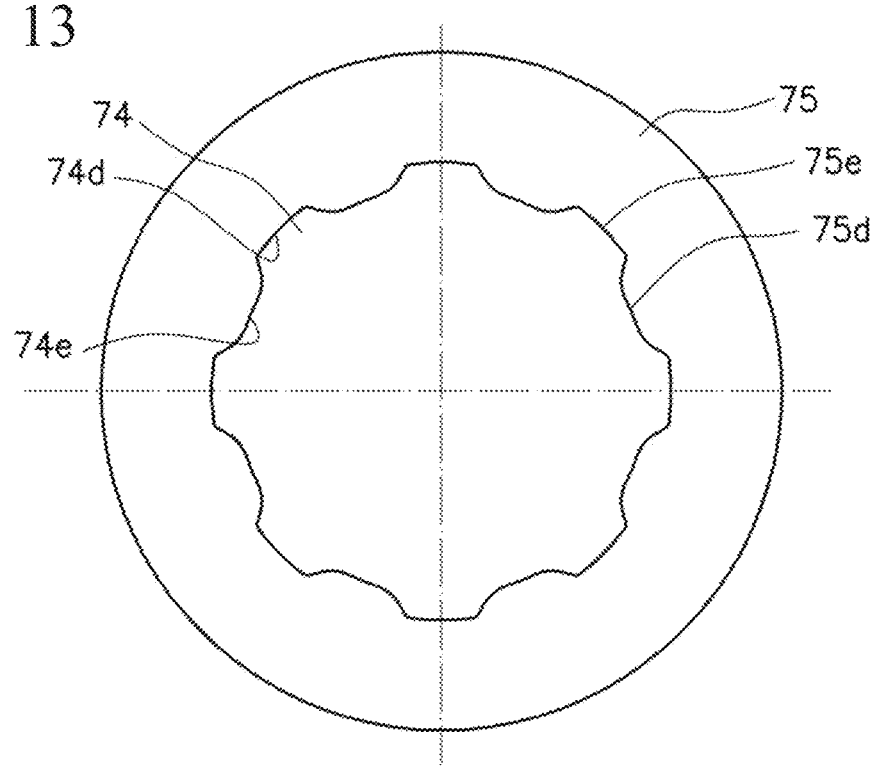
FIG. 13 is a view illustrating the state before forming starts in the tooth shape-forming process of the method of manufacturing a tooth-shaped component according to the first embodiment and is an E-directional bottom view of FIG. 10.

As illustrated in FIG. 12, the inner punch 72 and the die 75 are disposed such that the peak sites 72d of the inner punch 72 face the valley sites 75e of the die 75, in other words, the valley sites 72e of the inner punch 72 face the peak sites 75d the die 75.

The outer punch 73 has a flat surface portion 73a parallel to the radial direction orthogonal to the central axis C, a first side surface portion 73b continued to an inner edge portion of the flat surface portion 73a and extending in the first direction, and a second side surface portion 73c continued to an outer edge portion of the flat surface portion 73a and extending in the first direction. In the first side surface portion 73b, along the side surface portion 72c of the inner punch 72, peak sites 73d and valley sites 73e elongated in the first direction are alternately formed in the circumferential direction with predetermined spaces among thereof. In addition, in the second side surface portion 73c, along the side surface portion 75a of the die 75, peak sites 73f and valley sites 73g elongated in the first direction are alternately formed in the circumferential direction with predetermined spaces among thereof. The outer punch 73 is a movable type which can be lifted and lowered by a mechanically driven-type (hydraulic-type, servo-motor-type, and the like) driving source (not illustrated).

The counter punch 74 has a side surface portion 74a extending in the first direction, and a flat surface portion 74b continued to the side surface portion 74a and parallel to the radial direction orthogonal to the central axis C. In the side surface portion 74a, along the side surface portion 75a of the die 75, peak sites 74d and valley sites 74e elongated in the first direction are alternately formed in the circumferential direction with predetermined spaces among thereof. The counter punch 74 is a movable type which can be lifted and lowered by a mechanically driven-type (hydraulic-type, servo-motor-type, and the like) driving source (not illustrated).

Figure 14:
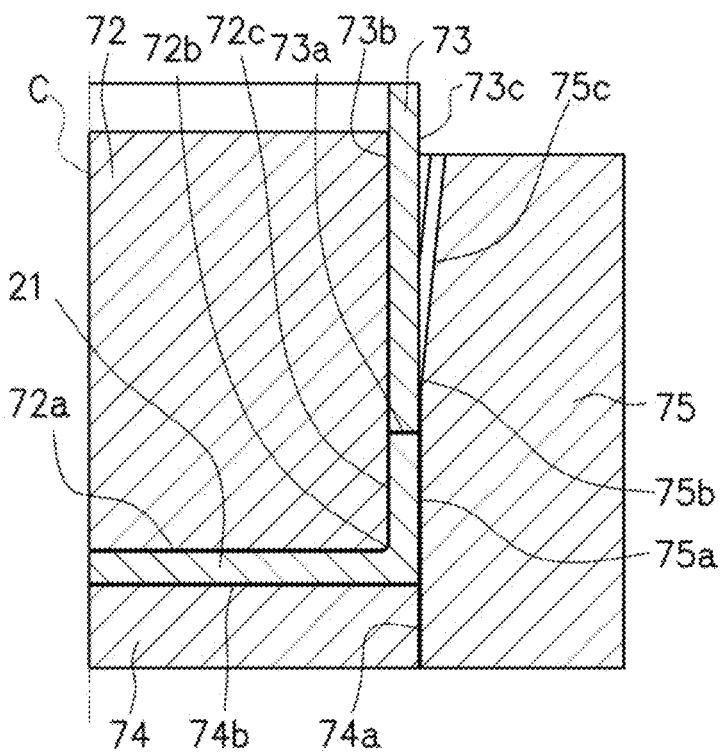
FIG. 14 is a cross-sectional view illustrating a state after forming in the tooth shape-forming process of the method of manufacturing a tooth-shaped component according to the first embodiment.

As illustrated in FIGS. 10 to 13, while having the diameter-reduced cylindrical container 65 formed in the diameter-reducing process, as the workpiece, the diameter-reduced cylindrical container 65 is positioned in the flat surface portion 74b of the counter punch 74 such that the member axis of the diameter-reduced cylindrical container 65 coincides with the central axis C of the press machine, and the bottom surface portion 65c of the diameter-reduced cylindrical container 65 is clamped between the flat surface portion 72a of the inner punch 72 and the flat surface portion 74b of the counter punch 74. In this case, the diameter-reduced side surface portion 65b is positioned in the valley sites 75e of the die 75. In addition, the flat surface portion 73a of the outer punch 73 is caused to abut an opening end 65d of the diameter-reduced cylindrical container 65. In this state, the inner punch 72, the outer punch 73, and the counter punch 74 are moved downward until the flat surface portion 73a of the outer punch 73 passes through the curved surface portion 75b of the die 75. Subsequently, in a state where the inner punch 72, the counter punch 74, and the die 75 are fixed, the outer punch 73 is moved downward so as to compress a side surface portion of the diameter-reduced cylindrical container 65. Accordingly, as illustrated in FIG. 14, the inside of a space surrounded by the inner punch 72, the outer punch 73, the counter punch 74, and the die 75 is filled with the material. As a result, the tooth tip portions 21*a* are formed in the diameter-reduced side surface portion 65*b* (the parts corresponding to the peak portions 31*b*) of the diameter-reduced cylindrical container 65, and the tooth bottom portions 21*b* are formed in other parts of the side surface portion (the parts corresponding to the valley portions 31*a*) of the diameter-reduced cylindrical container 65. According to each of the processes described above, the tooth-shaped component 21 having the bottom surface portion 21*c*, the side surface portion 21*d*, the tooth tip portions 21*a*, and the tooth bottom portions 21*b* is completed.

Figure 15:
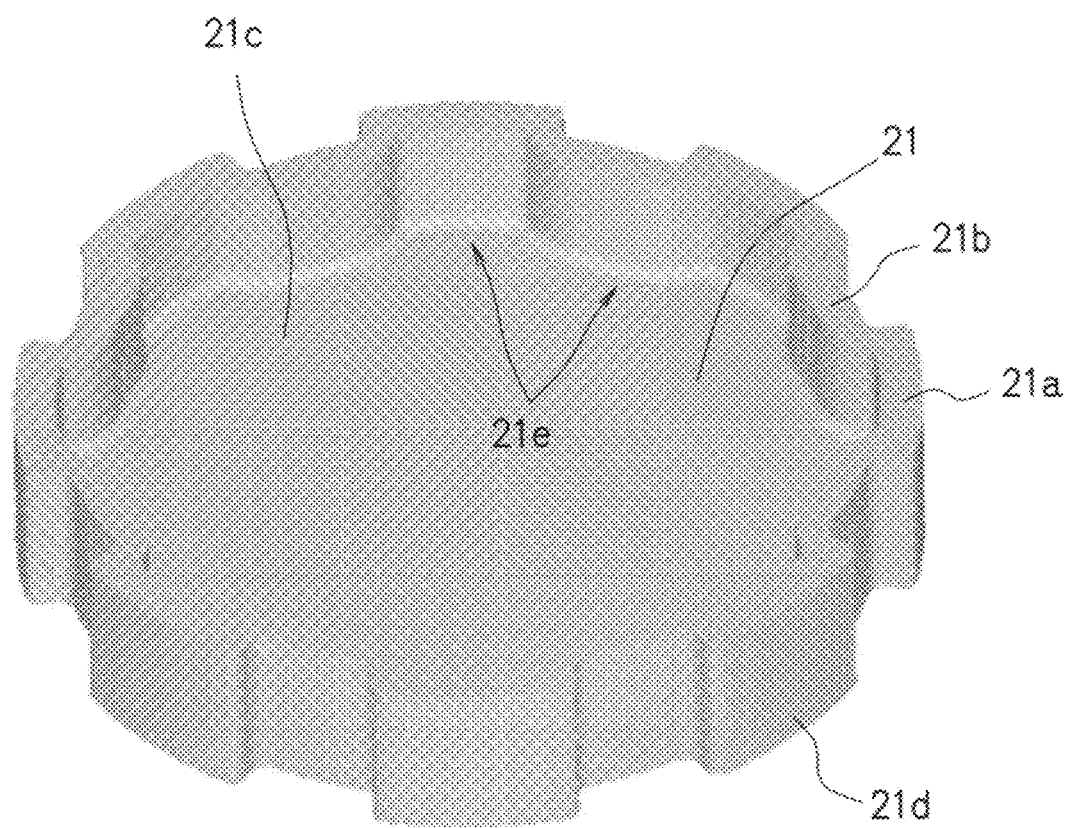
FIG. 15 is a perspective view illustrating a tooth-shaped component formed through the tooth shape-forming process.

FIG. 15 illustrates a view of the appearance of the tooth-shaped component 21 after the tooth shapes are formed. There is no occurrence of a superposition defect on an inner surface 21*e* of the corner portion of the tooth-shaped component 21. Before forming the tooth shape, forming is performed such that the curved surface portion 72*b* of the inner punch 72 and the corner portion 65*a* of the diameter-reduced cylindrical container 65 come into contact with each other, and the external angle of the corner portion 65*a* of the diameter-reduced cylindrical container 65 is adjusted to a value close to a right angle. Accordingly, in the tooth shape-forming process, it is possible to reduce a gap between a place in the vicinity of the corner portion where the flat surface portion 74*b* of the counter punch 74 and the side surface portion 75*a* of the die 75 come into contact with each other, and the corner portion 65*a* of the diameter-reduced cylindrical container 65. As a result, the corner portion 65*a* of the diameter-reduced cylindrical container 65 is not separated from the curved surface portion 72*b* of the inner punch 72 in the middle of the tooth shape-forming process. Therefore, after the tooth shape-forming process ends, it is possible to obtain the tooth-shaped component 21 having no superposition defect in a boundary between an upper surface of the bottom surface portion 21*c* and the inner circumferential surface of the side wall portion 21*d*.

In addition, in the present embodiment, the cold forging is employed as the method of manufacturing a tooth-shaped component. Therefore, compared to a tooth-shaped component manufactured through the hot forging, it is possible to obtain the tooth-shaped component 21 having no draft and having the dimensional accuracy ten times more accurate in thickness, without performing the machining process. That is, according to the method of manufacturing a tooth-shaped component in the present embodiment, it is possible to obtain the high-quality tooth-shaped component 21 having no superposition defect and draft and having the dimensional accuracy in thickness ranging from ±0.05 mm to ±0.3 mm.

Second Embodiment

Next, a second embodiment of the present invention will be described.

Figure 16A:
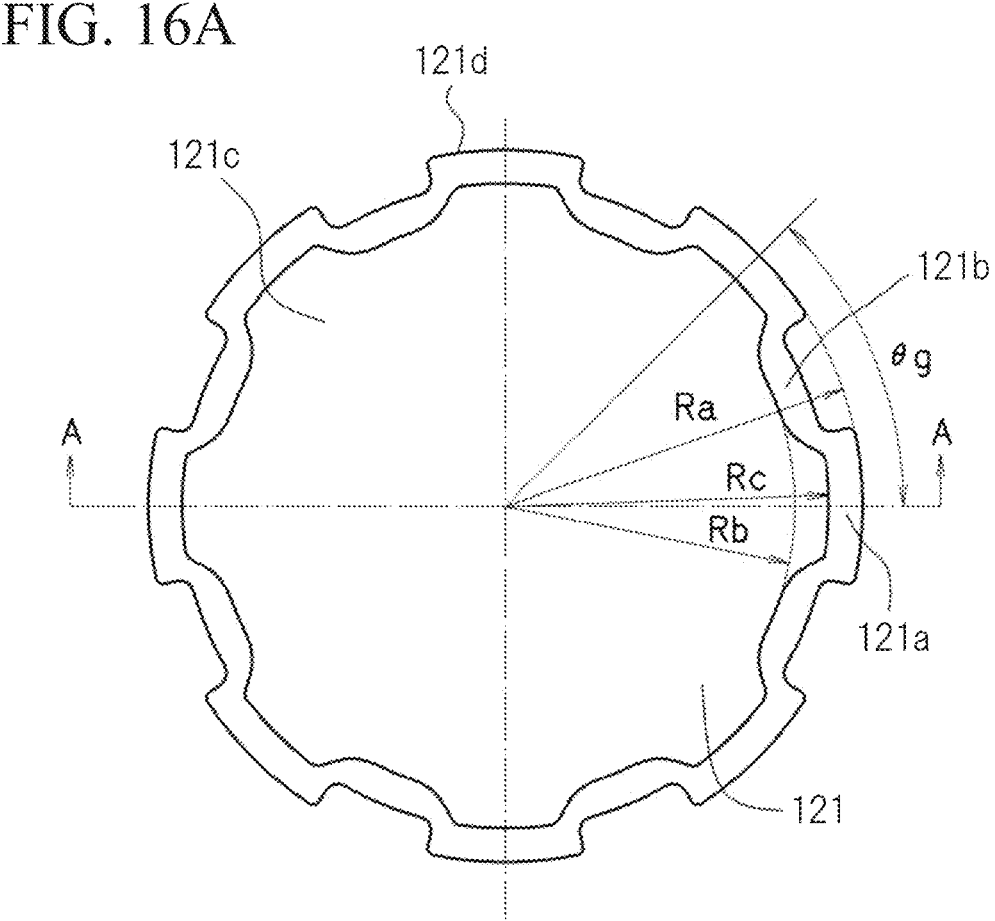
FIG. 16A is a plan view of a tooth-shaped component formed through a method of manufacturing a tooth-shaped component according to a second embodiment.
Figure 16B:
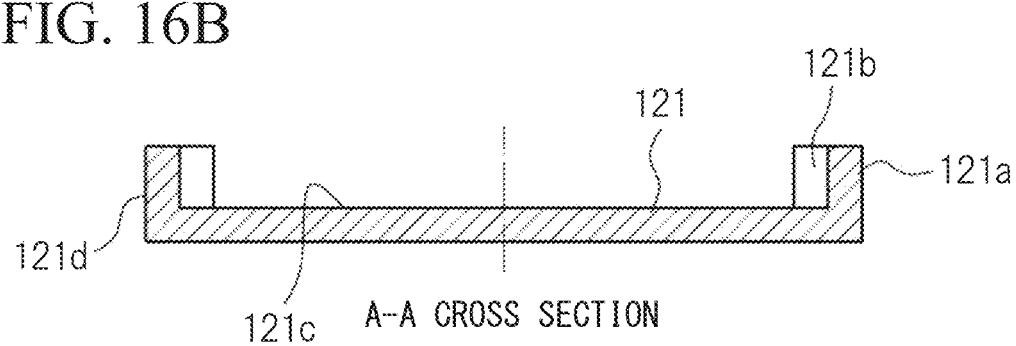
FIG. 16B is an A-A cross-sectional view of the tooth-shaped component illustrated in FIG. 16A.

FIG. 16A is a plan view of a tooth-shaped component 121 manufactured through a method of manufacturing a tooth-shaped component according to the second embodiment. FIG. 16B is an A-A cross-sectional view of the tooth-shaped component 121 illustrated in FIG. 16A. As illustrated in FIGS. 16A and 16B, the tooth-shaped component 121 is a component having a bottomed cylindrical shape of which one end portion is open and of which the other end portion is sealed in a direction of the member axis (the one-dot chain line illustrated in FIG. 16B).

The tooth-shaped component 121 has a bottom surface portion 121*c* and a side surface portion 121*d* which rises from an outer edge portion of the bottom surface portion 121*c*. An external angle of a corner portion formed by the bottom surface portion 121*c* and the side surface portion 121*d* is substantially a right angle. The side surface portion 121*d* has tooth tip portions 121*a* and tooth bottom portions 121*b* provided so as to alternately appear along a circumferential direction having the member axis as the center. The present embodiment illustrates a case where there are eight of the tooth tip portions 121*a* and the tooth bottom portions 121*b* each. However, the numbers of the tooth tip portions 121*a* and the tooth bottom portions 121*b* (that is, the number of teeth of the tooth-shaped component 121) are not limited to eight as long as there are a plurality thereof.

The tooth tip portions 121*a* are parts which protrude further outward than the tooth bottom portions 121*b* in a radial direction having the member axis as the center. More specifically, as illustrated in FIG. 16A, outer circumferential surfaces of the tooth tip portions 121*a* are positioned on the circumference of a radius Ra having the member axis as the center. Inner circumferential surfaces of the tooth tip portions 121*a* and outer circumferential surfaces of the tooth bottom portions 121*b* are positioned on the circumference of a radius Rc having the member axis as the center. Inner circumferential surfaces of the tooth bottom portions 121*b* are positioned on the circumference of a radius Rb having the member axis as the center. Hereinafter, the radius Ra will be referred to as an outer radius of the tooth tip portions 121*a*. The radius Rc will be referred to as an inner radius of the tooth tip portions 121*a*. The radius Rb will be referred to as an inner radius of the tooth bottom portions 121*b*.

In addition, in FIG. 16A, $\theta g$ indicates an angle between the tooth tip portions 121*a* adjacent to each other in the circumferential direction having the member axis as the center.

The tooth-shaped component 121 manufactured through the method of manufacturing a tooth-shaped component according to the present embodiment is characterized by naturally having no superposition defect, having no draft, and having the dimensional accuracy in thickness ranging from ±0.05 mm to ±0.3 mm.

In the present embodiment, cold forging is employed as the method of manufacturing a tooth-shaped component (will be described later in detail). Therefore, compared to a tooth-shaped component manufactured through hot forging, it is possible to obtain the tooth-shaped component 121 having no draft and having the dimensional accuracy ten times more accurate in thickness, without performing a machining process. That is, according to the method of manufacturing a tooth-shaped component in the present embodiment, it is possible to obtain the high-quality tooth-shaped component 121 having no superposition defect and draft and having the dimensional accuracy in thickness ranging from ±0.05 mm to ±0.3 mm.

In order to manufacture such a tooth-shaped component 121, the method of manufacturing a tooth-shaped component according to the second embodiment includes a drawing process, a diameter-reducing process, and a tooth shape-forming process (a rough tooth shape-forming process and a complete tooth shape-forming process). Hereinafter, each of the processes will be described in detail. As described above, in the present embodiment, the cold forging is employed as the method of manufacturing a tooth-shaped component. Therefore, each of the processes is executed at a normal temperature.

(Drawing Process)

Figure 17:
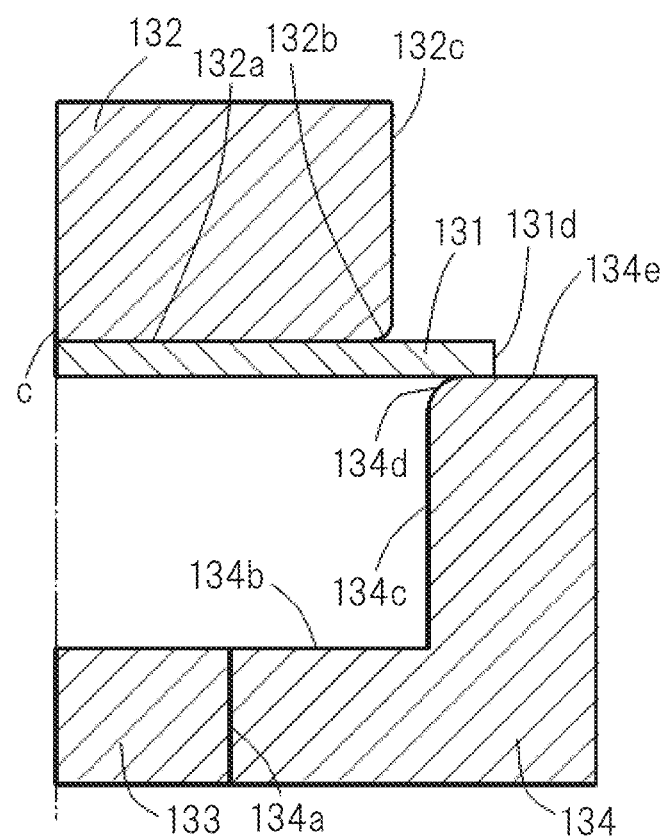
FIG. 17 is a cross-sectional view illustrating a state before forming starts in a drawing process of the method of manufacturing a tooth-shaped component according to the second embodiment.
Figure 18:
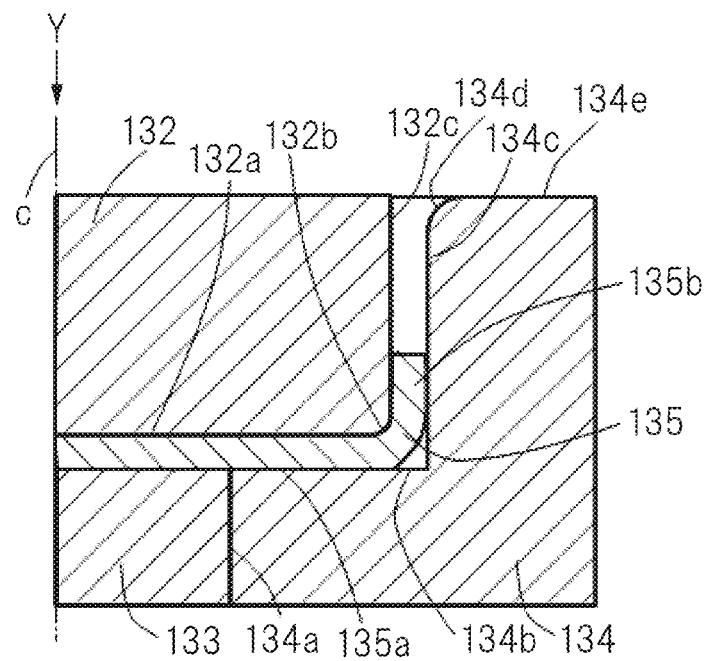
FIG. 18 is a cross-sectional view illustrating a state after forming in the drawing process of the method of manufacturing a tooth-shaped component according to the second embodiment.
Figure 19:
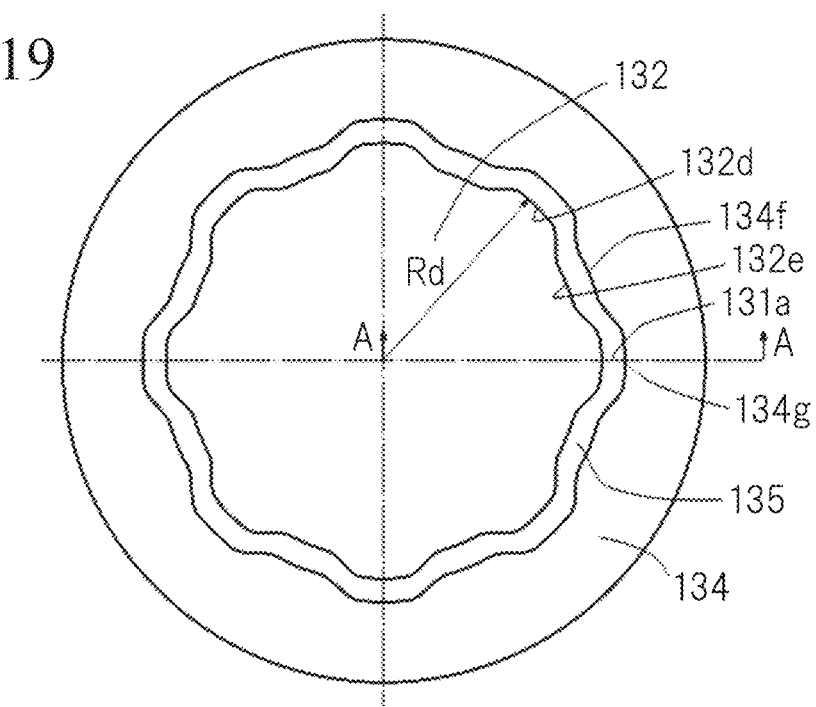
FIG. 19 is a view illustrating the state after forming in the drawing process of the method of manufacturing a tooth-shaped component according to the second embodiment and is a Y-directional plan view of FIG. 18.

FIG. 17 illustrates a state before forming starts in the drawing process, and FIGS. 18 and 19 illustrate states after forming in the drawing process. With reference to FIGS. 17 to 19, a press machine includes a punch 132, a knockout 133, and a die 134 having the coaxially disposed central axes C. The knockout 133 and the die 134 are disposed so as to face the punch 132.

Figure 21:
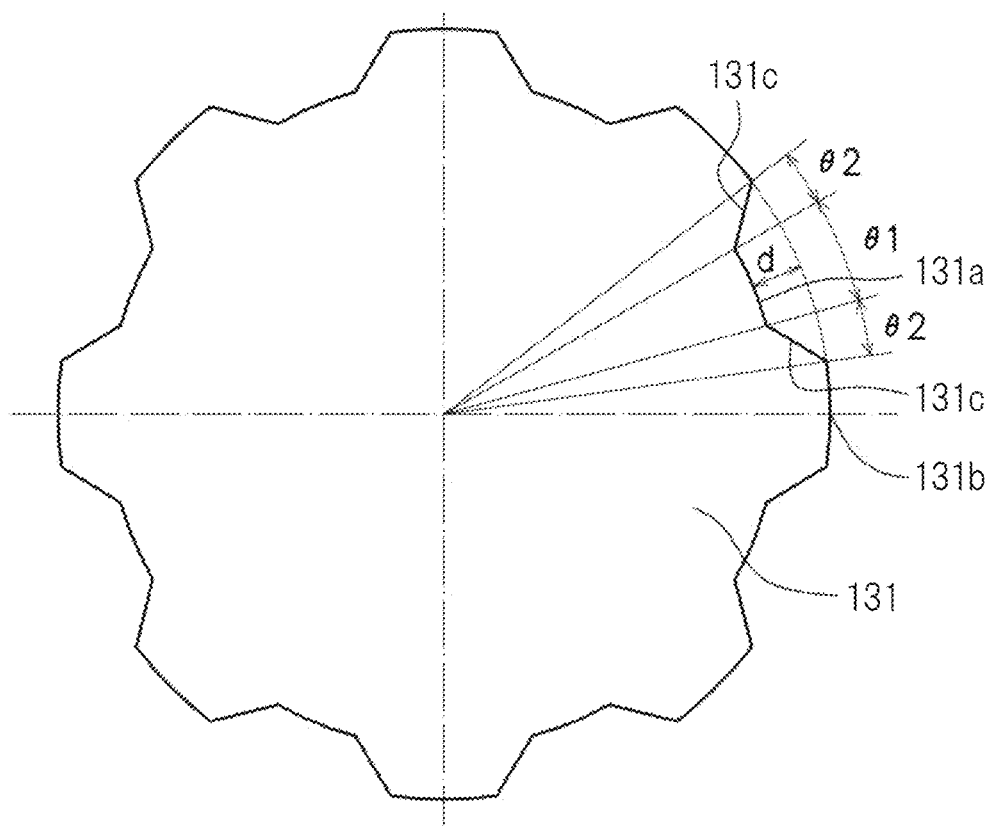
FIG. 21 is a plan view illustrating a metal sheet which is a workpiece in the drawing process.

As illustrated in FIG. 21, a workpiece 131 is a flat metal sheet (for example, a steel sheet) having valley portions 131a and peak portions 131b provided so as to alternately appear along the circumferential direction having the member axis (the central axis of the workpiece 131) as the center. The peak portions 131b are parts which protrude outward from the valley portions 131a in the radial direction having the member axis as the center. In addition, the workpiece 131 also has slope portions 131c each of which connects the peak portion 131b and the valley portion 131a together.

The valley portions 131a become parts corresponding to the tooth bottom portions 121b. The numbers of the peak portions 131b and the valley portions 131a coincide with the number of teeth of the tooth-shaped component 121, and the peak portions 131b, the slope portions 131c, and the valley portions 131a are formed with predetermined spaces among thereof along the circumferential direction having the member axis as the center.

In a case where a workpiece is a circularly-shaped sheet having the same outer diameters, when a tooth shape is formed in the tooth shape-forming process, the material of the workpiece remains at the tooth bottom portions of the tooth shape, and the inside of a space formed by a die and punch is filled in an early stage. Therefore, a forming load becomes excessive. In order to reduce the forming load, the parts corresponding to the tooth bottom portions 121b serve as the valley portions 131a. A depth d of the valley portion 131a with respect to the peak portion 131b (a length between an outer circumferential edge of the peak portion 131b and an outer circumferential edge of the valley portion 131a in the radial direction having the member axis as the center) may be set to approximately a length $\Delta r$ (=Ra−Rb) obtained by subtracting the inner radius Rb of the tooth bottom portions 121b from the outer radius Ra of the tooth tip portions 121a of the tooth-shaped component 121 illustrated in FIG. 16A. In addition, a regional angle $\theta 1$ of the valley portion 131a may be set to approximately ⅓ of the regional angle of one tooth ($\theta g$ illustrated in FIG. 16A). In addition, a regional angle $\theta 2$ of the slope portion 131c may be set to approximately ⅙ of the regional angle of one tooth ($\theta g$ illustrated in FIG. 16A).

The punch 132 has a flat surface portion 132a parallel to the radial direction orthogonal to the central axis C, a curved surface portion 132b provided at an outer circumferential edge of the flat surface portion 132a, and a side surface portion 132c continued via the flat surface portion 132a and the curved surface portion 132b and extending in an upward direction (a first direction) of FIG. 17 parallel to the central axis C. In the side surface portion 132c, peak sites 132d and valley sites 132e elongated in the first direction are alternately formed in the circumferential direction with predetermined spaces among thereof. The numbers of the peak sites 132d and the valley sites 132e coincide with the number of teeth of the tooth-shaped component 121. It is desirable that a radius Rd of the peak sites 132d (a length between outer circumferential surfaces of the peak sites 132d and the central axis C in the radial direction having the central axis C as the center) ranges from 1.08 times to 1.17 times the inner radius Re of the tooth tip portions 121a. The reason will be described in the section of the diameter-reducing process. The punch 132 is a movable type which can be lifted and lowered by a mechanically driven-type (hydraulic-type, servo-motor-type, and the like) driving source (not illustrated).

The knockout 133 has a columnar shape and is used for detaching a formed product from the die and punch. The knockout 133 is a movable type which can be lifted and lowered by a driving source (not illustrated).

The die 134 has a first side surface portion 134a extending in the first direction, a flat surface portion 134b continued to the first side surface portion 134a and parallel to the radial direction orthogonal to the central axis C, a second side surface portion 134c continued to the flat surface portion 134b and extending in the first direction, and a flat surface portion 134e continued via the second side surface portion 134c and a curved surface portion 134d and parallel to the radial direction orthogonal to the central axis C. In the second side surface portion 134c, peak sites 134f and valley sites 134g elongated in the first direction are alternately formed in the circumferential direction with predetermined spaces among thereof. The numbers of the peak sites 134f and the valley sites 134g coincide with the number of teeth of the tooth shape. The second side surface portion 134c is disposed in a form of being offset in the radial direction from the side surface portion 132c of the punch 132 substantially as much as a plate thickness of the workpiece 131. The die 134 is a fixed type.

As illustrated in FIG. 19, the punch 132 and the die 134 are disposed such that the peak sites 132d of the punch 132 face the valley sites 134g of the die 134, in other words, the valley sites 132e of the punch 132 face the peak sites 134f of the die 134.

Figure 20A:
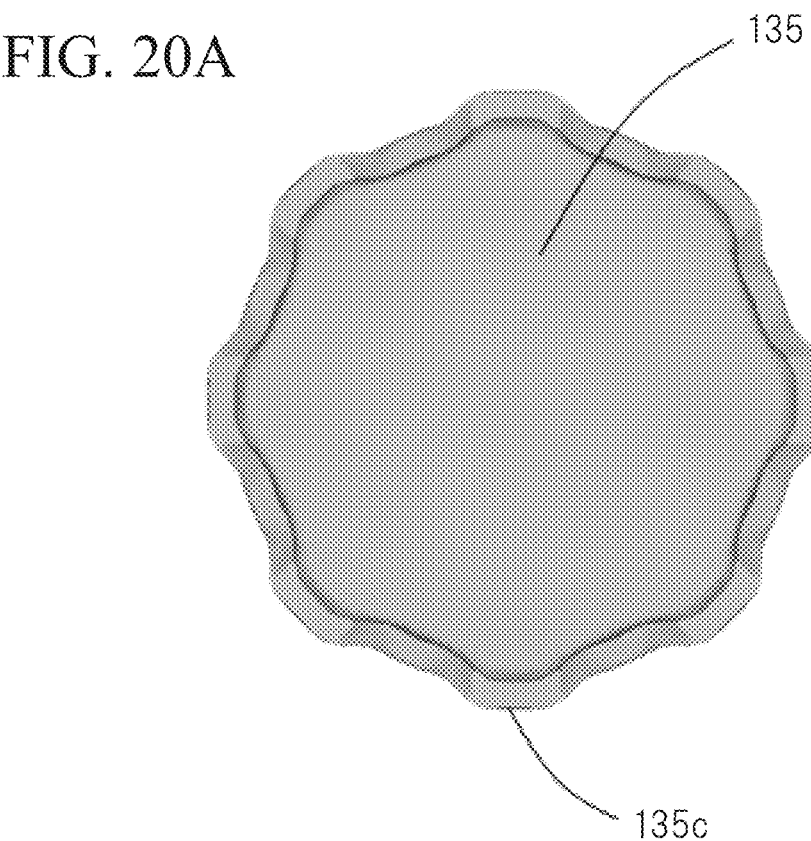
FIG. 20A is a plan view of a corrugated cylindrical container formed through the drawing process.
Figure 20B:
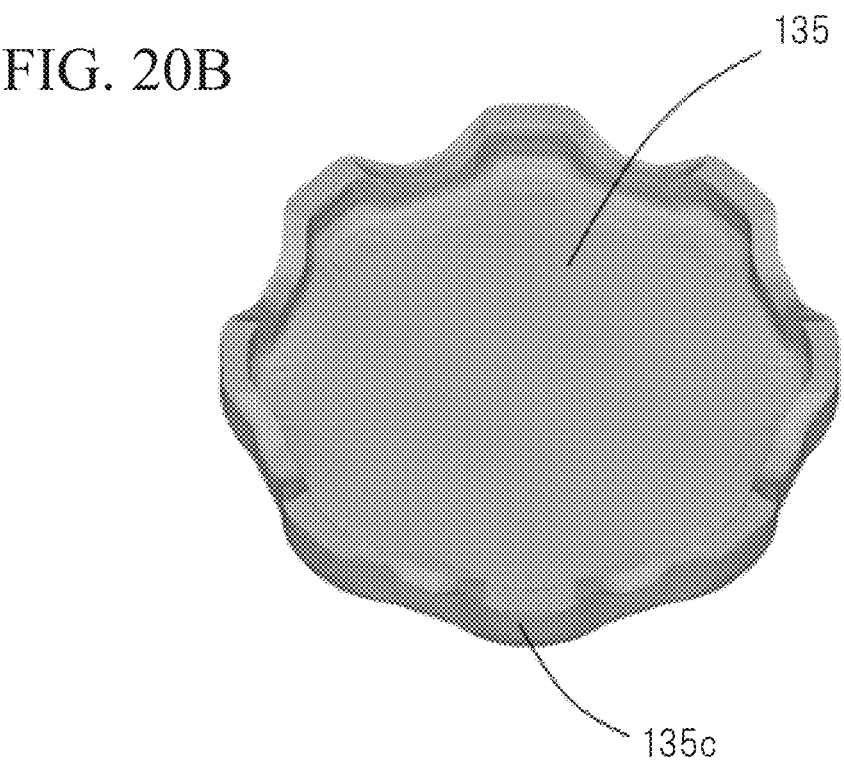
FIG. 20B is a perspective view of the corrugated cylindrical container formed through the drawing process.

As illustrated in FIG. 17, the workpiece 131 is positioned in the flat surface portion 134e of the die 134 such that the member axis of the workpiece 131 coincides with the central axis C of the press machine. In this case, the peak portions 131b of the workpiece 131 are positioned in the valley sites 134g of the die 134. In this state, the punch 132 is moved downward until an end portion 131d of the workpiece 131 passes through the curved surface portion 134d of the die 134, thereby performing draw-forming, and the punch 132 is moved downward until the flat surface portion 134b of the die 134 comes into contact with a bottom surface portion of the workpiece 131, thereby forming a corrugated cylindrical container 135, as illustrated in FIG. 18. A side surface portion 135b of the corrugated cylindrical container 135 has a shape standing upright with respect to a bottom surface portion 135a. After forming, the knockout 133 is lifted and the corrugated cylindrical container 135 is detached from the die 134. FIGS. 20A and 20B illustrate views of the appearance of the corrugated cylindrical container 135.

(Diameter-Reducing Process)

Figure 22:
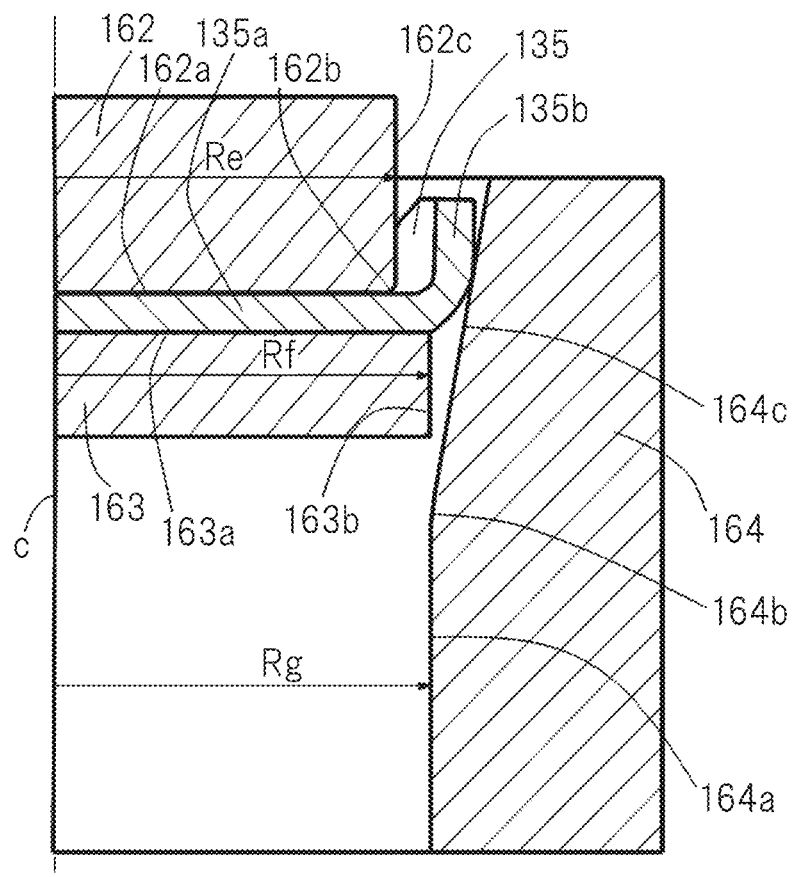
FIG. 22 is a cross-sectional view illustrating a state before forming starts in a diameter-reducing process of the method of manufacturing a tooth-shaped component according to the second embodiment.

FIG. 22 illustrates a state before forming starts in the diameter-reducing process. With reference to FIG. 22, the press machine includes a punch 162, a counter punch 163, and a die 164 disposed in an outer circumference of the counter punch 163, having the coaxially disposed central axes C. The counter punch 163 and the die 164 are disposed so as to face the punch 162.

The punch 162 has a flat surface portion 162a parallel to the radial direction orthogonal to the central axis C, a curved surface portion 162b provided at an outer circumferential edge of the flat surface portion 162a, and a side surface portion 162c continued via the flat surface portion 162a and the curved surface portion 162b and extending in an upward direction (a first direction) of FIG. 22 parallel to the central axis C. A radius Re of the side surface portion 162c is substantially equal to the inner radius Rc of the tooth tip portions 121a. The punch 162 is a movable type which can be lifted and lowered by a mechanically driven-type (hydraulic-type, servo-motor-type, and the like) driving source (not illustrated).

The counter punch 163 has a flat surface portion 163a parallel to the radial direction orthogonal to the central axis C, and a side surface portion 163b continued to the flat surface portion 163a and extending in a downward direction of FIG. 22 parallel to the central axis C. A radius Rf of the side surface portion 163b is substantially equal to the outer radius Ra of the tooth tip portions 121a. The counter punch 163 is a movable type which can be lifted and lowered by a mechanically driven-type (hydraulic-type, servo-motor-type, and the like) driving source (not illustrated).

The die 164 has a side surface portion 164a extending in the first direction, a curved surface portion 164b provided in an upper end portion of the side surface portion 164a, and a slope portion 164c continued via the side surface portion 164a and the curved surface portion 164b and widened in the radial direction orthogonal to the central axis toward the first direction. A radius Rg of the side surface portion 164a is substantially equal to the outer radius Ra of the tooth tip portions 121a. The die 164 is a fixed type.

Figure 23A:
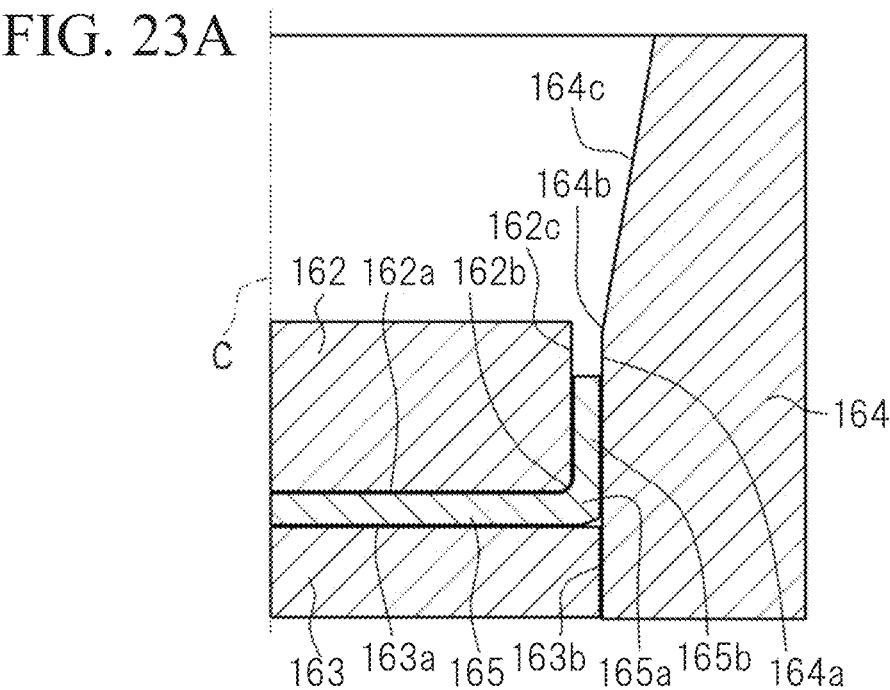
FIG. 23A is a cross-sectional view illustrating a state after forming in the diameter-reducing process of the method of manufacturing a tooth-shaped component according to the second embodiment.

As illustrated in FIG. 22, while having the corrugated cylindrical container 135 formed in the diameter-reducing process, as the workpiece, the corrugated cylindrical container 135 is positioned in the flat surface portion 163a of the counter punch 163 such that the member axis of the corrugated cylindrical container 135 coincides with the central axis C of the press machine, and the bottom surface portion 135a of the corrugated cylindrical container 135 is clamped between the flat surface portion 162a of the punch 162 and the flat surface portion 163a of the counter punch 163. In this state, the punch 162 and the counter punch 163 are moved downward, thereby forming a diameter-reduced cylindrical container 165, as illustrated in FIG. 23A. That is, as illustrated in FIG. 23A, in the side surface portion 135b of the corrugated cylindrical container 135 which is the workpiece, a peak portion side surface portion 135c (a particular part in which the tooth tip portion 21a is to be formed) corresponding to the peak portion 31b is reduced in diameter due to the slope portion 164c of the die 164 (hereinafter, this portion will be referred to as a diameter-reduced side surface portion 165b). A corner portion 165a of the diameter-reduced cylindrical container 165 is increased in thickness such that an external shape of the corner portion 165a of the diameter-reduced cylindrical container 165 satisfies the following conditional expression (1).

Figure 23B:
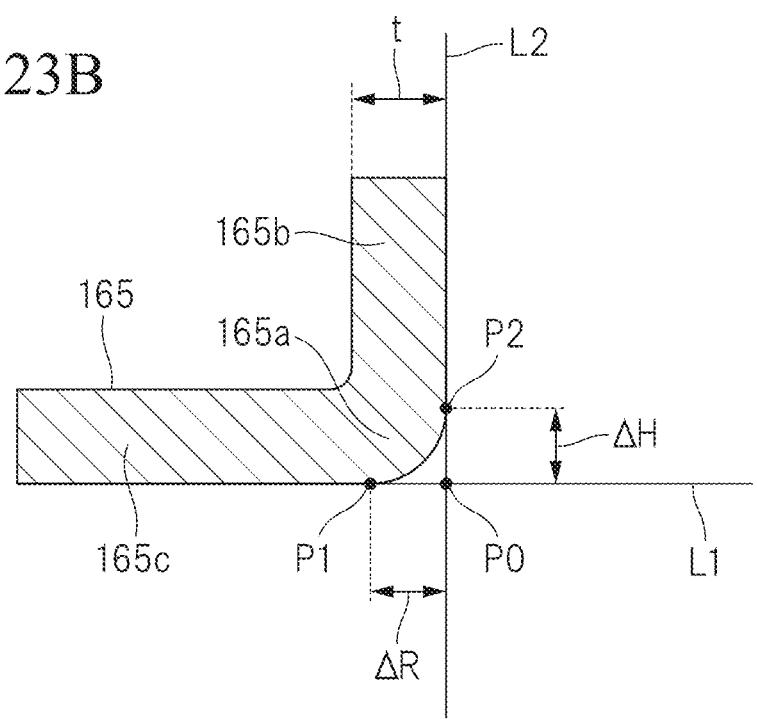
FIG. 23B is a view describing an external shape of a corner portion of a diameter-reduced cylindrical container obtained through the diameter-reducing process.

Here, as illustrated in FIG. 23B, in a case where the diameter-reduced cylindrical container 165 is viewed in a cross section including a central axis direction and a radial direction of the diameter-reduced cylindrical container 165, an intersection point of a straight line L1 in parallel contact with a bottom surface portion 165c of the diameter-reduced cylindrical container 165, and a straight line L2 in parallel contact with the side surface portion 165b of the diameter-reduced cylindrical container 165 is defined as P0. In addition, as illustrated in FIG. 23B, the point at which the straight line L1 starts being separated from the bottom surface portion 165c of the diameter-reduced cylindrical container 165 is defined as P1, and a point at which the straight line L2 starts being separated from the side surface portion 165b of the diameter-reduced cylindrical container 165 is defined as P2. Moreover, as illustrated in FIG. 23B, a length between the intersection point P0 and the point P1 on the straight line L1 is defined as $\Delta R$, and a length between the intersection point P0 and the point P2 on the straight line L2 is defined as $\Delta H$.

The conditional expression (1) is expressed as follows by using a plate thickness t of the diameter-reduced cylindrical container 165, and the lengths $\Delta R$ and $\Delta H$.

$$(\Delta R + \Delta H) \leq 2t \quad (1)$$

That is, when the corner portion 165a of the diameter-reduced cylindrical container 165 is increased in thickness such that the external shape of the corner portion 165a of the diameter-reduced cylindrical container 165 satisfies the conditional expression (1), the external angle of the corner portion 165a has a value close to a right angle.

In order to cause the external angle of the corner portion 165a of the diameter-reduced cylindrical container 165 to have a value closer to a right angle, it is preferable that the corner portion 165a of the diameter-reduced cylindrical container 165 be increased in thickness such that the external shape of the corner portion 165a of the diameter-reduced cylindrical container 165 satisfies the following conditional expression (2).

$$(\Delta R + \Delta H) \leq 1.5t \quad (2)$$

The reason for causing the desirable value for the radius Rd of the peak sites 132d of the side surface portion 132c of the punch 132 in the drawing process to range from 1.08 times to 1.17 times the inner radius Rc of the tooth tip portions 121a will be described below. When the radius Rd of the peak sites 132d is less than 1.08 times the inner radius Rc of the tooth tip portions 121a, the reduced amount of the diameter in the diameter-reducing process is small, and the corner portion 165a is insufficiently increased in thickness, thereby resulting in a superposition defect in the succeeding tooth shape-forming process. Meanwhile, when the radius Rd of the peak sites 132d exceeds 1.17 times the inner radius Re of the tooth tips 121a, the side surface portion 135b is excessively thin in the drawing process. As a result, the corner portion 165a is insufficiently increased in thickness, thereby resulting in a superposition defect in the succeeding tooth shape-forming process.

(Rough Tooth Shape-Forming Process)

FIGS. 24 to 27 illustrate states before forming starts in the rough tooth shape-forming process. With reference to FIGS. 24 to 27, the press machine includes a rough tooth shape-forming inner punch 172, a rough tooth shape-forming outer punch 173 disposed in an outer circumference of the inner punch 172, a rough tooth shape-forming counter punch 174, and a rough tooth shape-forming die 175 disposed in an outer circumference of the counter punch 174, having the coaxially disposed central axes C. The counter punch 174 and the die 175 are disposed so as to face the inner punch 172 and the outer punch 173.

Figure 24:
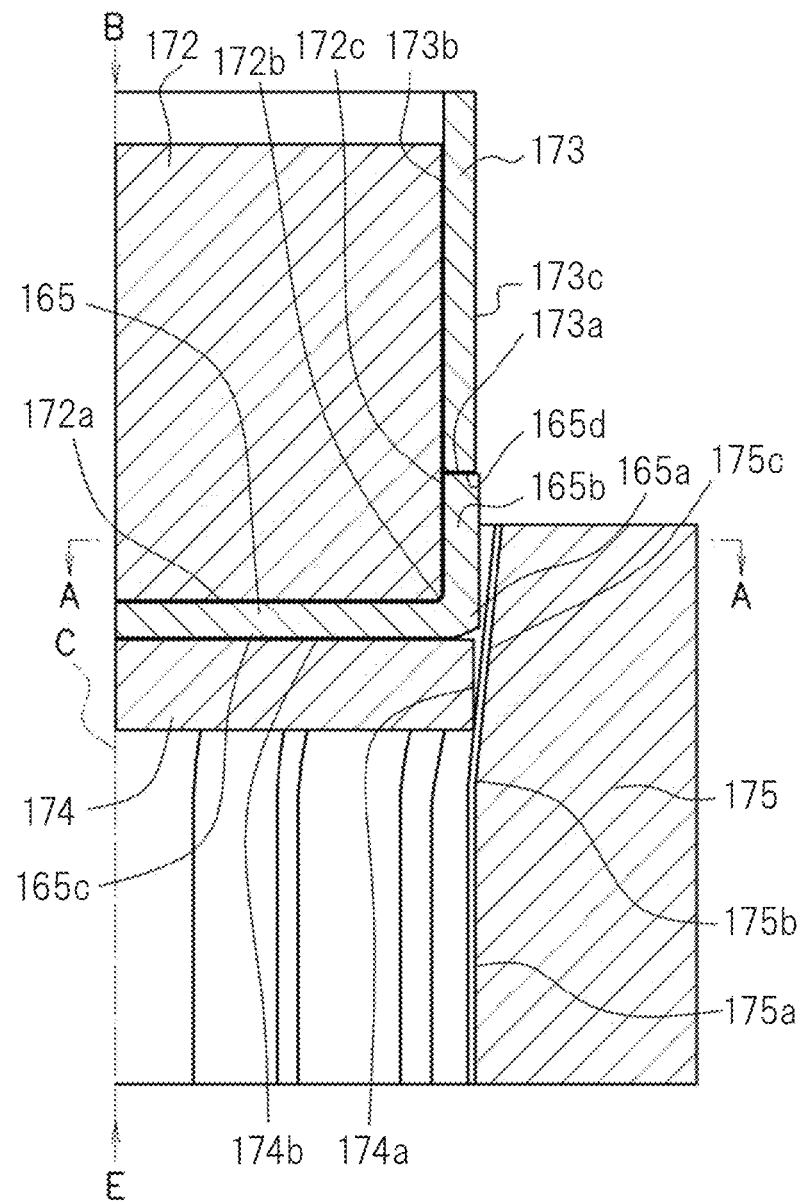
FIG. 24 is a view illustrating a state before forming starts in a rough tooth shape-forming process of the method of manufacturing a tooth-shaped component according to the second embodiment and is a D-D cross-sectional view of FIG. 26.
Figure 25:
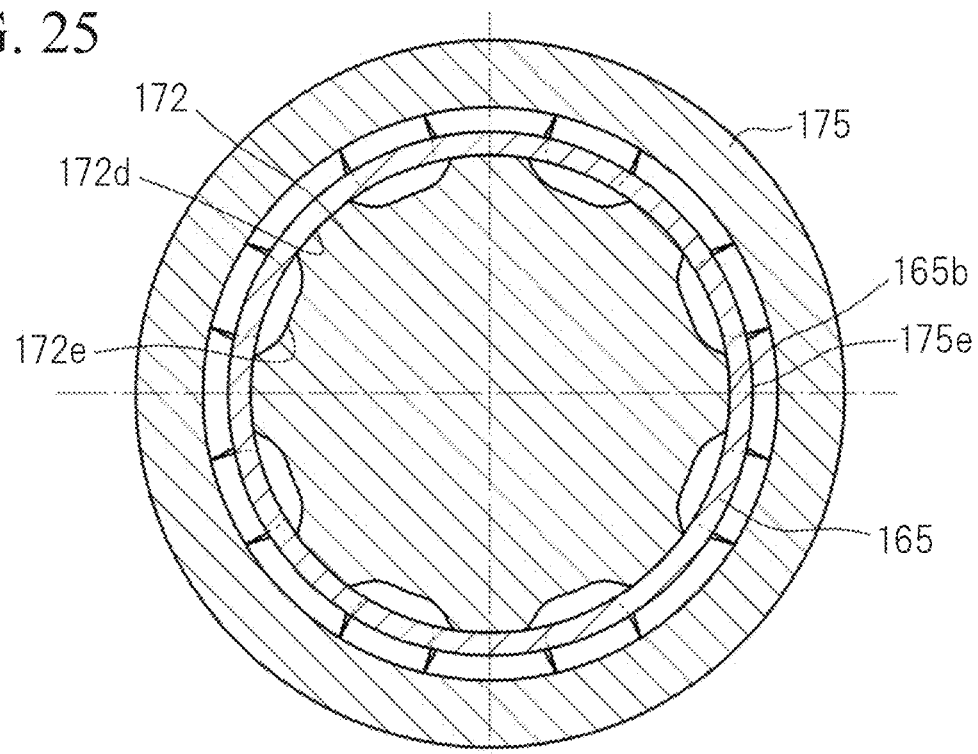
FIG. 25 is a view illustrating the state before forming starts in the rough tooth shape-forming process of the method of manufacturing a tooth-shaped component according to the second embodiment and is an A-A cross-sectional plan view of FIG. 24.

The inner punch 172 has a flat surface portion 172a parallel to the radial direction orthogonal to the central axis C, a curved surface portion 172b provided at an outer circumferential edge of the flat surface portion 172a, and a side surface portion 172c continued via the flat surface portion 172a and the curved surface portion 172b and extending in an upward direction (a first direction) of FIG. 24 parallel to the central axis C. In the side surface portion 172c, in order to form the tooth tip portions 121a and the tooth bottom portions 121b, peak sites 172d and valley sites 172e elongated in the first direction are alternately formed in the circumferential direction with predetermined spaces among thereof. The inner punch 172 is a movable type which can be lifted and lowered by a mechanically driven-type (hydraulic-type, servo-motor-type, and the like) driving source (not illustrated).

The die 175 has a side surface portion 175a extending in the first direction, a curved surface portion 175b provided in an upper end portion of the side surface portion 175a, and a slope portion 175c continued via the side surface portion 175a and the curved surface portion 175b and widened in the radial direction orthogonal to the central axis toward the first direction. In the side surface portion 175a, in order to form the tooth tip portions 121a and the tooth bottom portions 121b, peak sites 175d and valley sites 175e elongated in the first direction are alternately formed in the circumferential direction with predetermined spaces among thereof. The die 175 is a fixed type.

Figure 26:
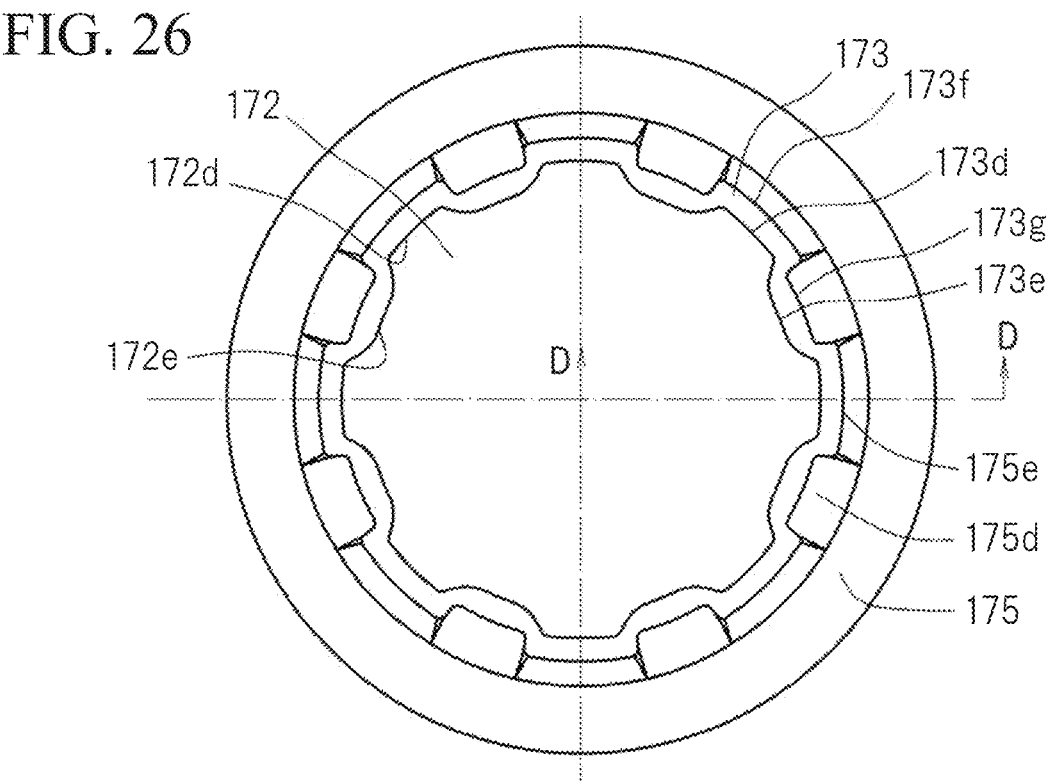
FIG. 26 is a view illustrating the state before forming starts in the rough tooth shape-forming process of the method of manufacturing a tooth-shaped component according to the second embodiment and is a B-directional plan view of FIG. 24.
Figure 27:
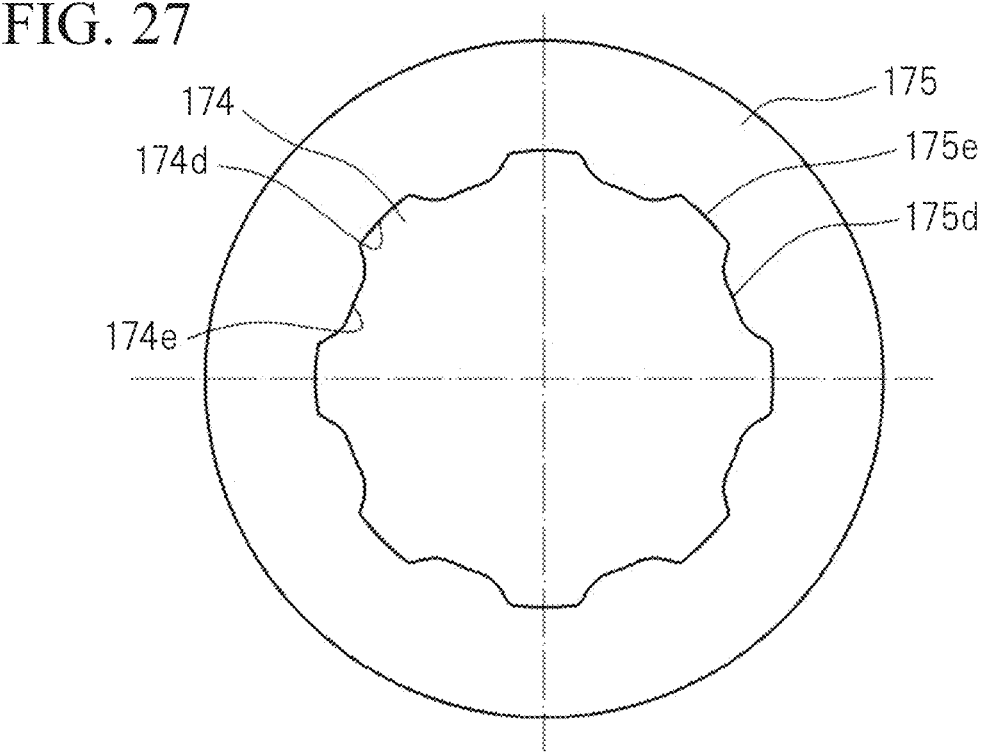
FIG. 27 is a view illustrating the state before forming starts in the rough tooth shape-forming process of the method of manufacturing a tooth-shaped component according to the second embodiment and is an E-directional bottom view of FIG. 24.

As illustrated in FIG. 26, the inner punch 172 and the die 175 are disposed such that the peak sites 172d of the inner punch 172 face the valley sites 175e of the die 175, in other words, the valley sites 172e of the inner punch 172 face the peak sites 175d of the die 175.

The outer punch 173 has a flat surface portion 173a parallel to the radial direction orthogonal to the central axis C, a first side surface portion 173b continued to an inner edge portion of the flat surface portion 173a and extending in the first direction, and a second side surface portion 173c continued to an outer edge portion of the flat surface portion 173a and extending in the first direction. In the first side surface portion 173b, along the side surface portion 172c of the inner punch 172, peak sites 173d and valley sites 173e elongated in the first direction are alternately formed in the circumferential direction with predetermined spaces among thereof. In addition, in the second side surface portion 173c, along the side surface portion 175a of the die 175, peak sites 173f and valley sites 173g elongated in the first direction are alternately formed in the circumferential direction with predetermined spaces among thereof. The outer punch 173 is a movable type which can be lifted and lowered by a mechanically driven-type (hydraulic-type, servo-motor-type, and the like) driving source (not illustrated).

The counter punch 174 has a side surface portion 174a extending in the first direction, and a flat surface portion 174b continued to the side surface portion 174a and parallel to the radial direction orthogonal to the central axis C. In the side surface portion 174a, along the side surface portion 175a of the die 175, peak sites 174d and valley sites 174e elongated in the first direction are alternately formed in the circumferential direction with predetermined spaces among thereof. The counter punch 174 is a movable type which can be lifted and lowered by a mechanically driven-type (hydraulic-type, servo-motor-type, and the like) driving source (not illustrated).

Figure 28:
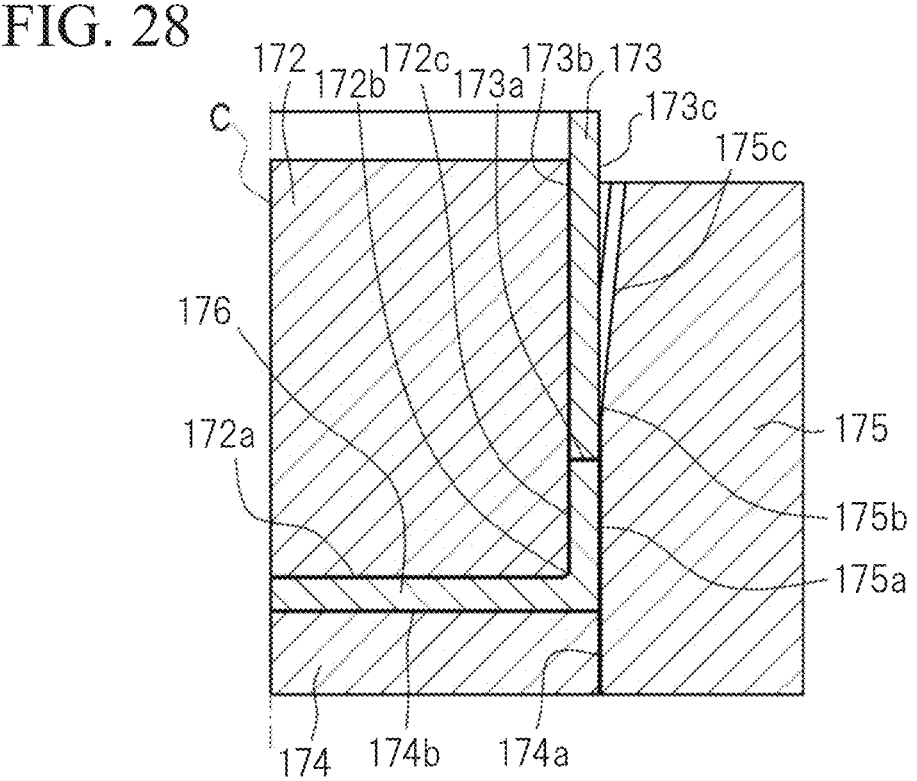
FIG. 28 is a cross-sectional view illustrating a state after forming in the rough tooth shape-forming process of the method of manufacturing a tooth-shaped component according to the second embodiment.
Figure 29:
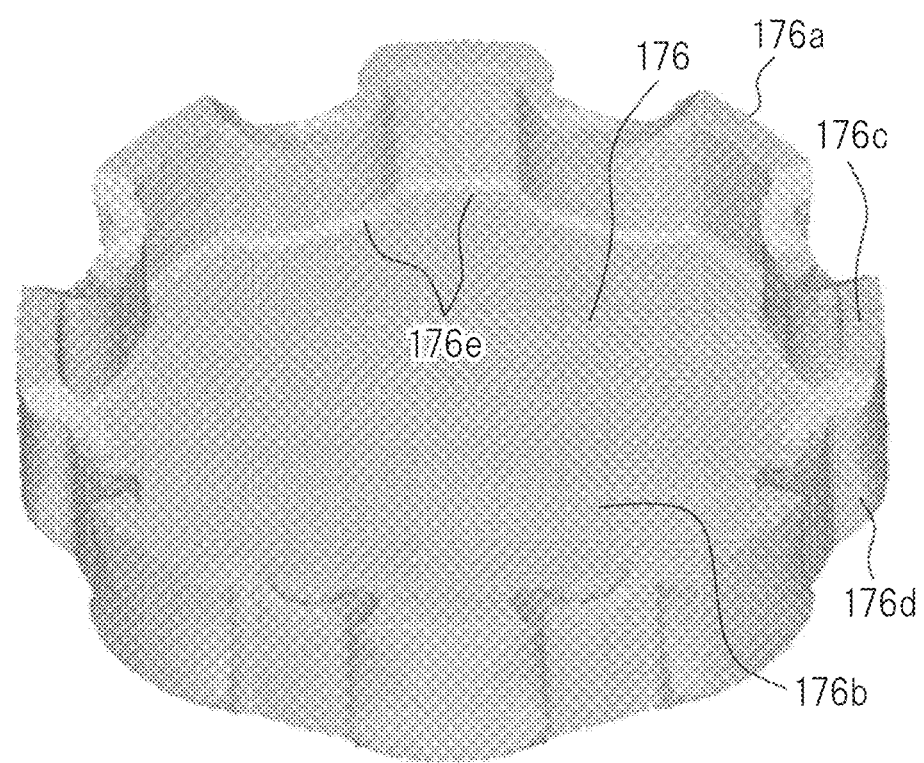
FIG. 29 is a perspective view illustrating a roughly tooth-shaped component formed through the rough tooth shape-forming process.

As illustrated in FIGS. 24 to 27, while having the diameter-reduced cylindrical container 165 formed in the diameter-reducing process, as the workpiece, the diameter-reduced cylindrical container 165 is positioned in the flat surface portion 174b of the counter punch 174 such that the member axis of the diameter-reduced cylindrical container 165 coincides with the central axis C of the press machine, and the bottom surface portion 165c of the diameter-reduced cylindrical container 165 is clamped between the flat surface portion 172a of the inner punch 172 and the flat surface portion 174b of the counter punch 174. In this case, the diameter-reduced side surface portion 165b is positioned in the valley sites 175e of the die 175. In addition, the flat surface portion 173a of the outer punch 173 is caused to abut an opening end 165d of the diameter-reduced cylindrical container 165. In this state, the inner punch 172, the outer punch 173, and the counter punch 174 are moved downward until the flat surface portion 173a of the outer punch 173 passes through the curved surface portion 175b of the die 175, and a rough tooth shape is formed in the diameter-reduced side surface portion 65b (the parts corresponding to the peak portions 31b) of the diameter-reduced cylindrical container 165, thereby forming a rough tooth shape-formed product 176, as illustrated in FIG. 28. FIG. 29 illustrates a view of the appearance of the rough tooth shape-formed product 176.

(Complete Tooth Shape-Forming Process)

Figure 30:
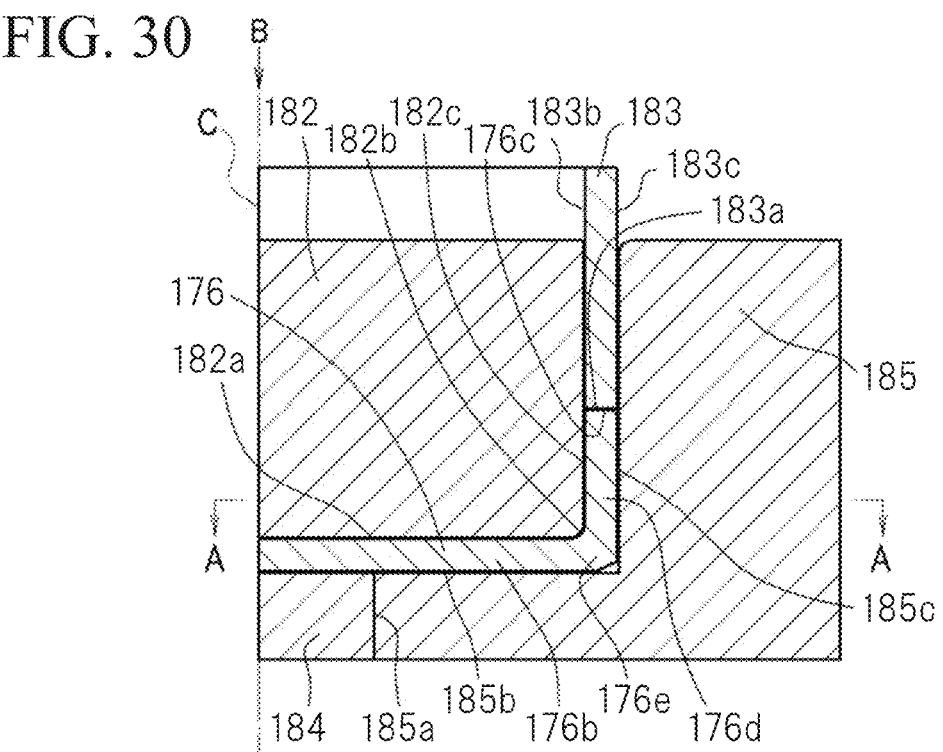
FIG. 30 is a view illustrating a state before forming starts in a complete tooth shape-forming process of the method of manufacturing a tooth-shaped component according to the second embodiment and is a D-D cross-sectional view of FIG. 32.
Figure 31:
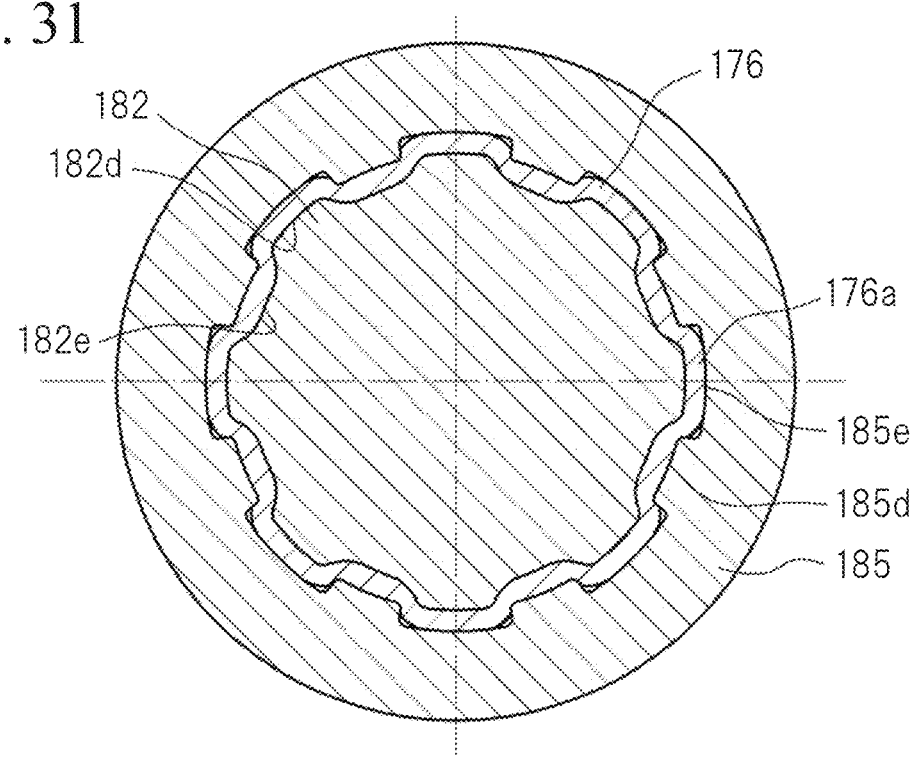
FIG. 31 is a view illustrating the state before forming starts in the complete tooth shape-forming process of the method of manufacturing a tooth-shaped component according to the second embodiment and is an A-A cross-sectional plan view of FIG. 30.
Figure 32:
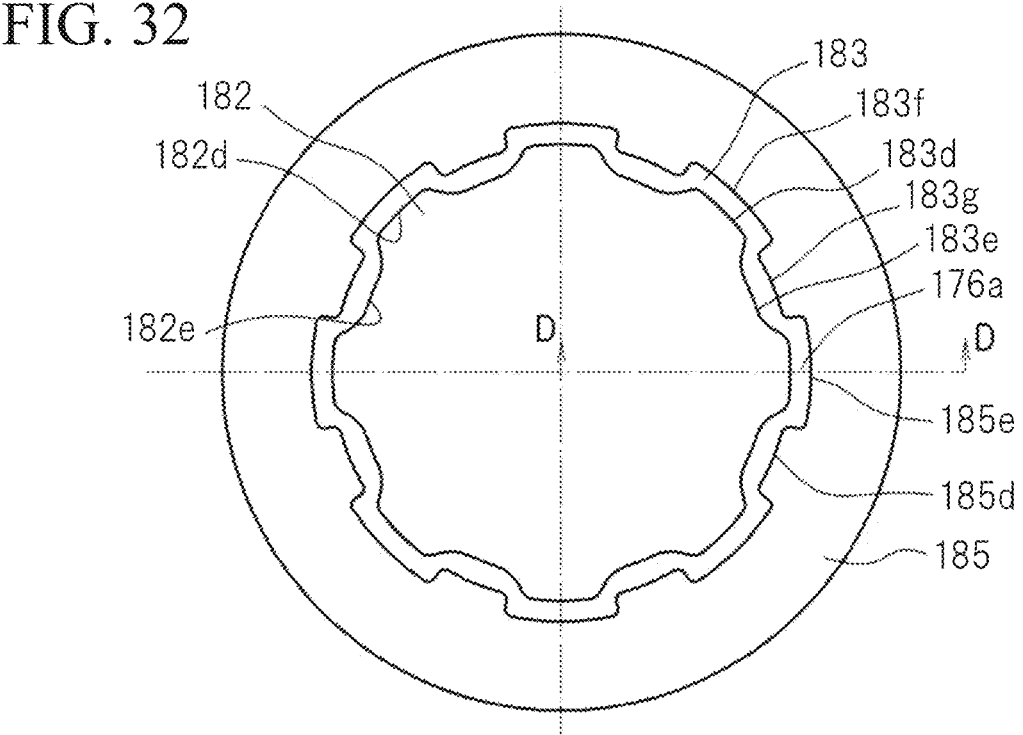
FIG. 32 is a view illustrating the state before forming starts in the complete tooth shape-forming process of the method of manufacturing a tooth-shaped component according to the second embodiment and is a B-directional plan view of FIG. 30.

FIGS. 30 to 32 illustrate states before forming starts in the complete tooth shape-forming process succeeding the rough tooth shape-forming process. With reference to FIGS. 30 to 32, the press machine includes a complete tooth shape-forming inner punch 182, a complete tooth shape-forming outer punch 183 disposed in an outer circumference of the inner punch 182, a complete tooth shape-forming knockout 184, and a complete tooth shape-forming die 185 disposed in an outer circumference of the knockout 184, having the coaxially disposed central axes C. The knockout 184 and the die 185 are disposed so as to face the inner punch 182 and the outer punch 183.

The inner punch 182 has a flat surface portion 182a parallel to the radial direction orthogonal to the central axis C, a curved surface portion 182b provided at an outer circumferential edge of the flat surface portion 182a, and a side surface portion 182c continued via the flat surface portion 182a and the curved surface portion 182b and extending in an upward direction (a first direction) of FIG. 30 parallel to the central axis C. The side surface portion 182c has the same shape and dimensions of a cross section orthogonal to the central axis C as the side surface portion 172c of the inner punch 172 of the rough tooth shape-forming process, and peak sites 182d and valley sites 182e elongated in the first direction are alternately formed in the circumferential direction with predetermined spaces among thereof. The inner punch 182 is a movable type which can be lifted and lowered by a mechanically driven-type (hydraulic-type, servo-motor-type, and the like) driving source (not illustrated).

The die 185 has a first side surface portion 185a extending in the first direction, a flat surface portion 185b continued to the first side surface portion 185a and parallel to the radial direction orthogonal to the central axis C, and a second side surface portion 185c continued to the flat surface portion 185b and extending in the first direction. The second side surface portion 185c has the same shape and dimensions of a cross section orthogonal to the central axis C as the side surface portion 175a of the die 175 of the rough tooth shape-forming process, and peak sites 185d and valley sites 185e elongated in the first direction are alternately formed in the circumferential direction with predetermined spaces among thereof. The die 185 is a fixed type.

As illustrated in FIG. 31, the inner punch 182 and the die 185 are disposed such that the peak sites 182d of the inner punch 182 face the valley sites 185e of the die 185, in other words, the valley sites 182e of the inner punch 182 face the peak sites 185d of the die 185.

The outer punch 183 has a flat surface portion 183a parallel to the radial direction orthogonal to the central axis C, a first side surface portion 183b continued to an inner edge portion of the flat surface portion 183a and extending in the first direction, and a second side surface portion 183c continued to an outer edge portion of the flat surface portion 183a and extending in the first direction. The first side surface portion 183b has the same shape and dimensions of a cross section orthogonal to the central axis C as the side surface portion 173b of the outer punch 173 of the rough tooth shape-forming process, and peak sites 183d and valley sites 183e elongated in the first direction are alternately formed in the circumferential direction with predetermined spaces among thereof. In addition, the second side surface portion 183c has the same shape and dimensions of a cross section orthogonal to the central axis C as the side surface portion 173c of the outer punch 173 of the rough tooth shape-forming process, and peak sites 183f and valley sites 183g elongated in the first direction are alternately formed in the circumferential direction with predetermined spaces among thereof. The outer punch 183 is a movable type which can be lifted and lowered by a mechanically driven-type (hydraulic-type, servo-motor-type, and the like) driving source (not illustrated).

The knockout 184 has a columnar shape and is used for detaching a formed product from the die and punch. The knockout 184 is a movable type which can be lifted and lowered by a driving source (not illustrated).

Figure 33:
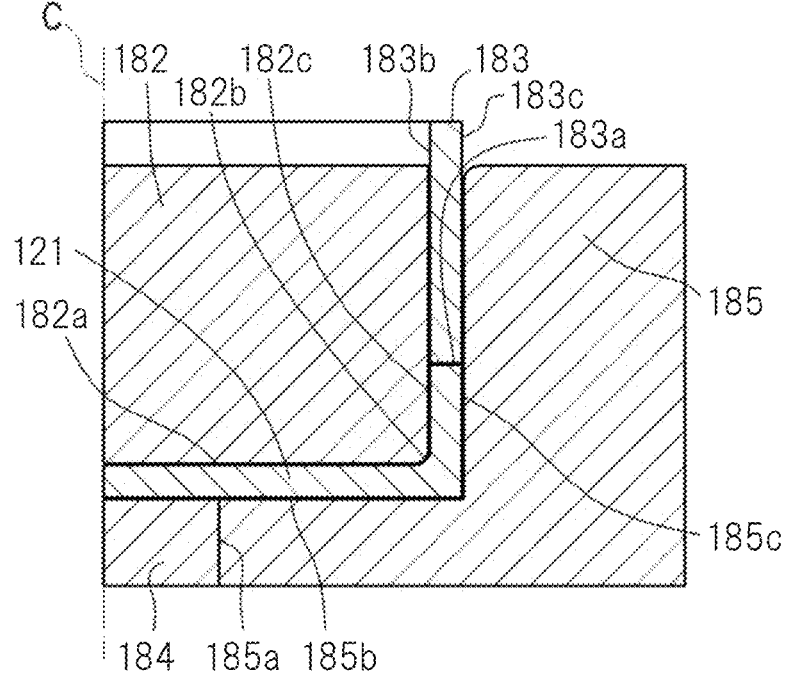
FIG. 33 is a cross-sectional view illustrating a state after forming in the complete tooth shape-forming process of the method of manufacturing a tooth-shaped component according to the second embodiment.

As illustrated in FIGS. 30 to 32, while having the rough tooth shape-formed product 176 formed in the rough tooth shape-forming process, as the workpiece, a bottom surface portion 176b of the rough tooth shape-formed product 176 is clamped between the flat surface portion 182a of the inner punch 182 and the flat surface portion 185b of the die 185 such that the member axis of the rough tooth shape-formed product 176 coincides with the central axis C of the press machine. In this case, rough tooth tip portions 176a of the rough tooth shape-formed product 176 are positioned in the valley sites 185e of the die 185. In this state, an opening end 176c of the rough tooth shape-formed product 176 is pressed downward by the flat surface portion 183a of the outer punch 183 so as to compress a side surface portion 176d of the rough tooth shape-formed product 176. Accordingly, as illustrated in FIG. 33, the inside of a space surrounded by the inner punch 182, the outer punch 183, the knockout 184, and the die 185 is filled with the material. As a result, complete tooth shapes are formed as the tooth tip portions 121a in the parts corresponding to the peak portions 131b in the side surface portion 176d of the rough tooth shape-formed product 176, and the tooth bottom portions 121b are formed in other parts of the side surface portion 176d (the parts corresponding to the valley portions 131a) of the rough tooth shape-formed product 176. According to each of the processes described above, the tooth-shaped component 121 having the bottom surface portion 121c, the side surface portion 121d, the tooth tip portions 121a, and the tooth bottom portions 121b is completed.

Figure 34:
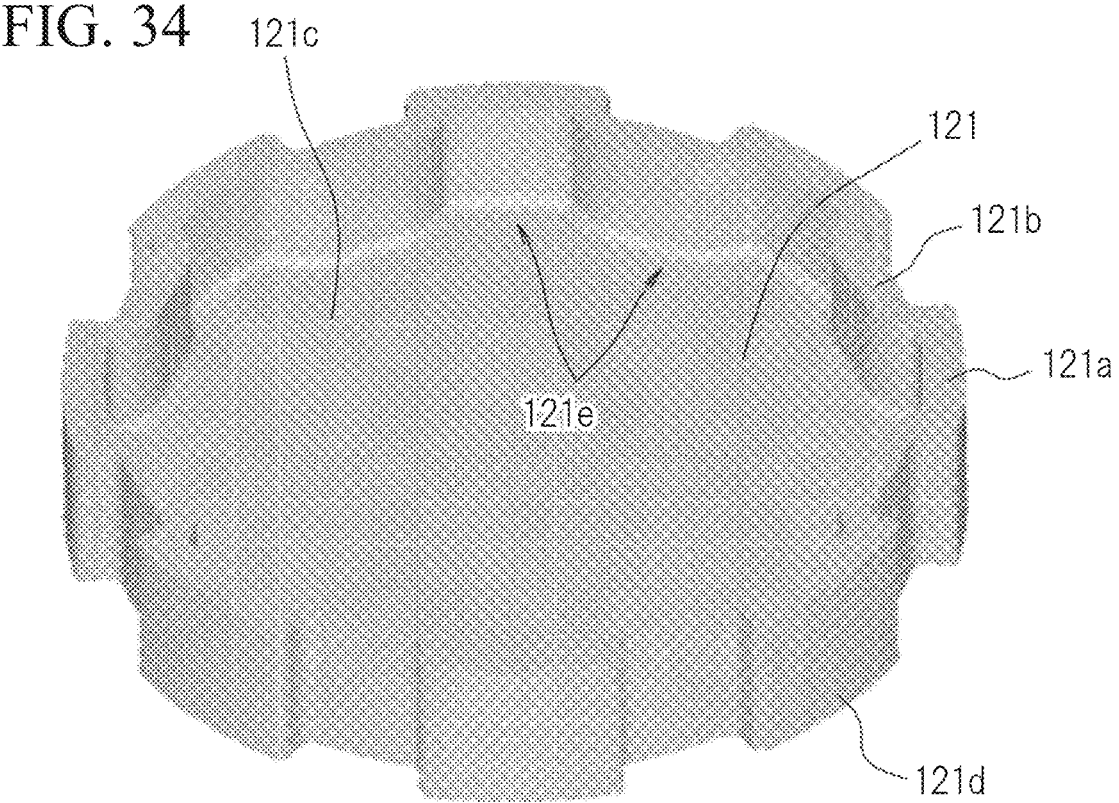
FIG. 34 is a perspective view illustrating a tooth-shaped component formed through the complete tooth shape-forming process.

FIG. 34 illustrates a view of the appearance of the tooth-shaped component 121 after the tooth shapes are formed. There is no occurrence of a superposition defect on an inner surface 121e of the corner portion of the tooth-shaped component 121. Before the tooth shapes are formed, forming is performed such that the curved surface portion 182b of the complete tooth shape-forming inner punch 182 and a corner portion 176e of the rough tooth shape-formed product 176 come into contact with each other, and the external angle of the corner portion 165a of the diameter-reduced cylindrical container 165 is adjusted to a value close to a right angle. Accordingly, in the complete tooth shape-forming process, it is possible to reduce a gap between a place in the vicinity of the corner portion formed by a boundary of the flat surface portion 185b and the side surface portion 185c of the complete tooth shape-forming die 185, and the corner portion 176e of the rough tooth shape-formed product 176. As a result, the corner portion 176e of the rough tooth shape-formed product 176 is not separated from the curved surface portion 182b of the inner punch 182 in the middle of the complete tooth shape-forming process. Therefore, after the complete tooth shape-forming process ends, it is possible to obtain the tooth-shaped component 121 having no superposition defect in a boundary between an upper surface of the bottom surface portion 121c and the inner circumferential surface of the side wall portion 121d.

In addition, in the present embodiment, the cold forging is employed as the method of manufacturing a tooth-shaped component. Therefore, compared to a tooth-shaped component manufactured through the hot forging, it is possible to obtain the tooth-shaped component 121 having no draft and having the dimensional accuracy ten times more accurate in thickness, without performing the machining process. That is, according to the method of manufacturing a tooth-shaped component in the present embodiment, it is possible to obtain the high-quality tooth-shaped component 121 having no superposition defect and draft and having the dimensional accuracy in thickness ranging from ±0.05 mm to ±0.3 mm.

Third Embodiment

Next, a third embodiment of the present invention will be described.

Figure 35A:
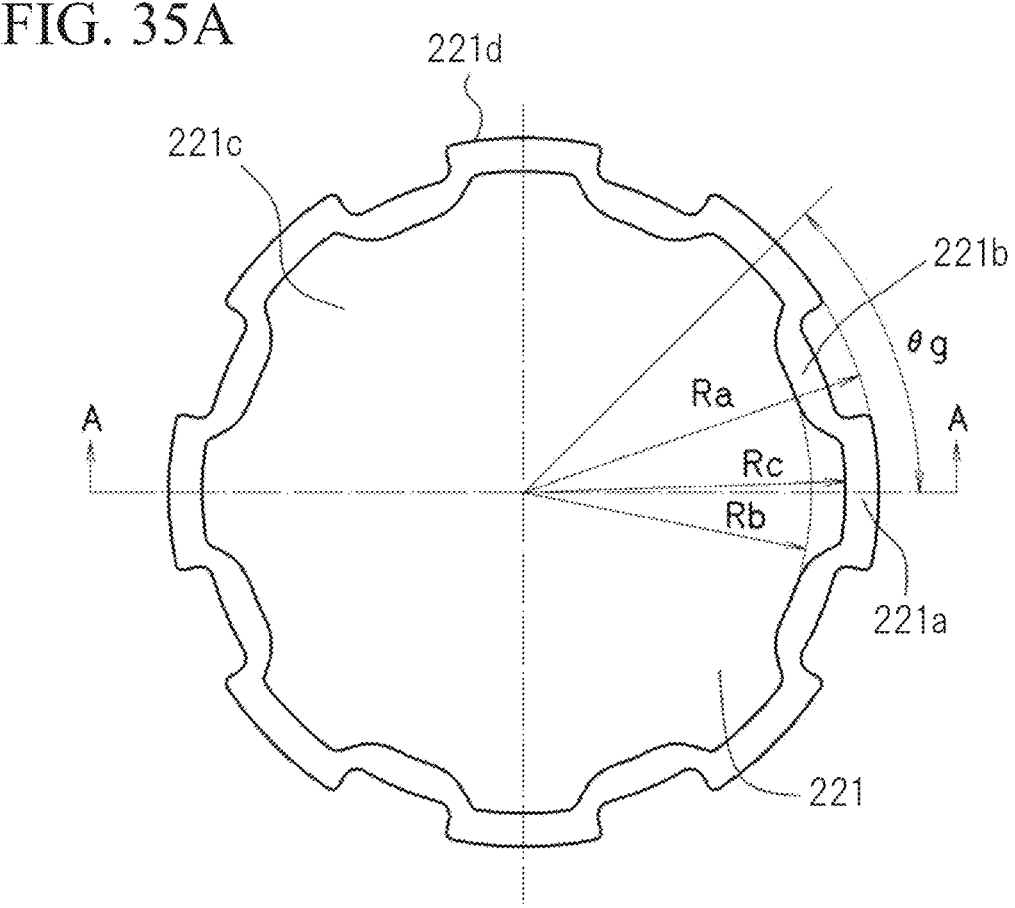
FIG. 35A is a plan view of a tooth-shaped component formed through a method of manufacturing a tooth-shaped component according to a third embodiment.
Figure 35B:
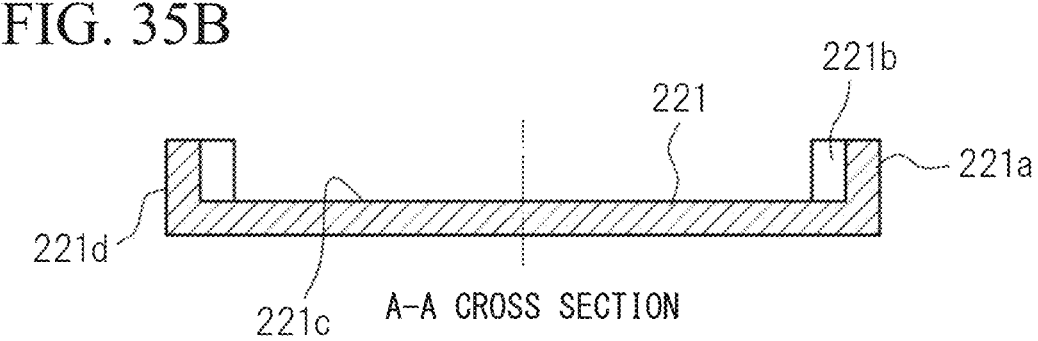
FIG. 35B is an A-A cross-sectional view of the tooth-shaped component illustrated in FIG. 35A.

FIG. 35A is a plan view of a tooth-shaped component 221 manufactured through a method of manufacturing a tooth-shaped component according to the third embodiment. FIG. 35B is an A-A cross-sectional view of the tooth-shaped component 221 illustrated in FIG. 35A. As illustrated in FIGS. 35A and 35B, the tooth-shaped component 221 is a component having a bottomed cylindrical shape of which one end portion is open and of which the other end portion is sealed in a direction of the member axis (the one-dot chain line illustrated in FIG. 35B).

The tooth-shaped component 221 has a bottom surface portion 221c and a side surface portion 221d which rises from an outer edge portion of the bottom surface portion 221c. An external angle of a corner portion formed by the bottom surface portion 221c and the side surface portion 221d is substantially a right angle. The side surface portion 221d has tooth tip portions 221a and the tooth bottom portions 221b provided so as to alternately appear along a circumferential direction having the member axis as the center. The present embodiment illustrates a case where there are eight of the tooth tip portions 221a and the tooth bottom portions 221b each. However, the numbers of the tooth tip portions 221a and the tooth bottom portions 221b (that is, the number of teeth of the tooth-shaped component 221) are not limited to eight as long as there are a plurality thereof.

The tooth tip portions 221a are parts which protrude further outward than the tooth bottom portions 221b in a radial direction having the member axis as the center. More specifically, as illustrated in FIG. 35A, outer circumferential surfaces of the tooth tip portions 221a are positioned on the circumference of a radius Ra having the member axis as the center. Inner circumferential surfaces of the tooth tip portions 221a and outer circumferential surfaces of the tooth bottom portions 221b are positioned on the circumference of a radius Rc having the member axis as the center. Inner circumferential surfaces of the tooth bottom portions 221b are positioned on the circumference of a radius Rb having the member axis as the center. Hereinafter, the radius Ra will be referred to as an outer radius of the tooth tip portions 221a. The radius Rc will be referred to as an inner radius of the tooth tip portions 221a. The radius Rb will be referred to as an inner radius of the tooth bottom portions 221b.

In addition, in FIG. 35A, θg indicates an angle between the tooth tip portions 221a adjacent to each other along the circumferential direction having the member axis as the center.

The tooth-shaped component 221 manufactured through the method of manufacturing a tooth-shaped component according to the present embodiment is characterized by naturally having no superposition defect, having no draft, and having the dimensional accuracy in thickness ranging from ±0.05 mm to ±0.3 mm.

In the present embodiment, cold forging is employed as the method of manufacturing a tooth-shaped component (will be described later in detail). Therefore, compared to a tooth-shaped component manufactured through hot forging, it is possible to obtain the tooth-shaped component 221 having no draft and having the dimensional accuracy ten times more accurate in thickness, without performing a machining process. That is, according to the method of manufacturing a tooth-shaped component in the present embodiment, it is possible to obtain the high-quality tooth-shaped component 221 having no superposition defect and draft and having the dimensional accuracy in thickness ranging from ±0.05 mm to ±0.3 mm.

In order to manufacture such a tooth-shaped component 221, the method of manufacturing a tooth-shaped component according to the third embodiment includes a drawing process, a diameter-increasing process, a diameter-reducing process, and a tooth shape-forming process. Hereinafter, each of the processes will be described in detail. As described above, in the present embodiment, the cold forging is employed as the method of manufacturing a tooth-shaped component. Therefore, each of the processes is executed at a normal temperature.

(Drawing Process)

Figure 36:
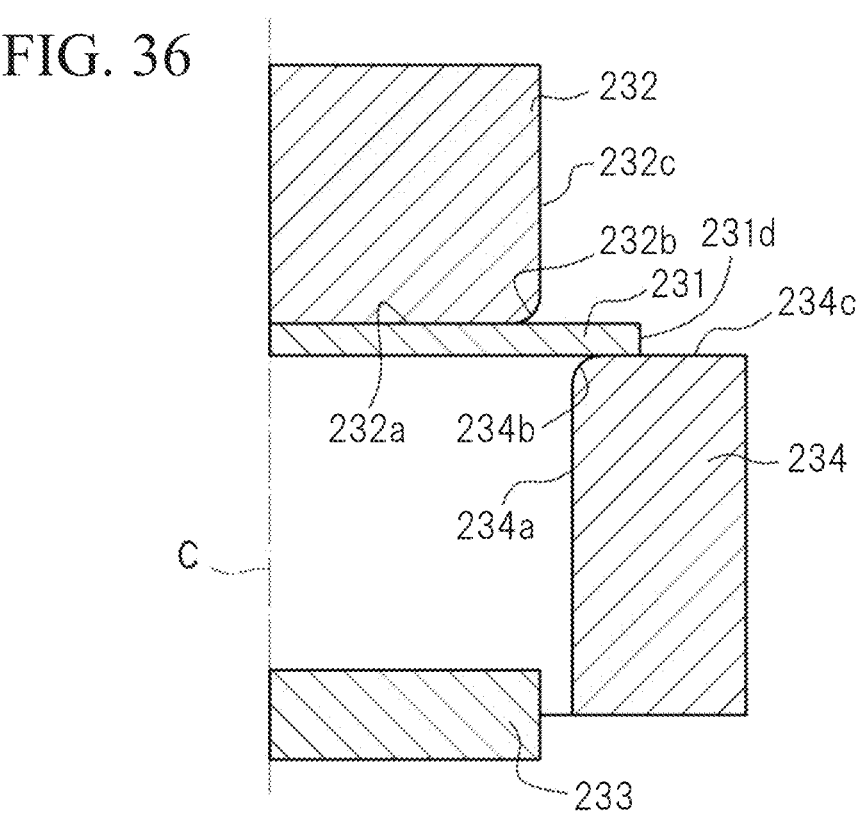
FIG. 36 is a cross-sectional view illustrating a state before forming starts in a drawing process of the method of manufacturing a tooth-shaped component according to the third embodiment.

FIG. 36 illustrates a state before forming starts in the drawing process. With reference to FIG. 36, a press machine includes, a punch 232, a knockout 233, and a die 234 having the coaxially disposed central axes C. The knockout 233 and the die 234 are disposed so as to face the punch 232.

Figure 38:
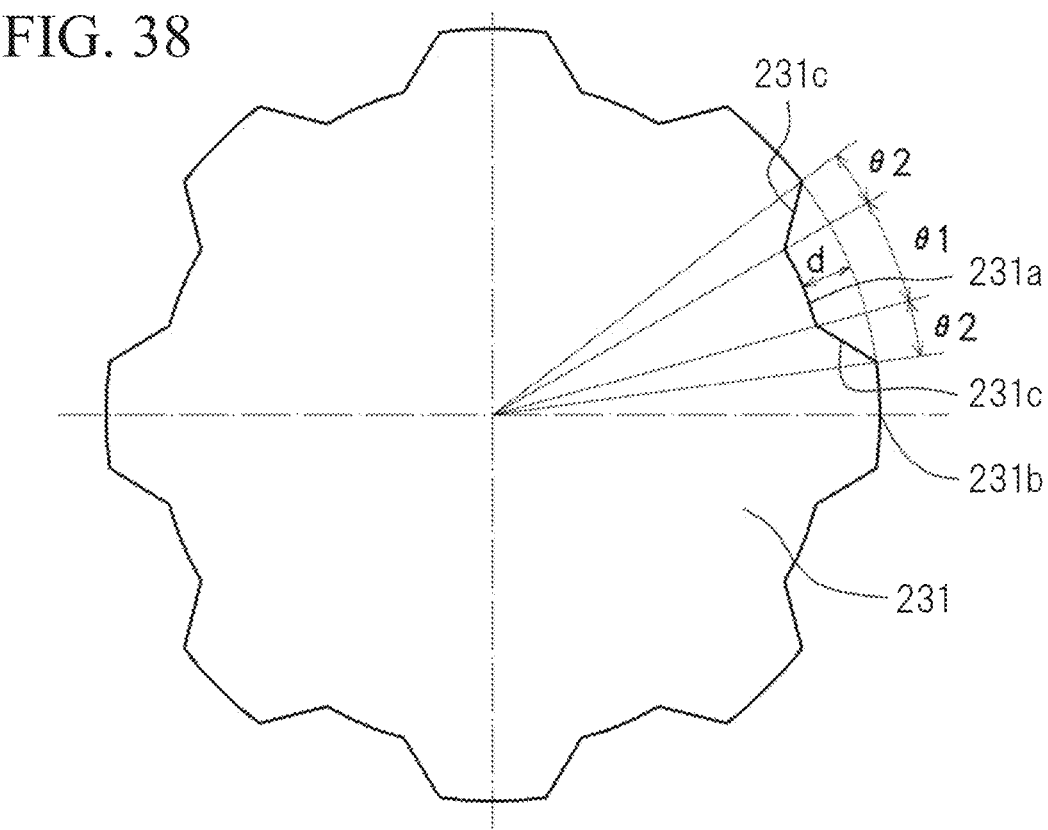
FIG. 38 is a plan view illustrating a metal sheet which is a workpiece in the drawing process.

As illustrated in FIG. 38, a workpiece 231 is a flat metal sheet (for example, a steel sheet) having valley portions 231a and peak portions 231b provided so as to alternately appear along the circumferential direction having the member axis (the central axis of the workpiece 231) as the center. The peak portions 231b are parts which protrude outward from the valley portions 231a in the radial direction having the member axis as the center. In addition, the workpiece 231 also has slope portions 231c each of which connects the peak portion 231b and the valley portion 231a together.

The valley portions 231a become parts corresponding to the tooth bottom portions 221b. The numbers of the peak portions 231b and the valley portions 231a coincide with the number of teeth of the tooth-shaped component 221, and the peak portions 231b, the slope portions 231c, and the valley portions 231a are formed with predetermined spaces among thereof along the circumferential direction having the member axis as the center.

In a case where a workpiece is a circularly-shaped sheet having the same outer diameters, when a tooth shape is formed in the tooth shape-forming process, the material of the workpiece remains at the tooth bottom portions of the tooth shape, and the inside of a space formed by a die and punch is filled in an early stage. Therefore, a forming load becomes excessive. In order to reduce the forming load, the parts corresponding to the tooth bottom portions 221b serve as the valley portions 231a. A depth d of the valley portion 231a with respect to the peak portion 231b (a length between an outer circumferential edge of the peak portion 231b and an outer circumferential edge of the valley portion 231a in the radial direction having the member axis as the center) may be set to approximately a length Δr (=Ra−Rb) obtained by subtracting the inner radius Rb of the tooth bottom portions 221b from the outer radius Ra of the tooth tip portions 221a of the tooth-shaped component 221 illustrated in FIG. 35A. In addition, a regional angle θ1 of the valley portion 231a may be set to approximately ⅓ of the regional angle of one tooth (θg illustrated in FIG. 35A). In addition, a regional angle θ2 of the slope portion 231c may be set to approximately ⅙ of the regional angle of one tooth (θg illustrated in FIG. 35A).

The punch 232 has a flat surface portion 232a parallel to the radial direction orthogonal to the central axis C, a curved surface portion 232b provided at an outer circumferential edge of the flat surface portion 232a, and a side surface portion 232c continued via the flat surface portion 232a and the curved surface portion 232b and extending in an upward direction (a first direction) of FIG. 36 parallel to the central axis C. The punch 232 is a movable type which can be lifted and lowered by a mechanically driven-type (hydraulic-type, servo-motor-type, and the like) driving source (not illustrated).

The knockout 233 has a columnar shape and is used for detaching a formed product from the die and punch. The knockout 233 is a movable type which can be lifted and lowered by a driving source (not illustrated).

The die 234 has a side surface portion 234a extending in the first direction, a curved surface portion 234b provided in an upper end portion of the side surface portion 234a, and a flat surface portion 234c continued via the side surface portion 234a and the curved surface portion 234b and parallel to the radial direction orthogonal to the central axis C. The die 234 is a fixed type.

Figure 37:
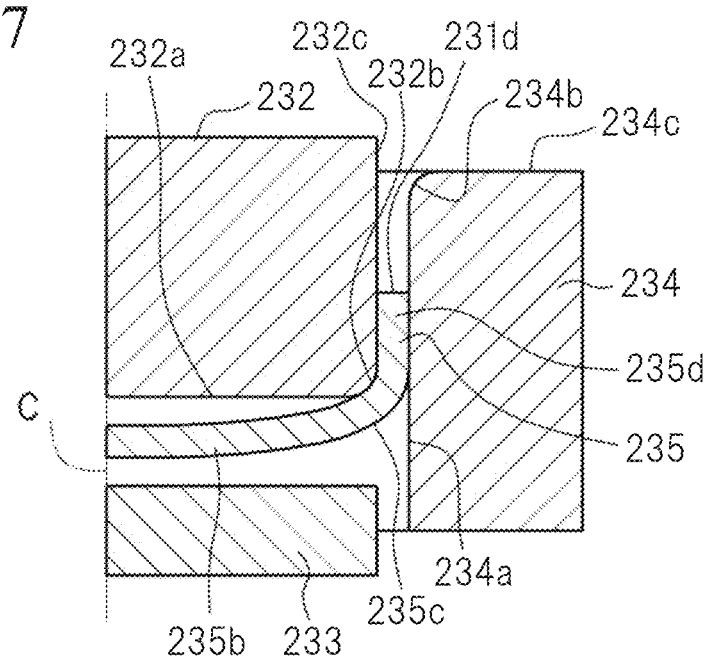
FIG. 37 is a cross-sectional view illustrating a state after forming in the drawing process of the method of manufacturing a tooth-shaped component according to the third embodiment.
Figure 39:
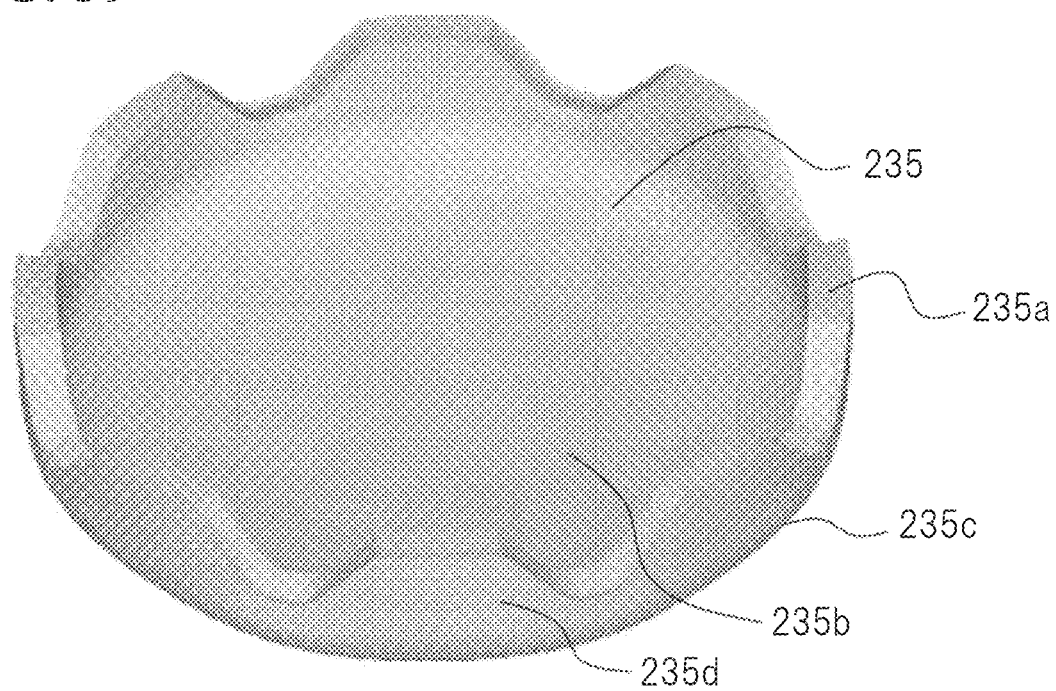
FIG. 39 is a perspective view illustrating a cylindrical container formed through the drawing process.

As illustrated in FIG. 36, the workpiece 231 is positioned in the flat surface portion 234c of the die 234 such that the member axis of the workpiece 231 coincides with the central axis C of the press machine. The punch 232 is moved downward until an end portion 231d of the workpiece 231 passes through the curved surface portion 234b of the die 234, and drawing is performed, thereby forming a cylindrical container 235, as illustrated in FIG. 37. FIG. 39 illustrates a view of the appearance of the cylindrical container 235. The cylindrical container 235 has a bottom surface portion 235b and a side surface portion 235d continued via the bottom surface portion 235b and a curved surface portion 235c, and projection portions 235a realized by the peak portions 231b deformed so as to protrude in the first direction are formed. After forming, the knockout 233 is lifted and the cylindrical container 235 is detached from the die 234.

(Diameter-Increasing Process)

The diameter-increasing process has a first step and a second step.

Figure 40:
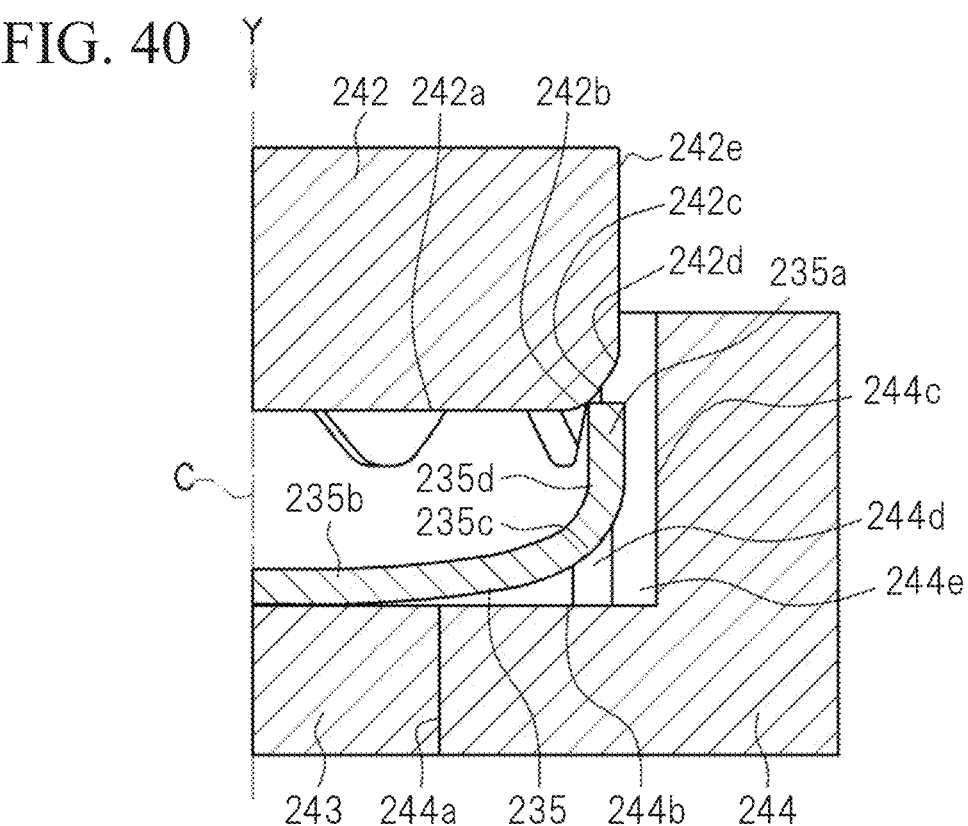
FIG. 40 is a view illustrating a state before forming starts in a first step of a diameter-increasing process of the method of manufacturing a tooth-shaped component according to the third embodiment and is an A-A cross-sectional view of FIG. 41.
Figure 41:
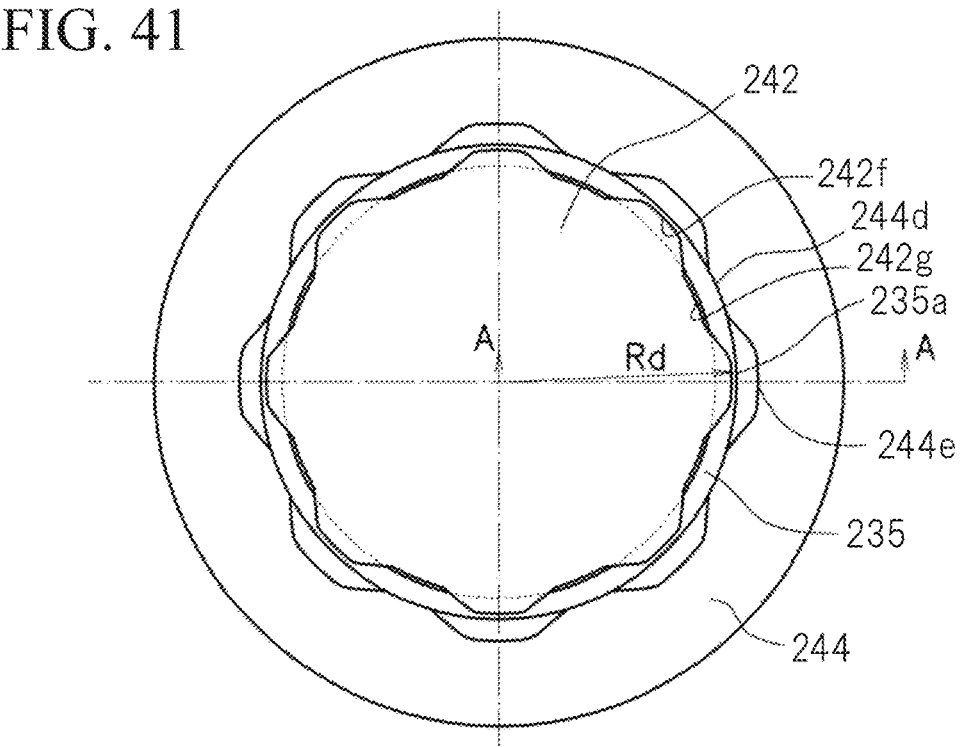
FIG. 41 is a view illustrating the state before forming starts in the first step of the diameter-increasing process of the method of manufacturing a tooth-shaped component according to the third embodiment and is a Y-directional plan view of FIG. 40.

FIGS. 40 and 41 illustrate states before forming starts in the first step of the diameter-increasing process. With reference to FIGS. 40 and 41, the press machine includes a first punch 242, a first knockout 243, and a first die 244 disposed in an outer circumference of the first knockout 243, having the coaxially disposed central axes C. The first knockout 243 and the first die 244 are disposed so as to face the first punch 242.

The first punch 242 has a flat surface portion 242a parallel to the radial direction orthogonal to the central axis C, a first curved surface portion 242b provided at an outer circumferential edge of the flat surface portion 242a, a slope portion 242c continued via the flat surface portion 242a and the first curved surface portion 242b and widened in the radial direction orthogonal to the central axis C toward an upward direction (the first direction) of FIG. 40 parallel to the central axis C, a second curved surface portion 242d provided at an upper end of the slope portion 242c, and a side surface portion 242e continued via the slope portion 242c and the second curved surface portion 242d and extending in the first direction. In the side surface portion 242e, peak sites 242f and valley sites 242g elongated in the first direction are alternately formed in the circumferential direction with predetermined spaces among thereof, and the numbers of the peak sites 242f and the valley sites 242g coincide with the number of teeth of the tooth-shaped component 221. It is desirable that a radius Rd (a length between outer circumferential surfaces of the peak sites 242f and the central axis C in the radial direction having the central axis C as the center) of the peak sites 242f ranges from 1.08 times to 1.17 times the inner radius Re of the tooth tip portions 221a. The reason will be described in the section of the diameter-reducing process. The first punch 242 is a movable type which can be lifted and lowered by a mechanically driven-type (hydraulic-type, servo-motor-type, and the like) driving source (not illustrated).

The first knockout 243 has a columnar shape and is used for detaching a formed product from the die and punch. The first knockout 243 is a movable type which can be lifted and lowered by a driving source (not illustrated).

The first die 244 has a first side surface portion 244a extending in the first direction, a flat surface portion 244b continued to the first side surface portion 244a and parallel to the radial direction orthogonal to the central axis C, and a second side surface portion 244c continued to the flat surface portion 244b and extending in the first direction. In the second side surface portion 244c, peak sites 244d and valley sites 244e elongated in the first direction are alternately formed in the circumferential direction with predetermined spaces among thereof, and the numbers of the peak sites 244d and the valley sites 244e coincide with the number of teeth of the tooth-shaped component 221. The second side surface portion 244c is disposed in a form of being offset in the radial direction from the side surface portion 242e of the first punch 242 substantially as much as a plate thickness of the workpiece 235. The first die 244 is a fixed type.

As illustrated in FIG. 41, the first punch 242 and the first die 244 are disposed such that the peak sites 242f of the first punch 242 face the valley sites 244e of the first die 244, in other words, the valley sites 242g of the first punch 242 face the peak sites 244d of the first die 244.

Figure 42:
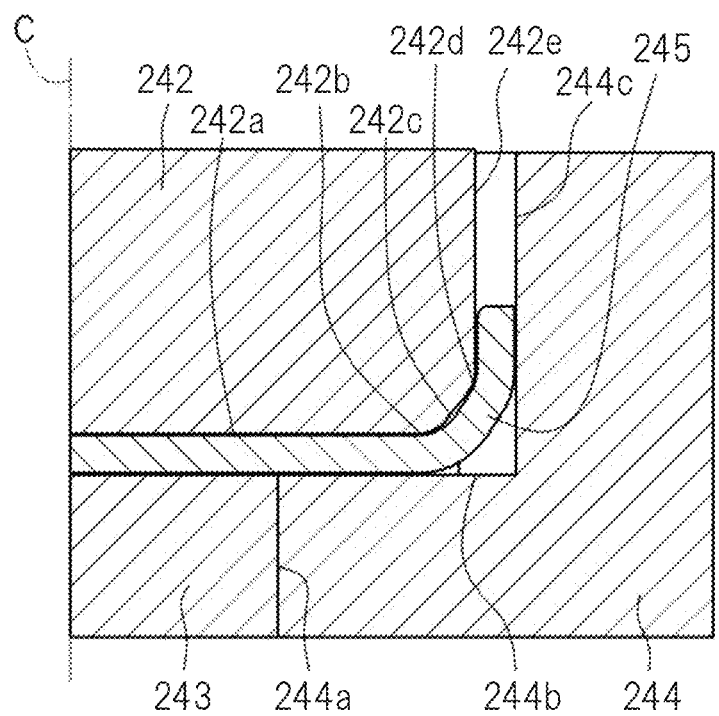
FIG. 42 is a cross-sectional view illustrating a state after forming in the first step of the diameter-increasing process of the method of manufacturing a tooth-shaped component according to the third embodiment.
Figure 43A:
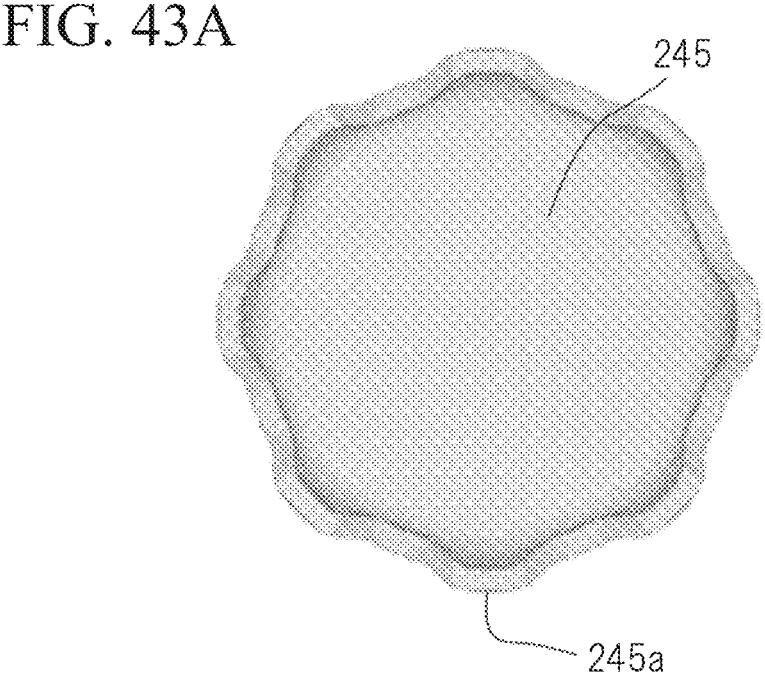
FIG. 43A is a plan view of a first diameter-increased cylindrical container formed through the first step of the diameter-increasing process.
Figure 43B:
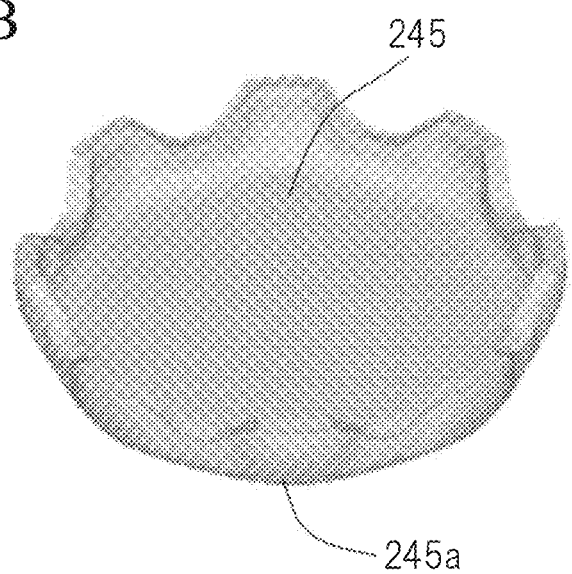
FIG. 43B is a perspective view of the first diameter-increased cylindrical container formed through the first step of the diameter-increasing process.

As illustrated in FIGS. 40 and 41, while having the cylindrical container 235 formed in the drawing process, as the workpiece, the cylindrical container 235 is positioned on the first knockout 243 and the first die 244 such that the member axis of the cylindrical container 235 coincides with the central axis C of the press machine. In this case, the projection portions 235a realized by the deformed peak portions 231b are positioned in the valley sites 244e of the first die 244. In this state, the first punch 242 is moved downward until the flat surface portion 242a of the first punch 242 comes into contact with the bottom surface portion 235b of the cylindrical container 235, thereby forming a first diameter-increased cylindrical container 245, as illustrated in FIG. 42. FIGS. 43A and 43B illustrate views of the appearance of the first diameter-increased cylindrical container 245. In the first diameter-increased cylindrical container 245, in the side surface portion 235d of the cylindrical container 235, the projection portions 235a (the particular part) realized by the deformed peak portions 231b are increased in diameter (hereinafter, this portion will be referred to as the diameter-increased side surface portion 245a). After forming, the first knockout 243 is lifted and the first diameter-increased cylindrical container 245 is detached from the first die 244.

Figure 44:
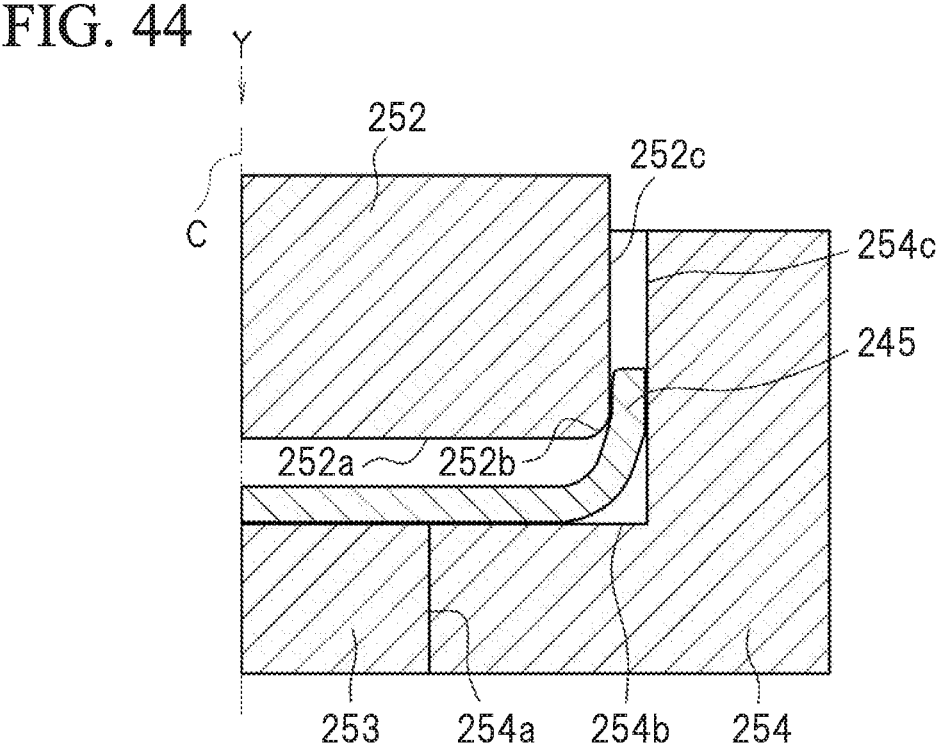
FIG. 44 is a view illustrating a state before forming starts in a second step of the diameter-increasing process of the method of manufacturing a tooth-shaped component according to the third embodiment and is an A-A cross-sectional view of FIG. 45.
Figure 45:
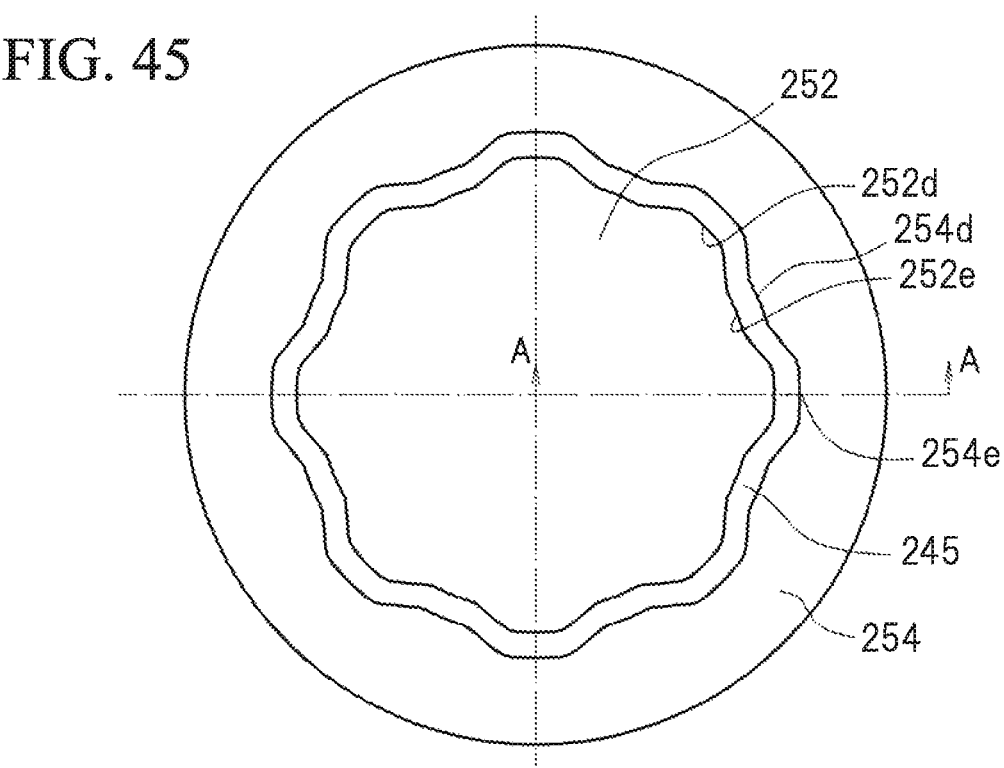
FIG. 45 is a view illustrating the state before forming starts in the second step of the diameter-increasing process of the method of manufacturing a tooth-shaped component according to the third embodiment and is a Y-directional plan view of FIG. 44.

FIGS. 44 and 45 illustrate states before forming starts in the second step of the diameter-increasing process. With reference to FIGS. 44 and 45, the press machine includes a second punch 252, a second knockout 253, and a second die 254 disposed in an outer circumference of the second knockout 253, having the coaxially disposed central axes C. The second knockout 253 and the second die 254 are disposed so as to face the second punch 252.

The second punch 252 has a flat surface portion 252a parallel to the radial direction orthogonal to the central axis C, a curved surface portion 252b provided at an outer circumferential edge of the flat surface portion 252a, and a side surface portion 252c continued via the flat surface portion 252a and the curved surface portion 252b and extending in an upward direction (a first direction) of FIG. 44 parallel to the central axis C. The side surface portion 252c has the same shape and dimensions of a cross section orthogonal to the central axis C as the side surface portion 242e of the first punch 242. In the side surface portion 252c, peak sites 252d and valley sites 252e elongated in the first direction are alternately formed in the circumferential direction with predetermined spaces among thereof, and the numbers of the peak sites 252d and the valley sites 252e coincide with the number of teeth of the tooth-shaped component 221. The second punch 252 is a movable type which can be lifted and lowered by a mechanically driven-type (hydraulic-type, servo-motor-type, and the like) driving source (not illustrated).

The second knockout 253 has a columnar shape and is used for detaching a formed product from the die and punch. The second knockout 253 is a movable type which can be lifted and lowered by a driving source (not illustrated).

The second die 254 has a first side surface portion 254a having the same shape and dimensions as the first die 244 and extending in the first direction, a flat surface portion 254b continued to the first side surface portion 254a and parallel to the radial direction orthogonal to the central axis C, and a second side surface portion 254c continued to the flat surface portion 254b and extending in the first direction. In the second side surface portion 254c, peak sites 254d and valley sites 254e elongated in the first direction are alternately formed in the circumferential direction with predetermined spaces among thereof, and the numbers of the peak sites 254d and the valley sites 254e coincide with the number of teeth of the tooth shape. The second die 254 is a fixed type.

As illustrated in FIG. 45, the second punch 252 and the second die 254 are disposed such that the peak sites 252d of the second punch 252 face the valley sites 254e of the second die 254, in other words, the valley sites 252e of the second punch 252 face the peak sites 254d of the second die 254.

Figure 46:
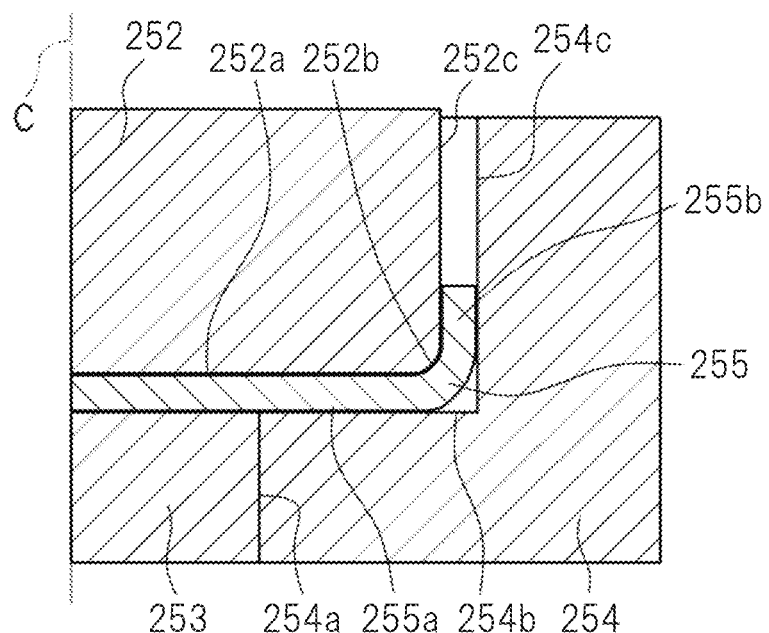
FIG. 46 is a cross-sectional view illustrating a state after forming in the second step of the diameter-increasing process of the method of manufacturing a tooth-shaped component according to the third embodiment.

As illustrated in FIGS. 44 and 45, while having the first diameter-increased cylindrical container 245 formed in the first step, as the workpiece, the first diameter-increased cylindrical container 245 is positioned on the second knockout 253 and the second die 254 such that the member axis of the first diameter-increased cylindrical container 245 coincides with the central axis C of the press machine. In this case, the diameter-increased side surface portion 245a is positioned in the valley sites 254e of the second die 254. In this state, the second punch 252 is moved downward until the flat surface portion 252a of the second punch 252 comes into contact with the bottom surface portion of the first diameter-increased cylindrical container 245, thereby forming a second diameter-increased cylindrical container 255, as illustrated in FIG. 46. A side surface portion 255b of the second diameter-increased cylindrical container 255 has a shape standing upright with respect to a bottom surface portion 255a. After forming, the second knockout 253 is lifted and the second diameter-increased cylindrical container 255 is detached from the second die 254.

(Diameter-Reducing Process)

Figure 47:
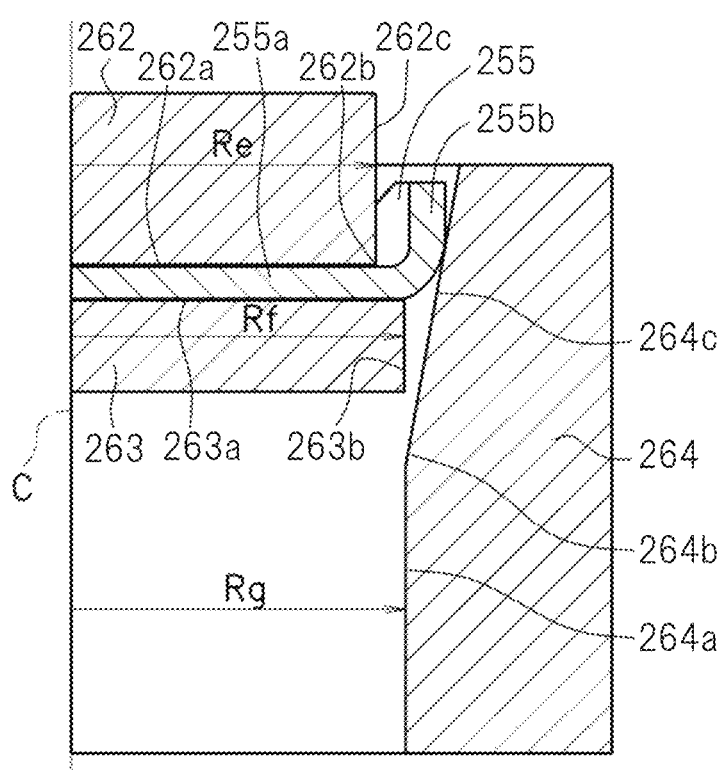
FIG. 47 is a cross-sectional view illustrating a state before forming starts in a diameter-reducing process of the method of manufacturing a tooth-shaped component according to the third embodiment.

FIG. 47 illustrates a state before forming starts in the diameter-reducing process. With reference to FIG. 47, the press machine includes a punch 262, a counter punch 263, and a die 264 disposed in an outer circumference of the counter punch 263, having the coaxially disposed central axes C. The counter punch 263 and the die 264 are disposed so as to face the punch 262.

The punch 262 has a flat surface portion 262a parallel to the radial direction orthogonal to the central axis C, a curved surface portion 262b provided at an outer circumferential edge of the flat surface portion 262a, and a side surface portion 262c continued via the flat surface portion 262a and the curved surface portion 262b and extending in an upward direction (a first direction) of FIG. 47 parallel to the central axis C. A radius Re of the side surface portion 262c is substantially equal to the inner radius Re of the tooth tip portions 221a. The punch 262 is a movable type which can be lifted and lowered by a mechanically driven-type (hydraulic-type, servo-motor-type, and the like) driving source (not illustrated).

The counter punch 263 has a flat surface portion 263a parallel to the radial direction orthogonal to the central axis C, and a side surface portion 263b continued to the flat surface portion 263a and extending in a downward direction of FIG. 47 parallel to the central axis C. A radius Rf of the side surface portion 263b is substantially equal to the outer radius Ra of the tooth tip portions 221a. The counter punch 263 is a movable type which can be lifted and lowered by a mechanically driven-type (hydraulic-type, servo-motor-type, and the like) driving source (not illustrated).

The die 264 has a side surface portion 264a extending in the first direction, a curved surface portion 264b provided in an upper end portion of the side surface portion 264a, and a slope portion 264c continued via the side surface portion 264a and the curved surface portion 264b and widened in the radial direction orthogonal to the central axis C toward the first direction. A radius Rg of the side surface portion 264a is substantially equal to the outer radius Ra of the tooth tip portions 221a. The die 264 is a fixed type.

Figure 48A:
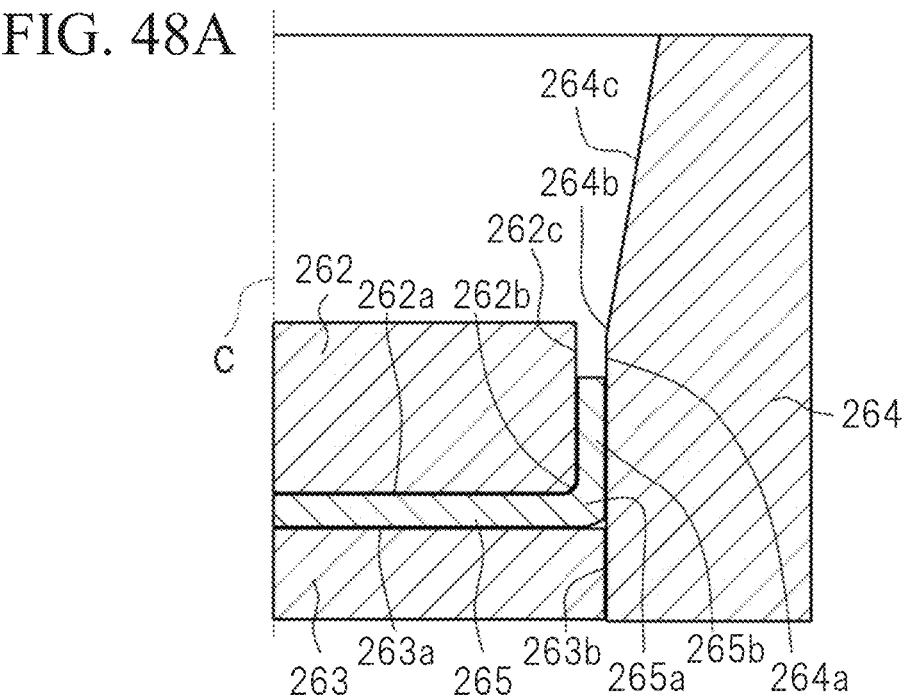
FIG. 48A is a cross-sectional view illustrating a state after forming in the diameter-reducing process of the method of manufacturing a tooth-shaped component according to the third embodiment.

As illustrated in FIG. 47, while having the second diameter-increased cylindrical container 255 formed in the diameter-reducing process, as the workpiece, the second diameter-increased cylindrical container 255 is positioned in the flat surface portion 263a of the counter punch 263 such that the member axis of the second diameter-increased cylindrical container 255 coincides with the central axis C of the press machine, and the bottom surface portion 255a of the second diameter-increased cylindrical container 255 is clamped between the flat surface portion 262a of the punch 262 and the flat surface portion 263a of the counter punch 263. In this state, the punch 262 and the counter punch 263 are moved downward, thereby forming a diameter-reduced cylindrical container 265, as illustrated in FIG. 48A. That is, as illustrated in FIG. 48A, in the side surface portion 255 of the second diameter-increased cylindrical container 255 which is the workpiece, the diameter-increased side surface portion 245a increased in diameter in the diameter-increasing process is reduced in diameter due to the slope portion 264c of the die 264 (hereinafter, this portion will be referred to as a diameter-reduced side surface portion 265b). A corner portion 265a of the diameter-reduced cylindrical container 265 is increased in thickness such that an external shape of the corner portion 265a of the diameter-reduced cylindrical container 265 satisfies the following conditional expression (1).

Figure 48B:
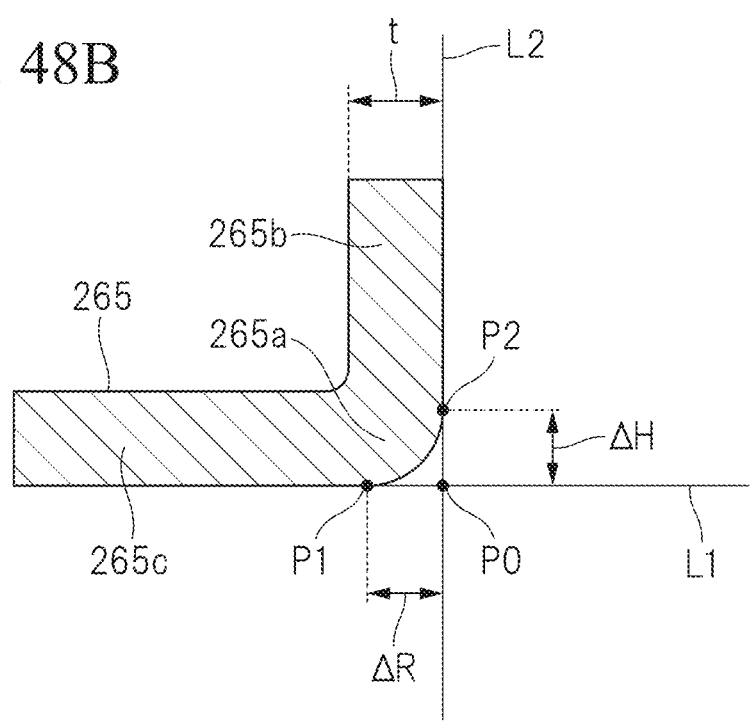
FIG. 48B is a view describing an external shape of a corner portion of a diameter-reduced cylindrical container obtained through the diameter-reducing process.

Here, as illustrated in FIG. 48B, in a case where the diameter-reduced cylindrical container 265 is viewed in a cross section including a central axis direction and a radial direction of the diameter-reduced cylindrical container 265, an intersection point of a straight line L1 in parallel contact with a bottom surface portion 265c of the diameter-reduced cylindrical container 265, and a straight line L2 in parallel contact with the side surface portion 265b of the diameter-reduced cylindrical container 265 is defined as P0. In addition, as illustrated in FIG. 48B, a point at which the straight line L1 starts being separated from the bottom surface portion 265c of the diameter-reduced cylindrical container 265 is defined as P1, and a point at which the straight line L2 starts being separated from the side surface portion 265b of the diameter-reduced cylindrical container 265 is defined as P2. Moreover, as illustrated in FIG. 48B, a length between the intersection point P0 and the point P1 on the straight line L1 is defined as ΔR, and a length between the intersection point P0 and the point P2 on the straight line L2 is defined as ΔH.

The conditional expression (1) is expressed as follows by using a plate thickness t of the diameter-reduced cylindrical container 265, and the lengths ΔR and ΔH.

$$(\Delta R + \Delta H) \leq 2t \tag{1}$$

That is, when the corner portion 265a of the diameter-reduced cylindrical container 265 is increased in thickness such that the external shape of the corner portion 265a of the diameter-reduced cylindrical container 265 satisfies the conditional expression (1), the external angle of the corner portion 265a has a value close to a right angle.

In order to cause the external angle of the corner portion 265a of the diameter-reduced cylindrical container 265 to have a value closer to a right angle, it is preferable that the corner portion 265a of the diameter-reduced cylindrical container 265 be increased in thickness such that the external shape of the corner portion 265a of the diameter-reduced cylindrical container 265 satisfies the following conditional expression (2).

$$(\Delta R + \Delta H) \leq 1.5t \tag{2}$$

The reason for causing the desirable value for the radius Rd of the peak sites 242f of the side surface portion 242e of the first punch 242 in the diameter-increasing process to range from 1.08 times to 1.17 times the inner radius Rc of the tooth tip portions 221a will be described below. When the radius Rd of the peak sites 242f is less than 1.08 times the inner radius Rc of the tooth tip portions 221a, the reduced amount of the diameter in the diameter-reducing process is small, and the corner portion 265a is insufficiently increased in thickness, thereby resulting in a superposition defect in the succeeding tooth shape-forming process.

Meanwhile, when the radius Rd of the peak sites 242f exceeds 1.17 times the inner radius Rc of the tooth tips 221a, the side surface portion 255b is excessively thin in the diameter-increasing process. As a result, the corner portion 265a is insufficiently increased in thickness, thereby resulting in a superposition defect in the succeeding tooth shape-forming process.

(Tooth Shape-Forming Process)

FIGS. 49 to 52 illustrate states before forming starts in the tooth shape-forming process. With reference to FIGS. 49 to 52, the press machine includes an inner punch 272, an outer punch 273 disposed in an outer circumference of the inner punch 272, a counter punch 274, and a die 275 disposed in an outer circumference of the counter punch 274, having the coaxially disposed central axes C. The counter punch 274 and the die 275 are disposed so as to face the inner punch 272 and the outer punch 273.

Figure 49:
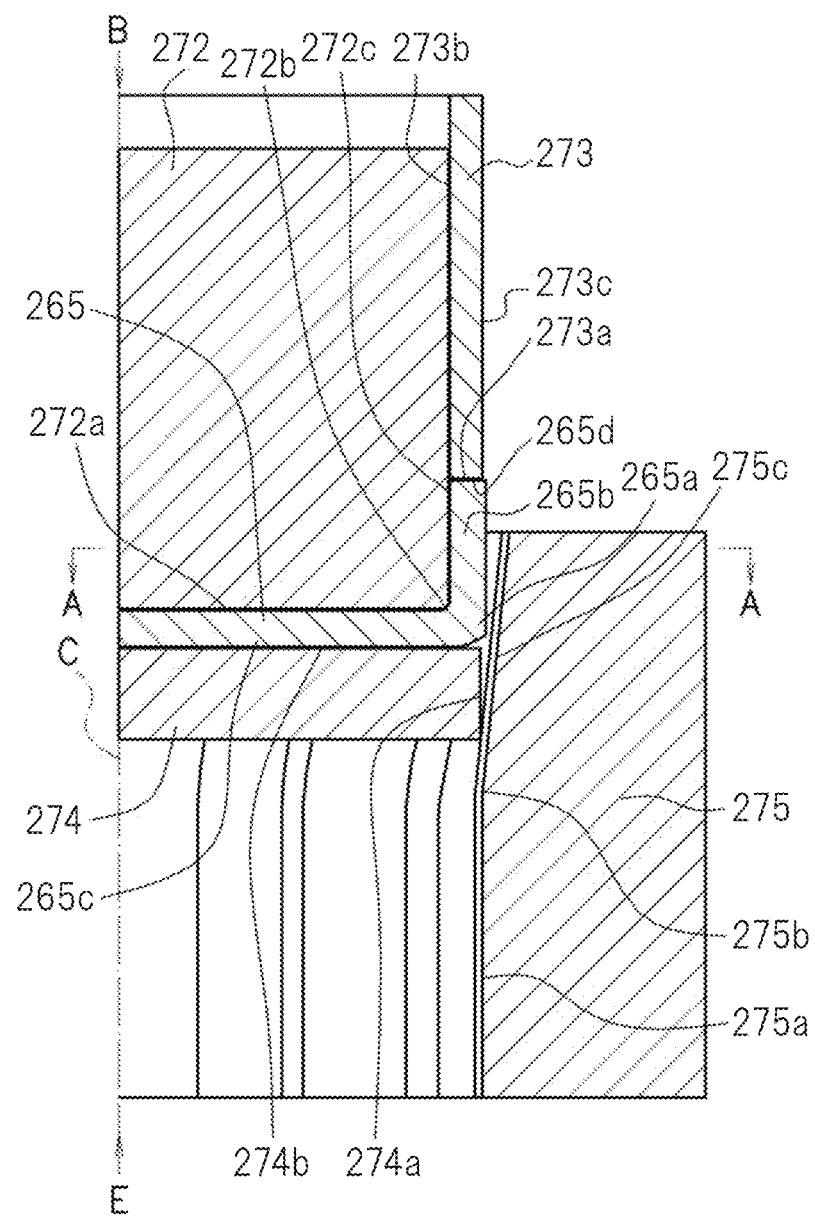
FIG. 49 is a view illustrating a state before forming starts in the tooth shape-forming process of the method of manufacturing a tooth-shaped component according to the third embodiment and is a D-D cross-sectional view of FIG. 51.
Figure 50:
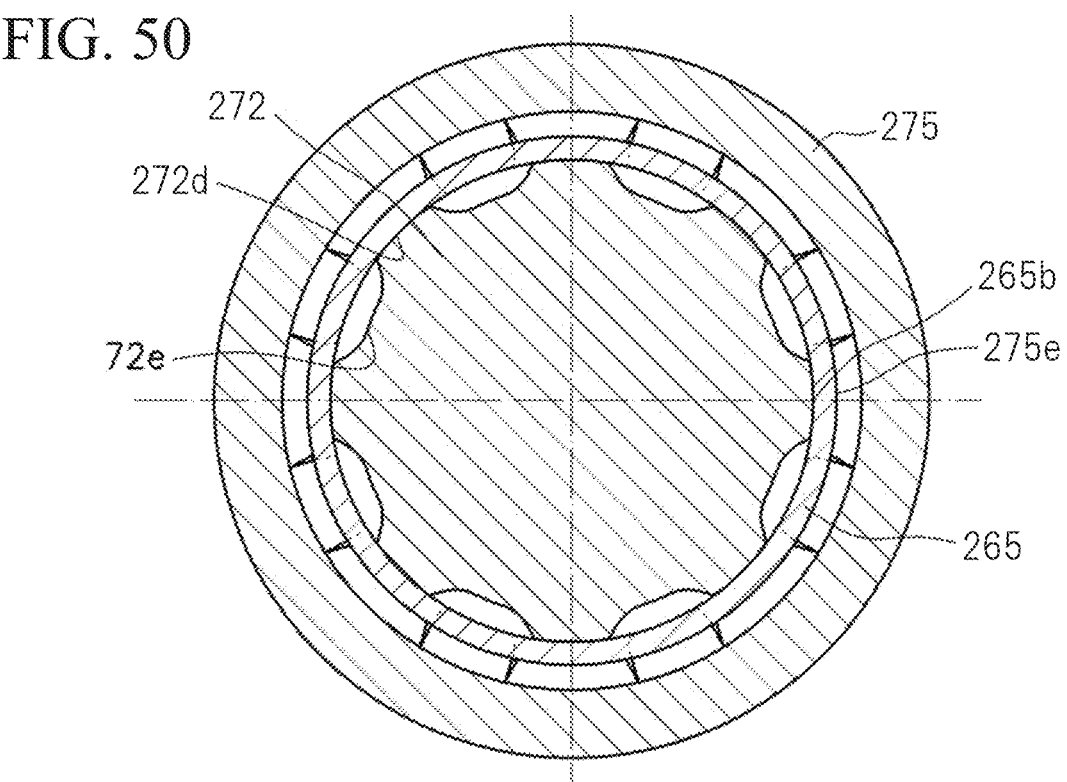
FIG. 50 is a view illustrating the state before forming starts in the tooth shape-forming process of the method of manufacturing a tooth-shaped component according to the third embodiment and is an A-A cross-sectional plan view of FIG. 49.

The inner punch 272 has a flat surface portion 272a parallel to the radial direction orthogonal to the central axis C, a curved surface portion 272b provided at an outer circumferential edge of the flat surface portion 272a, and a side surface portion 272c continued via the flat surface portion 272a and the curved surface portion 272b and extending in an upward direction (a first direction) of FIG. 49 parallel to the central axis C. In the side surface portion 272c, in order to form the tooth tip portions 221a and the tooth bottom portions 221b, peak sites 272d and valley sites 272e elongated in the first direction are alternately formed in the circumferential direction with predetermined spaces among thereof. The inner punch 272 is a movable type which can be lifted and lowered by a mechanically driven-type (hydraulic-type, servo-motor-type, and the like) driving source (not illustrated).

The die 275 has a side surface portion 275a extending in the first direction, a curved surface portion 275b provided in an upper end portion of the side surface portion 275a, and a slope portion 275c continued via the side surface portion 275a and the curved surface portion 275b and widened in the radial direction orthogonal to the central axis toward the first direction. In the side surface portion 275a, in order to form the tooth tip portions 221a and the tooth bottom portions 221b, peak sites 275d and valley sites 275e elongated in the first direction are alternately formed in the circumferential direction with predetermined spaces among thereof. The die 275 is a fixed type.

Figure 51:
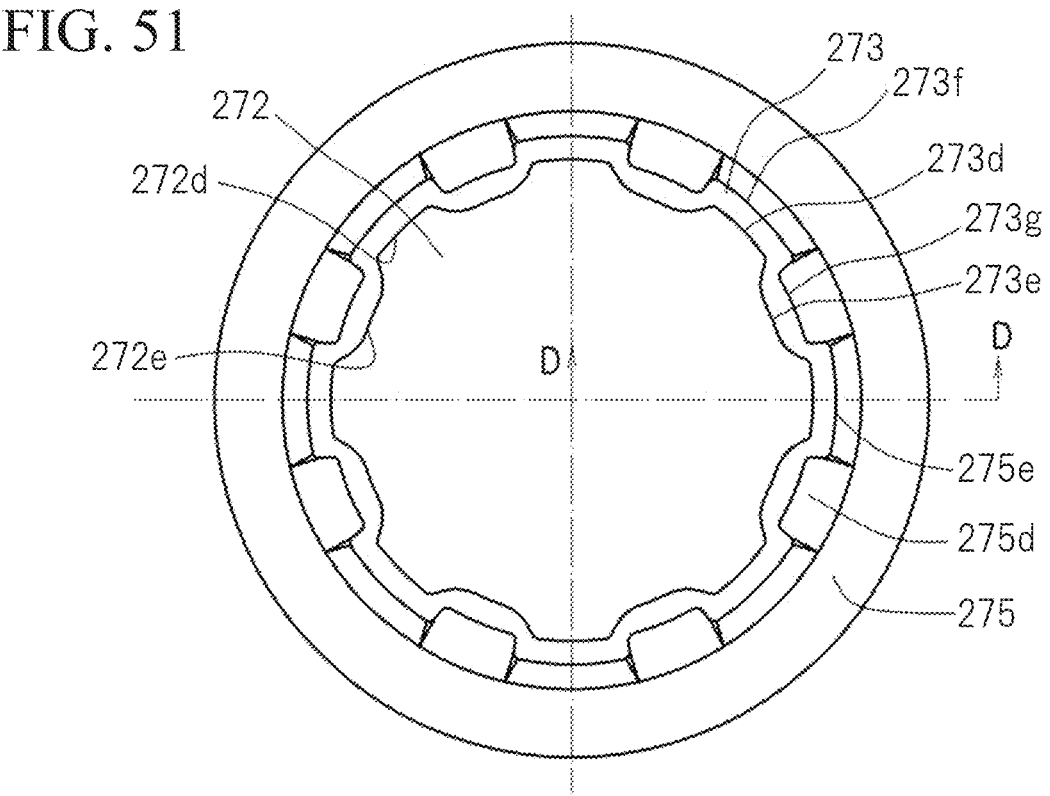
FIG. 51 is a view illustrating the state before forming starts in the tooth shape-forming process of the method of manufacturing a tooth-shaped component according to the third embodiment and is a B-directional plan view of FIG. 49.
Figure 52:
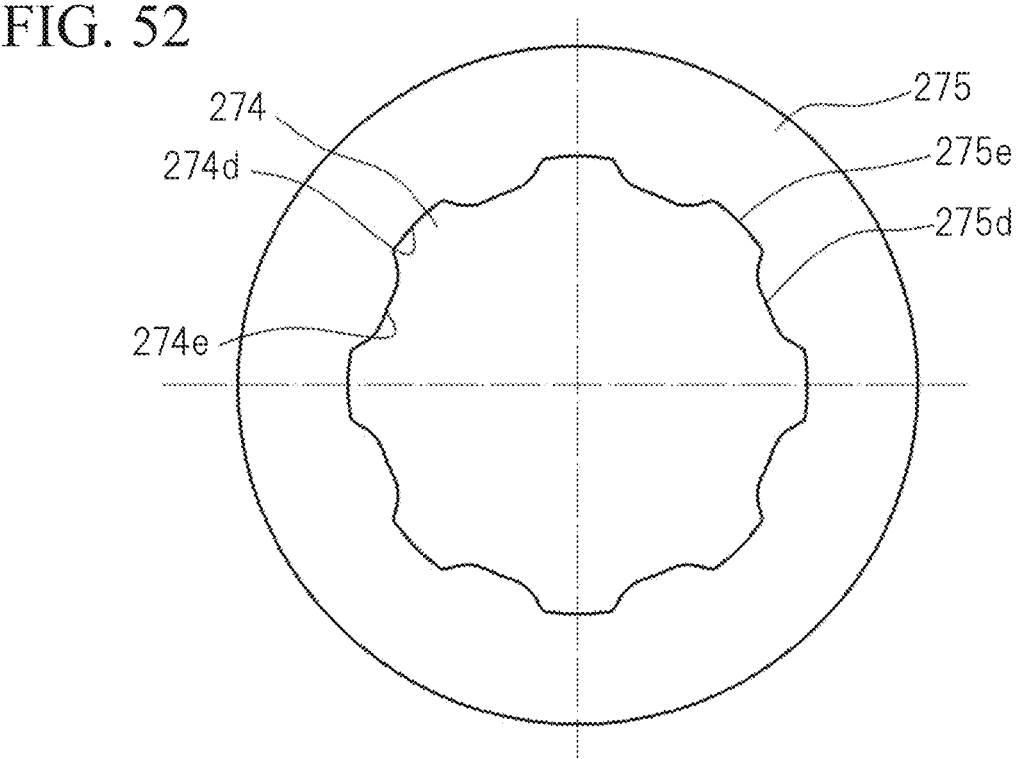
FIG. 52 is a view illustrating the state before forming starts in the tooth shape-forming process of the method of manufacturing a tooth-shaped component according to the third embodiment and is an E-directional bottom view of FIG. 49.

As illustrated in FIG. 51, the inner punch 272 and the die 275 are disposed such that the peak sites 272d of the inner punch 272 face the valley sites 275e of the die 275, in other words, the valley sites 272e of the inner punch 272 face the peak sites 275d of the die 275.

The outer punch 273 has a flat surface portion 273a parallel to the radial direction orthogonal to the central axis C, a first side surface portion 273b continued to an inner edge portion of the flat surface portion 273a and extending in the first direction, and a second side surface portion 273c continued to an outer edge portion of the flat surface portion 273a and extending in the first direction. In the first side surface portion 273b, along the side surface portion 272c of the inner punch 272, peak sites 273d and valley sites 273e elongated in the first direction are alternately formed in the circumferential direction with predetermined spaces among thereof. In addition, in the second side surface portion 273c, along the side surface portion 275a of the die 275, peak sites 273f and valley sites 273g elongated in the first direction are alternately formed in the circumferential direction with predetermined spaces among thereof. The outer punch 273 is a movable type which can be lifted and lowered by a mechanically driven-type (hydraulic-type, servo-motor-type, and the like) driving source (not illustrated).

The counter punch 274 has a side surface portion 274a extending in the first direction, and a flat surface portion 274b continued to the side surface portion 274a and parallel to the radial direction orthogonal to the central axis C. In the side surface portion 274a, along the side surface portion 275a of the die 275, peak sites 274d and valley sites 274e elongated in the first direction are alternately formed in the circumferential direction with predetermined spaces among thereof. The counter punch 274 is a movable type which can be lifted and lowered by a mechanically driven-type (hydraulic-type, servo-motor-type, and the like) driving source (not illustrated).

As illustrated in FIGS. 49 to 52, while having the diameter-reduced cylindrical container 265 formed in the diameter-reducing process, as the workpiece, the diameter-reduced cylindrical container 265 is positioned in the flat surface portion 274b of the counter punch 274 such that the member axis of the diameter-reduced cylindrical container 265 coincides with the central axis C of the press machine, and the bottom surface portion 265c of the diameter-reduced cylindrical container 265 is clamped between the flat surface portion 272a of the inner punch 272 and the flat surface portion 274b of the counter punch 274. In this case, the diameter-reduced side surface portion 265b is positioned in the valley sites 275e of the die 275.

Figure 53:
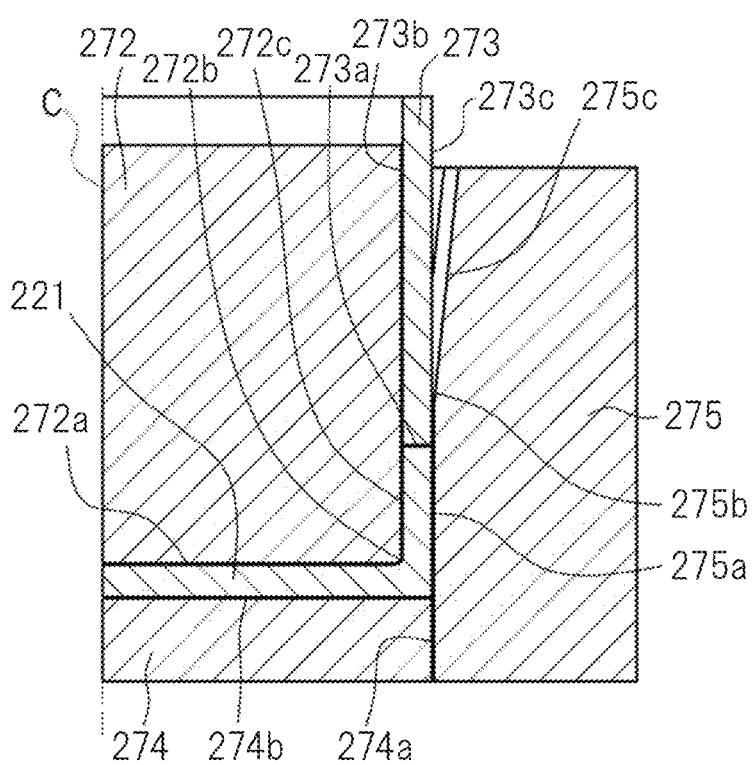
FIG. 53 is a cross-sectional view illustrating a state after forming in the tooth shape-forming process of the method of manufacturing a tooth-shaped component according to the third embodiment.

In addition, the flat surface portion 273a of the outer punch 273 is caused to abut an opening end 265d of the diameter-reduced cylindrical container 265. In this state, the inner punch 272, the outer punch 273, and the counter punch 274 are moved downward until the flat surface portion 273a of the outer punch 273 passes through the curved surface portion 275b of the die 275. Subsequently, in a state where the inner punch 272, the counter punch 274, and the die 275 are fixed, the outer punch 273 is moved downward so as to compress a side surface portion of the diameter-reduced cylindrical container 265. Accordingly, as illustrated in FIG. 53, the inside of a space surrounded by the inner punch 272, the outer punch 273, the counter punch 274, and the die 275 is filled with the material. As a result, the tooth tip portions 221a are formed in the diameter-reduced side surface portion 265b (the parts corresponding to the projection portions realized by the deformed peak portions 231b) of the diameter-reduced cylindrical container 265, and the tooth bottom portions 221b are formed in other parts of the side surface portion (the parts corresponding to the valley portions 231a) of the diameter-reduced cylindrical container 265. According to each of the processes described above, the tooth-shaped component 221 having the bottom surface portion 221c, the side surface portion 221d, the tooth tip portions 221a, and the tooth bottom portions 221b is completed.

Figure 54:
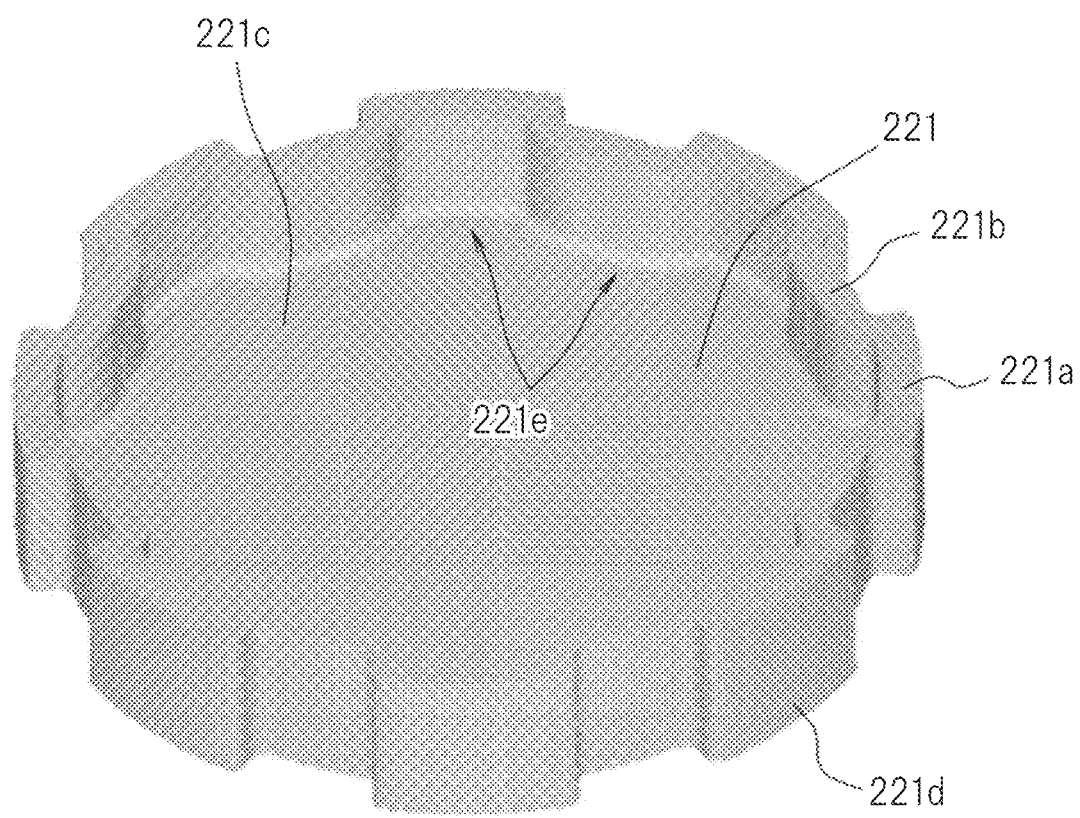
FIG. 54 is a perspective view illustrating a tooth-shaped component formed through the tooth shape-forming process.

FIG. 54 illustrates a view of the appearance of the tooth-shaped component 221 after the tooth shapes are formed. There is no occurrence of a superposition defect on an inner surface 221e of the corner portion of the tooth-shaped component 221. Before the tooth shapes are formed, forming is performed such that the curved surface portion 272b of the inner punch 272 and the corner portion 265a of the diameter-reduced cylindrical container 265 come into contact with each other, and the external angle of the corner portion 265a of the diameter-reduced cylindrical container 265 is adjusted to a value close to a right angle. Accordingly, in the tooth shape-forming process, it is possible to reduce a gap between a place in the vicinity of the corner portion where the flat surface portion 274b of the counter punch 274 and the side surface portion 275a of the die 275 come into contact with each other, and the corner portion 265a of the diameter-reduced cylindrical container 265. As a result, the corner portion 265a of the diameter-reduced cylindrical container 265 is not separated from the curved surface portion 272b of the inner punch 272 in the middle of the tooth shape-forming process. Therefore, after the tooth shape-forming process ends, it is possible to obtain the tooth-shaped component 221 having no superposition defect in a boundary between an upper surface of the bottom surface portion 221c and the inner circumferential surface of the side wall portion 221d.

In addition, in the present embodiment, the cold forging is employed as the method of manufacturing a tooth-shaped component. Therefore, compared to a tooth-shaped component manufactured through the hot forging, it is possible to obtain the tooth-shaped component 221 having no draft and having the dimensional accuracy ten times more accurate in thickness, without performing the machining process. That is, according to the method of manufacturing a tooth-shaped component in the present embodiment, it is possible to obtain the high-quality tooth-shaped component 221 having no superposition defect and draft and having the dimensional accuracy in thickness ranging from ±0.05 mm to ±0.3 mm.

Fourth Embodiment

Next, a fourth embodiment of the present invention will be described.

Figure 55A:
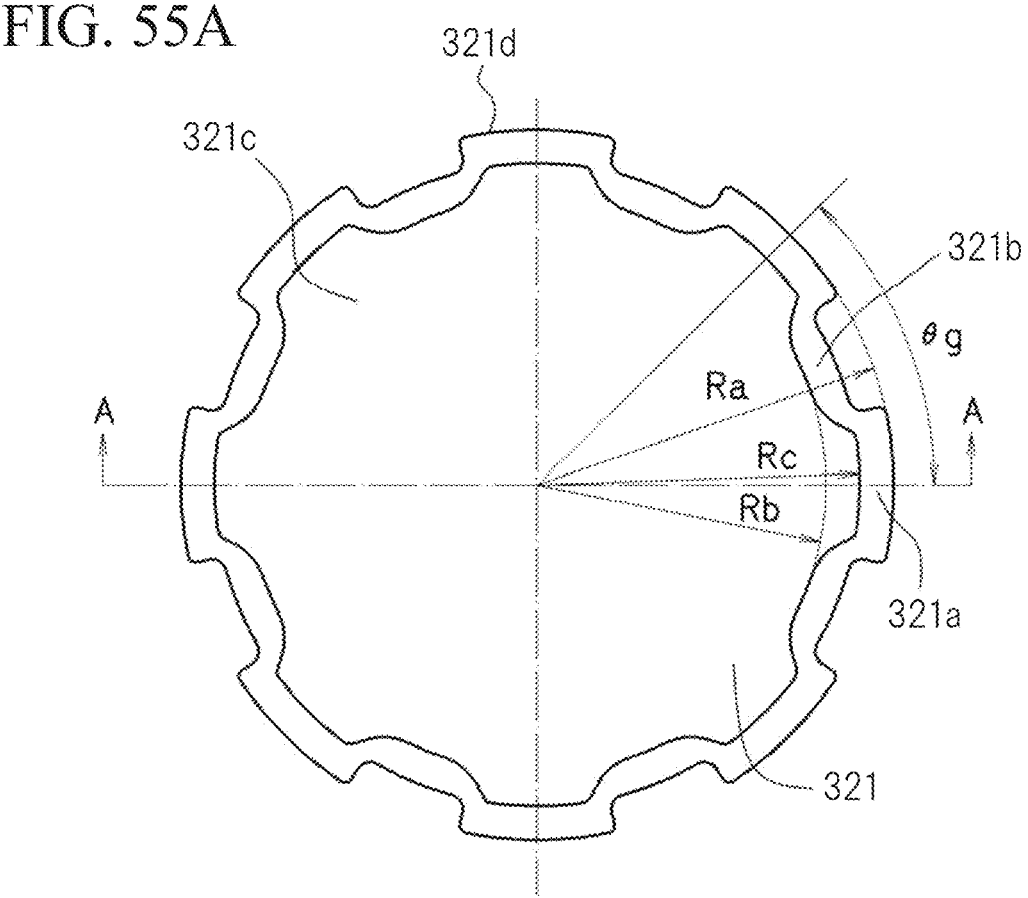
FIG. 55A is a plan view of a tooth-shaped component formed through a method of manufacturing a tooth-shaped component according to a fourth embodiment.
Figure 55B:
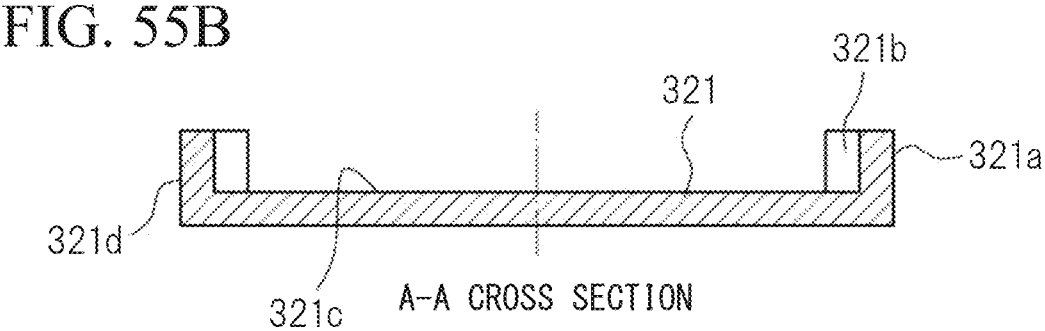
FIG. 55B is an A-A cross-sectional view of the tooth-shaped component illustrated in FIG. 55A.

FIG. 55A is a plan view of a tooth-shaped component 321 manufactured through a method of manufacturing a tooth-shaped component according to the fourth embodiment. FIG. 55B is an A-A cross-sectional view of the tooth-shaped component 321 illustrated in FIG. 55A. As illustrated in FIGS. 55A and 55B, the tooth-shaped component 321 is a component having a bottomed cylindrical shape of which one end portion is open and of which the other end portion is sealed in a direction of the member axis (the one-dot chain line illustrated in FIG. 55B).

The tooth-shaped component 321 has a bottom surface portion 321c and a side surface portion 321d which rises from an outer edge portion of the bottom surface portion 321c. An external angle of a corner portion formed by the bottom surface portion 321c and the side surface portion 321d is substantially a right angle. The side surface portion 321d has tooth tip portions 321a and tooth bottom portions 321b provided so as to alternately appear along a circumferential direction having the member axis as the center. The present embodiment illustrates a case where there are eight of the tooth tip portions 321a and the tooth bottom portions 321b each. However, the numbers of the tooth tip portions 321a and the tooth bottom portions 321b (that is, the number of teeth of the tooth-shaped component 321) are not limited to eight as long as there are a plurality thereof.

The tooth tip portions 321a are parts which protrude further outward than the tooth bottom portions 321b in a radial direction having the member axis as the center. More specifically, as illustrated in FIG. 55A, outer circumferential surfaces of the tooth tip portions 321a are positioned on the circumference of a radius Ra having the member axis as the center. Inner circumferential surfaces of the tooth tip portions 321a and outer circumferential surfaces of the tooth bottom portions 321b are positioned on the circumference of a radius Rc having the member axis as the center. Inner circumferential surfaces of the tooth bottom portions 321b are positioned on the circumference of a radius Rb having the member axis as the center. Hereinafter, the radius Ra will be referred to as an outer radius of the tooth tip portions 321a. The radius Rc will be referred to as an inner radius of the tooth tip portions 321a. The radius Rb will be referred to as an inner radius of the tooth bottom portions 321b.

In addition, in FIG. 55A, θg indicates an angle between the tooth tip portions 321a adjacent to each other along the circumferential direction having the member axis as the center.

The tooth-shaped component 321 manufactured through the method of manufacturing a tooth-shaped component according to the present embodiment is characterized by naturally having no superposition defect, having no draft, and having the dimensional accuracy in thickness ranging from ±0.05 mm to ±0.3 mm.

In the present embodiment, cold forging is employed as the method of manufacturing a tooth-shaped component (will be described later in detail). Therefore, compared to a tooth-shaped component manufactured through hot forging, it is possible to obtain the tooth-shaped component 321 having no draft and having the dimensional accuracy ten times more accurate in thickness, without performing a machining process. That is, according to the method of manufacturing a tooth-shaped component in the present embodiment, it is possible to obtain the high-quality tooth-shaped component 321 having no superposition defect and draft and having the dimensional accuracy in thickness ranging from ±0.05 mm to ±0.3 mm.

In order to manufacture such a tooth-shaped component 321, the method of manufacturing a tooth-shaped component according to the fourth embodiment includes a drawing process, a diameter-increasing process, a diameter-reducing process, and a tooth shape-forming process (a rough tooth shape-forming process and a complete tooth shape-forming process). Hereinafter, each of the processes will be described in detail. As described above, in the present embodiment, the cold forging is employed as the method of manufacturing a tooth-shaped component. Therefore, each of the processes is executed at a normal temperature.

(Drawing Process)

Figure 56:
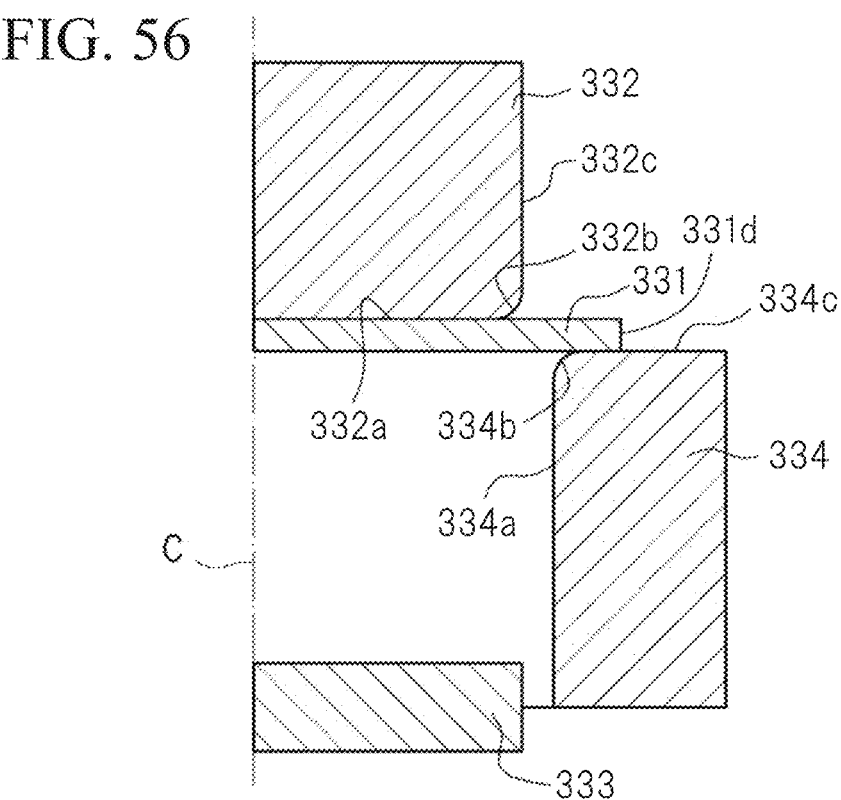
FIG. 56 is a cross-sectional view illustrating a state before forming starts in a drawing process of the method of manufacturing a tooth-shaped component according to the fourth embodiment.

FIG. 56 illustrates a state before forming starts in the drawing process. With reference to FIG. 56, a press machine includes a punch 332, a knockout 333, and a die 334 having the coaxially disposed central axes C. The knockout 333 and the die 334 are disposed so as to face the punch 332.

Figure 58:
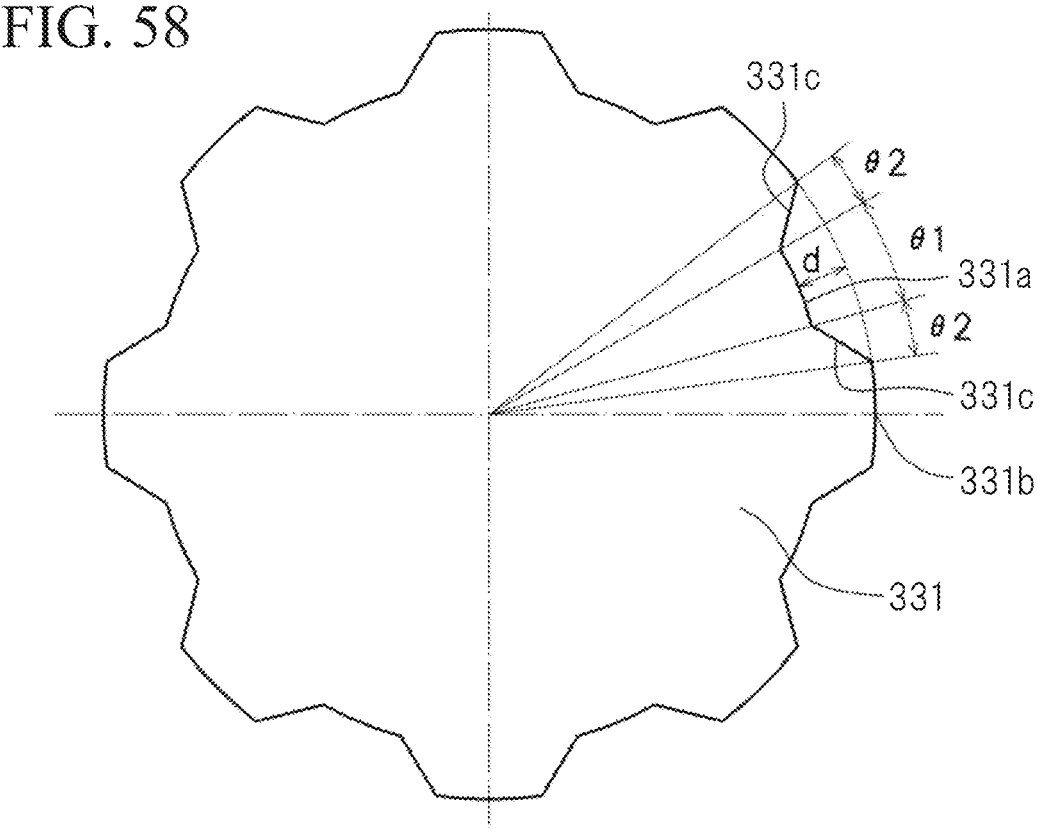
FIG. 58 is a plan view illustrating a metal sheet which is a workpiece in the drawing process.

As illustrated in FIG. 58, a workpiece 331 is a flat metal sheet (for example, a steel sheet) having valley portions 331a and peak portions 331b provided so as to alternately appear along the circumferential direction having the member axis (the central axis of the workpiece 331) as the center. The peak portions 331b are parts which protrude outward from the valley portions 331a in the radial direction having the member axis as the center. In addition, the workpiece 331 also has slope portions 331c each of which connects the peak portion 331b and the valley portion 331a together.

The valley portions 331a become parts corresponding to the tooth bottom portions 321b. The numbers of the peak portions 331b and the valley portions 331a coincide with the number of teeth of the tooth-shaped component 321, and the peak portions 331b, the slope portions 331c, and the valley portions 331a are formed with predetermined spaces among thereof along the circumferential direction having the member axis as the center.

In a case where a workpiece is a circularly-shaped sheet having the same outer diameters, when a tooth shape is formed in the tooth shape-forming process, the material of the workpiece remains at the tooth bottom portions of the tooth shape, and the inside of a space formed by a die and punch is filled in an early stage. Therefore, a forming load becomes excessive. In order to reduce the forming load, the parts corresponding to the tooth bottom portions 321*b* serve as the valley portions 331*a*. A depth d of the valley portion 331*a* with respect to the peak portion 331*b* (a length between an outer circumferential edge of the peak portion 331*b* and an outer circumferential edge of the valley portion 331*a* in the radial direction having the member axis as the center) may be set to approximately a length Δr (=Ra−Rb) obtained by subtracting the inner radius Rb of the tooth bottom portions 321*b* from the outer radius Ra of the tooth tip portions 321*a* of the tooth-shaped component 321 illustrated in FIG. 55A. In addition, a regional angle θ1 of the valley portion 331*a* may be set to approximately ⅓ of the regional angle of one tooth (θg illustrated in FIG. 55A). In addition, a regional angle θ2 of the slope portion 331*c* may be set to approximately ⅙ of the regional angle of one tooth (θg illustrated in FIG. 55A).

The punch 332 has a flat surface portion 332*a* parallel to the radial direction orthogonal to the central axis C, a curved surface portion 332*b* provided at an outer circumferential edge of the flat surface portion 332*a*, and a side surface portion 332*c* continued via the flat surface portion 332*a* and the curved surface portion 332*b* and extending in an upward direction (a first direction) of FIG. 56 parallel to the central axis C. The punch 332 is a movable type which can be lifted and lowered by a mechanically driven-type (hydraulic-type, servo-motor-type, and the like) driving source (not illustrated).

The knockout 333 has a columnar shape and is used for detaching a formed product from the die and punch. The knockout 333 is a movable type which can be lifted and lowered by a driving source (not illustrated).

The die 334 has a side surface portion 334*a* extending in the first direction, a curved surface portion 334*b* provided in an upper end portion of the side surface portion 334*a*, and a flat surface portion 334*c* continued via the side surface portion 334*a* and the curved surface portion 334*b* and parallel to the radial direction orthogonal to the central axis C. The die 334 is a fixed type.

Figure 57:
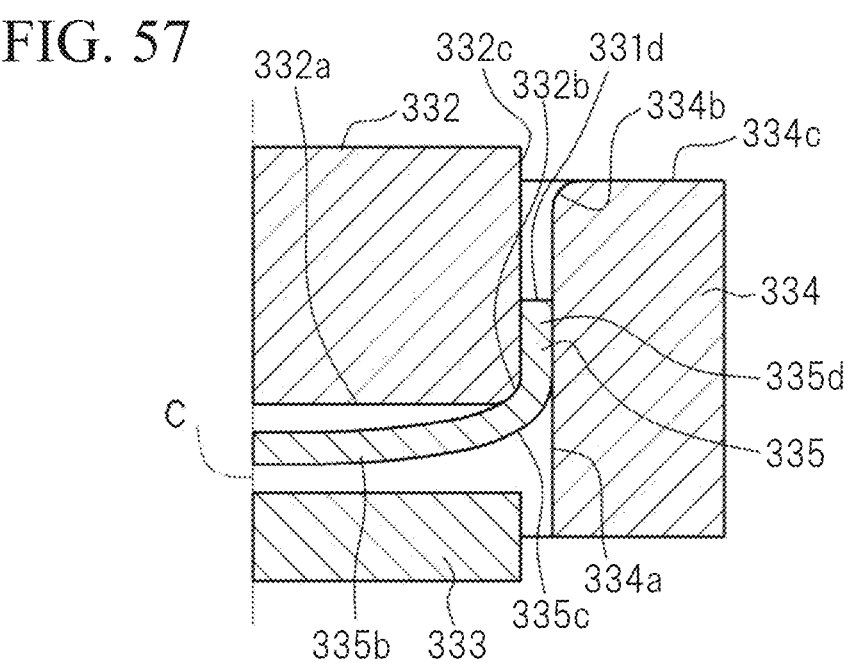
FIG. 57 is a cross-sectional view illustrating a state after forming in the drawing process of the method of manufacturing a tooth-shaped component according to the fourth embodiment.
Figure 59:
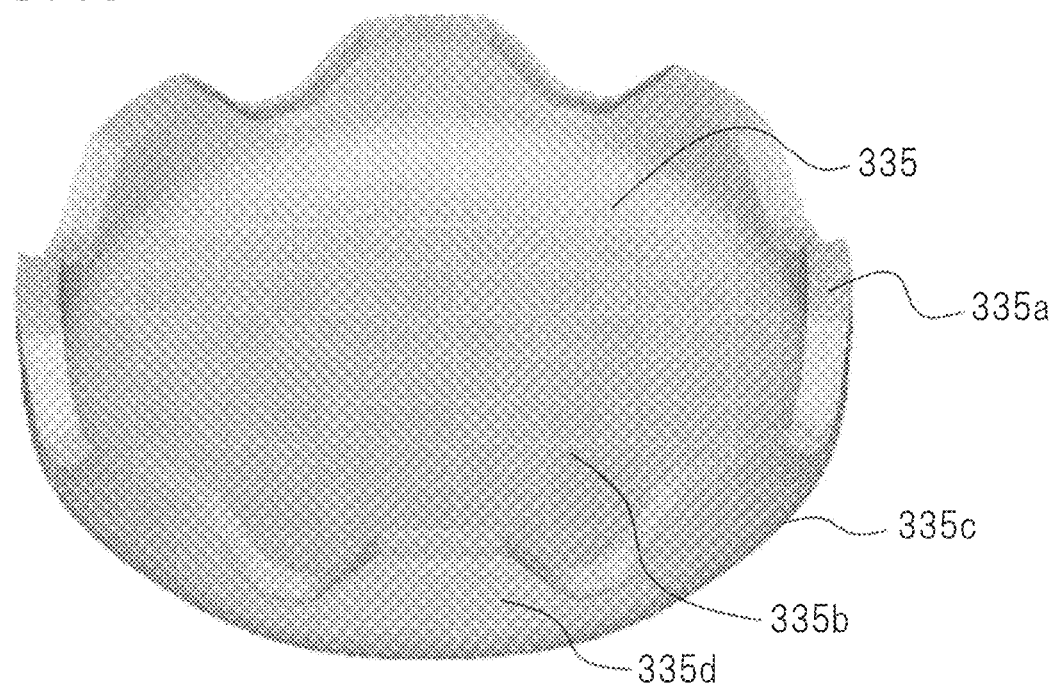
FIG. 59 is a perspective view illustrating a cylindrical container formed through the drawing process.

As illustrated in FIG. 56, the workpiece 331 is positioned in the flat surface portion 334*c* of the die 334 such that the member axis of the workpiece 331 coincides with the central axis C of the press machine. The punch 332 is moved downward until an end portion 331*d* of the workpiece 331 passes through the curved surface portion 334*b* of the die 334, and drawing is performed, thereby forming a cylindrical container 335, as illustrated in FIG. 57. FIG. 59 illustrates a view of the appearance of the cylindrical container 335. The cylindrical container 335 has a bottom surface portion 335*b* and a side surface portion 335*d* continued via the bottom surface portion 335*b* and a curved surface portion 335*c*, and projection portions 335*a* realized by the peak portions 331*b* deformed so as to protrude in the first direction are formed. After forming, the knockout 333 is lifted and the cylindrical container 335 is detached from the die 334.

(Diameter-Increasing Process)

The diameter-increasing process has a first step and a second step.

Figure 60:
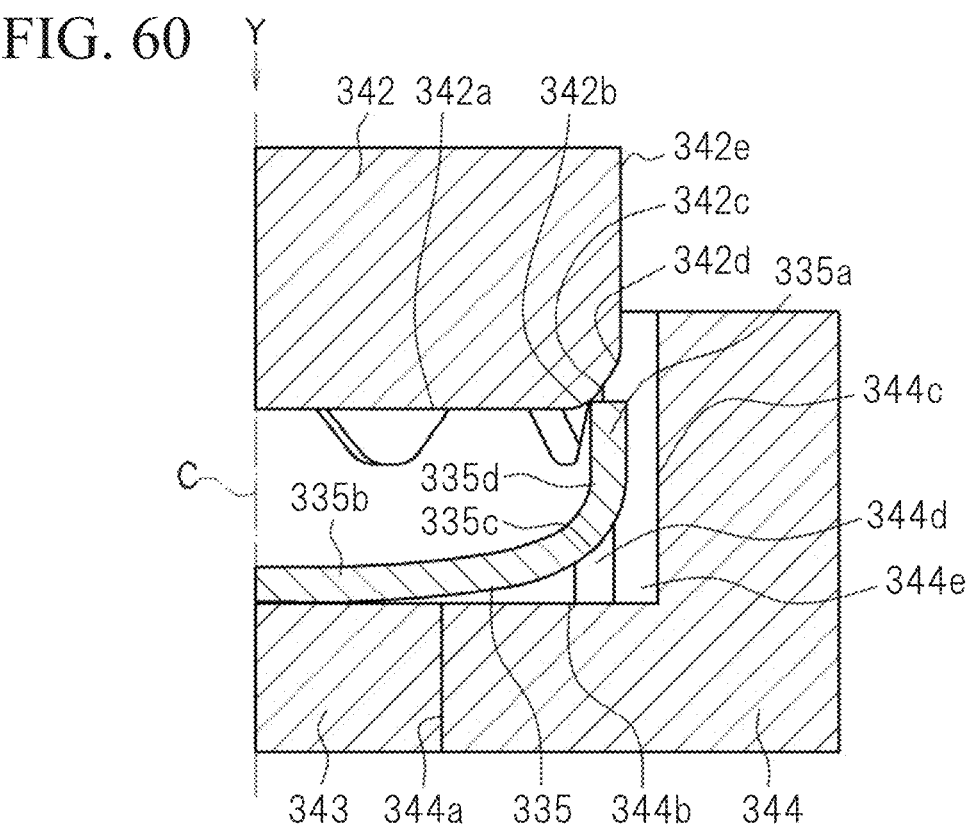
FIG. 60 is a view illustrating a state before forming starts in a first step of a diameter-increasing process of the method of manufacturing a tooth-shaped component according to the fourth embodiment and is an A-A cross-sectional view of FIG. 61.
Figure 61:
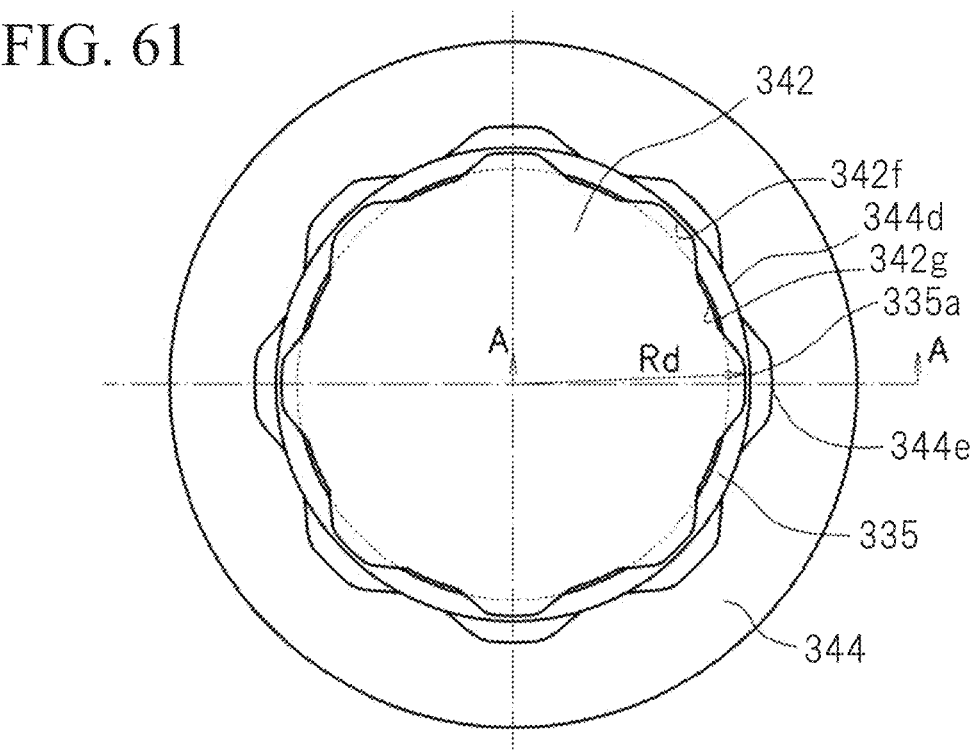
FIG. 61 is a view illustrating the state before forming starts in the first step of the diameter-increasing process the method of manufacturing a tooth-shaped component according to the fourth embodiment and is a Y-directional plan view of FIG. 60.

FIGS. 60 and 61 illustrate states before forming starts in the first step of the diameter-increasing process. With reference to FIGS. 60 and 61, the press machine includes a first punch 342, a first knockout 343, and a first die 344 disposed in an outer circumference of the first knockout 343, having the coaxially disposed central axes C. The first knockout 343 and the first die 344 are disposed so as to face the first punch 342.

The first punch 342 has a flat surface portion 342*a* parallel to the radial direction orthogonal to the central axis C, a first curved surface portion 342*b* provided at an outer circumferential edge of the flat surface portion 342*a*, a slope portion 342*c* continued via the flat surface portion 342*a* and the first curved surface portion 342*b* and widened in the radial direction orthogonal to the central axis C toward an upward direction (the first direction) of FIG. 60 parallel to the central axis C, a second curved surface portion 342*d* provided at an upper end of the slope portion 342*c*, and a side surface portion 342*e* continued via the slope portion 342*c* and the second curved surface portion 342*d* and extending in the first direction. In the side surface portion 342*e*, peak sites 342*f* and valley sites 342*g* elongated in the first direction are alternately formed in the circumferential direction with predetermined spaces among thereof, and the numbers of the peak sites 342*f* and the valley sites 342*g* coincide with the number of teeth of the tooth-shaped component 321. It is desirable that a radius Rd (a length between outer circumferential surfaces of the peak sites 342*f* and the central axis C in the radial direction having the central axis C as the center) of the peak sites 342*f* ranges from 1.08 times to 1.17 times the inner radius Re of the tooth tip portions 321*a*. The reason will be described in the section of the diameter-reducing process. The first punch 342 is a movable type which can be lifted and lowered by a mechanically driven-type (hydraulic-type, servo-motor-type, and the like) driving source (not illustrated).

The first knockout 343 has a columnar shape and is used for detaching a formed product from the die and punch. The first knockout 343 is a movable type which can be lifted and lowered by a driving source (not illustrated).

The first die 344 has a first side surface portion 344*a* extending in the first direction, a flat surface portion 344*b* continued to the first side surface portion 344*a* and parallel to the radial direction orthogonal to the central axis C, and a second side surface portion 344*c* continued to the flat surface portion 344*b* and extending in the first direction. In the second side surface portion 344*c*, peak sites 344*d* and valley sites 344*e* elongated in the first direction are alternately formed in the circumferential direction with predetermined spaces among thereof, and the numbers of the peak sites 344*d* and the valley sites 344*e* coincide with the number of teeth of the tooth-shaped component 321. The second side surface portion 344*c* is disposed in a form of being offset in the radial direction from the side surface portion 342*e* of the first punch 342 substantially as much as a plate thickness of the workpiece 335. The first die 344 is a fixed type.

As illustrated in FIG. 61, the first punch 342 and the first die 344 are disposed such that the peak sites 342*f* of the first punch 342 face the valley sites 344*e* of the first die 344, in other words, the valley sites 342*g* of the first punch 342 face the peak sites 344*d* of the first die 344.

Figure 62:
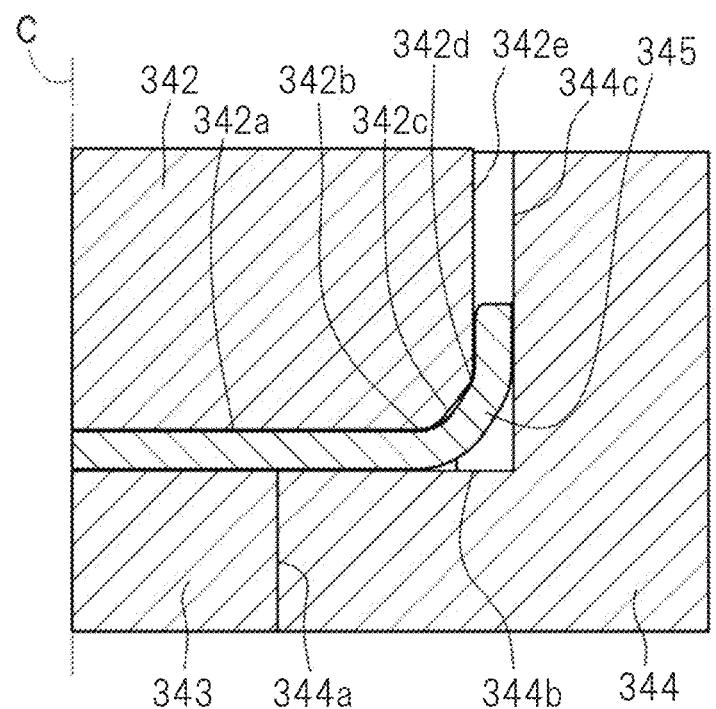
FIG. 62 is a cross-sectional view illustrating a state after forming in the first step of the diameter-increasing process of the method of manufacturing a tooth-shaped component according to the fourth embodiment.
Figure 63A:
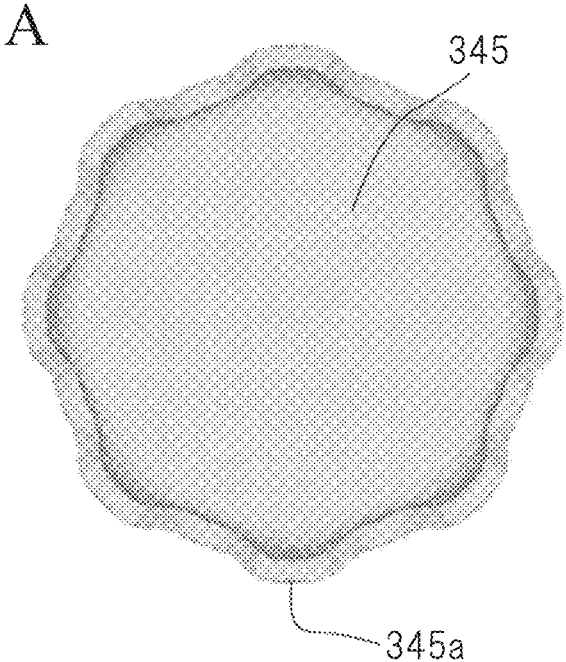
FIG. 63A is a plan view of a first diameter-increased cylindrical container formed through the first step of the diameter-increasing process.
Figure 63B:
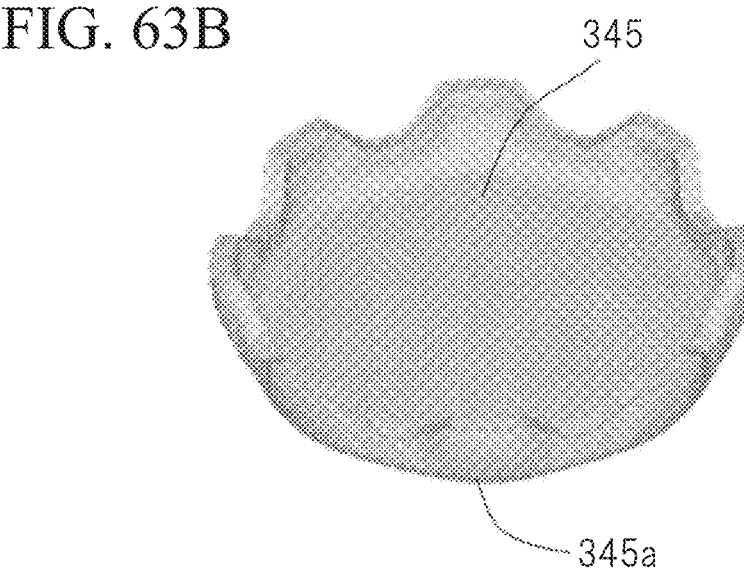
FIG. 63B is a perspective view of the first step of the diameter-increasing process formed through the first diameter-increased cylindrical container.

As illustrated in FIGS. 60 and 61, while having the cylindrical container 335 formed in the drawing process, as the workpiece, the cylindrical container 335 is positioned on the first knockout 343 and the first die 344 such that the member axis of the cylindrical container 335 coincides with the central axis C of the press machine. In this case, the projection portions 335*a* realized by the deformed peak portions 331*b* are positioned in the valley sites 344*e* of the first die 344. In this state, the first punch 342 is moved downward until the flat surface portion 342*a* of the first punch 342 comes into contact with the bottom surface portion 335b of the cylindrical container 335, thereby forming a first diameter-increased cylindrical container 345, as illustrated in FIG. 62. FIGS. 63A and 63B illustrate views of the appearance of the first diameter-increased cylindrical container 345. In the first diameter-increased cylindrical container 345, in the side surface portion 335d of the cylindrical container 335, the projection portions 335a (the particular part) realized by the deformed peak portions 331b are increased in diameter (hereinafter, this portion will be referred to as a diameter-increased side surface portion 345a). After forming, the first knockout 343 is lifted and the first diameter-increased cylindrical container 345 is detached from the first die 344.

Figure 64:
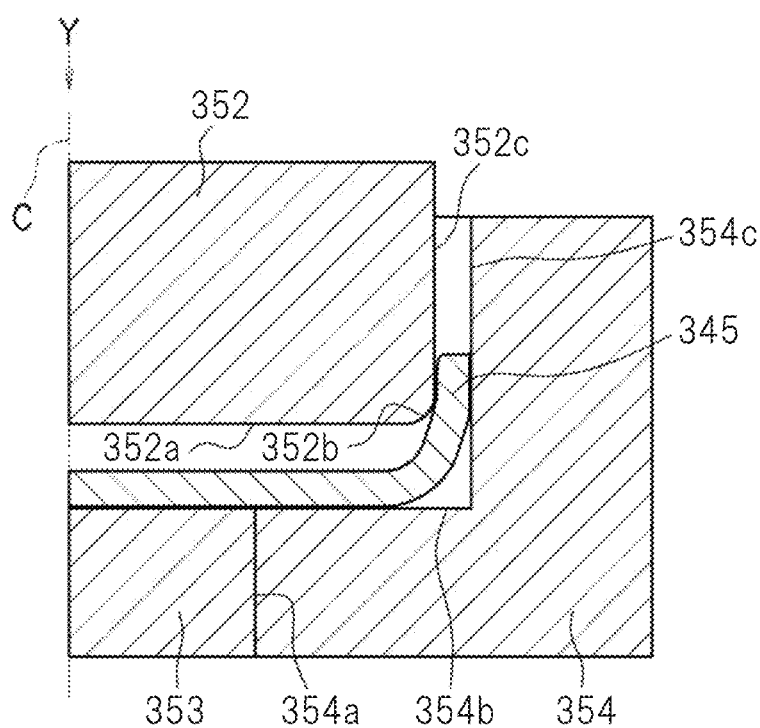
FIG. 64 is a view illustrating a state before forming starts in a second step of the diameter-increasing process of the method of manufacturing a tooth-shaped component according to the fourth embodiment and is an A-A cross-sectional view of FIG. 65.
Figure 65:
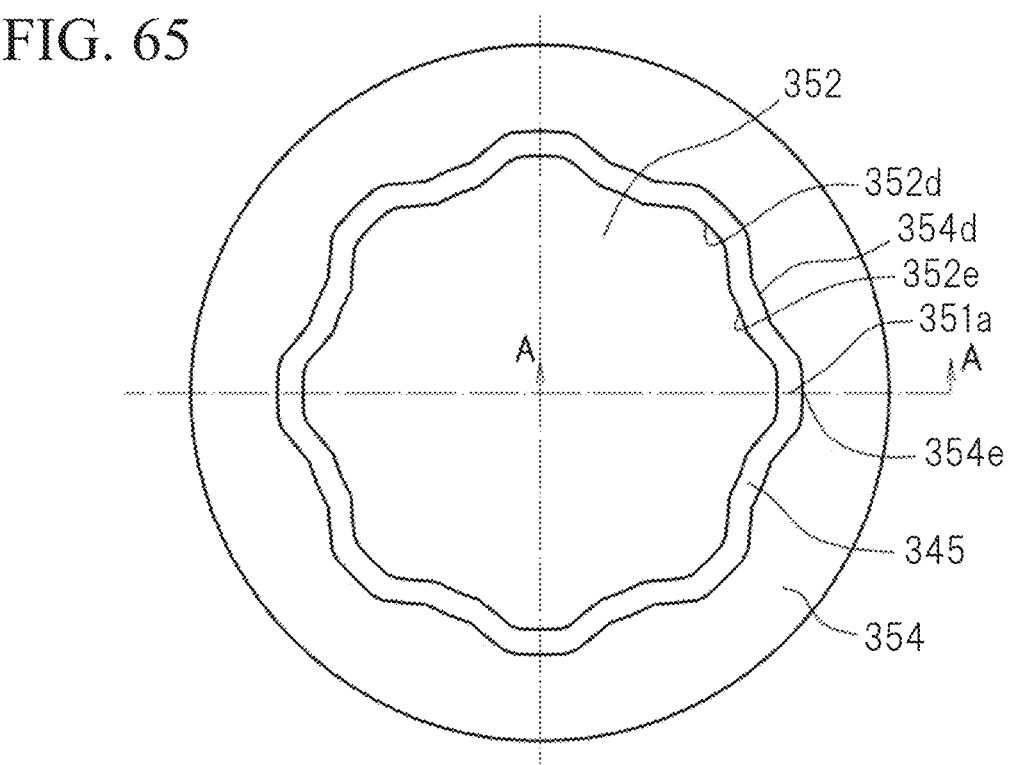
FIG. 65 is a view illustrating the state before forming starts in the second step of the diameter-increasing process of the method of manufacturing a tooth-shaped component according to the fourth embodiment and is a Y-directional plan view of FIG. 64.

FIGS. 64 and 65 illustrate states before forming starts in the second step of the diameter-increasing process. With reference to FIGS. 64 and 65, the press machine includes a second punch 352, a second knockout 353, and a second die 354 disposed in an outer circumference of the second knockout 353, having the coaxially disposed central axes C. The second knockout 353 and the second die 354 are disposed so as to face the second punch 352.

The second punch 352 has a flat surface portion 352a parallel to the radial direction orthogonal to the central axis C, a curved surface portion 352b provided at an outer circumferential edge of the flat surface portion 352a, and a side surface portion 352c continued via the flat surface portion 352a and the curved surface portion 352b and extending in an upward direction (a first direction) of FIG. 64 parallel to the central axis C. The side surface portion 352c has the same shape and dimensions of a cross section orthogonal to the central axis C as the side surface portion 342e of the first punch 342. In the side surface portion 352c, peak sites 352d and valley sites 352e elongated in the first direction are alternately formed in the circumferential direction with predetermined spaces among thereof, and the numbers of the peak sites 352d and the valley sites 352e coincide with the number of teeth of the tooth-shaped component 321. The second punch 352 is a movable type which can be lifted and lowered by a mechanically driven-type (hydraulic-type, servo-motor-type, and the like) driving source (not illustrated).

The second knockout 353 has a columnar shape and is used for detaching a formed product from the die and punch. The second knockout 353 is a movable type which can be lifted and lowered by a driving source (not illustrated).

The second die 354 has a first side surface portion 354a having the same shape and dimensions as the first die 344 and extending in the first direction, a flat surface portion 354b continued to the first side surface portion 354a and parallel to the radial direction orthogonal to the central axis C, and a second side surface portion 354c continued to the flat surface portion 354b and extending in the first direction. In the second side surface portion 354c, peak sites 354d and valley sites 354e elongated in the first direction are alternately formed in the circumferential direction with predetermined spaces among thereof, and the numbers of the peak sites 354d and the valley sites 354e coincide with the number of teeth of the tooth shape. The second die 354 is a fixed type.

As illustrated in FIG. 65, the second punch 352 and the second die 354 are disposed such that the peak sites 352d of the second punch 352 face the valley sites 354e of the second die 354, in other words, the valley sites 352e of the second punch 352 face the peak sites 354d of the second die 354.

Figure 66:
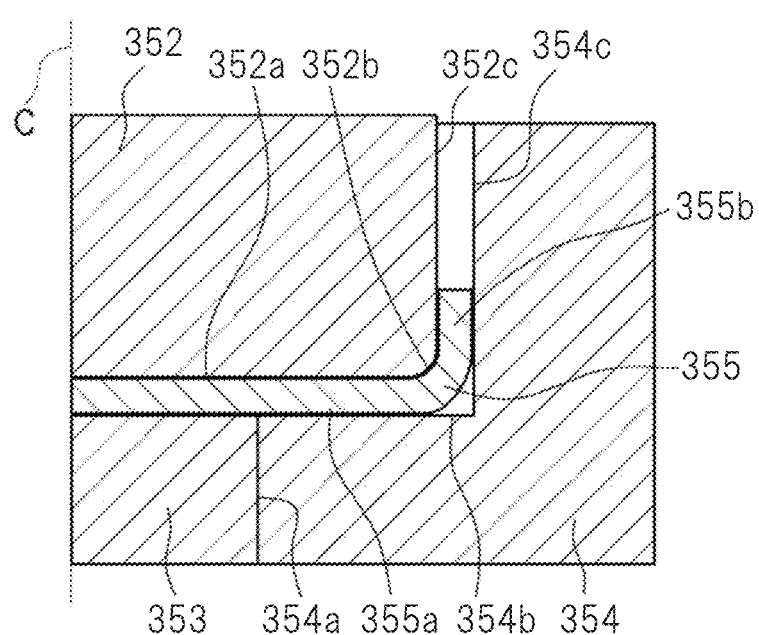
FIG. 66 is a cross-sectional view illustrating a state after forming in the second step of the diameter-increasing process of the method of manufacturing a tooth-shaped component according to the fourth embodiment.

As illustrated in FIGS. 64 and 65, while having the first diameter-increased cylindrical container 345 formed in the first step, as the workpiece, the first diameter-increased cylindrical container 345 is positioned on the second knockout 353 and the second die 354 such that the member axis of the first diameter-increased cylindrical container 345 coincides with the central axis C of the press machine. In this case, the diameter-increased side surface portion 345a is positioned in the valley sites 354e of the second die 354. In this state, the second punch 352 is moved downward until the flat surface portion 352a of the second punch 352 comes into contact with the bottom surface portion of the first diameter-increased cylindrical container 345, thereby forming a second diameter-increased cylindrical container 355, as illustrated in FIG. 66. A side surface portion 355b of the second diameter-increased cylindrical container 355 has a shape standing upright with respect to a bottom surface portion 355a. After forming, the second knockout 353 is lifted and the second diameter-increased cylindrical container 355 is detached from the second die 354.

(Diameter-Reducing Process)

Figure 67:
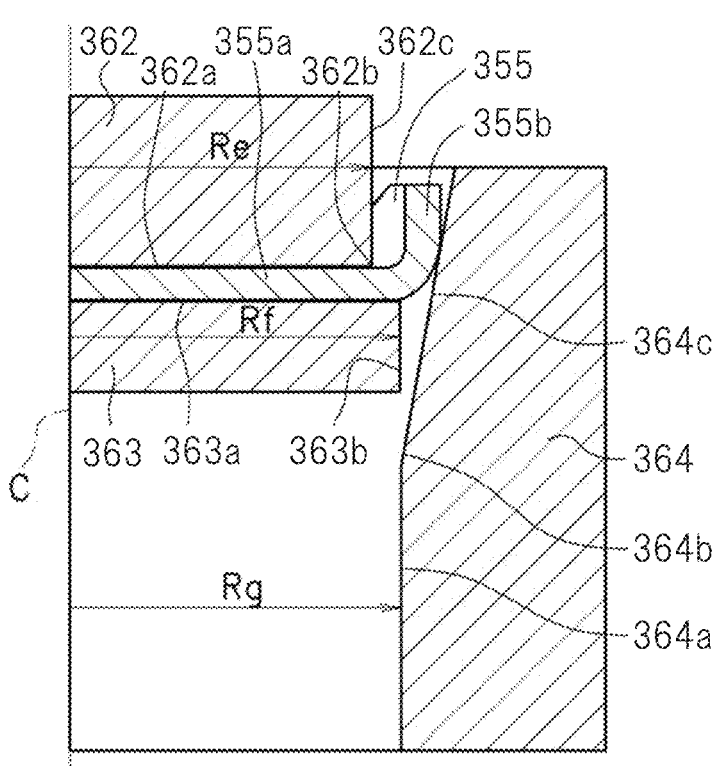
FIG. 67 is a cross-sectional view illustrating a state before forming starts in a diameter-reducing process of the method of manufacturing a tooth-shaped component according to the fourth embodiment.

FIG. 67 illustrates a state before forming starts in the diameter-reducing process. With reference to FIG. 67, the press machine includes a punch 362, a counter punch 363, and a die 64 disposed in an outer circumference of the counter punch 363, having the coaxially disposed central axes C. The counter punch 363 and the die 364 are disposed so as to face the punch 362.

The punch 362 has a flat surface portion 362a parallel to the radial direction orthogonal to the central axis C, a curved surface portion 362b provided at an outer circumferential edge of the flat surface portion 362a, and a side surface portion 362c continued via the flat surface portion 362a and the curved surface portion 362b and extending in an upward direction (a first direction) of FIG. 67 parallel to the central axis C. A radius Re of the side surface portion 362c is substantially equal to the inner radius Re of the tooth tip portions 321a. The punch 362 is a movable type which can be lifted and lowered by a mechanically driven-type (hydraulic-type, servo-motor-type, and the like) driving source (not illustrated).

The counter punch 363 has a flat surface portion 363a parallel to the radial direction orthogonal to the central axis C, and a side surface portion 363b continued to the flat surface portion 363a and extending in a downward direction of FIG. 67 parallel to the central axis C. A radius Rf of the side surface portion 363b is substantially equal to the outer radius Ra of the tooth tip portions 321a. The counter punch 363 is a movable type which can be lifted and lowered by a mechanically driven-type (hydraulic-type, servo-motor-type, and the like) driving source (not illustrated).

The die 364 has a side surface portion 364a extending in the first direction, a curved surface portion 364b provided in an upper end portion of the side surface portion 364a, and a slope portion 364c continued via the side surface portion 364a and the curved surface portion 364b and widened in the radial direction orthogonal to the central axis toward the first direction. A radius Rg of the side surface portion 364a is substantially equal to the outer radius Ra of the tooth tip portions 321a. The die 364 is a fixed type.

Figure 68A:
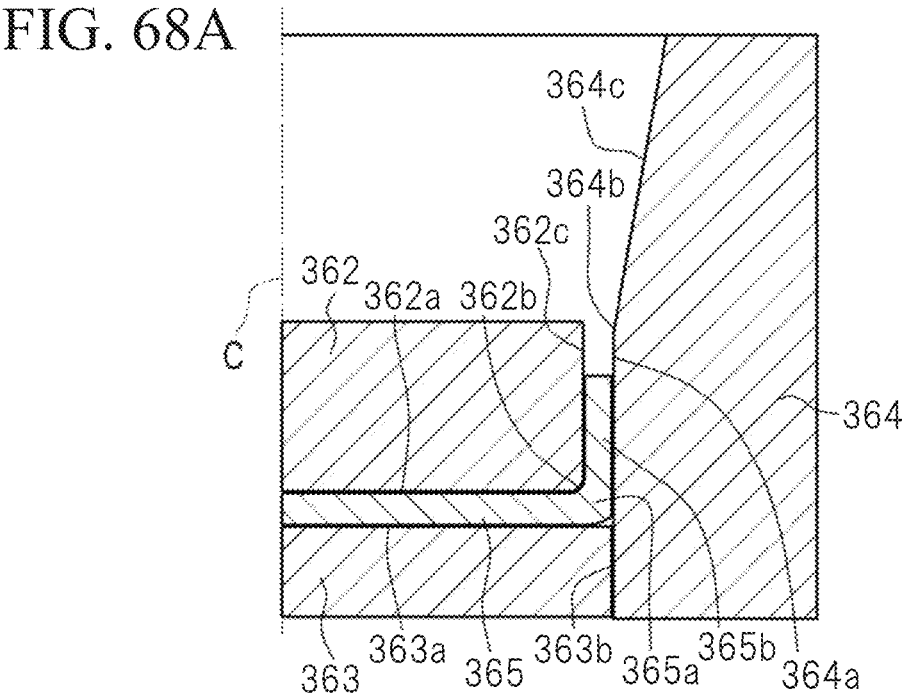
FIG. 68A is a cross-sectional view illustrating a state after forming in the diameter-reducing process of the method of manufacturing a tooth-shaped component according to the fourth embodiment.

FIG. 67 as illustrated in, while having the second diameter-increased cylindrical container 355 formed in the diameter-reducing process, as the workpiece, the second diameter-increased cylindrical container 355 is positioned in the flat surface portion 363a of the counter punch 363 such that the member axis of the second diameter-increased cylindrical container 355 coincides with the central axis C of the press machine, and the bottom surface portion 355a of the second diameter-increased cylindrical container 355 is clamped between the flat surface portion 362a of the punch 362 and the flat surface portion 363a of the counter punch 363. In this state, the punch 362 and the counter punch 363 are moved downward, thereby forming a diameter-reduced cylindrical container 365, as illustrated in FIG. 68A. That is, as illustrated in FIG. 68A, in the side surface portion 355 of the second diameter-increased cylindrical container 355 which is the workpiece, the diameter-increased side surface portion 345a increased in diameter in the diameter-increasing process is reduced in diameter due to the slope portion 364c of the die 364 (hereinafter, this portion will be referred to as a diameter-reduced side surface portion 365b). A corner portion 365a of the diameter-reduced cylindrical container 365 is increased in thickness such that an external shape of the corner portion 365a of the diameter-reduced cylindrical container 365 satisfies the following conditional expression (1).

Figure 68B:
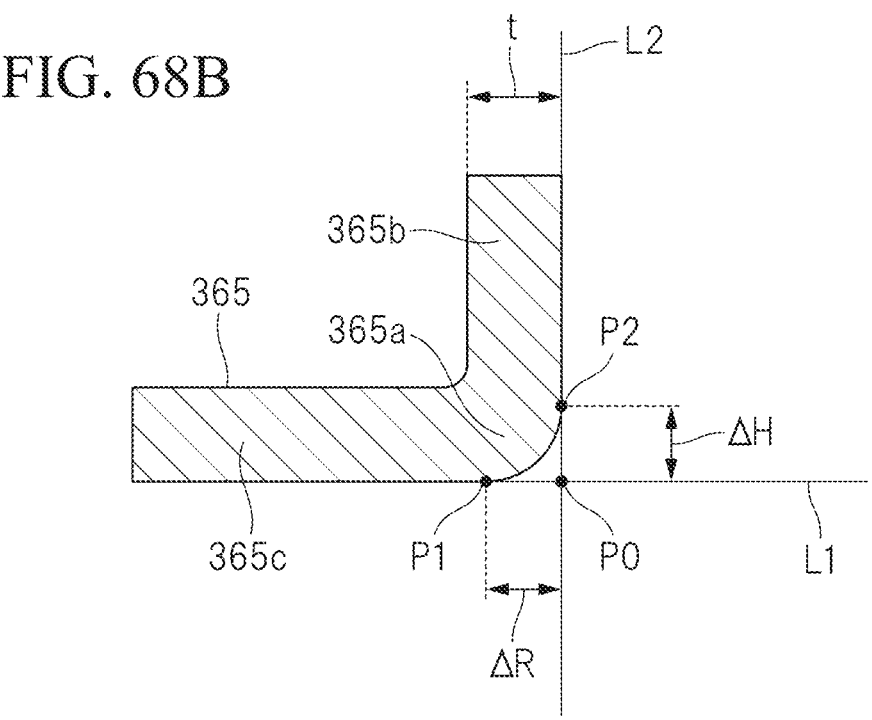
FIG. 68B is a view describing an external shape of a corner portion of a diameter-reduced cylindrical container obtained through the diameter-reducing process.

Here, as illustrated in FIG. 68B, in a case where the diameter-reduced cylindrical container 365 is viewed in a cross section including a central axis direction and a radial direction of the diameter-reduced cylindrical container 365, an intersection point of a straight line L1 in parallel contact with a bottom surface portion 365c of the diameter-reduced cylindrical container 365, and a straight line L2 in parallel contact with the side surface portion 365b of the diameter-reduced cylindrical container 365 is defined as P0. In addition, as illustrated in FIG. 68B, a point at which the straight line L1 starts being separated from the bottom surface portion 365c of the diameter-reduced cylindrical container 365 is defined as P1, and a point at which the straight line L2 starts being separated from the side surface portion 365b of the diameter-reduced cylindrical container 365 is defined as P2. Moreover, as illustrated in FIG. 68B, a length between the intersection point P0 and the point P1 on the straight line L1 is defined as ΔR, and a length between the intersection point P0 and the point P2 on the straight line L2 is defined as ΔH.

The conditional expression (1) is expressed as follows by using a plate thickness t of the diameter-reduced cylindrical container 365, and the lengths ΔR and ΔH.

$$(\Delta R + \Delta H) \leq 2t \quad (1)$$

That is, when the corner portion 365a of the diameter-reduced cylindrical container 365 is increased in thickness such that the external shape of the corner portion 365a of the diameter-reduced cylindrical container 365 satisfies the conditional expression (1), the external angle of the corner portion 365a has a value close to a right angle.

In order to cause the external angle of corner portion 365a of the diameter-reduced cylindrical container 365 to have a value closer to a right angle, it is preferable that the corner portion 365a of the diameter-reduced cylindrical container 365 be increased in thickness such that the external shape of the corner portion 365a of the diameter-reduced cylindrical container 365 satisfies the following conditional expression (2).

$$(\Delta R + \Delta H) \leq 1.5t \quad (2)$$

The reason for causing the desirable value for the radius Rd of the peak sites 342f of the side surface portion 342e of the first punch 342 in the diameter-increasing process to range from 1.08 times to 1.17 times the inner radius Rc of the tooth tip portions 321a will be described below. When the radius Rd of the peak sites 342f is less than 1.08 times the inner radius Rc of the tooth tip portions 321a, the reduced amount of the diameter in the diameter-reducing process is small, and the corner portion 365a is insufficiently increased in thickness, thereby resulting in a superposition defect in the succeeding tooth shape-forming process. Meanwhile, when the radius Rd of the peak sites 342f exceeds 1.17 times the inner radius Rc of the tooth tips 321a, the side surface portion 355b is excessively thin in the diameter-increasing process. As a result, the corner portion 365a is insufficiently increased in thickness, thereby resulting in a superposition defect in the succeeding tooth shape-forming process.

(Rough Tooth Shape-Forming Process)

FIGS. 69 to 72 illustrate states before forming starts in the rough tooth shape-forming process. With reference to FIGS. 69 to 72, the press machine includes a rough tooth shape-forming inner punch 372, a rough tooth shape-forming outer punch 373 disposed in an outer circumference of the inner punch 372, a rough tooth shape-forming counter punch 374, and a rough tooth shape-forming die 375 disposed in an outer circumference of the counter punch 374, having the coaxially disposed central axes C. The counter punch 374 and the die 375 are disposed so as to face the inner punch 372 and the outer punch 373.

Figure 69:
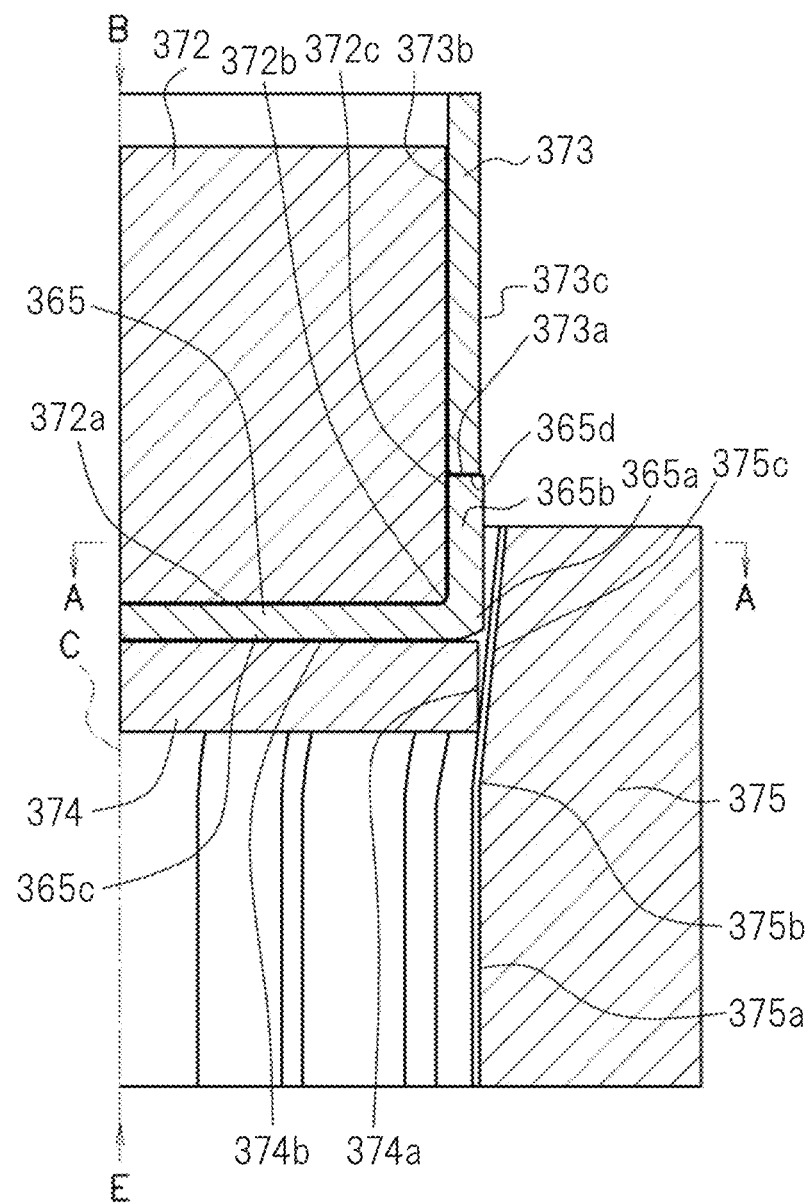
FIG. 69 is a view illustrating a state before forming starts in a rough tooth shape-forming process of the method of manufacturing a tooth-shaped component according to the fourth embodiment and is a D-D cross-sectional view of FIG. 71.
Figure 70:
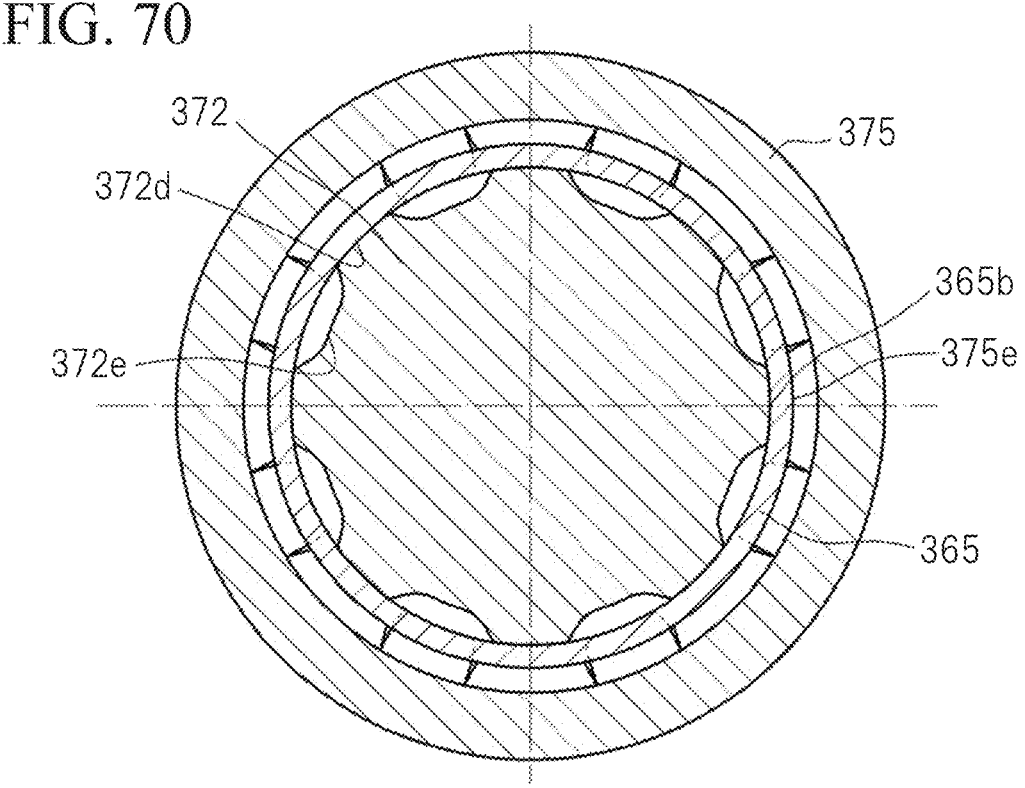
FIG. 70 is a view illustrating the state before forming starts in the rough tooth shape-forming process of the method of manufacturing a tooth-shaped component according to the fourth embodiment and is an A-A cross-sectional plan view of FIG. 69.

The inner punch 372 has a flat surface portion 372a parallel to the radial direction orthogonal to the central axis C, a curved surface portion 372b provided at an outer circumferential edge of the flat surface portion 372a, and a side surface portion 372c continued via the flat surface portion 372a and the curved surface portion 372b and extending in an upward direction (a first direction) of FIG. 69 parallel to the central axis C. In the side surface portion 372c, in order to form the tooth tip portions 321a and the tooth bottom portions 321b, peak sites 372d and valley sites 372e elongated in the first direction are alternately formed in the circumferential direction with predetermined spaces among thereof. The inner punch 372 is a movable type which can be lifted and lowered by a mechanically driven-type (hydraulic-type, servo-motor-type, and the like) driving source (not illustrated).

The die 375 has a side surface portion 375a extending in the first direction, a curved surface portion 375b provided in an upper end portion of the side surface portion 375a, and a slope portion 375c continued via the side surface portion 375a and the curved surface portion 375b and widened in the radial direction orthogonal to the central axis toward the first direction. In the side surface portion 375a, in order to form the tooth tip portions 321a and the tooth bottom portions 321b, peak sites 375d and valley sites 375e elongated in the first direction are alternately formed in the circumferential direction with predetermined spaces among thereof. The die 375 is a fixed type.

Figure 71:
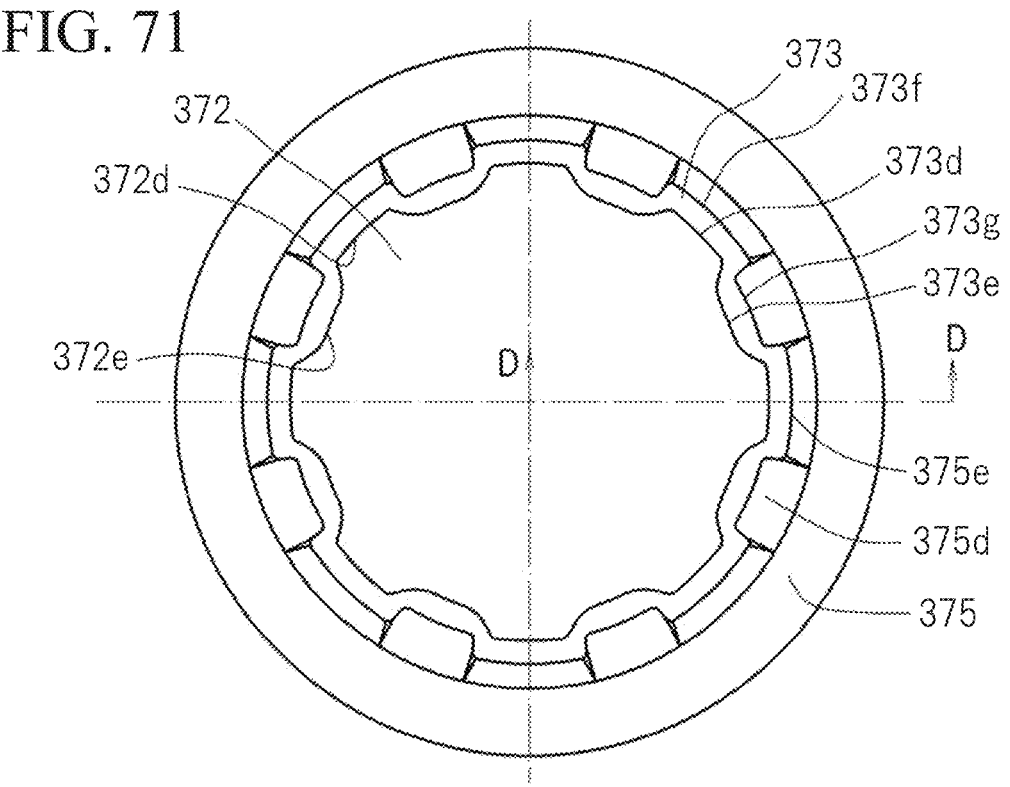
FIG. 71 is a view illustrating the state before forming starts in the rough tooth shape-forming process of the method of manufacturing a tooth-shaped component according to the fourth embodiment and is a B-directional plan view of FIG. 69.
Figure 72:
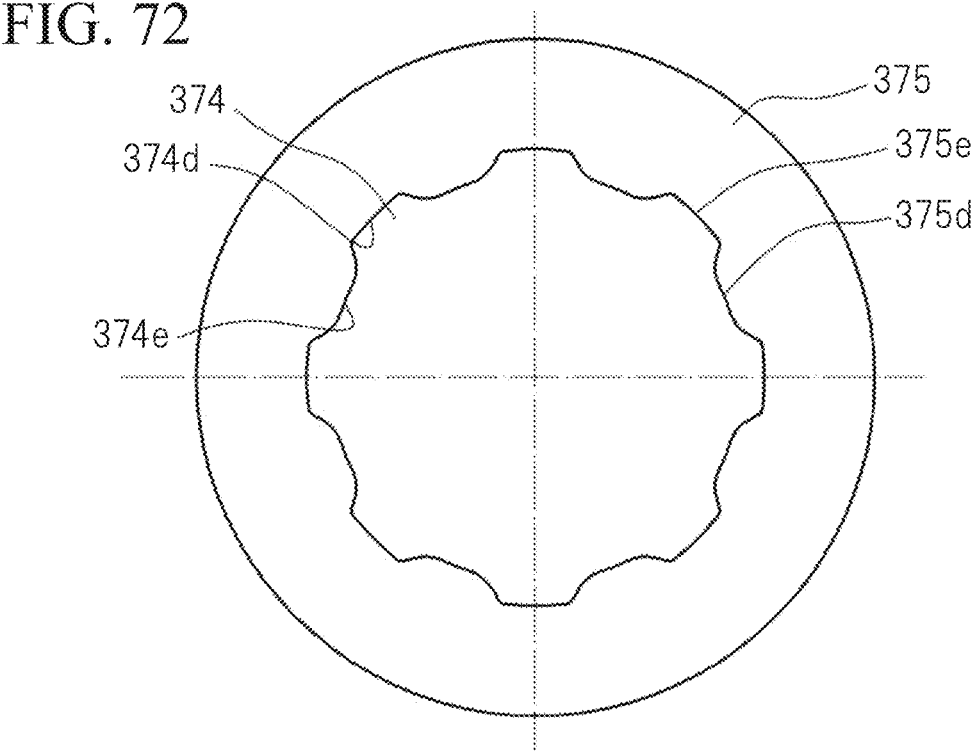
FIG. 72 is a view illustrating the state before forming starts in the rough tooth shape-forming process of the method of manufacturing a tooth-shaped component according to the fourth embodiment and is an E-directional bottom view of FIG. 69.

As illustrated in FIG. 71, the inner punch 372 and the die 375 are disposed such that the peak sites 372d of the inner punch 372 face the valley sites 375e of the die 375, in other words, the valley sites 372e of the inner punch 372 face the peak sites 375d of the die 375.

The outer punch 373 has a flat surface portion 373a parallel to the radial direction orthogonal to the central axis C, a first side surface portion 373b continued to an inner edge portion of the flat surface portion 373a and extending in the first direction, and a second side surface portion 373c continued to an outer edge portion of the flat surface portion 373a and extending in the first direction. In the first side surface portion 373b, along the side surface portion 372c of the inner punch 372, peak sites 373d and valley sites 373e elongated in the first direction are alternately formed in the circumferential direction with predetermined spaces among thereof. In addition, in the second side surface portion 373c, along the side surface portion 375a of the die 375, peak sites 373f and valley sites 373g elongated in the first direction are alternately formed in the circumferential direction with predetermined spaces among thereof. The outer punch 373 is a movable type which can be lifted and lowered by a mechanically driven-type (hydraulic-type, servo-motor-type, and the like) driving source (not illustrated).

The counter punch 374 has a side surface portion 374a extending in the first direction, and a flat surface portion 374b continued to the side surface portion 374a and parallel to the radial direction orthogonal to the central axis C. In the side surface portion 374a, along the side surface portion 375a of the die 375, peak sites 374d and valley sites 374e elongated in the first direction are alternately formed in the circumferential direction with predetermined spaces among thereof. The counter punch 374 is a movable type which can be lifted and lowered by a mechanically driven-type (hydraulic-type, servo-motor-type, and the like) driving source (not illustrated).

Figure 73:
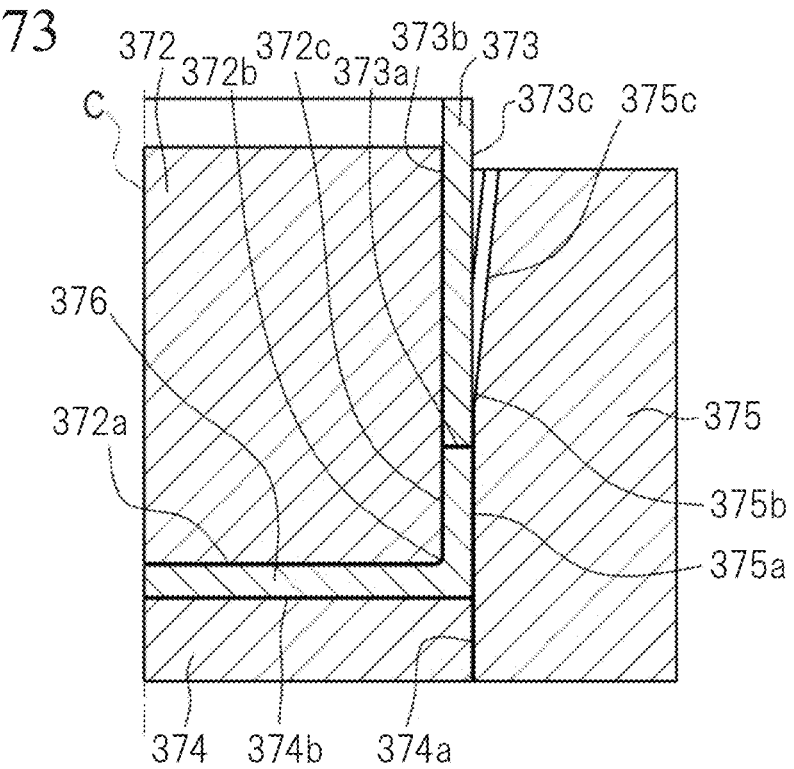
FIG. 73 is a cross-sectional view illustrating a state after forming in the rough tooth shape-forming process of the method of manufacturing a tooth-shaped component according to the fourth embodiment.
Figure 74:
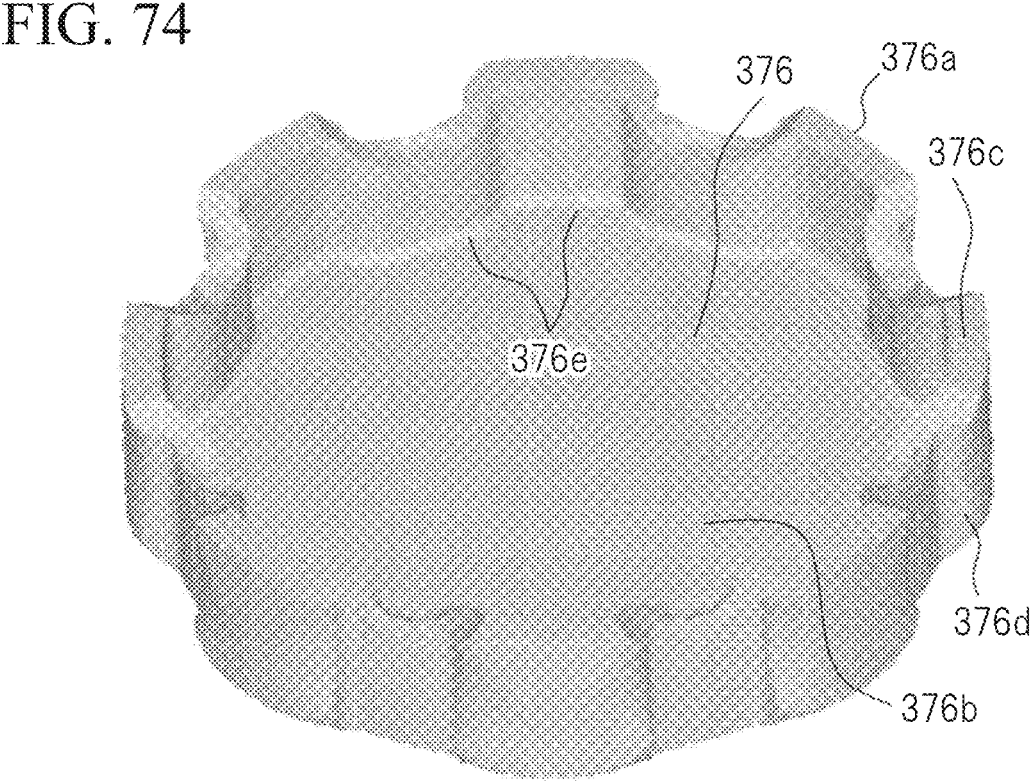
FIG. 74 is a perspective view illustrating a rough tooth shape-formed product formed through the rough tooth shape-forming process.

As illustrated in FIGS. 69 to 72, while having the diameter-reduced cylindrical container 365 formed in the diameter-reducing process, as the workpiece, the diameter-reduced cylindrical container 365 is positioned in the flat surface portion 374b of the counter punch 374 such that the member axis of the diameter-reduced cylindrical container 365 coincides with the central axis C of the press machine, and the bottom surface portion 365c of the diameter-reduced cylindrical container 365 is clamped between the flat surface portion 372a of the inner punch 372 and the flat surface portion 374b of the counter punch 374. In this case, the diameter-reduced side surface portion 365b is positioned in the valley sites 375e of the die 375. In addition, the flat surface portion 373a of the outer punch 373 is caused to abut an opening end 365d of the diameter-reduced cylindrical container 365. In this state, the inner punch 372, the outer punch 373, and the counter punch 374 are moved downward until the flat surface portion 373a of the outer punch 373 passes through the curved surface portion 375b of the die 375, and a rough tooth shape is formed in the diameter-reduced side surface portion 365b (the parts corresponding to the projection portions 335a realized by the deformed peak portions 331b) of the diameter-reduced cylindrical container 365, thereby forming a rough tooth shape-formed product 376, as illustrated in FIG. 73. FIG. 74 illustrates a view of the appearance of the rough tooth shape-formed product 376.

(Complete Tooth Shape-Forming Process)

Figure 75:
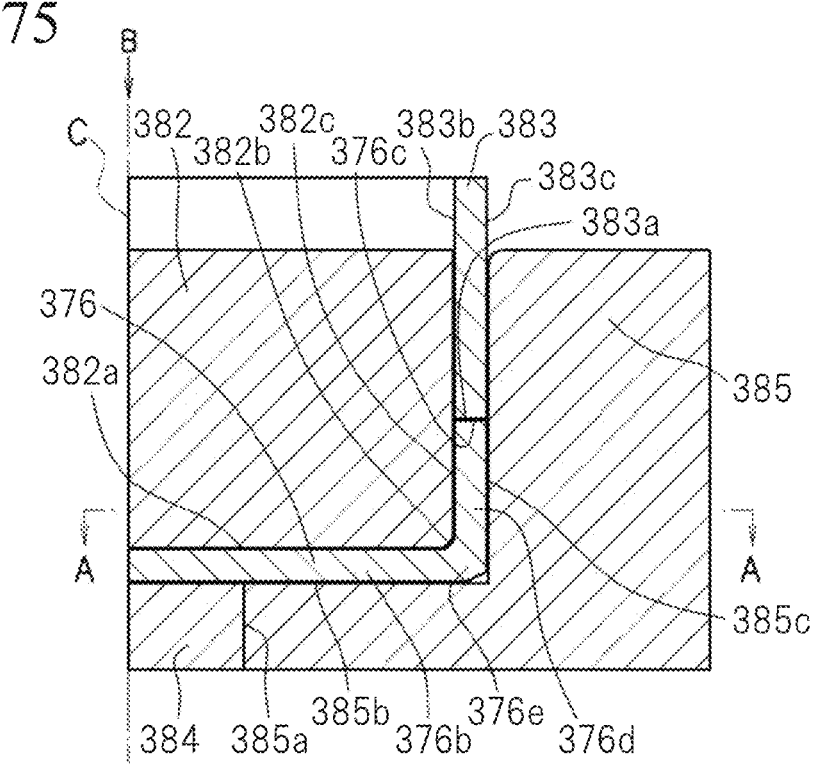
FIG. 75 is a view illustrating a state before forming starts in a complete tooth shape-forming process of the method of manufacturing a tooth-shaped component according to the fourth embodiment and is a D-D cross-sectional view of FIG. 77.
Figure 76:
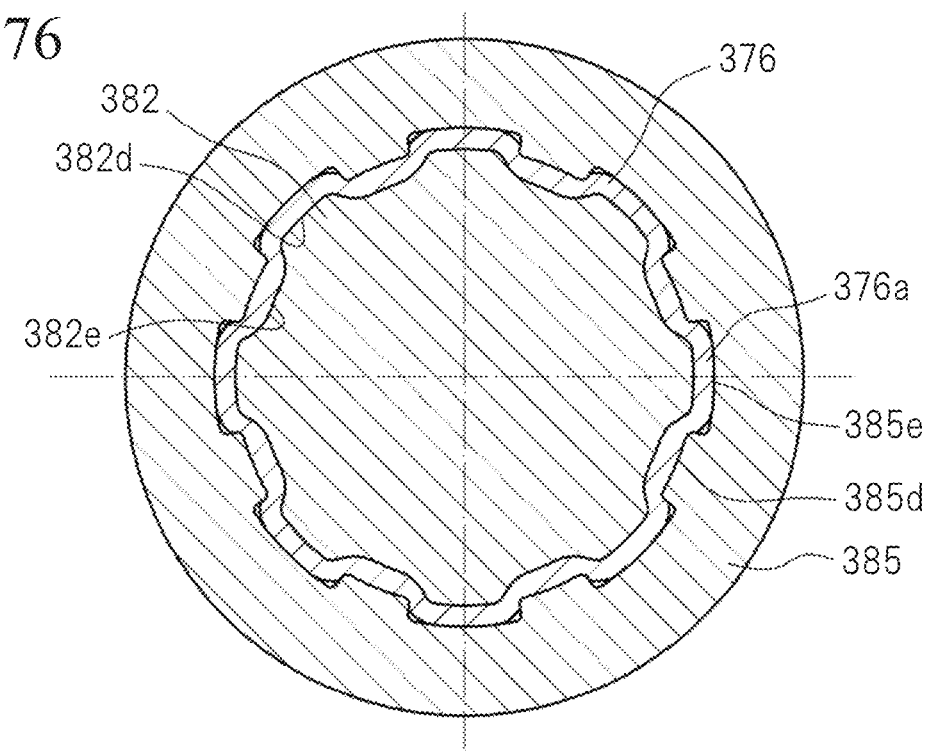
FIG. 76 is a view illustrating the state before forming starts in the complete tooth shape-forming process of the method of manufacturing a tooth-shaped component according to the fourth embodiment and is an A-A cross-sectional plan view of FIG. 75.
Figure 77:
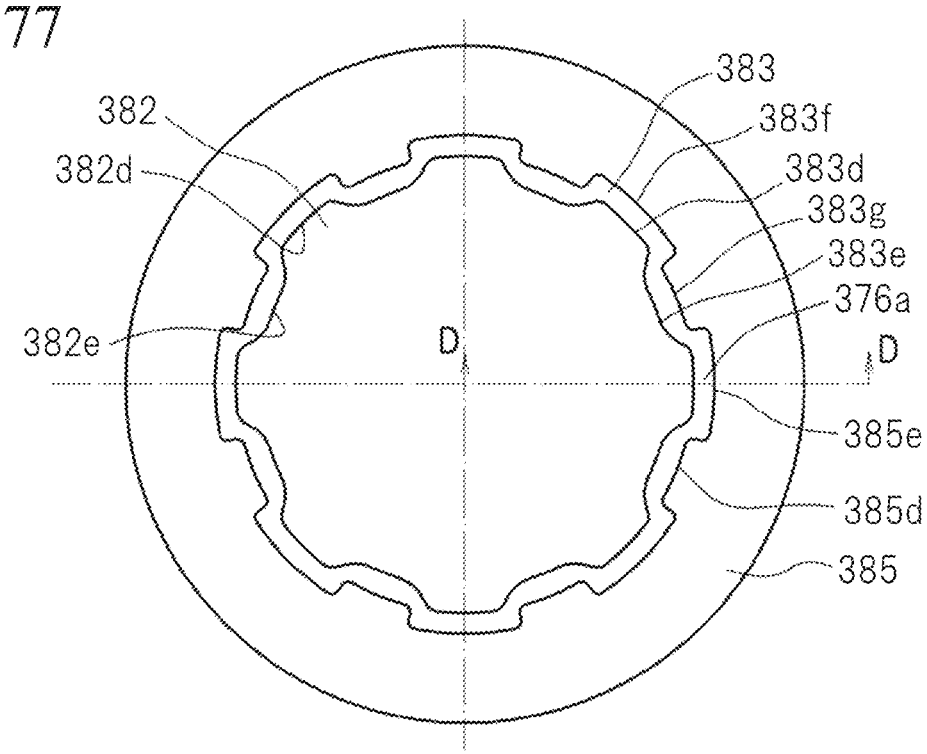
FIG. 77 is a view illustrating the state before forming starts in the complete tooth shape-forming process of the method of manufacturing a tooth-shaped component according to the fourth embodiment and is a B-directional plan view of FIG. 75.

FIGS. 75 to 77 illustrate states before forming starts in the complete tooth shape-forming process succeeding the rough tooth shape-forming process. With reference to FIGS. 75 to 77, the press machine includes a complete tooth shape-forming inner punch 382, a complete tooth shape-forming outer punch 383 disposed in an outer circumference of the inner punch 382, a complete tooth shape-forming knockout 384, and a complete tooth shape-forming die 385 disposed in an outer circumference of the knockout 384, having the coaxially disposed central axes C. The knockout 384 and the die 385 are disposed so as to face the inner punch 382 and the outer punch 383.

The inner punch 382 has a flat surface portion 382a parallel to the radial direction orthogonal to the central axis C, a curved surface portion 382b provided at an outer circumferential edge of the flat surface portion 382a, and a side surface portion 382c continued via the flat surface portion 382a and the curved surface portion 382b and extending in an upward direction (a first direction) of FIG. 75 parallel to the central axis C. The side surface portion 382c has the same shape and dimensions of a cross section orthogonal to the central axis C as the side surface portion 372c of the inner punch 372 of the rough tooth shape-forming process, and peak sites 382d and valley sites 382e elongated in the first direction are alternately formed in the circumferential direction with predetermined spaces among thereof. The inner punch 382 is a movable type which can be lifted and lowered by a mechanically driven-type (hydraulic-type, servo-motor-type, and the like) driving source (not illustrated).

The die 385 has a first side surface portion 385a extending in the first direction, a flat surface portion 385b continued to the first side surface portion 385a and parallel to the radial direction orthogonal to the central axis C, and a second side surface portion 385c continued to the flat surface portion 385b and extending in the first direction. The second side surface portion 385c has the same shape and dimensions of a cross section orthogonal to the central axis C as the side surface portion 375a of the die 375 of the rough tooth shape-forming process, and peak sites 385d and valley sites 385e elongated in the first direction are alternately formed in the circumferential direction with predetermined spaces among thereof. The die 385 is a fixed type.

As illustrated in FIG. 76, the inner punch 382 and the die 385 are disposed such that the peak sites 382d of the inner punch 382 face the valley sites 385e of the die 385, in other words, the valley sites 382e of the inner punch 382 face the peak sites 385d of the die 385.

The outer punch 383 has a flat surface portion 383a parallel to the radial direction orthogonal to the central axis C, a first side surface portion 383b continued to an inner edge portion of the flat surface portion 383a and extending in the first direction, and a second side surface portion 383c continued to an outer edge portion of the flat surface portion 383a and extending in the first direction. The first side surface portion 383b has the same shape and dimensions of a cross section orthogonal to the central axis C as the side surface portion 373b of the outer punch 373 of the rough tooth shape-forming process, and peak sites 383d and valley sites 383e elongated in the first direction are alternately formed in the circumferential direction with predetermined spaces among thereof. In addition, the second side surface portion 383c has the same shape and dimensions of a cross section orthogonal to the central axis C as the side surface portion 373c of the outer punch 373 of the rough tooth shape-forming process, peak sites 383f and valley sites 383g elongated in the first direction are alternately formed in the circumferential direction with predetermined spaces among thereof. The outer punch 383 is a movable type which can be lifted and lowered by a mechanically driven-type (hydraulic-type, servo-motor-type, and the like) driving source (not illustrated).

The knockout 384 has a columnar shape and is used for detaching a formed product from the die and punch. The knockout 384 is a movable type which can be lifted and lowered by a driving source (not illustrated).

Figure 78:
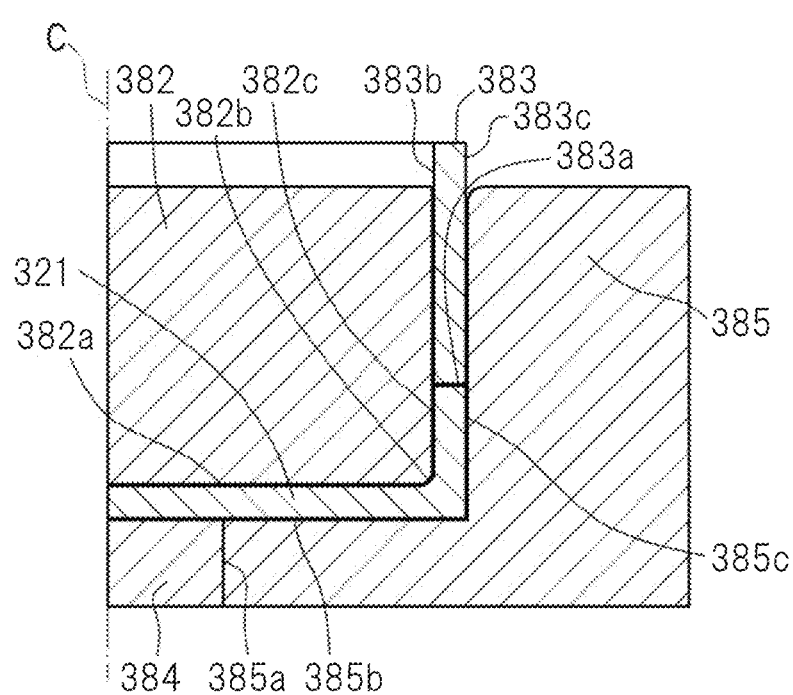
FIG. 78 is a cross-sectional view illustrating a state after forming in the complete tooth shape-forming process of the method of manufacturing a tooth-shaped component according to the fourth embodiment.

As illustrated in FIGS. 75 to 77, while having the rough tooth shape-formed product 376 formed in the rough tooth shape-forming process, as the workpiece, a bottom surface portion 376b of the rough tooth shape-formed product 376 is clamped between the flat surface portion 382a of the inner punch 382 and the flat surface portion 385b of the die 385 such that the member axis of the rough tooth shape-formed product 376 coincides with the central axis C of the press machine. In this case, rough tooth tip portions 376a of the rough tooth shape-formed product 376 are positioned in the valley sites 385e of the die 385. In this state, an opening end 376c of the rough tooth shape-formed product 376 is pressed downward by the flat surface portion 383a of the outer punch 383 so as to compress a side surface portion 376d of the rough tooth shape-formed product 376. Accordingly, as illustrated in FIG. 78, the inside of a space surrounded by the inner punch 382, the outer punch 383, the knockout 384, and the die 385 is filled with the material. As a result, complete tooth shapes are formed as the tooth tip portions 321a in the parts corresponding to the projection portions 335a realized by the deformed peak portions 331b in the side surface portion 376d of the rough tooth shape-formed product 376, and the tooth bottom portions 321b are formed in other parts of the side surface portion 376d (the parts corresponding to the valley portions 331a) of the rough tooth shape-formed product 376. According to each of the processes described above, the tooth-shaped component 321 having the bottom surface portion 321c, the side surface portion 321d, the tooth tip portions 321a, and the tooth bottom portions 321b is completed.

Figure 79:
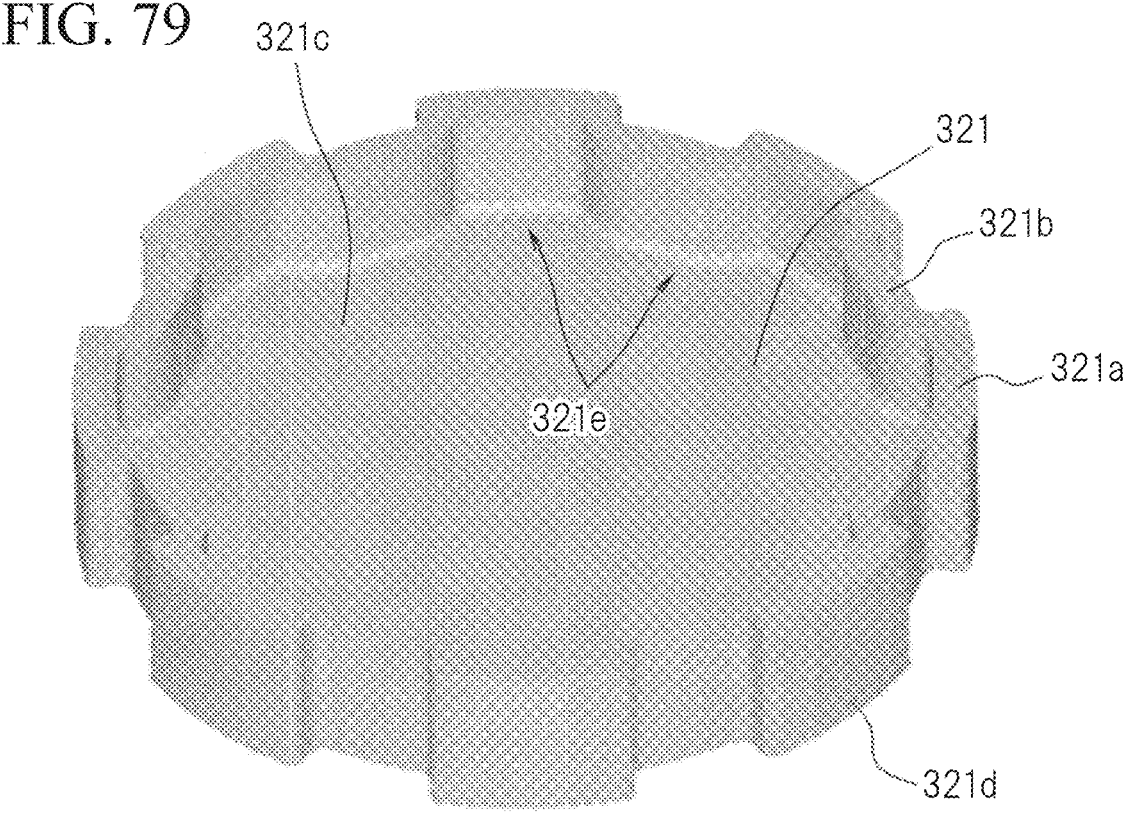
FIG. 79 is a perspective view illustrating a tooth-shaped component formed through the complete tooth shape-forming process.

FIG. 79 illustrates a view of the appearance of the tooth-shaped component 321 after the tooth shapes are formed. There is no occurrence of a superposition defect on an inner surface 321e of the corner portion of the tooth-shaped component 321. Before the tooth shapes are formed, forming is performed such that the curved surface portion 382b of the complete tooth shape-forming inner punch 382 and a corner portion 376e of the rough tooth shape-formed product 376 come into contact with each other, and the external angle of the corner portion 365a of the diameter-reduced cylindrical container 365 is adjusted to a value close to a right angle. Accordingly, in the complete tooth shape-forming process, it is possible to reduce a gap between a place in the vicinity of the corner portion formed by a boundary of the flat surface portion 385b and the side surface portion 385c of the complete tooth shape-forming die 385, and the corner portion 376e of the rough tooth shape-formed product 376. As a result, the corner portion 376e of the rough tooth shape-formed product 376 is not separated from the curved surface portion 382b of the inner punch 382 in the middle of the complete tooth shape-forming process. Therefore, after the complete tooth shape-forming process ends, it is possible to obtain the tooth-shaped component 321 having no superposition defect in a boundary between an upper surface of the bottom surface portion 321c and the inner circumferential surface of the side wall portion 321d.

In addition, in the present embodiment, the cold forging is employed as the method of manufacturing a tooth-shaped component. Therefore, compared to a tooth-shaped component manufactured through the hot forging, it is possible to obtain the tooth-shaped component 321 having no draft and having the dimensional accuracy ten times more accurate in thickness, without performing the machining process. That is, according to the method of manufacturing a tooth-shaped component in the present embodiment, it is possible to obtain the high-quality tooth-shaped component 321 having no superposition defect and draft and having the dimensional accuracy in thickness ranging from ±0.05 mm to ±0.3 mm.

Fifth Embodiment

Next, a fifth embodiment of the present invention will be described.

Figure 80A:
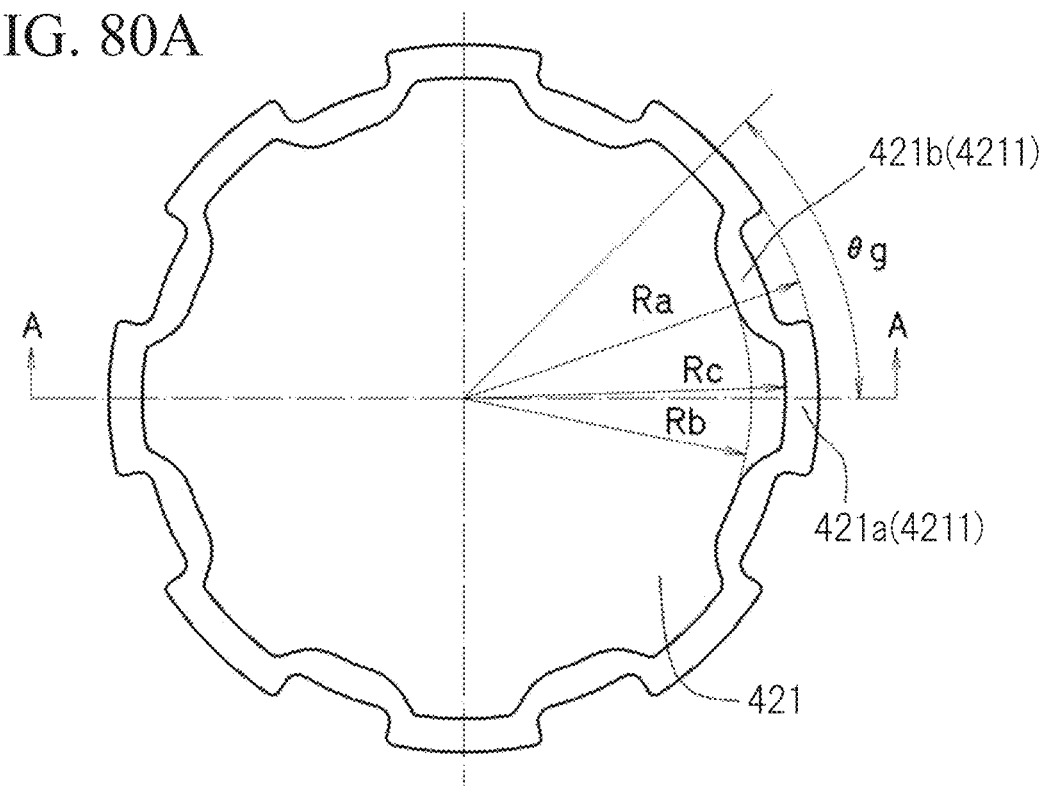
FIG. 80A is a plan view of a tooth-shaped component formed through a method of manufacturing a tooth-shaped component according to a fifth embodiment.
Figure 80B:
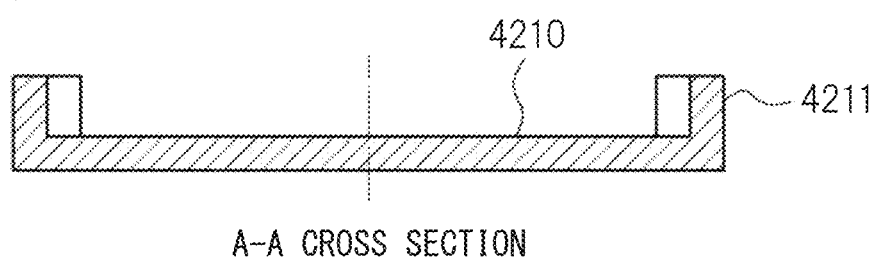
FIG. 80B is an A-A cross-sectional view of the tooth-shaped component illustrated in FIG. 80A.

FIG. 80A is a plan view of a tooth-shaped component 421 manufactured through a method of manufacturing a tooth-shaped component according to the fifth embodiment. FIG. 80B is an A-A cross-sectional view of the tooth-shaped component 421 illustrated in FIG. 80A. As illustrated in FIGS. 80A and 80B, the tooth-shaped component 421 is a component having a bottomed cylindrical shape of which one end portion is open and of which the other end portion is sealed in a direction of the member axis (the one-dot chain line illustrated in FIG. 80B).

The tooth-shaped component 421 has a container bottom portion 4210 and a side surface portion 4211. The side surface portion 4211 is provided so as to rise from an outer edge portion of the container bottom portion 4210. An external angle of a corner portion formed by the container bottom portion 4210 and the side surface portion 4211 is substantially a right angle. The side surface portion 4211 has tooth tip portions 421a and tooth bottom portions 421b provided so as to alternately appear along a circumferential direction having the member axis as the center. The present embodiment illustrates a case where there are eight of the tooth tip portions 421a and the tooth bottom portions 421b each. However, the numbers of the tooth tip portions 421a and the tooth bottom portions 421b (that is, the number of teeth of the tooth-shaped component 421) are not limited to eight as long as there are a plurality thereof.

The tooth tip portions 421a are parts which protrude further outward than the tooth bottom portions 421b in a radial direction having the member axis as the center. More specifically, as illustrated in FIG. 80A, outer circumferential surfaces of the tooth tip portions 421a are positioned on the circumference of a radius Ra having the member axis as the center. Inner circumferential surfaces of the tooth tip portions 421a and outer circumferential surfaces of the tooth bottom portions 421b are positioned on the circumference of a radius Re having the member axis as the center. Inner circumferential surfaces of the tooth bottom portions 421b are positioned on the circumference of a radius Rb having the member axis as the center. Hereinafter, the radius Ra will be referred to as an outer radius of the tooth tip portions 421a. The radius Rc will be referred to as an inner radius of the tooth tip portions 421a. The radius Rb will be referred to as an inner radius of the tooth bottom portions 421b.

In addition, in FIG. 80A, θg indicates an angle between the tooth tip portions 421a adjacent to each other along the circumferential direction having the member axis as the center.

The tooth-shaped component 421 manufactured through the method of manufacturing a tooth-shaped component according to the present embodiment is characterized by naturally having no superposition defect, having no draft, and having the dimensional accuracy in thickness ranging from ±0.05 mm to ±0.3 mm.

In the present embodiment, cold forging is employed as the method of manufacturing a tooth-shaped component (will be described later in detail). Therefore, compared to a tooth-shaped component manufactured through hot forging, it is possible to obtain the tooth-shaped component 421 having no draft and having the dimensional accuracy ten times more accurate in thickness, without performing a machining process. That is, according to the method of manufacturing a tooth-shaped component in the present embodiment, it is possible to obtain the high-quality tooth-shaped component 421 having no superposition defect and draft and having the dimensional accuracy in thickness ranging from ±0.05 mm to ±0.3 mm.

In order to manufacture such a tooth-shaped component 421, the method of manufacturing a tooth-shaped component according to the fifth embodiment includes a drawing process, a diameter-increasing process, a diameter-reducing process, and a tooth shape-forming process. Hereinafter, each of the processes will be described in detail. As described above, in the present embodiment, the cold forging is employed as the method of manufacturing a tooth-shaped component. Therefore, each of the processes is executed at a normal temperature.

(Drawing Process)

Figure 81:
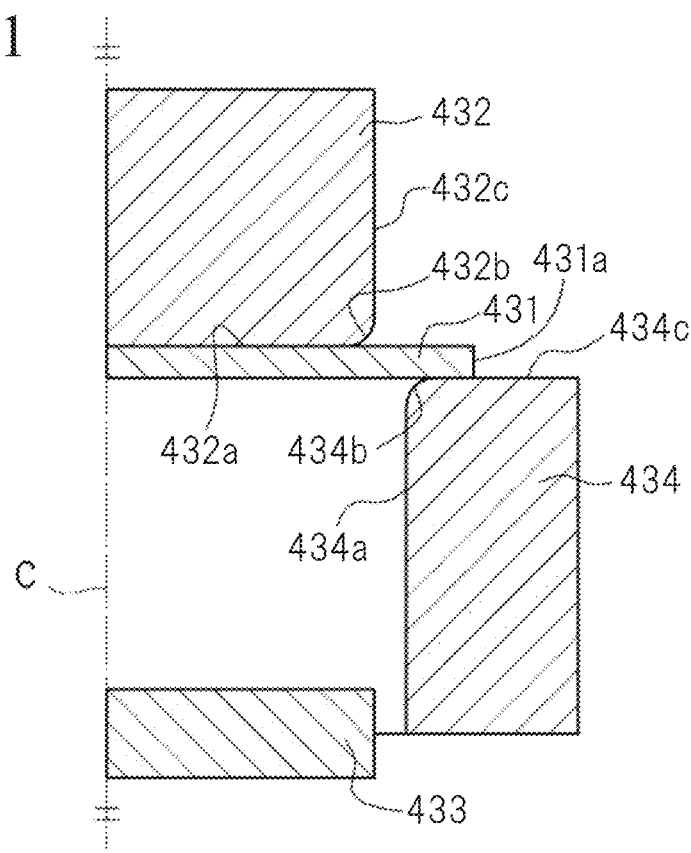
FIG. 81 is a cross-sectional view illustrating a state before a drawing process of the method of manufacturing a tooth-shaped component according to the fifth embodiment.
Figure 82:
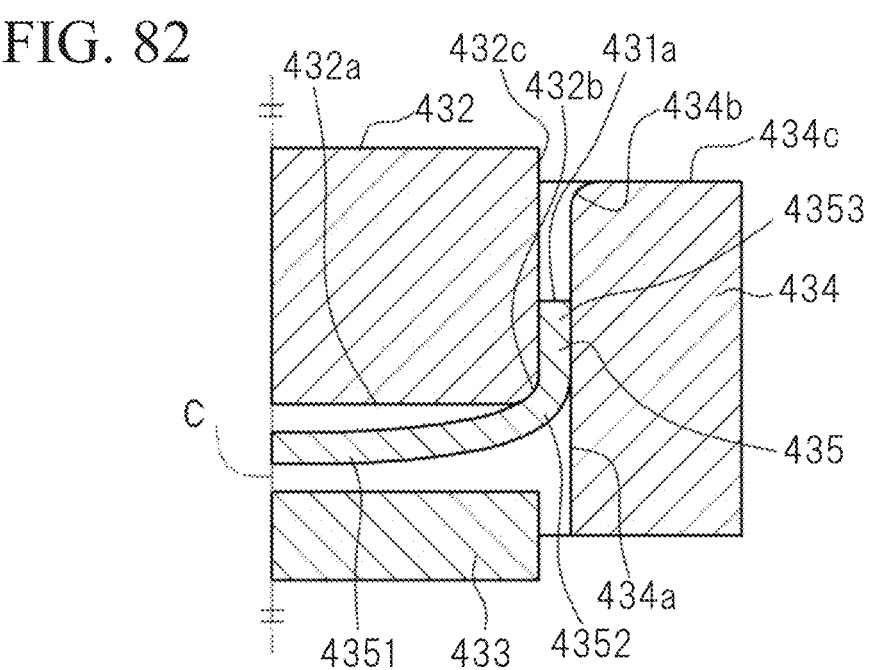
FIG. 82 is a cross-sectional view illustrating a state after the drawing process of the method of manufacturing a tooth-shaped component according to the fifth embodiment.

FIGS. 81 and 82 are cross-sectional views respectively and schematically illustrating states before forming and after forming in the drawing process. As illustrated in FIGS. 81 and 82, a press machine used in the drawing process includes a punch 432, a knockout 433, and a die 434 having the coaxially disposed central axes C. The knockout 433 and the die 434 are disposed so as to face the punch 432.

The punch 432 has a flat surface portion 432a parallel to the radial direction orthogonal to the central axis C, a curved surface portion 432b provided in an outer edge portion of the flat surface portion 432a, and a side surface portion 432c continued via the flat surface portion 432a and the curved surface portion 432b and elongated in an upward direction (the first direction) of FIG. 81 in a direction parallel to the central axis C. The punch 432 is a movable type which can reciprocate (can be lifted and lowered) in a direction parallel to the central axis C by a mechanically driven-type (hydraulic-type, servo-motor-type, and the like) driving source (not illustrated).

The knockout 433 has a columnar shape and is used for detaching a formed product from the die and punch. The knockout 433 is a movable type which can reciprocate (can be lifted and lowered) in a direction parallel to the central axis C by a driving source (not illustrated).

The die 434 has a side surface portion 434a elongated in the first direction, a curved surface portion 434b provided in an upper end portion of the side surface portion 434a, and a flat surface portion 434c elongated in the radial direction orthogonal to the central axis via the side surface portion 434a and the curved surface portion 434b. The die 434 is a fixed type.

In the drawing process, a workpiece 431 which is a flat metal sheet having a circular shape (for example, a steel sheet) is draw-formed, thereby forming a cylindrical container 435. The cylindrical container 435 formed in this drawing process has a container bottom portion 4351 having a substantially circular shape in plan view, a container curved surface 4352 provided in an outer edge portion of the container bottom portion 4351, and a container side surface portion 4353 continued to the container bottom portion 4351 via the container curved surface 4352. First, as illustrated in FIG. 81, the workpiece 431 is positioned in the flat surface portion 434c of the die 434 such that the member axis of the workpiece 431 coincides with the central axis C of the press machine. As illustrated in FIG. 82, the punch 432 is moved downward until an end portion 431a of the workpiece 431 passes through the curved surface portion 434b of the die 434, thereby performing drawing. In this manner, the cylindrical container 435 is formed. After forming the cylindrical container 435, the knockout 433 is lifted, and the cylindrical container 435 is detached from the die 434.

(Diameter-Increasing Process)

Figure 83:
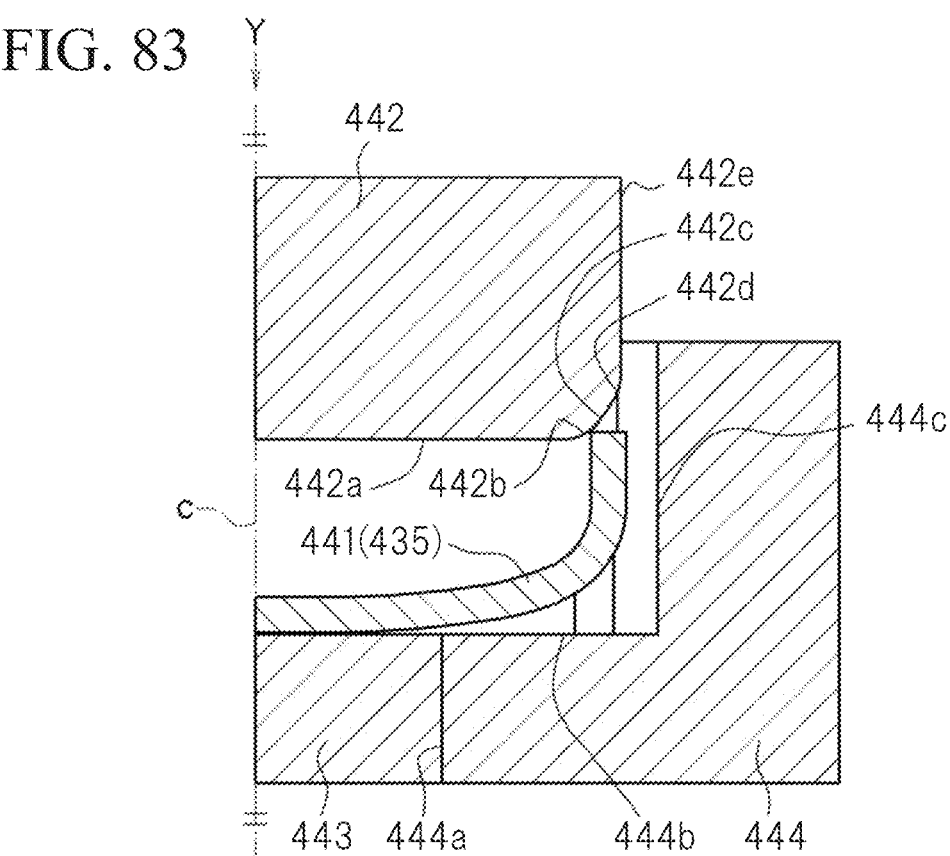
FIG. 83 is a view illustrating a state before a first step of a diameter-increasing process of the method of manufacturing a tooth-shaped component according to the fifth embodiment and is an A-A cross-sectional view of FIG. 84.
Figure 84:
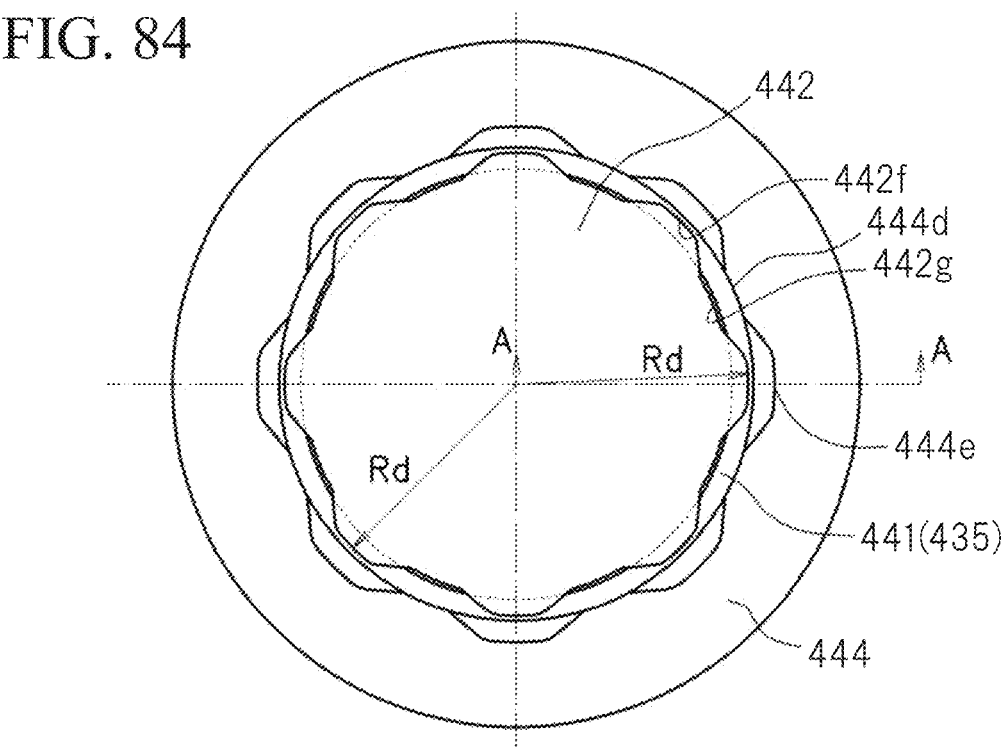
FIG. 84 is a view illustrating the state before the first step of the diameter-increasing process of the method of manufacturing a tooth-shaped component according to the fifth embodiment and is a Y-directional plan view of FIG. 83.

The diameter-increasing process has a first step and a second step. FIGS. 83 and 84 are views schematically illustrating states before the first step of the diameter-increasing process starts. FIG. 83 is an A-A cross-sectional view of FIG. 84, and FIG. 84 is a plan view. As illustrated in FIGS. 83 and 84, the press machine used in the first step of the diameter-increasing process includes a first punch 442, a first knockout 443, and a first die 444, having the coaxially disposed central axes C. The first knockout 443 and the first die 444 are disposed so as to face the first punch 442.

The first punch 442 has a flat surface portion 442a, a first curved surface portion 442b, a slope portion 442c, a second curved surface portion 442d, and a side surface portion 442e. The flat surface portion 442a is a portion parallel to the radial direction orthogonal to the central axis C. The first curved surface portion 442b is provided in an outer edge portion of the flat surface portion 442a. The slope portion 442c is continued via the flat surface portion 442a and the first curved surface portion 442b, is parallel to the central axis C, and is widened in the radial direction orthogonal to the central axis C toward an upward direction (the first direction) of FIG. 83. The second curved surface portion 442d is provided in an upper end portion of the slope portion 442c. The side surface portion 442e is continued via the slope portion 442c and the second curved surface portion 442d and is elongated in the first direction. Moreover, in the side surface portion 442e, a plurality of peak sites 442f and a plurality of valley sites 442g elongated along the first direction are alternately formed in the circumferential direction with predetermined spaces among thereof. The numbers of the peak sites 442f and the valley sites 442g coincide with the numbers of the tooth tip portions 421a and the tooth bottom portions 421b (the number of teeth) of the tooth-shaped component 421. It is desirable that the outer radius Rd of the peak sites 442f (a length between outer circumferential surfaces of the peak sites 442f and the central axis C in the radial direction having the central axis C as the center) ranges from 1.08 times to 1.17 times the inner radius Rc of the tooth tip portions 421a of the tooth-shaped component 421. The reason will be described in the section of the diameter-reducing process. The first punch 442 is a movable type which can reciprocate (can be lifted and lowered) in a direction parallel to the central axis C by a mechanically driven-type (hydraulic-type, servo-motor-type, and the like) driving source (not illustrated).

The first knockout 443 has a columnar shape and is used for detaching a formed product from the die and punch. The first knockout 443 is a movable type which can reciprocate (can be lifted and lowered) in a direction parallel to the central axis C by a driving source (not illustrated).

The first die 444 is a fixed type. The first die 444 has a first side surface portion 444a elongated in the first direction parallel to the central axis C, a flat surface portion 444b continued to the first side surface portion 444a and parallel to the radial direction orthogonal to the central axis C, and a second side surface portion 444c continued to the flat surface portion 444b and elongated in the first direction. The second side surface portion 444c is offset in the radial direction from the side surface portion 442e of the first punch 442 substantially as much as a plate thickness of the workpiece 431 (the metal sheet) and has a plurality of peak sites 444d and a plurality of valley sites 444e alternately arranged in the circumferential direction.

Figure 85:
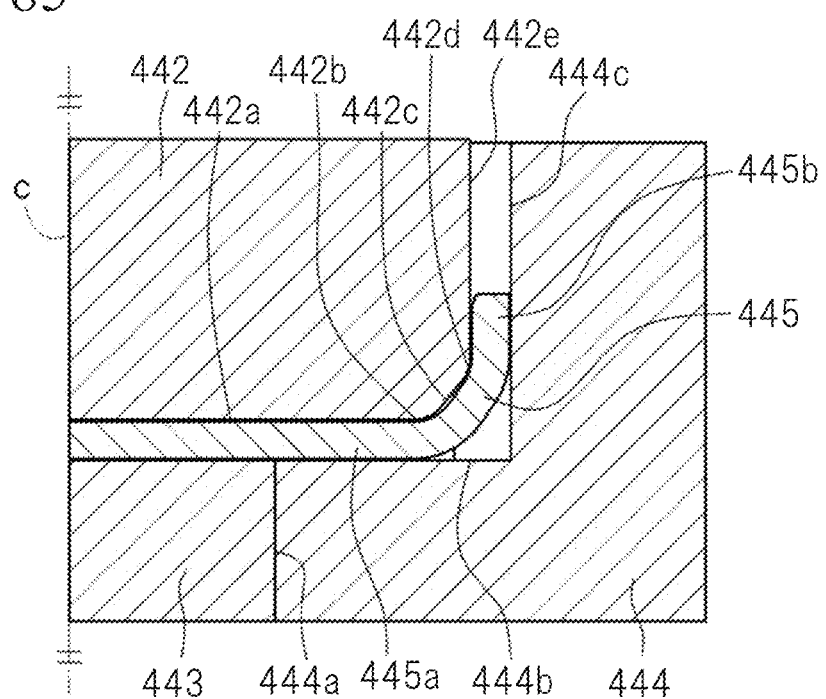
FIG. 85 is a cross-sectional view illustrating a state after the first step of the diameter-increasing process of the method of manufacturing a tooth-shaped component according to the fifth embodiment.
Figure 86A:
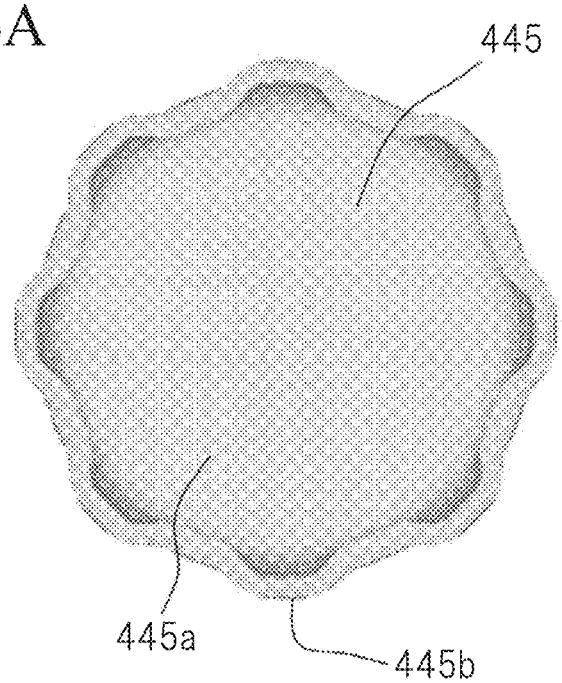
FIG. 86A is a plan view of a first diameter-increased cylindrical container after the first step of the diameter-increasing process.
Figure 86B:
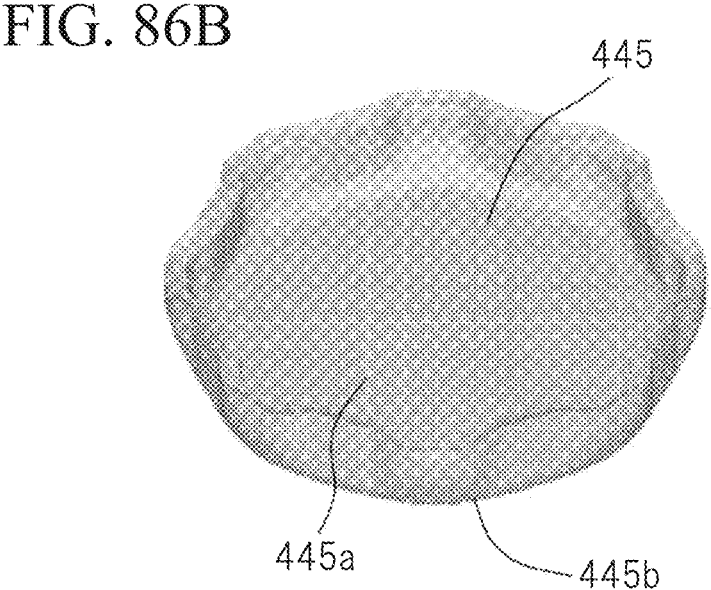
FIG. 86B is a perspective view of the first diameter-increased cylindrical container after the first step of the diameter-increasing process.

In the first step of the diameter-increasing process, as illustrated in FIGS. 83 and 84, while having the cylindrical container 435 formed in the draw-forming process, as a workpiece 441, a first diameter-increased cylindrical container 445 is formed by increasing the diameter of the container side surface portion 4353 of the cylindrical container 435. First, as illustrated in FIGS. 83 and 84, the workpiece 441 is positioned on the first knockout 443 and the first die 444 such that the member axis of the workpiece 441 (the cylindrical container 435) coincides with the central axis C of the press machine. As illustrated in FIG. 85, the first punch 442 is moved downward until the flat surface portion 442a of the first punch 442 comes into contact with a bottom surface portion 445a of the first diameter-increased cylindrical container 445, thereby performing diameter-increasing forming. According to the first step of the diameter-increasing process, a plurality of parts of the container side surface portion 4353 (particular parts in which the tooth tip portions 421a of the tooth-shaped component 421 are to be formed) of the cylindrical container 435 are pushed outward in the radial direction by the peak sites 442f of the first punch 442 and are increased in diameter, thereby realizing a plurality of diameter-increased side surface portions 445b. In this manner, the first diameter-increased cylindrical container 445 having the plurality of diameter-increased side surface portions 445b is formed. FIGS. 86A and 86B are views of the appearance of the first diameter-increased cylindrical container 445 in which the diameter-increased side surface portions 445b are formed through the diameter-increasing process. FIG. 86A is a plan view of the first diameter-increased cylindrical container 445, and FIG. 86B is a perspective view of the first diameter-increased cylindrical container 445. As illustrated in FIGS. 86A and 86B, the first diameter-increased cylindrical container 445 has the plurality of diameter-increased side surface portions 445b in which the tooth tip portions 421a of the tooth-shaped component 421 are formed. After the first step of the diameter-increasing process ends, the first knockout 443 is lifted, and the first diameter-increased cylindrical container 445 is detached from the first die 444.

Figure 87:
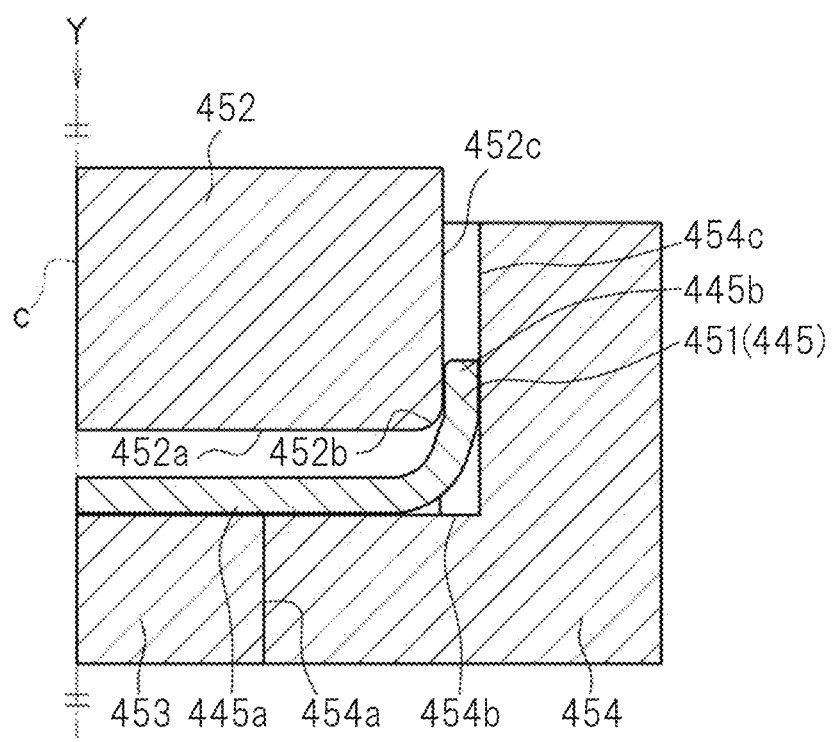
FIG. 87 is a view illustrating a state before a second step of the diameter-increasing process of the method of manufacturing a tooth-shaped component according to the fifth embodiment and is an A-A cross-sectional view of FIG. 88.
Figure 88:
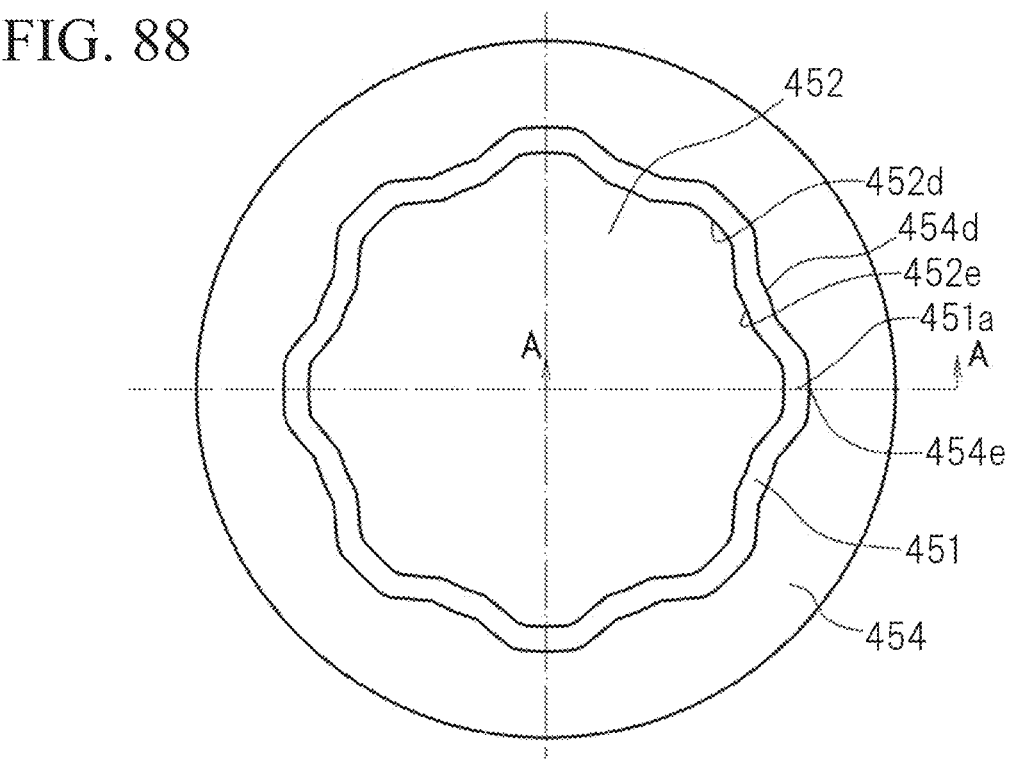
FIG. 88 is a view illustrating the state before the second step of the diameter-increasing process of the method of manufacturing a tooth-shaped component according to the fifth embodiment and is a Y-directional plan view of FIG. 87.

FIGS. 87 and 88 are views schematically illustrating states before forming in the second step of the diameter-increasing process. FIG. 87 is an A-A cross-sectional view of FIG. 88, and FIG. 88 is a plan view. As illustrated in FIGS. 87 and 88, the press machine used in the second step of the diameter-increasing process includes a second punch 452, a second knockout 453, and a second die 454, having the coaxially disposed central axes C. The second knockout 453 and the second die 454 are disposed so as to face the second punch 452.

The second punch 452 has a flat surface portion 452a parallel to the radial direction orthogonal to the central axis C, a curved surface portion 452b provided in an outer edge portion of the flat surface portion 452a, and a side surface portion 452c continued via the flat surface portion 452a and the curved surface portion 452b, parallel to the central axis C, and elongated in an upward direction (the first direction) of FIG. 87. The side surface portion 452c has the same shape and dimensions of a cross section orthogonal to the central axis C as the side surface portion 442e of the first punch 442. In the side surface portion 452c, a plurality of peak sites 452d and a plurality of valley sites 452e elongated along the first direction are alternately formed in the circumferential direction with predetermined spaces among thereof. The numbers of the peak sites 452d and the valley sites 452e coincide with the numbers of the tooth tip portions 421a and the tooth bottom portions 421b (the number of teeth) of the tooth-shaped component 421. The second punch 452 is a movable type which can reciprocate (can be lifted and lowered) in a direction parallel to the central axis C by a mechanically driven-type (hydraulic-type, servo-motor-type, and the like) driving source (not illustrated).

The second knockout 453 has a columnar shape and is used for detaching a formed product from the die and punch. The second knockout 453 is a movable type which can reciprocate (can be lifted and lowered) in a direction parallel to the central axis C by a driving source (not illustrated).

The second die 454 has the same shape and dimensions as the first die 444 of the first step. That is, the second die 454 has a first side surface portion 454a parallel to the central axis C and elongated in the first direction, a flat surface portion 454b parallel to the radial direction orthogonal to the central axis C, and a second side surface portion 454c elongated in the first direction. In the second side surface portion 454c, a plurality of peak sites 454d and a plurality of valley sites 454e elongated in a direction parallel to the central axis C are provided so as to be alternately arranged in the circumferential direction. Similar to the first die 444, the numbers of the plurality of peak sites 454d and the plurality of valley sites 454e coincide with the numbers of the tooth tip portions 421a and the tooth bottom portions 421b (the number of teeth) of the tooth-shaped component 421.

Figure 89:
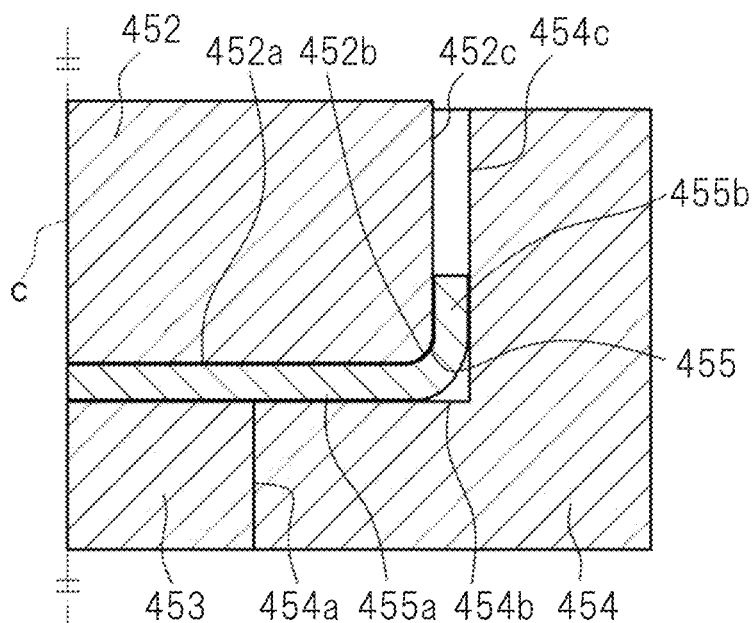
FIG. 89 is a cross-sectional view illustrating a state after the second step of the diameter-increasing process of the method of manufacturing a tooth-shaped component according to the fifth embodiment.

In the second step, while having the first diameter-increased cylindrical container 445 formed in the first step, as a workpiece 451, a second diameter-increased cylindrical container 455 having a shape in which a side surface portion 455b stands upright with respect to a bottom surface portion 455a is formed. First, as illustrated in FIG. 87, the first diameter-increased cylindrical container 445 (the workpiece 451) is positioned on the flat surface portion 454b of the second die 454 such that the member axis of the workpiece 451 (the first diameter-increased cylindrical container 445) coincides with the central axis C of the press machine and the diameter-increased side surface portions 445b increased in diameter in the first step are positioned in the valley sites 454e of the second die 454. As illustrated in FIG. 89, the second punch 452 is moved downward until the flat surface portion 452a of the second punch 452 comes into contact with the bottom surface portion 445a of the first diameter-increased cylindrical container 445. Accordingly, the second diameter-increased cylindrical container 455 is formed. The side surface portion 455b of the second diameter-increased cylindrical container 455 is formed to have a shape of standing upright with respect to the bottom surface portion 455a. After the second diameter-increased cylindrical container 455 is formed, the second knockout 453 is lifted, and the second diameter-increased cylindrical container 455 is detached from the second die 454.

(Diameter-Reducing Process)

Figure 90:
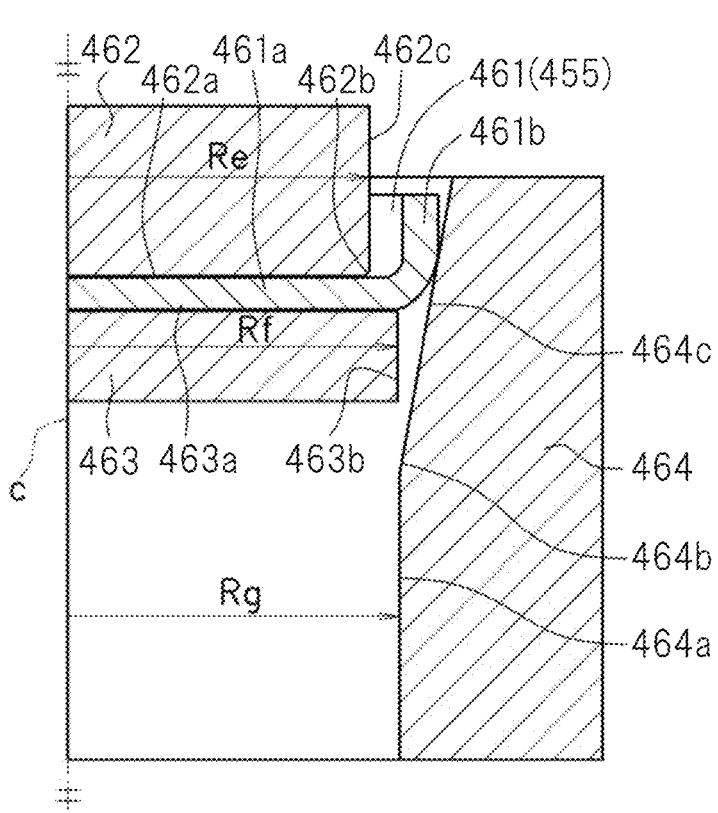
FIG. 90 is a cross-sectional view illustrating a state before a diameter-reducing process of the method of manufacturing a tooth-shaped component according to the fifth embodiment.

FIG. 90 is a cross-sectional view schematically illustrating a state before forming is performed through the diameter-reducing process. As illustrated in FIG. 90, the press machine used in the diameter-reducing process includes a punch 462, a counter punch 463, and a die 464, having the coaxially disposed central axes C. The counter punch 463 and the die 464 are disposed so as to face the punch 462.

The punch 462 has a flat surface portion 462a parallel to the radial direction orthogonal to the central axis C, a curved surface portion 462b provided at a circumferential edge portion of the flat surface portion 462a, and a side surface portion 462c continued via the flat surface portion 462a and the curved surface portion 462b, parallel to the central axis C, and elongated in an upward direction (the first direction) of FIG. 90. An outer radius Re of the side surface portion 462c is substantially equal to the inner radius Re of the tooth tip portions 421a of the tooth-shaped component 421. The punch 462 is a movable type which can reciprocate (can be lifted and lowered) in a direction parallel to the central axis C by a mechanically driven-type (hydraulic-type, servo-motor-type, and the like) driving source (not illustrated).

The counter punch 463 has a flat surface portion 463a parallel to the radial direction orthogonal to the central axis C, and a side surface portion 463b elongated in a downward direction of FIG. 90 along the central axis C. A radius Rf of the side surface portion 463b is substantially equal to the outer radius Ra of the tooth tip portions 421a of the tooth-shaped component 421. The counter punch 463 is a movable type which can reciprocate (can be lifted and lowered) in a direction parallel to the central axis C by a mechanically driven-type (hydraulic-type, servo-motor-type, and the like) driving source (not illustrated).

The die 464 is a fixed type. The die 464 has a side surface portion 464a parallel to the central axis C and elongated in the first direction which is an upward direction in FIG. 90, a curved surface portion 464b provided in an upper end portion of the side surface portion 464a, and a slope portion 464c continued via the side surface portion 464a and the curved surface portion 464b and widened in the radial direction orthogonal to the central axis toward the first direction. An inner radius Rg of the side surface portion 464a is substantially equal to the outer radius Ra of the tooth tip portions 421a of the tooth-shaped component 421.

Figure 91A:
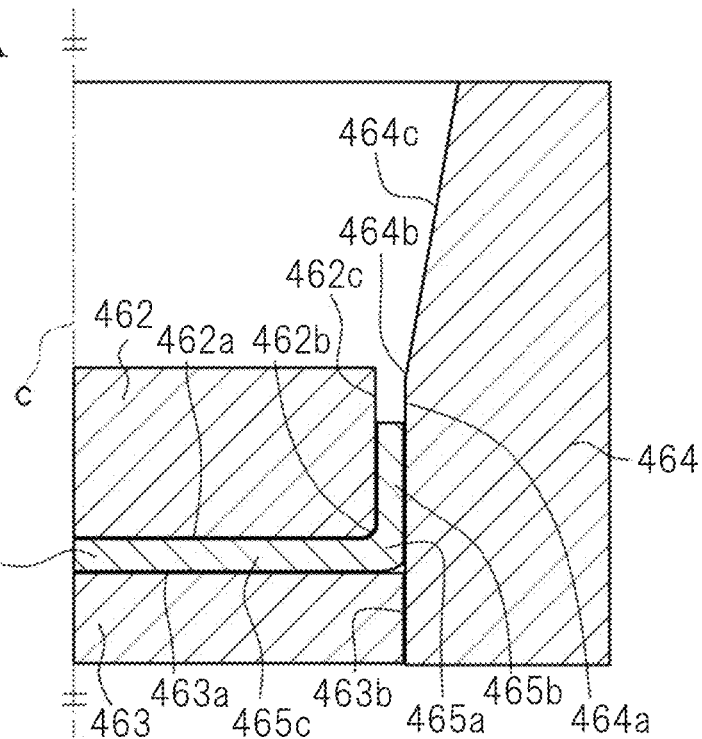
FIG. 91A is a cross-sectional view illustrating a state after the diameter-reducing process of the method of manufacturing a tooth-shaped component according to the fifth embodiment.

In the diameter-reducing process, the second diameter-increased cylindrical container 455 serves as a workpiece 461. First, the second diameter-increased cylindrical container 455 (the workpiece 461) is positioned in the flat surface portion 463a of the counter punch 463 such that the member axis of the workpiece 461 (the second diameter-increased cylindrical container 455) coincides with the central axis C of the press machine. In a state where a bottom surface portion 461a of the workpiece 461 is clamped between the flat surface portion 462a of the punch 462 and the flat surface portion 463a of the counter punch 463, the punch 462 and the counter punch 463 are moved downward. FIG. 91A is a cross-sectional view schematically illustrating a state where the punch 462 and the counter punch 463 are moved downward. In this manner, a diameter-increased side surface portion 461b increased in diameter in the diameter-increasing process is reduced in diameter by the slope portion 464c of the die 464, thereby forming a diameter-reduced side surface portion. Moreover, a corner portion 465a (a shoulder portion) of a diameter-reduced cylindrical container 465 is increased in thickness such that an external shape of the corner portion 465a of the diameter-reduced cylindrical container 465 satisfies the following conditional expression (1).

Figure 91B:
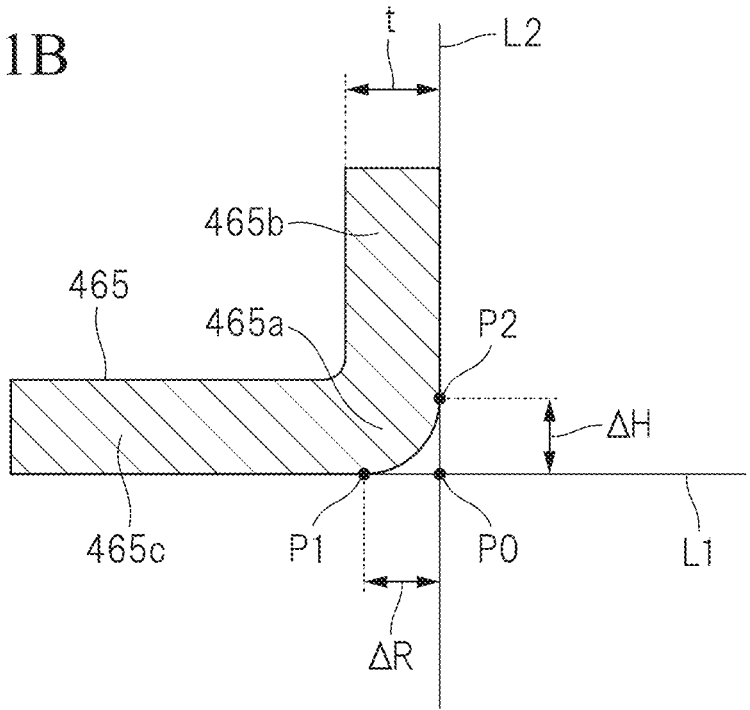
FIG. 91B is a view describing an external shape of a corner portion of a diameter-reduced cylindrical container obtained through the diameter-reducing process.

Here, as illustrated in FIG. 91B, in a case where the diameter-reduced cylindrical container 465 is viewed in a cross section including a central axis direction and a radial direction of the diameter-reduced cylindrical container 465, an intersection point of a straight line L1 in parallel contact with a bottom surface portion 465c of the diameter-reduced cylindrical container 465, and a straight line L2 in parallel contact with a side surface portion 465b of the diameter-reduced cylindrical container 465 is defined as P0. In addition, as illustrated in FIG. 91B, a point at which the straight line L1 starts being separated from the bottom surface portion 465c of the diameter-reduced cylindrical container 465 is defined as P1, and a point at which the straight line L2 starts being separated from the side surface portion 465b of the diameter-reduced cylindrical container 465 is defined as P2. Moreover, as illustrated in FIG. 91B, a length between the intersection point P0 and the point P1 on the straight line L1 is defined as $\Delta R$, and a length between the intersection point P0 and the point P2 on the straight line L2 is defined as $\Delta H$.

The conditional expression (1) is expressed as follows by using a plate thickness t of the diameter-reduced cylindrical container 465, and the lengths $\Delta R$ and $\Delta H$.

$$(\Delta R+\Delta H) \leq 2t \qquad (1)$$

That is, when the corner portion 465a of the diameter-reduced cylindrical container 465 is increased in thickness such that the external shape of the corner portion 465a of the diameter-reduced cylindrical container 465 satisfies the conditional expression (1), the external angle of the corner portion 465a has a value close to a right angle.

In order to cause the external angle of the corner portion 465a of the diameter-reduced cylindrical container 465 to have a value closer to a right angle, it is preferable that the corner portion 465a of the diameter-reduced cylindrical container 465 be increased in thickness such that the external shape of the corner portion 465a of the diameter-reduced cylindrical container 465 satisfies the following conditional expression (2).

$$(\Delta R+\Delta H) \leq 1.5t \qquad (2)$$

The reason for causing the desirable value for the radius Rd of the peak sites 442f of the side surface portion 442e of the first punch 442 in the diameter-increasing process to range from 1.08 times to 1.17 times the inner radius Rc of the tooth tip portions 421a of the tooth-shaped component 421 will be described below. When the radius Rd of the peak sites 442f is less than 1.08 times the inner radius Rc of the tooth tip portions 421a, the reduced amount of the diameter in the diameter-reducing process is small, and the corner portion 465a is insufficiently increased in thickness, thereby resulting in a possibility that a superposition defect occurs in the succeeding tooth shape-forming process. Meanwhile, when the radius Rd of the peak sites 442f exceeds 1.17 times the inner radius Rc of the tooth tip portions 421a, the side surface portion 455b is excessively thin in the diameter-increasing process. As a result, the corner portion 465a is insufficiently increased in thickness, thereby causing a possibility that a superposition defect occurs in the succeeding tooth shape-forming process. Therefore, it is desirable that the radius Rd of the peak sites 442f of the side surface portion 442e of the first punch 442 in the diameter-increasing process ranges from 1.08 times to 1.17 times the inner radius Rc of the tooth tip portions 421a of the tooth-shaped component 421.

(Tooth Shape-Forming Process)

Figure 92:
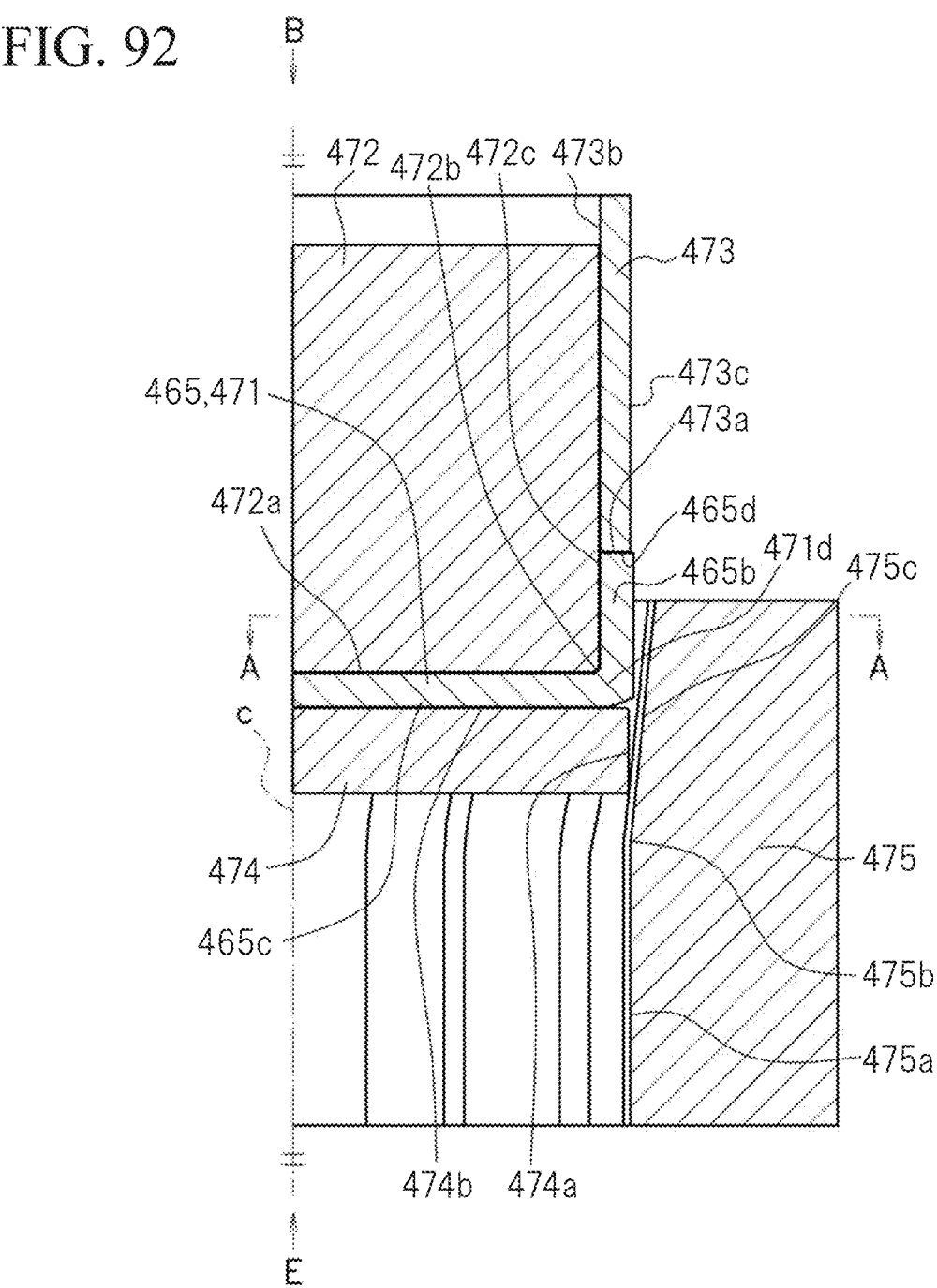
FIG. 92 is a view illustrating a state before a tooth shape-forming process of the method of manufacturing a tooth-shaped component according to the fifth embodiment and is a D-D cross-sectional view of FIG. 94.
Figure 93:
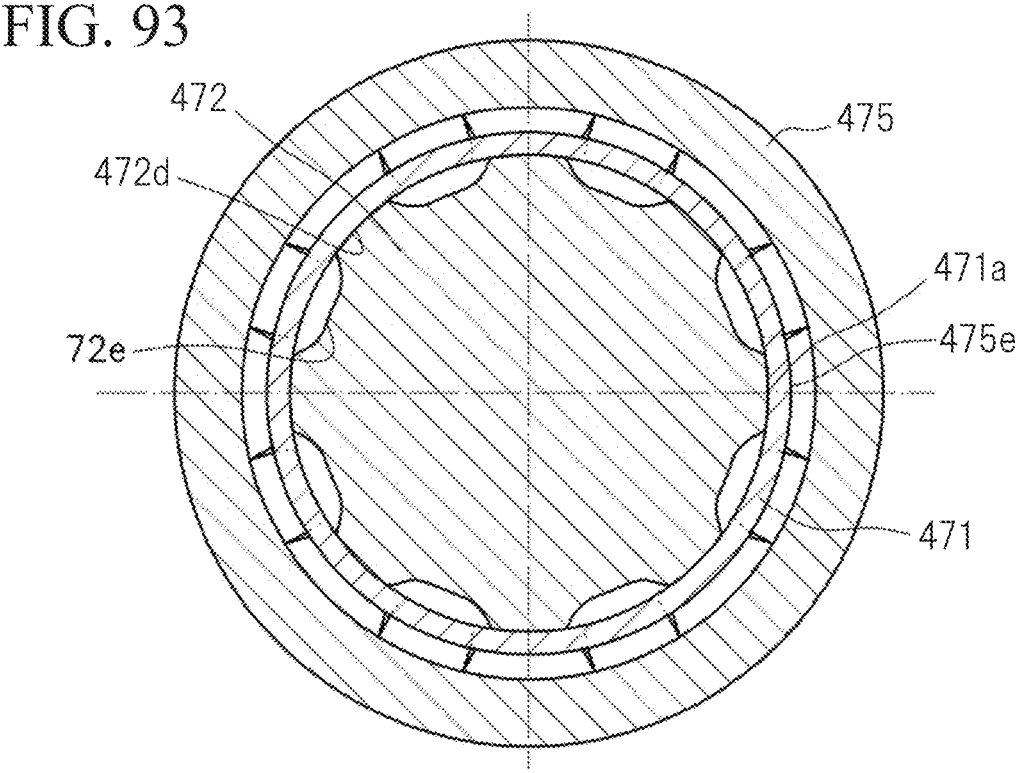
FIG. 93 is a view illustrating the state before the tooth shape-forming process of the method of manufacturing a tooth-shaped component according to the fifth embodiment and is an A-A cross-sectional plan view of FIG. 92.
Figure 94:
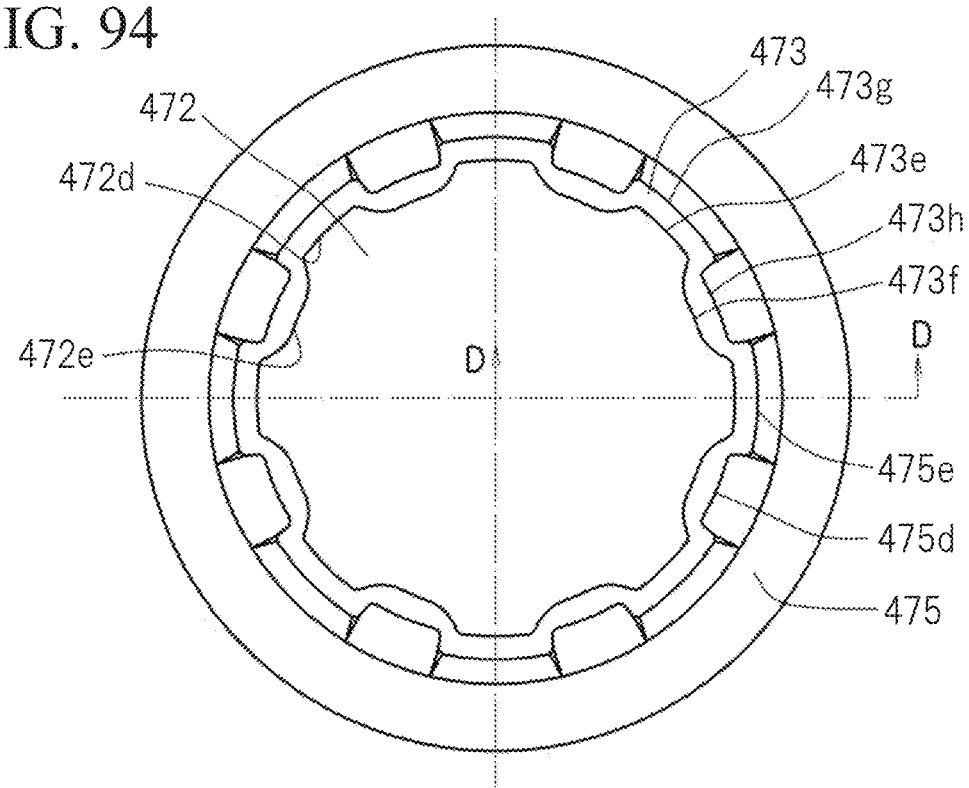
FIG. 94 is a view illustrating the state before the tooth shape-forming process of the method of manufacturing a tooth-shaped component according to the fifth embodiment and is a B-directional plan view of FIG. 92.
Figure 95:
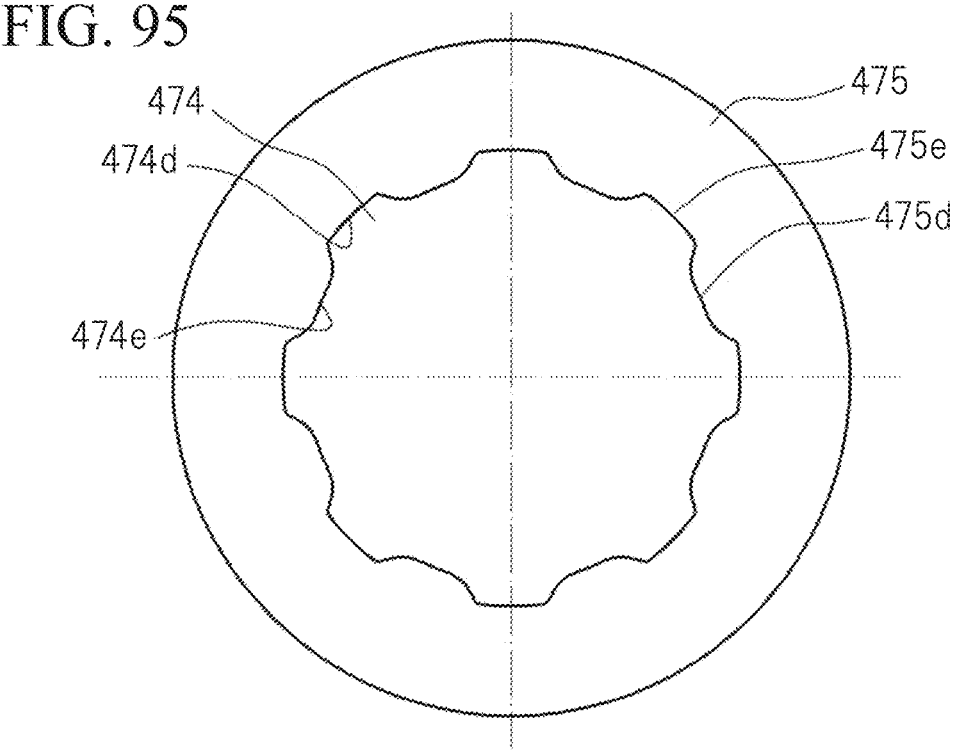
FIG. 95 is a view illustrating the state before the tooth shape-forming process of the method of manufacturing a tooth-shaped component according to the fifth embodiment and is an E-directional bottom view of FIG. 92.

FIGS. 92 to 95 are views schematically illustrating states before forming is performed through the tooth shape-forming process. FIG. 92 is a cross-sectional view taken along a plane passing through the central axis C (a D-D cross-sectional view of FIG. 94). FIG. 93 is an A-A cross-sectional view of FIG. 92. FIG. 94 is a B-directional view (a plan view) of FIG. 92. FIG. 95 is an E-directional view (a bottom view) of FIG. 92. As illustrated in the diagrams, the press machine used in the tooth shape-forming process includes an inner punch 472, an outer punch 473, a counter punch 474, and a die 475, having the coaxially disposed central axes C. The counter punch 474 and the die 475 are disposed so as to face the inner punch 472.

The inner punch 472 has a flat surface portion 472a parallel to the radial direction orthogonal to the central axis C, a curved surface portion 472b provided in an outer edge portion of the flat surface portion 472a, and a side surface portion 472c continued via the flat surface portion 472a and the curved surface portion 472b and elongated in an upward direction (the first direction) of FIG. 92 along the central axis C. In the side surface portion 472c, in order to form the tooth tip portions 421a and the tooth bottom portions 421b of the tooth-shaped component 421, a plurality of peak sites 472d and a plurality of valley sites 472e elongated in parallel to the first direction are alternately formed in the circumferential direction with predetermined spaces among thereof. The inner punch 472 is a movable type which can reciprocate (can be lifted and lowered) in a direction parallel to the central axis C by a mechanically driven-type (hydraulic-type, servo-motor-type, and the like) driving source (not illustrated).

The die 475 is a fixed type. The die 475 has a side surface portion 475*a* elongated in parallel to the first direction, a curved surface portion 475*b* provided in an upper end portion of the side surface portion 475*a*, and a slope portion 475*c* continued via the side surface portion 475*a* and the curved surface portion 475*b* and widened in the radial direction orthogonal to the central axis C toward the first direction. In the side surface portion 475*a*, in order to form the tooth tip portions 421*a* and the tooth bottom portions 421*b* of the tooth-shaped component 421, a plurality of peak sites 475*d* and a plurality of valley sites 475*e* elongated in a direction parallel to the first direction are alternately formed in the circumferential direction with predetermined spaces among thereof.

Figure 96:
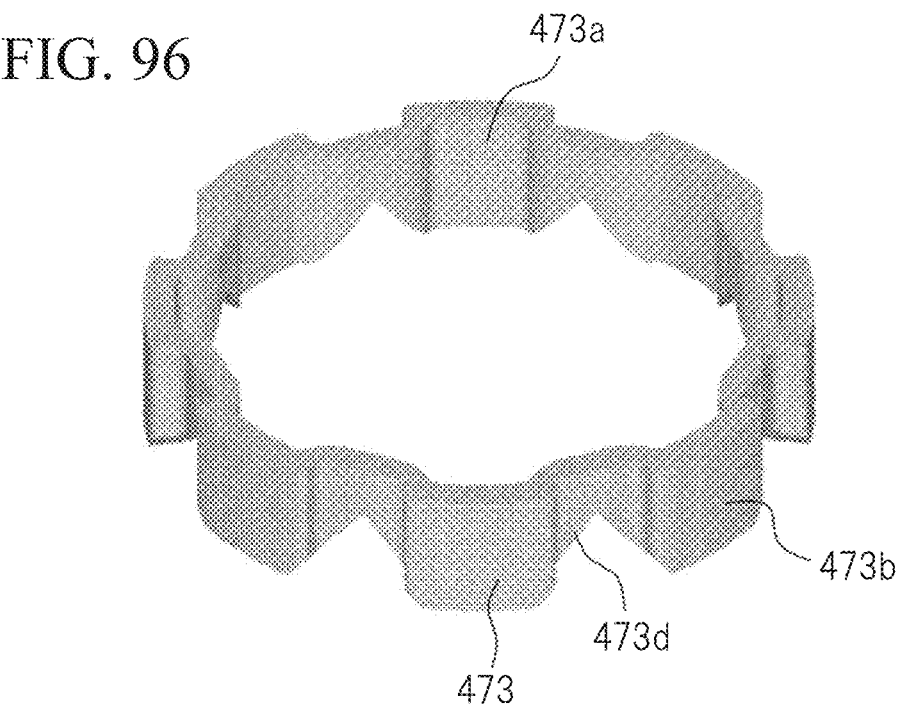
FIG. 96 is a perspective view of an outer punch of the method of manufacturing a tooth-shaped component according to the fifth embodiment.

The outer punch 473 has a tubular shape and is provided along an outer circumference of the inner punch 472. The outer punch 473 has a flat surface portion 473*a* parallel to the radial direction orthogonal to the central axis C, a first side surface portion 473*b* in contact with an edge portion of the flat surface portion 473*a* on the small diameter side and elongated in the first direction, and a second side surface portion 473*c* in contact with an edge portion of the flat surface portion 473*a* on the large diameter side and elongated in the first direction. As illustrated in FIG. 96, the flat surface portion 473*a* has a recess portion 473*d* of which the parts corresponding to the tooth bottom portions 421*b* (the parts between the tooth tip portions 421*a* adjacent to each other) of the tooth-shaped component 421 are recessed in the first direction. In the first side surface portion 473*b*, along the side surface portion 472*c* of the inner punch 472, a plurality of peak sites 473*e* and a plurality of valley sites 473*f* elongated in the first direction are alternately formed in the circumferential direction with predetermined spaces among thereof. In the second side surface portion 473*c*, along the side surface portion 475*a* of the die 475, a plurality of peak sites 473*g* and a plurality of valley sites 473*h* elongated in the first direction are alternately formed in the circumferential direction with predetermined spaces among thereof. The outer punch 473 is a movable type which can reciprocate (can be lifted and lowered) in a direction parallel to the central axis C along the outer circumference of the inner punch 472 by a mechanically driven-type (hydraulic-type, servo-motor-type, and the like) driving source (not illustrated).

The counter punch 474 has a side surface portion 474*a* elongated in the first direction, and a flat surface portion 474*b* continued to the side surface portion 474*a* and parallel to the radial direction orthogonal to the central axis C. In the side surface portion 474*a*, along the side surface portion 475*a* of the die 475, a plurality of peak sites 474*d* and a plurality of valley sites 474*e* elongated in the first direction are alternately formed in the circumferential direction with predetermined spaces among thereof. The counter punch 474 is a movable type which can reciprocate (can be lifted and lowered) in a direction parallel to the central axis C by a mechanically driven-type (hydraulic-type, servo-motor-type, and the like) driving source (not illustrated).

Figure 97:
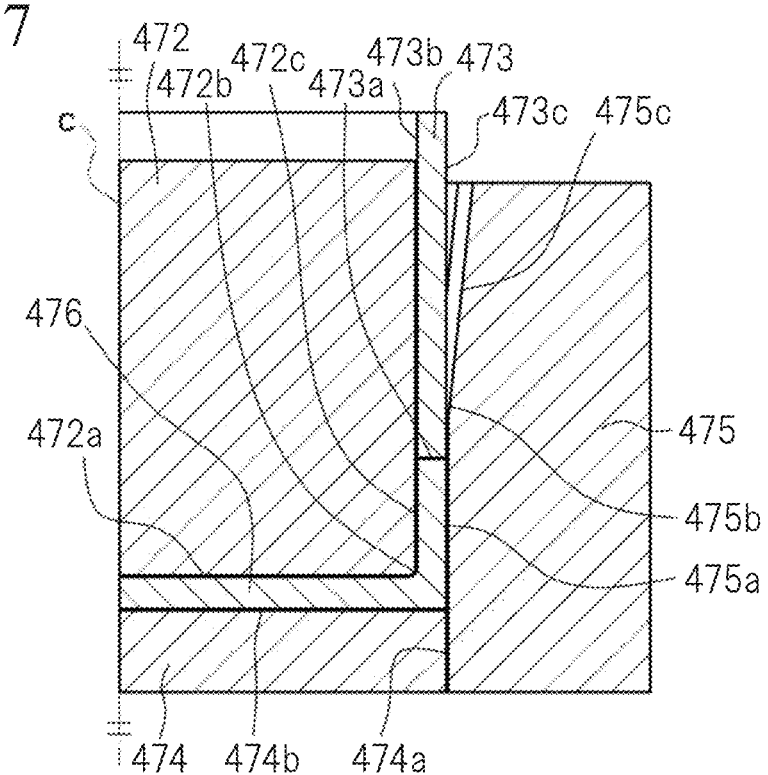
FIG. 97 is a cross-sectional view illustrating a state after the tooth shape-forming process of the method of manufacturing a tooth-shaped component according to the fifth embodiment.

In the tooth shape-forming process, while having the diameter-reduced cylindrical container 465 formed in the diameter-reducing process described above, as a workpiece 471, the tooth-shaped component 421 is formed. First, as illustrated in FIG. 93, the diameter-reduced cylindrical container 465 (the workpiece 471) is positioned in the flat surface portion 474*b* of the counter punch 474 such that the member axis of the workpiece 471 (the diameter-reduced cylindrical container 465) coincides with the central axis C of the press machine and a diameter-reduced side surface portion 471*a* (reduced in diameter) of the container side surface portion 465*b* of the diameter-reduced cylindrical container 465 is positioned in the valley sites 475*e* of the die 475. The bottom surface portion 465*c* of the workpiece 471 is clamped between the flat surface portion 472*a* of the inner punch 472 and the flat surface portion 474*b* of the counter punch 474, and the flat surface portion 473*a* of the outer punch 473 is in a state of abutting an end portion 465*d* of the workpiece 471. In this state, as illustrated in FIG. 97, the inner punch 472, the outer punch 473, and the counter punch 474 are moved downward until the flat surface portion 473*a* of the outer punch 473 passes through the curved surface portion 475*b* of the die 475. Subsequently, in a state where the inner punch 472, the counter punch 474, and the die 475 are fixed, the outer punch 473 is moved downward so as to compress a side surface portion 471*d* of the workpiece 471. Accordingly, as illustrated in FIG. 97, the inside of a space surrounded by the inner punch 472, the outer punch 473, the counter punch 474, and the die 475 is filled with the material. As a result, the tooth tip portions 421*a* are formed in the diameter-reduced side surface portion 471*a* of the diameter-reduced cylindrical container 465 (the workpiece 471), and the tooth bottom portions 421*b* are formed in other parts of the side surface portion 471*d* of the diameter-reduced cylindrical container 465 (the workpiece 471). According to each of the processes described above, the tooth-shaped component 421 having a bottom surface portion 421*c*, a side surface portion 421*d*, the tooth tip portions 421*a*, and the tooth bottom portions 421*b* is completed.

Figure 98:
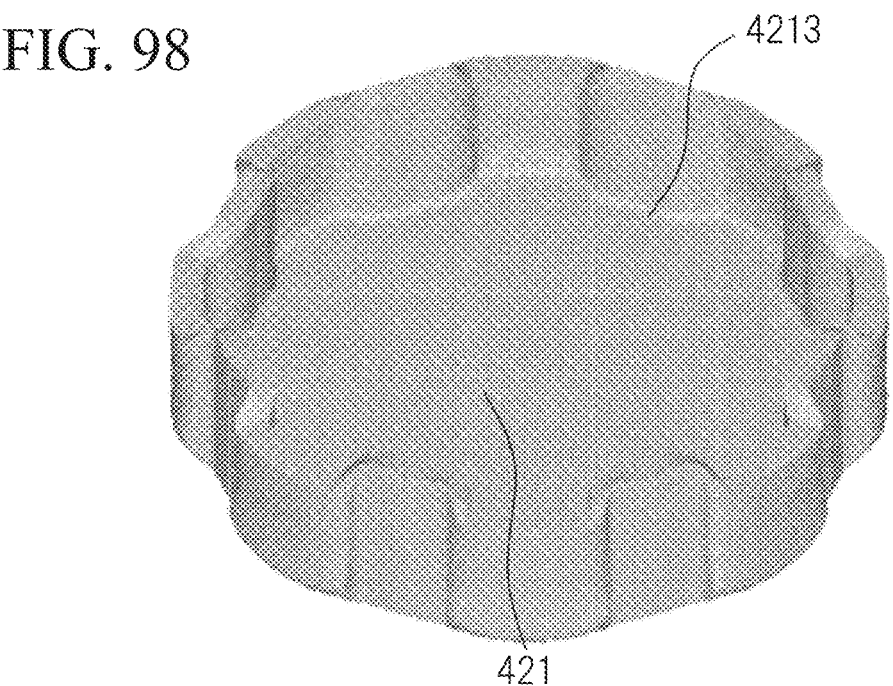
FIG. 98 is a perspective view of a tooth-shaped component after the tooth shape-forming process of the method of manufacturing a tooth-shaped component according to the fifth embodiment.

FIG. 98 is a view schematically illustrating the appearance of the tooth-shaped component 421 after the tooth shapes are formed. According to the method of manufacturing a tooth-shaped component in the present embodiment, in an inner surface 4213 of the corner portion of the tooth-shaped component 421, an occurrence of a superposition defect can be prevented. That is, in the method of manufacturing a tooth-shaped component according to the present embodiment, before the tooth shapes are formed, forming is performed such that the curved surface portion 472*b* of the inner punch 472 and a corner portion 471*d* of the workpiece 471 (the diameter-reduced cylindrical container 465) come into contact with each other, and the external angle of the corner portion 265*a* of the workpiece 471 (the diameter-reduced cylindrical container 465) is adjusted to a value close to a right angle. Accordingly, in the tooth shape-forming process, it is possible to reduce a gap between a place near the corner portion where the flat surface portion 474*b* of the counter punch 474 and the side surface portion 475*a* of the die 475 come into contact with each other, and the corner portion 471*d* of the workpiece 471. As a result, the corner portion 471*d* of the workpiece 471 (the diameter-reduced cylindrical container 465) is not separated from the curved surface portion 472*b* of the inner punch 472 in the middle of the tooth shape-forming process. Therefore, after the tooth shape-forming process ends, it is possible to obtain the tooth-shaped component 421 having no superposition defect in a boundary between an upper surface of the bottom surface portion 421*c* and the inner circumferential surface of the side wall portion 421*d*.

In addition, in the present embodiment, the cold forging is employed as the method of manufacturing a tooth-shaped component. Therefore, compared to a tooth-shaped component manufactured through the hot forging, it is possible to obtain the tooth-shaped component 421 having no draft and having the dimensional accuracy ten times more accurate in thickness, without performing the machining process. That is, according to the method of manufacturing a tooth-shaped component in the present embodiment, it is possible to obtain the high-quality tooth-shaped component 421 having no superposition defect and draft and having the dimensional accuracy in thickness ranging from ±0.05 mm to ±0.3 mm.

The flat surface portion 473a of the outer punch 473 has the recess portion 473d of which the parts corresponding to the tooth bottom portions 421b of the tooth-shaped component 421 are recessed. Therefore, the workpiece 471 does not come into contact with the entirety of the flat surface portion 473a, and an increase of the forming load caused due to hydrostatic pressure can be reduced. The shape of the recess is not particularly regulated as long as the recess has a shape in which the flat surface portion 473a is not filled with the workpiece 471.

The tooth-shaped component 421 has a shape in which end portions of the tooth bottom portions 421b protrude. However, as illustrated in FIGS. 80A and 80B, in a case where the end portions are desired to be flattened, after the tooth shape-forming process, there may be provided a process in which the end portions of the tooth-shaped component 421 are machined and flattened. The specific method of the machining processing is not particularly limited, and various types of known machining processing can be applied.

Sixth Embodiment

Next, a sixth embodiment of the present invention will be described.

Figure 99A:
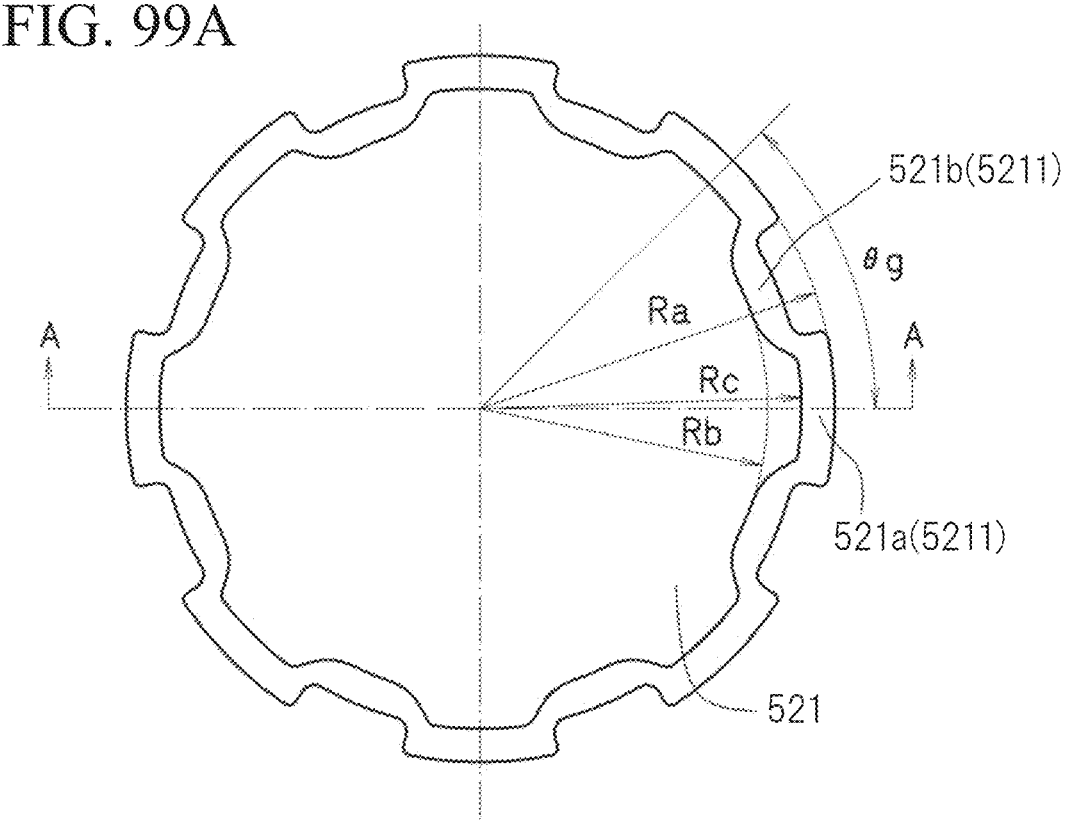
FIG. 99A is a plan view of a tooth-shaped component formed through a method of manufacturing a tooth-shaped component according to a sixth embodiment.
Figure 99B:
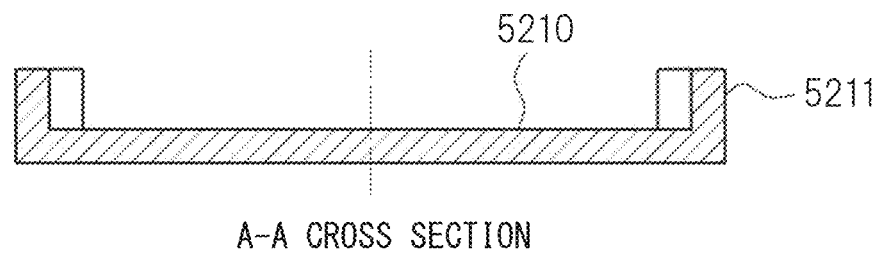
FIG. 99B is an A-A cross-sectional view of the tooth-shaped component illustrated in FIG. 99A.

FIG. 99A is a plan view of a tooth-shaped component 521 manufactured through a method of manufacturing a tooth-shaped component according to the sixth embodiment. FIG. 99B is an A-A cross-sectional view of the tooth-shaped component 521 illustrated in FIG. 99A. As illustrated in FIGS. 99A and 99B, the tooth-shaped component 521 is a component having a bottomed cylindrical shape of which one end portion is open and of which the other end portion is sealed in a direction of the member axis (the one-dot chain line illustrated in FIG. 99B).

The tooth-shaped component 521 has a container bottom portion 5210 and a side surface portion 5211. The side surface portion 5211 is provided so as to rise from an outer edge portion of the container bottom portion 5210. An external angle of a corner portion formed by the container bottom portion 5210 and the side surface portion 5211 is substantially a right angle. The side surface portion 5211 has tooth tip portions 521a and tooth bottom portions 521b provided so as to alternately appear along a circumferential direction having the member axis as the center. The present embodiment illustrates a case where there are eight of the tooth tip portions 521a and the tooth bottom portions 521b each. However, the numbers of the tooth tip portions 521a and the tooth bottom portions 521b (that is, the number of teeth of the tooth-shaped component 521) are not limited to eight as long as there are a plurality thereof.

The tooth tip portions 521a are parts which protrude further outward than the tooth bottom portions 521b in a radial direction having the member axis as the center. More specifically, as illustrated in FIG. 99A, outer circumferential surfaces of the tooth tip portions 521a are positioned on the circumference of a radius Ra having the member axis as the center. Inner circumferential surfaces of the tooth tip portions 521a and outer circumferential surfaces of the tooth bottom portions 521b are positioned on the circumference of a radius Rc having the member axis as the center. Inner circumferential surfaces of the tooth bottom portions 521b are positioned on the circumference of a radius Rb having the member axis as the center. Hereinafter, the radius Ra will be referred to as an outer radius of the tooth tip portions 521a. The radius Rc will be referred to as an inner radius of the tooth tip portions 521a. The radius Rb will be referred to as an inner radius of the tooth bottom portions 521b.

In addition, in FIG. 99A, θg indicates an angle between the tooth tip portions 521a adjacent to each other along the circumferential direction having the member axis as the center.

The tooth-shaped component 521 manufactured through the method of manufacturing a tooth-shaped component according to the present embodiment is characterized by naturally having no superposition defect, having no draft, and having the dimensional accuracy in thickness ranging from ±0.05 mm to ±0.3 mm.

In the present embodiment, cold forging is employed as the method of manufacturing a tooth-shaped component (will be described later in detail). Therefore, compared to a tooth-shaped component manufactured through hot forging, it is possible to obtain the tooth-shaped component 521 having no draft and having the dimensional accuracy ten times more accurate in thickness, without performing a machining process. That is, according to the method of manufacturing a tooth-shaped component in the present embodiment, it is possible to obtain the high-quality tooth-shaped component 521 having no superposition defect and draft and having the dimensional accuracy in thickness ranging from ±0.05 mm to ±0.3 mm.

In order to manufacture such a tooth-shaped component 521, the method of manufacturing the tooth-shaped component 521 according to the sixth embodiment includes a drawing process, a diameter-increasing process, a diameter-reducing process, and a tooth shape-forming process (a rough tooth shape-forming process and a complete tooth shape-forming process). Hereinafter, each of the processes will be described in detail. As described above, in the present embodiment, the cold forging is employed as the method of manufacturing a tooth-shaped component. Therefore, each of the processes is executed at a normal temperature.

(Drawing Process)

Figure 100:
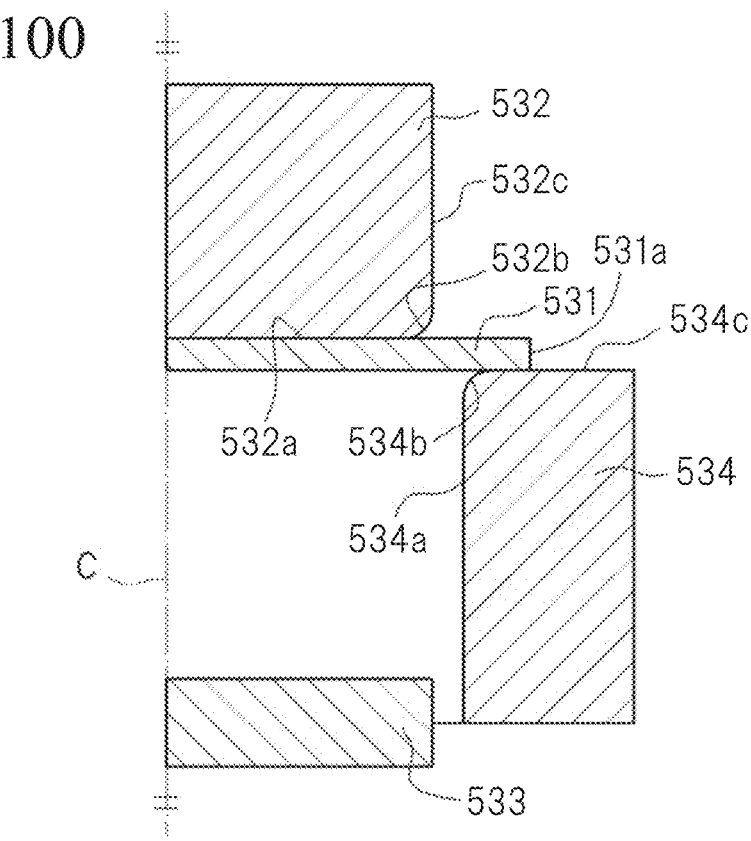
FIG. 100 is a cross-sectional view illustrating a state before a drawing process of the method of manufacturing a tooth-shaped component according to the sixth embodiment.
Figure 101:
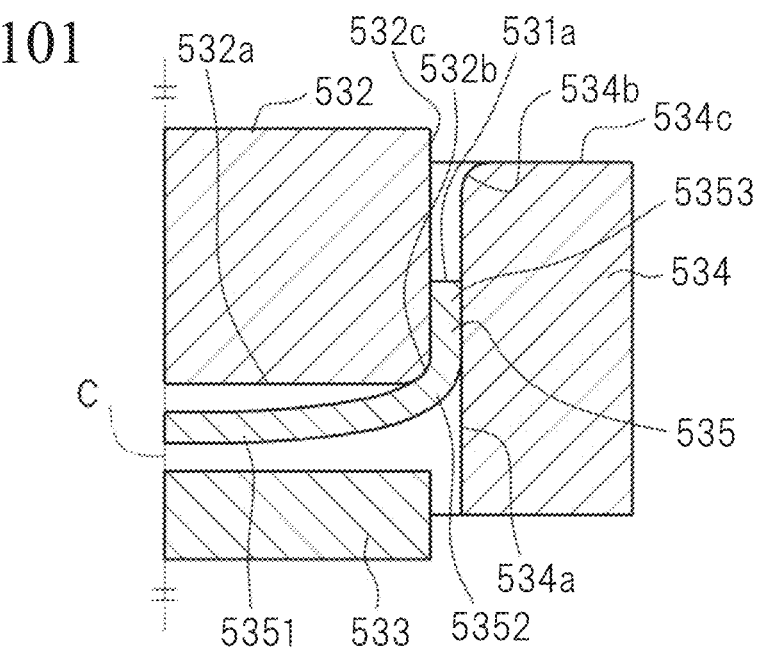

FIGS. 100 and 101 are cross-sectional views respectively and schematically illustrating states before forming and after forming in the drawing process. As illustrated in FIGS. 100 and 101, a press machine used in the drawing process includes a punch 532, a knockout 533, and a die 534 having the coaxially disposed central axes C. The knockout 533 and the die 534 are disposed so as to face the punch 532.

The punch 532 has a flat surface portion 532a parallel to the radial direction orthogonal to the central axis C, a curved surface portion 532b provided in an outer edge portion of the flat surface portion 532a, and a side surface portion 532c continued via the flat surface portion 532a and the curved surface portion 532b and elongated in an upward direction (the first direction) of FIG. 100 in a direction parallel to the central axis C. The punch 532 is a movable type which can reciprocate (can be lifted and lowered) in a direction parallel to the central axis C by a mechanically driven-type (hydraulic-type, servo-motor-type, and the like) driving source (not illustrated).

The knockout 533 has a columnar shape and is used for detaching a formed product from the die and punch. The knockout 533 is a movable type which can reciprocate (can be lifted and lowered) in a direction parallel to the central axis C by a driving source (not illustrated).

The die 534 a side surface portion 534a elongated in the first direction, a curved surface portion 534b provided in an upper end portion of the side surface portion 534a, and a flat surface portion 534c elongated in the radial direction orthogonal to the central axis via the side surface portion 534a and the curved surface portion 534b. The die 534 is a fixed type.

In the drawing process, a workpiece 531 which is a flat metal sheet having a circular shape (for example, a steel sheet) is draw-formed, thereby forming a cylindrical container 535. The cylindrical container 535 formed in this drawing process has a container bottom portion 5351 having a substantially circular shape in plan view, a container curved surface 5352 provided in an outer edge portion of the container bottom portion 5351, and a container side surface portion 5353 continued to the container bottom portion 5351 via the container curved surface 5352. First, as illustrated in FIG. 100, the workpiece 531 is positioned in the flat surface portion 534c of the die 534 such that the member axis of the workpiece 531 coincides with the central axis C of the press machine. As illustrated in FIG. 101, the punch 532 is moved downward until an end portion 531a of the workpiece 531 passes through the curved surface portion 534b of the die 534, thereby performing drawing. In this manner, the cylindrical container 535 is formed. After forming the cylindrical container 535, the knockout 533 is lifted, and the cylindrical container 535 is detached from the die 534.

(Diameter-Increasing Process)

Figure 102:
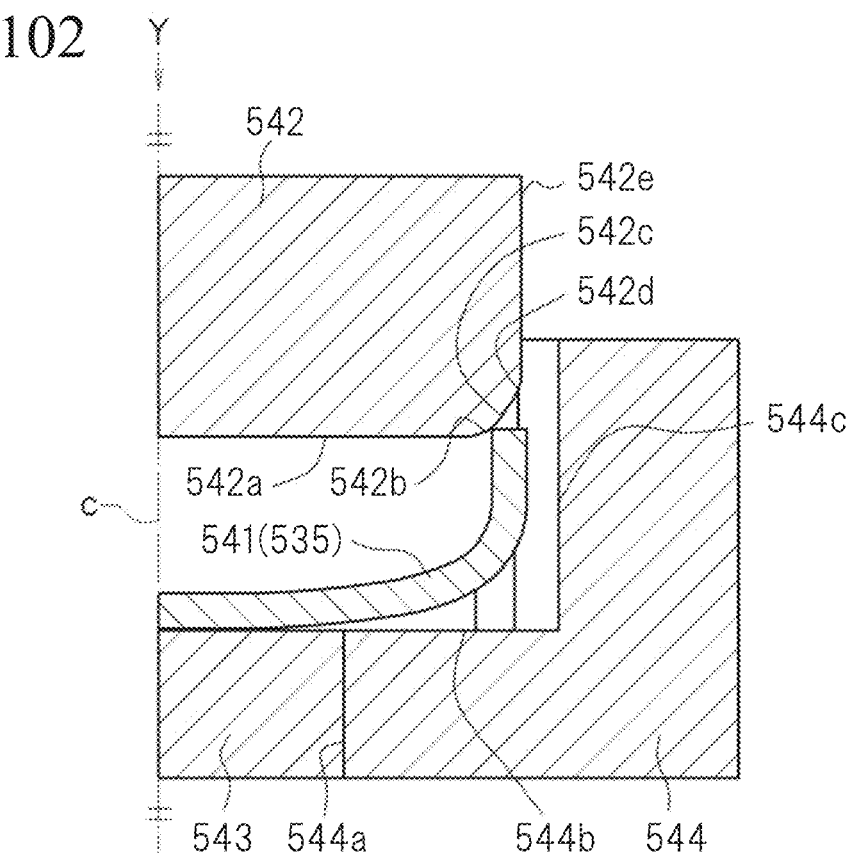
Figure 103:
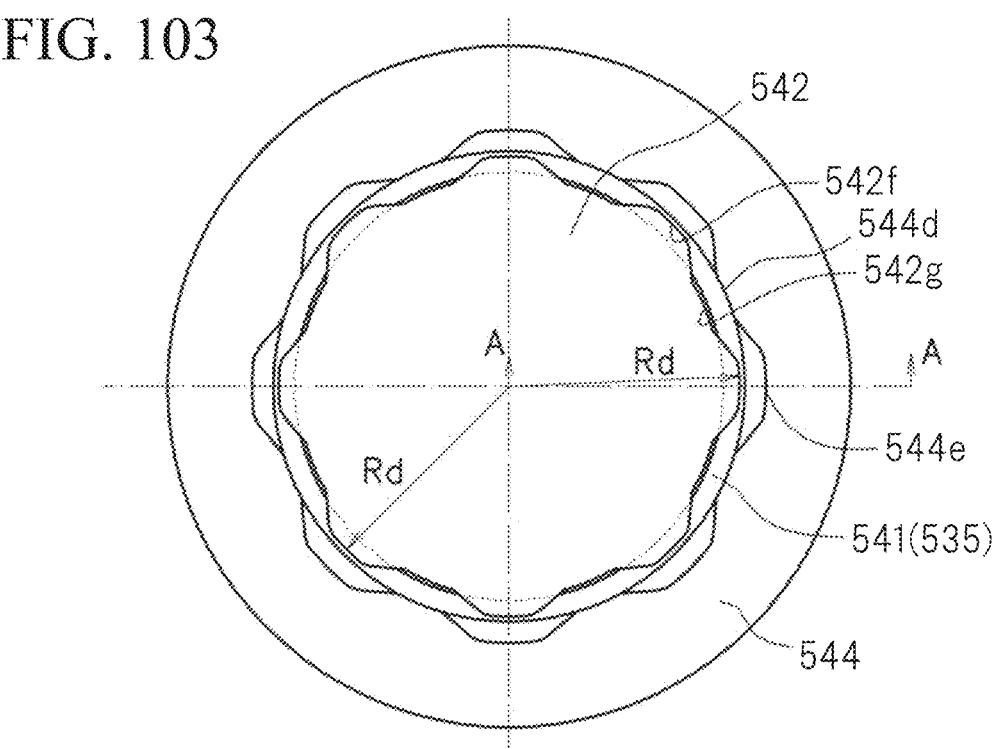

The diameter-increasing process has a first step and a second step. FIGS. 102 and 103 are views schematically illustrating states before the first step of the diameter-increasing process starts. FIG. 102 is an A-A cross-sectional view of FIG. 103, and FIG. 103 is a plan view. As illustrated in FIGS. 102 and 103, the press machine used in the first step of the diameter-increasing process includes a first punch 542, a first knockout 543, and a first die 544, having the coaxially disposed central axes C. The first knockout 543 and the first die 544 are disposed so as to face the first punch 542.

The first punch 542 has a flat surface portion 542a, a first curved surface portion 542b, a slope portion 542c, a second curved surface portion 542d, and a side surface portion 542e. The flat surface portion 542a is a portion parallel to the radial direction orthogonal to the central axis C. The first curved surface portion 542b is provided in an outer edge portion of the flat surface portion 542a. The slope portion 542c is continued via the flat surface portion 542a and the first curved surface portion 542b, is parallel to the central axis C, and is widened in the radial direction orthogonal to the central axis C toward an upward direction (the first direction) of FIG. 102. The second curved surface portion 542d is provided in an upper end portion of the slope portion 542c. The side surface portion 542e is continued via the slope portion 542c and the second curved surface portion 542d and is elongated in the first direction. Moreover, in the side surface portion 542e, a plurality of peak sites 542f and a plurality of valley sites 542g elongated along the first direction are alternately formed in the circumferential direction with predetermined spaces among thereof. The numbers of the peak sites 542f and the valley sites 542g coincide with the numbers of the tooth tip portions 521a and the tooth bottom portions 521b (the number of teeth) of the tooth-shaped component 521. It is desirable that the outer radius Rd of the peak sites 542f (a length between outer circumferential surfaces of the peak sites 542f and the central axis C in the radial direction having the central axis C as the center) ranges from 1.08 times to 1.17 times the inner radius Rc of the tooth tip portions 521a of the tooth-shaped component 521. The reason will be described in the section of the diameter-reducing process. The first punch 542 is a movable type which can reciprocate (can be lifted and lowered) in a direction parallel to the central axis C by a mechanically driven-type (hydraulic-type, servo-motor-type, and the like) driving source (not illustrated).

The first knockout 543 has a columnar shape and is used for detaching a formed product from the die and punch. The first knockout 543 is a movable type which can reciprocate (can be lifted and lowered) in a direction parallel to the central axis C by a driving source (not illustrated).

The first die 544 is a fixed type. The first die 544 has a first side surface portion 544a elongated in the first direction parallel to the central axis C, a flat surface portion 544b continued to the first side surface portion 544a and parallel to the radial direction orthogonal to the central axis C, and a second side surface portion 544c continued to the flat surface portion 544b and elongated in the first direction. The second side surface portion 544c is offset in the radial direction from the side surface portion 542e of the first punch 542 substantially as much as a plate thickness of the workpiece 531 (the metal sheet) and has a plurality of peak sites 544d and a plurality of valley sites 544e alternately arranged in the circumferential direction.

Figure 104:
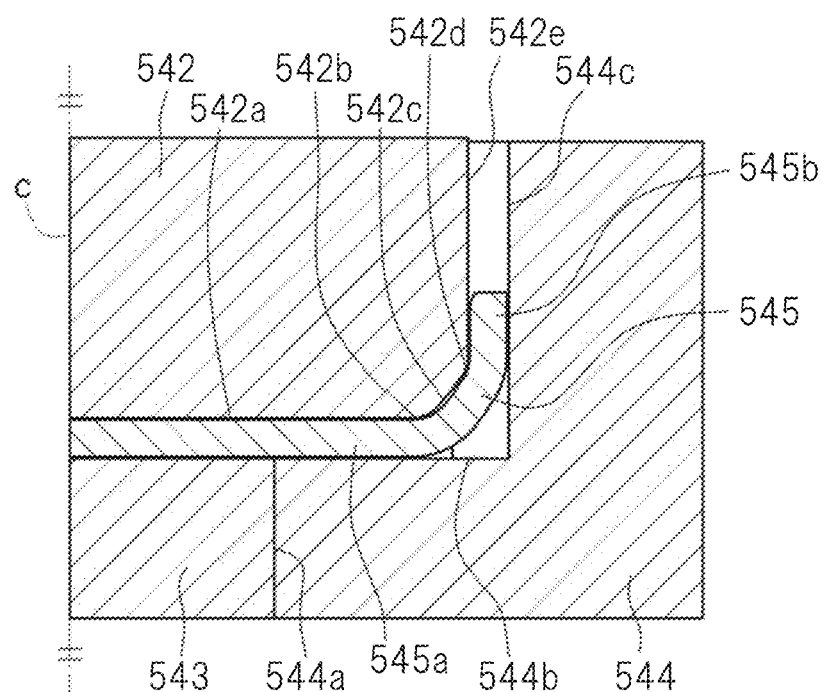
Figure 105A:
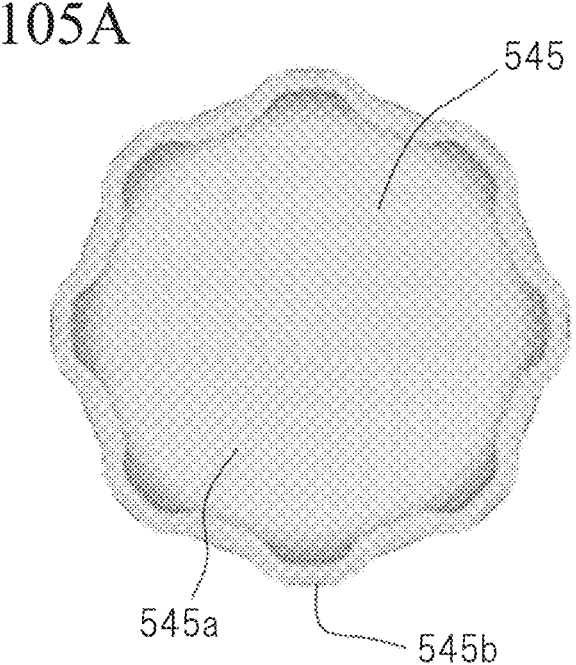
Figure 105B:
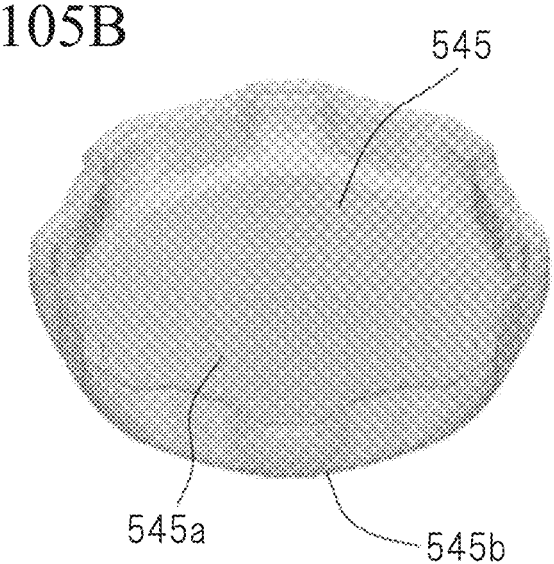

In the first step of the diameter-increasing process, as illustrated in FIGS. 102 and 103, while having the cylindrical container 535 formed in the draw-forming process, as a workpiece 541, a first diameter-increased cylindrical container 545 is formed by increasing the diameter of the container side surface portion 5353 of the cylindrical container 535. First, as illustrated in FIGS. 102 and 103, the workpiece 541 is positioned on the first knockout 543 and the first die 544 such that the member axis of the workpiece 541 (the cylindrical container 535) coincides with the central axis C of the press machine. As illustrated in FIG. 104, the first punch 542 is moved downward until the flat surface portion 542a of the first punch 542 comes into contact with a bottom surface portion 545a of the first diameter-increased cylindrical container 545, thereby performing diameter-increasing forming. According to the first step of the diameter-increasing process, a plurality of parts of the container side surface portion 5353 (particular parts in which the tooth tip portions 521a of the tooth-shaped component 521 are to be formed) of the cylindrical container 535 are pushed outward in the radial direction by the peak sites 542f of the first punch 542 and are increased in diameter, thereby realizing a plurality of diameter-increased side surface portions 545b. In this manner, the first diameter-increased cylindrical container 545 having the plurality of diameter-increased side surface portions 545b is formed. FIGS. 105A and 105B views of the appearance of the first diameter-increased cylindrical container 545 in which the diameter-increased side surface portions 545b are formed through the diameter-increasing process. FIG. 105A is a plan view of the first diameter-increased cylindrical container 545, and FIG. 105B is a perspective view of the first diameter-increased cylindrical container 545. As illustrated in FIGS. 105A and 105B, the first diameter-increased cylindrical container 545 has the plurality of diameter-increased side surface portions 545b in which the tooth tip portions 521a of the tooth-shaped component 521 are formed. After the first step of the diameter-increasing process ends, the first knockout 543 is lifted, and the first diameter-increased cylindrical container 545 is detached from the first die 544.

Figure 106:
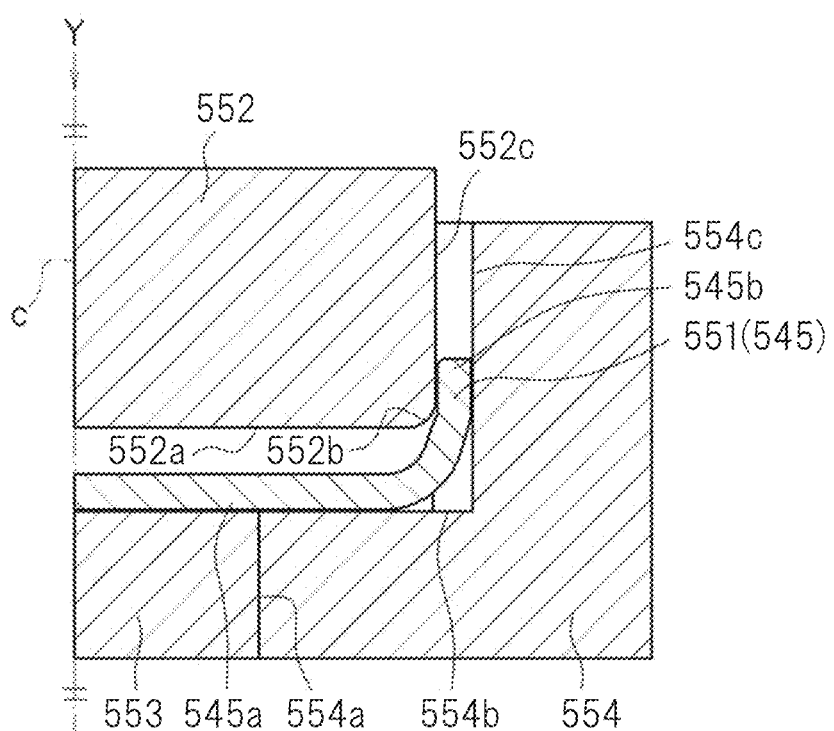
Figure 107:
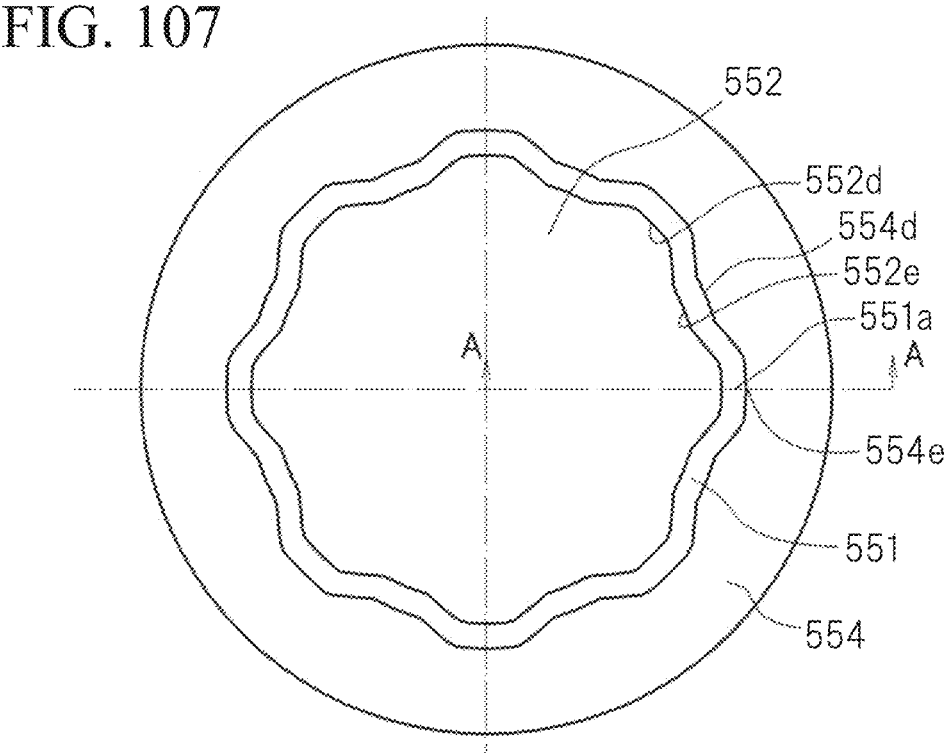

FIGS. 106 and 107 are views schematically illustrating states before forming in the second step of the diameter-increasing process. FIG. 106 is an A-A cross-sectional view of FIG. 107. FIG. 107 is a plan view. As illustrated in FIGS. 106 and 107, the press machine used in the second step of the diameter-increasing process includes a second punch 552, a second knockout 553, and a second die 554, having the coaxially disposed central axes C. The second knockout 553 and the second die 554 are disposed so as to face the second punch 552.

The second punch 552 has a flat surface portion 552a parallel to the radial direction orthogonal to the central axis C, a curved surface portion 552b provided in an outer edge portion of the flat surface portion 552a, and a side surface portion 552c continued via the flat surface portion 552a and the curved surface portion 552b, parallel to the central axis C, and elongated in an upward direction (the first direction) of FIG. 106. The side surface portion 552c has the same shape and dimensions of a cross section orthogonal to the central axis C as the side surface portion 542e of the first punch 542. In the side surface portion 552c, a plurality of peak sites 552d and a plurality of valley sites 552e elongated along the first direction are alternately formed in the circumferential direction with predetermined spaces among thereof. The numbers of the peak sites 552d and the valley sites 552e coincide with the numbers of the tooth tip portions 521a and the tooth bottom portions 521b (the number of teeth) of the tooth-shaped component 521. The second punch 552 is a movable type which can reciprocate (can be lifted and lowered) in a direction parallel to the central axis C by a mechanically driven-type (hydraulic-type, servo-motor-type, and the like) driving source (not illustrated).

The second knockout 553 has a columnar shape and is used for detaching a formed product from the die and punch. The second knockout 553 is a movable type which can reciprocate (can be lifted and lowered) in a direction parallel to the central axis C by a driving source (not illustrated).

The second die 554 has the same shape and dimensions as the first die 544 of the first step. That is, the second die 554 has a first side surface portion 554a parallel to the central axis C and elongated in the first direction, a flat surface portion 554b parallel to the radial direction orthogonal to the central axis C, and a second side surface portion 554c elongated in the first direction. In the second side surface portion 554c, a plurality of peak sites 554d and a plurality of valley sites 554e elongated in a direction parallel to the central axis C are provided so as to be alternately arranged in the circumferential direction. Similar to the first die 544, the numbers of the plurality of peak sites 554d and the plurality of valley sites 554e coincide with the numbers of the tooth tip portions 521a and the tooth bottom portions 521b (the number of teeth) of the tooth-shaped component 521.

Figure 108:
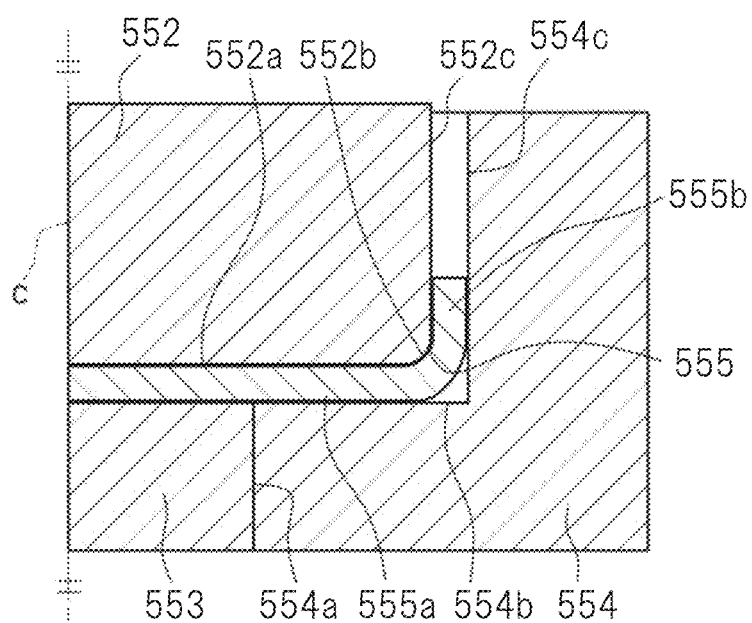

In the second step, while having the first diameter-increased cylindrical container 545 formed in the first step, as a workpiece 551, a second diameter-increased cylindrical container 555 having a shape in which a side surface portion 555b stands upright with respect to a bottom surface portion 555a is formed. First, as illustrated in FIG. 106, the first diameter-increased cylindrical container 545 (the workpiece 551) is positioned on the flat surface portion 554b of the second die 554 such that the member axis of the workpiece 551 (the first diameter-increased cylindrical container 545) coincides with the central axis C of the press machine and the diameter-increased side surface portions 545b increased in diameter in the first step are positioned in the valley sites 554e of the second die 554. As illustrated in FIG. 108, the second punch 552 is moved downward until the flat surface portion 552a of the second punch 552 comes into contact with the bottom surface portion 545a of the first diameter-increased cylindrical container 545. Accordingly, the second diameter-increased cylindrical container 555 is formed. The side surface portion 555b of the second diameter-increased cylindrical container 555 is formed to have a shape of standing upright with respect to the bottom surface portion 555a. After the second diameter-increased cylindrical container 555 is formed, the second knockout 553 is lifted, and the second diameter-increased cylindrical container 555 is detached from the second die 554.

(Diameter-Reducing Process)

Figure 109:
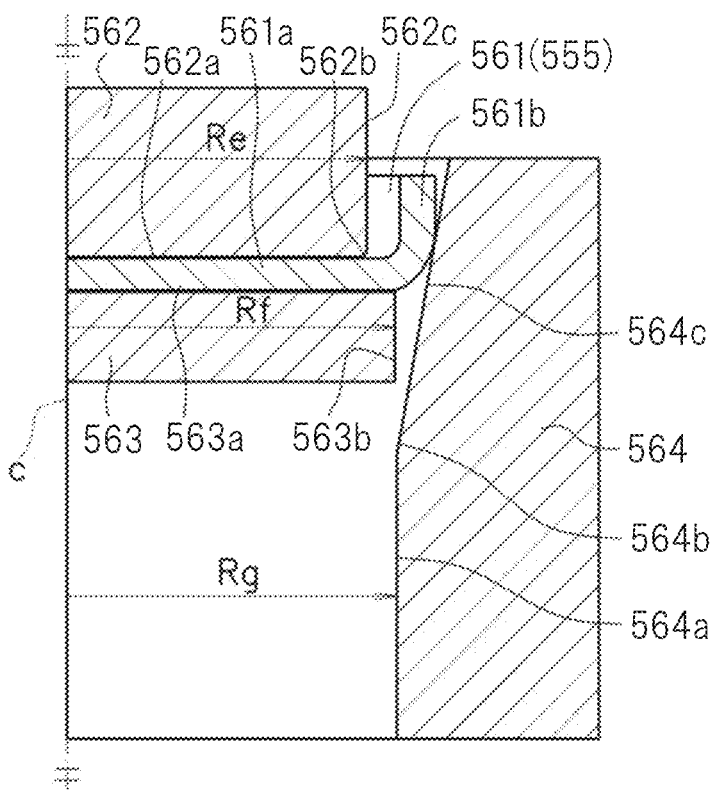

FIG. 109 is a cross-sectional view schematically illustrating a state before forming is performed through the diameter-reducing process. As illustrated in FIG. 109, the press machine used in the diameter-reducing process includes a punch 562, a counter punch 563, and a die 564, having the coaxially disposed central axes C. The counter punch 563 and the die 564 are disposed so as to face the punch 562.

The punch 562 has a flat surface portion 562a parallel to the radial direction orthogonal to the central axis C, a curved surface portion 562b provided at a circumferential edge portion of the flat surface portion 562a, and a side surface portion 562c continued via the flat surface portion 562a and the curved surface portion 562b, parallel to the central axis C, and elongated in an upward direction (the first direction) of FIG. 109. An outer radius Re of the side surface portion 562c is substantially equal to the inner radius Rc of the tooth tip portions 521a of the tooth-shaped component 521. The punch 562 is a movable type which can reciprocate (can be lifted and lowered) in a direction parallel to the central axis C by a mechanically driven-type (hydraulic-type, servo-motor-type, and the like) driving source (not illustrated).

The counter punch 563 has a flat surface portion 563a parallel to the radial direction orthogonal to the central axis C, and a side surface portion 563b elongated in a downward direction of FIG. 109 along the central axis C. A radius Rf of the side surface portion 563b is substantially equal to the outer radius Ra of the tooth tip portions 521a of the tooth-shaped component 521. The counter punch 563 is a movable type which can reciprocate (can be lifted and lowered) in a direction parallel to the central axis C by a mechanically driven-type (hydraulic-type, servo-motor-type, and the like) driving source (not illustrated).

The die 564 is a fixed type. The die 564 has a side surface portion 564a parallel to the central axis C and elongated in the first direction which is an upward direction in FIG. 109, a curved surface portion 564b provided in an upper end portion of the side surface portion 564a, and a slope portion 564c continued via the side surface portion 564a and the curved surface portion 564b and widened in the radial direction orthogonal to the central axis toward the first direction. An inner radius Rg of the side surface portion 564a is substantially equal to the outer radius Ra of the tooth tip portions 521a of the tooth-shaped component 521.

Figure 110A:
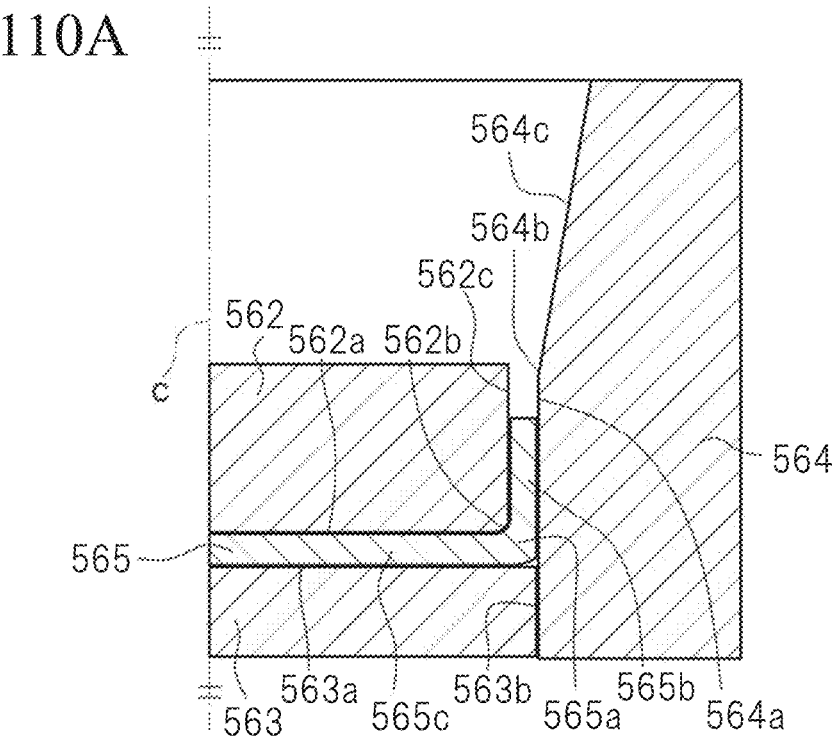

In the diameter-reducing process, the second diameter-increased cylindrical container 555 serves as a workpiece 561. First, the second diameter-increased cylindrical container 555 (the workpiece 561) is positioned in the flat surface portion 563a of the counter punch 563 such that the member axis of the workpiece 561 (the second diameter-increased cylindrical container 555) coincides with the central axis C of the press machine. In a state where a bottom surface portion 561a of the workpiece 561 is clamped between the flat surface portion 562a of the punch 562 and the flat surface portion 563a of the counter punch 563, the punch 562 and the counter punch 563 are moved downward. FIG. 110A is a cross-sectional view schematically illustrating a state where the punch 562 and the counter punch 563 are moved downward. In this manner, a diameter-increased side surface portion 561b increased in diameter in the diameter-increasing process is reduced in diameter by the slope portion 564c of the die 564, thereby forming the diameter-reduced side surface portion. Moreover, a corner portion 565a (a shoulder portion) of a diameter-reduced cylindrical container 565 is increased in thickness such that an external shape of the corner portion 565a of the diameter-reduced cylindrical container 565 satisfies the following conditional expression (1).

Figure 110B:
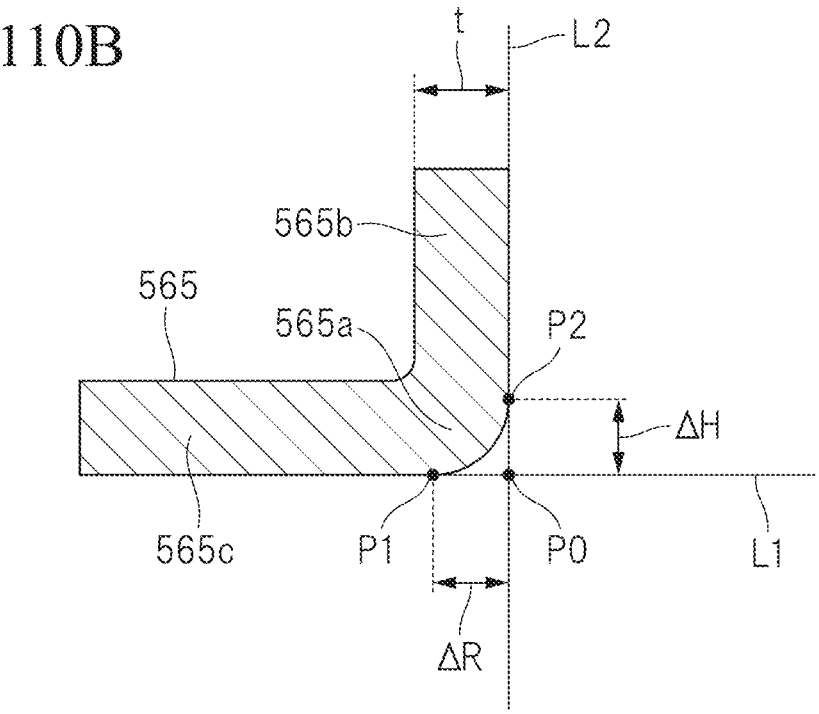

Here, as illustrated in FIG. 11B, in a case where the diameter-reduced cylindrical container 565 is viewed in a cross section including a central axis direction and a radial direction of the diameter-reduced cylindrical container 565, an intersection point of a straight line L1 in parallel contact with a bottom surface portion 565c of the diameter-reduced cylindrical container 565, and a straight line L2 in parallel contact with a side surface portion 565b of the diameter-reduced cylindrical container 565 is defined as P0. In addition, as illustrated in FIG. 110B, a point at which the straight line L1 starts being separated from the bottom surface portion 565c of the diameter-reduced cylindrical container 565 is defined as P1, and a point at which the straight line L2 starts being separated from the side surface portion 565b of the diameter-reduced cylindrical container 565 is defined as P2. Moreover, as illustrated in FIG. 110B, a length between the intersection point P0 and the point P1 on the straight line L1 is defined as ΔR, and a length between the intersection point P0 and the point P2 on the straight line L2 is defined as ΔH.

The conditional expression (1) is expressed as follows by using a plate thickness t of the diameter-reduced cylindrical container 565, and the lengths ΔR and ΔH.

$$(\Delta R + \Delta H) \leq 2t \qquad (1)$$

That is, when the corner portion 565a of the diameter-reduced cylindrical container 565 is increased in thickness such that the external shape of the corner portion 565a of the diameter-reduced cylindrical container 565 satisfies the conditional expression (1), the external angle of the corner portion 565a has a value close to a right angle.

In order to cause the external angle of the corner portion 565a of the diameter-reduced cylindrical container 565 to have a value closer to a right angle, it is preferable that the corner portion 565a of the diameter-reduced cylindrical container 565 be increased in thickness such that the external shape of the corner portion 565a of the diameter-reduced cylindrical container 565 satisfies the following conditional expression (2).

$$(\Delta R + \Delta H) \leq 1.5t \qquad (2)$$

The reason for causing the desirable value for the radius Rd of the peak sites 542f of the side surface portion 542e of the first punch 542 in the diameter-increasing process to range from 1.08 times to 1.17 times the inner radius Rc of the tooth tip portions 521a of the tooth-shaped component 521 will be described below. When the radius Rd of the peak sites 542f is less than 1.08 times the inner radius Rc of the tooth tip portions 521a, the reduced amount of the diameter in the diameter-reducing process is small, and the corner portion 565a is insufficiently increased in thickness, thereby resulting in a possibility that a superposition defect occurs in the succeeding rough tooth shape-forming process and complete tooth shape-forming process. Meanwhile, when the radius Rd of the peak sites 542f exceeds 1.17 times the inner radius Re of the tooth tip portions 521a, the side surface portion 555b is excessively thin in the diameter-increasing process. As a result, the corner portion 565a is insufficiently increased in thickness, thereby causing a possibility that a superposition defect occurs in the succeeding rough tooth shape-forming process and complete tooth shape-forming process. Therefore, it is desirable that the radius Rd of the peak sites 542f of the side surface portion 542e of the first punch 542 in the diameter-increasing process ranges from 1.08 times to 1.17 times the inner radius Re of the tooth tip portions 521a of the tooth-shaped component 521.

(Rough Tooth Shape-Forming Process)

FIGS. 111 to 114 are views schematically illustrating states before forming is performed through the rough tooth shape-forming process. FIG. 111 is a cross-sectional view taken along a plane passing through the central axis C (a D-D cross-sectional view of FIG. 113). FIG. 112 is an A-A cross-sectional view of FIG. 111. FIG. 113 is a B-directional view (a plan view) of FIG. 111. FIG. 114 is an E-directional view (a bottom view) of FIG. 111. As illustrated in the diagrams, the press machine used in the rough tooth shape-forming process includes a rough tooth shape-forming inner punch 572, a rough tooth shape-forming outer punch 573, a rough tooth shape-forming counter punch 574, and a rough tooth shape-forming die 575, having the coaxially disposed central axes C. The rough tooth shape-forming counter punch 574 and the rough tooth shape-forming die 575 are disposed so as to face the rough tooth shape-forming inner punch 572.

The rough tooth shape-forming inner punch 572 has a flat surface portion 572a parallel to the radial direction orthogonal to the central axis C, a curved surface portion 572b provided in an outer edge portion of the flat surface portion 572a, and a side surface portion 572c continued via the flat surface portion 572a and the curved surface portion 572b and elongated in an upward direction (the first direction) of FIG. 111 along the central axis C. In the side surface portion 572c, in order to form the tooth tip portions 521a and the tooth bottom portions 521b of the tooth-shaped component 521, a plurality of peak sites 572d and a plurality of valley sites 572e elongated in parallel to the first direction are alternately formed in the circumferential direction with predetermined spaces among thereof. The rough tooth shape-forming inner punch 572 is a movable type which can reciprocate (can be lifted and lowered) in a direction parallel to the central axis C by a mechanically driven-type (hydraulic-type, servo-motor-type, and the like) driving source (not illustrated).

The rough tooth shape-forming die 575 is a fixed type. The rough tooth shape-forming die 575 has a side surface portion 575a elongated in parallel to the first direction, a curved surface portion 575b provided in an upper end portion of the side surface portion 575a, and a slope portion 575c continued via the side surface portion 575a and the curved surface portion 575b and widened in the radial direction orthogonal to the central axis C toward the first direction. In the side surface portion 575a, in order to form the tooth tip portions 521a and the tooth bottom portions 521b of the tooth-shaped component 521, a plurality of peak sites 575d and a plurality of valley sites 575e elongated in a direction parallel to the first direction are alternately formed in the circumferential direction with predetermined spaces among thereof.

The rough tooth shape-forming outer punch 573 has a tubular shape and is provided along the outer circumference of the rough tooth shape-forming inner punch 572. The rough tooth shape-forming outer punch 573 has a flat surface portion 573a parallel to the radial direction orthogonal to the central axis C, a first side surface portion 573b in contact with an edge portion of the flat surface portion 573a on the small diameter side and elongated in the first direction, and a second side surface portion 573c in contact with an edge portion of the flat surface portion 573a on the large diameter side and elongated in the first direction. As illustrated in FIG. 115, the flat surface portion 573a has a recess portion 573d of which the parts corresponding to the tooth bottom portions 521b (the parts between the tooth tip portions 521a adjacent to each other) of the tooth-shaped component 521 are recessed in the first direction. In the first side surface portion 573b, along the side surface portion 572c of the rough tooth shape-forming inner punch 572, a plurality of peak sites 573e and a plurality of valley sites 573f elongated in the first direction are alternately formed in the circumferential direction with predetermined spaces among thereof. In the second side surface portion 573c, along the side surface portion 575a of the rough tooth shape-forming die 575, a plurality of peak sites 573g and a plurality of valley sites 573h elongated in the first direction are alternately formed in the circumferential direction with predetermined spaces among thereof. The rough tooth shape-forming outer punch 573 is a movable type which can reciprocate (can be lifted and lowered) in a direction parallel to the central axis C along the outer circumference of the rough tooth shape-forming inner punch 572 by a mechanically driven-type (hydraulic-type, servo-motor-type, and the like) driving source (not illustrated).

The rough tooth shape-forming counter punch 574 has a side surface portion 574a elongated in the first direction, and a flat surface portion 574b continued to the side surface portion 574a and parallel to the radial direction orthogonal to the central axis C. In the side surface portion 574a, along the side surface portion 575a of the rough tooth shape-forming die 575, a plurality of peak sites 574d and a plurality of valley sites 574e elongated in the first direction are alternately formed in the circumferential direction with predetermined spaces among thereof. The rough tooth shape-forming counter punch 574 is a movable type which can reciprocate (can be lifted and lowered) in a direction parallel to the central axis C by a mechanically driven-type (hydraulic-type, servo-motor-type, and the like) driving source (not illustrated).

In the rough tooth shape-forming process, while having the diameter-reduced cylindrical container 565 formed in the diameter-reducing process described above, as a workpiece 571, a roughly tooth-shaped component 576 is formed. First, as illustrated in FIG. 112, the diameter-reduced cylindrical container 565 (the workpiece 571) is positioned in the flat surface portion 574b of the rough tooth shape-forming counter punch 574 such that the member axis of the workpiece 571 (the diameter-reduced cylindrical container 565) coincides with the central axis C of the press machine and a diameter-reduced side surface portion 571a (reduced in diameter) of the container side surface portion 565b of the diameter-reduced cylindrical container 565 is positioned in the valley sites 575e of the rough tooth shape-forming die 575. The bottom surface portion 565c of the workpiece 571 is clamped between the flat surface portion 572a of the rough tooth shape-forming inner punch 572 and the flat surface portion 574b of the rough tooth shape-forming counter punch 574, and the flat surface portion 573a of the rough tooth shape-forming outer punch 573 is in a state of abutting an end portion 565d of the workpiece 571. In this state, as illustrated in FIG. 116, the rough tooth shape-forming inner punch 572, the rough tooth shape-forming outer punch 573, and the rough tooth shape-forming counter punch 574 are moved downward until the flat surface portion 573a of the rough tooth shape-forming outer punch 573 passes through the curved surface portion 575b of the rough tooth shape-forming die 575. Accordingly, rough tooth shapes (the rough tooth tip portions 581a) are formed in the diameter-reduced side surface portion 571a of the workpiece 571 (the diameter-reduced cylindrical container 565), thereby forming the roughly tooth-shaped component 576. FIG. 117 is a view schematically illustrating the appearance of the roughly tooth-shaped component 576 after the rough tooth shapes are formed.

The flat surface portion 573a of the rough tooth shape-forming outer punch 573 has the recess portion 573d of which the parts corresponding to the tooth bottom portions 521b of the tooth-shaped component 521 are recessed. Therefore, the workpiece 571 does not come into contact with the entirety of the flat surface portion 573a, and an increase of the forming load caused due to hydrostatic pressure can be reduced. The shape of the recess is not particularly regulated as long as the recess has a shape in which the flat surface portion 573a is not filled with the workpiece 571.

(Complete Tooth Shape-Forming Process)

FIGS. 118 to 120 are views schematically illustrating states before forming in the complete tooth shape-forming process succeeding the rough tooth shape-forming process. FIG. 118 is a D-D cross-sectional view of FIG. 120. FIG. 119 is an A-A cross-sectional plan view of FIG. 118. FIG. 120 is an E-directional view of FIG. 118. As illustrated in the diagrams, the press machine used in the complete tooth shape-forming process includes a complete tooth shape-forming inner punch 582, a complete tooth shape-forming outer punch 583, a complete tooth shape-forming knockout 584, and a complete tooth shape-forming die 585, having the coaxially disposed central axes C. The complete tooth shape-forming knockout 584 and the complete tooth shape-forming die 585 are disposed so as to face the complete tooth shape-forming inner punch 582.

The complete tooth shape-forming inner punch 582 has a flat surface portion 582a parallel to the radial direction orthogonal to the central axis C, a curved surface portion 582b, and a side surface portion 582c continued via the flat surface portion 582a and the curved surface portion 582b and elongated in an upward direction (the first direction) of FIG. 118 in a direction parallel to the central axis C. The side surface portion 582c has the same shape and dimensions of a cross section orthogonal to the central axis C as the side surface portion 572c of the rough tooth shape-forming inner punch 572 used in the rough tooth shape-forming process. In the side surface portion 582c, a plurality of peak sites 582d and a plurality of valley sites 582e elongated in a direction parallel to the first direction are alternately formed in the circumferential direction with predetermined spaces among thereof. The complete tooth shape-forming inner punch 582 is a movable type which can reciprocate (can be lifted and lowered) in a direction parallel to the central axis C by a mechanically driven-type (hydraulic-type, servo-motor-type, and the like) driving source (not illustrated).

The complete tooth shape-forming die 585 is a fixed type and has a first side surface portion 585a elongated in the first direction, a flat surface portion 585b continued to the first side surface portion 585a and parallel to the radial direction orthogonal to the central axis, and a second side surface portion 585c continued to the flat surface portion 585b and elongated in the first direction. The second side surface portion 585c has the same shape and dimensions of a cross section orthogonal to the central axis C as the side surface portion 575c of the rough tooth shape-forming die 575 of the rough tooth shape-forming process. In the second side surface portion 585c, a plurality of peak sites 585d and a plurality of valley sites 585e elongated in a direction parallel to the first direction are alternately formed in the circumferential direction with predetermined spaces among thereof.

The complete tooth shape-forming outer punch 583 has a shape substantially equal to the rough tooth shape-forming outer punch 573. That is, the complete tooth shape-forming outer punch 583 has a tubular shape and is disposed along an outer circumference of the complete tooth shape-forming inner punch 582. The complete tooth shape-forming outer punch 583 has a flat surface portion 583a, a first side surface portion 583b, and a second side surface portion 583c. The flat surface portion 583a is a portion parallel to the radial direction orthogonal to the central axis C. The first side surface portion 583b is in contact with an edge portion of the flat surface portion 583a on the small diameter side and is elongated in the first direction along the side surface portion 582c of the complete tooth shape-forming inner punch 582. The second side surface portion 583c is in contact with an edge portion of the flat surface portion 583a on the large diameter side and is elongated in the first direction along the second side surface portion 585c of the complete tooth shape-forming die 585. As illustrated in FIG. 121, the flat surface portion 583a has a recess portion 583d of which the parts corresponding to the tooth bottom portions 521b (the parts between the tooth tip portions 521a adjacent to each other) of the tooth-shaped component 521 are recessed. The first side surface portion 583b has the same shape and dimensions of a cross section orthogonal to the central axis C as the side surface portion 573b of the rough tooth shape-forming outer punch 573 used in the rough tooth shape-forming process. In the first side surface portion 583b, a plurality of peak sites 583e and a plurality of valley sites 583f elongated in a direction parallel to the first direction are alternately formed in the circumferential direction with predetermined spaces among thereof. The second side surface portion 583c has the same shape and dimensions of a cross section orthogonal to the central axis C as the side surface portion 573c of the rough tooth shape-forming outer punch 573 used in the rough tooth shape-forming process. In the second side surface portion 583c, a plurality of peak sites 583g and a plurality of valley sites 583h elongated in a direction parallel to the first direction are alternately formed in the circumferential direction with predetermined spaces among thereof. The complete tooth shape-forming outer punch 583 is a movable type which can reciprocate (can be lifted and lowered) in a direction parallel to the central axis C by a mechanically driven-type (hydraulic-type, servo-motor-type, and the like) driving source (not illustrated).

The complete tooth shape-forming knockout 584 has a columnar shape and is used for detaching a formed product from the die. The complete tooth shape-forming knockout 584 is a movable type which can reciprocate (can be lifted and lowered) in a direction parallel to the central axis C by a mechanically driven-type (hydraulic-type, servo-motor-type, and the like) driving source (not illustrated).

A bottom surface portion 581b of the workpiece 581 is clamped between the flat surface portion 582a of the complete tooth shape-forming inner punch 582 and the flat surface portion 585b of the complete tooth shape-forming die 585 such that the member axis of a workpiece 581 (the rough tooth shape-formed product 576) coincides with the central axis C of the press machine and the rough tooth tip portions 581a of the roughly tooth-shaped component 576 (the workpiece 581) are positioned in the valley sites 585e of the complete tooth shape-forming die 585. In this state, an opening end 581c of the workpiece 581 is pressed downward by the flat surface portion 583a of the complete tooth shape-forming outer punch 583 so as to compress a side surface portion 581d of the workpiece 581. Accordingly, as illustrated in FIG. 122, the inside of a space surrounded by the complete tooth shape-forming inner punch 582, the complete tooth shape-forming outer punch 583, the complete tooth shape-forming knockout 584, and the complete tooth shape-forming die 585 is filled with the workpiece 581. As a result, complete tooth shapes are formed as the tooth tip portions 521a in the particular parts (the parts in which the rough tooth tip portions 581a are formed) of the rough tooth shape-formed product 576 (the workpiece 581) of the side surface portion 581d, and the tooth bottom portions 521b are formed in other parts of the side surface portion 581d of the rough tooth shape-formed product 576 (the workpiece 581). According to each of the processes described above, the tooth-shaped component 521 having a bottom surface portion 521c, a side surface portion 521d, the tooth tip portions 521a, and the tooth bottom portions 521b is completed.

FIG. 123 is a view of the appearance of the tooth-shaped component 521 after the complete tooth shapes are formed. According to the method of manufacturing a tooth-shaped component in the present embodiment, in an inner surface 5213 of the corner portion of the tooth-shaped component 521, an occurrence of a superposition defect can be prevented. That is, in the method of manufacturing a tooth-shaped component according to the present embodiment, before the complete tooth shapes are formed, forming is performed such that the curved surface portion 582b of the complete tooth shape-forming inner punch 582 and a corner portion 581e of the workpiece 581 come into contact with each other, and the external angle of the corner portion 565a of the diameter-reduced cylindrical container 565 is adjusted to a value close to a right angle. Accordingly, in the complete tooth shape-forming process, it is possible to reduce a gap between a place in the vicinity of the corner portion formed by a boundary of the flat surface portion 585b and a side surface portion 585c of the complete tooth shape-forming die 585, and the corner portion 581e of the workpiece 581. As a result, the corner portion 581e of the workpiece 581 is not separated from the curved surface portion 582b of the complete tooth shape-forming inner punch 582 in the middle of the complete tooth shape-forming process. Therefore, after the complete tooth shape-forming process ends, it is possible to obtain the tooth-shaped component 521 having no superposition defect in a boundary between an upper surface of the bottom surface portion 521c and the inner circumferential surface of the side wall portion 521d.

In addition, in the present embodiment, the cold forging is employed as the method of manufacturing a tooth-shaped component. Therefore, compared to a tooth-shaped component manufactured through the hot forging, it is possible to obtain the tooth-shaped component 521 having no draft and having the dimensional accuracy ten times more accurate in thickness, without performing the machining process. That is, according to the method of manufacturing a tooth-shaped component in the present embodiment, it is possible to obtain the high-quality tooth-shaped component 521 having no superposition defect and draft and having the dimensional accuracy in thickness ranging from ±0.05 mm to ±0.3 mm.

The flat surface portion 583a of the complete tooth shape-forming outer punch 583 has the recess portion 583d of which the parts corresponding to the tooth bottom portions 521b of the tooth-shaped component 521 are recessed. Therefore, the workpiece 581 does not come into contact with the entirety of the flat surface portion 583a, and an increase of the forming load caused due to hydrostatic pressure can be reduced. The shape of the recess is not particularly regulated as long as the recess has a shape in which the flat surface portion 583a is not filled with the workpiece 581.

The tooth-shaped component 521 has a shape in which end portions of the tooth bottom portions 521b protrude. However, as illustrated in FIGS. 99A and 99B, in a case where the end portions are desired to be flattened, after the tooth shape-forming process (that is, after the complete tooth shape-forming process), there may be provided a process in which the end portions of the tooth-shaped component 521 are machined and flattened. The specific method of the machining processing is not particularly limited, and various types of known machining processing can be applied.

Hereinbefore, the present invention has been described together with the embodiments. However, the embodiments are merely specific examples for executing the present invention, and the technical scope of the present invention must not be limitedly interpreted by the embodiments. That is, the present invention can be executed in various forms without departing from the technical idea thereof or the main features thereof.

As the material of the workpiece, it is possible to employ various types of known materials which can be subjected to deformation processing, such as metal, for example, iron, steel, aluminum, titanium, stainless steel, and copper; or alloys thereof; and the like. In addition, a composite material of metal and resin, a composite material of dissimilar metal, and the like may also be employed as the workpiece.

In the first to fourth embodiments, a case where the workpiece is a flat sheet including peak portions and valley portions provided so as to alternately appear along a circumferential direction having the member axis as the center is described as an example, and in the fifth and sixth embodiments, a case where the workpiece is a flat sheet having a circular shape is described as an example.

However, the shape of the workpiece is not limited to the shapes described above. For example, a flat sheet having a polygonal shape may be used as the workpiece.

The present invention is not limited to a tooth-shaped component which is a configuration element in a vehicular automatic transmission device and can be applied when manufacturing a tooth-shaped component which is a configuration element in a driving force transmission mechanism such as general machinery, and a watercraft. In addition, in the first to sixth embodiments, a case where cold forging is applied in the method of manufacturing a tooth-shaped component is described as an example. However, in place of the cold forging, hot forging may be applied as long as a tooth-shaped component having accuracy and strength can be obtained.

BRIEF DESCRIPTION OF THE REFERENCE SYMBOLS

21: TOOTH-SHAPED COMPONENT
21a: TOOTH TIP PORTION
21b: TOOTH BOTTOM PORTION
31: WORKPIECE
31a: VALLEY PORTION
31b: PEAK PORTION
31c: SLOPE PORTION
32: PUNCH
34: DIE
35: CORRUGATED CYLINDRICAL CONTAINER
62: PUNCH
63: COUNTER PUNCH
64: DIE
65: DIAMETER-REDUCED CYLINDRICAL CONTAINER
72: INNER PUNCH
73: OUTER PUNCH
74: COUNTER PUNCH
75: DIE
121: TOOTH-SHAPED COMPONENT
121a: TOOTH TIP PORTION
121b: TOOTH BOTTOM PORTION
131: WORKPIECE
131a: VALLEY PORTION
131b: PEAK PORTION
131c: SLOPE PORTION
132: PUNCH
134: DIE
135: CORRUGATED CYLINDRICAL CONTAINER
162: PUNCH
163: COUNTER PUNCH
164: DIE
165: DIAMETER-REDUCED CYLINDRICAL CONTAINER
172: ROUGH TOOTH SHAPE-FORMING INNER PUNCH
173: ROUGH TOOTH SHAPE-FORMING OUTER PUNCH
174: ROUGH TOOTH SHAPE-FORMING COUNTER PUNCH
175: ROUGH TOOTH SHAPE-FORMING DIE
176: ROUGH TOOTH SHAPE-FORMED PRODUCT
182: COMPLETE TOOTH SHAPE-FORMING INNER PUNCH
183: COMPLETE TOOTH SHAPE-FORMING OUTER PUNCH
184: COMPLETE TOOTH SHAPE-FORMING KNOCKOUT
185: COMPLETE TOOTH SHAPE-FORMING DIE
221: TOOTH-SHAPED COMPONENT
221a: TOOTH TIP PORTION
221b: TOOTH BOTTOM PORTION
231: WORKPIECE
231a: VALLEY PORTION
231b: PEAK PORTION
231c: SLOPE PORTION
232: PUNCH
234: DIE
235: CYLINDRICAL CONTAINER
242: FIRST PUNCH
244: FIRST DIE
245: FIRST DIAMETER-INCREASED CYLINDRICAL CONTAINER
252: SECOND PUNCH
254: SECOND DIE
255: SECOND DIAMETER-INCREASED CYLINDRICAL CONTAINER
262: PUNCH
263: COUNTER PUNCH

264: DIE
265: DIAMETER-REDUCED CYLINDRICAL CONTAINER
272: INNER PUNCH
273: OUTER PUNCH
274: COUNTER PUNCH
275: DIE
321: TOOTH-SHAPED COMPONENT
321a: TOOTH TIP PORTION
321b: TOOTH BOTTOM PORTION
331: WORKPIECE
331a: VALLEY PORTION
331b: PEAK PORTION
331c: SLOPE PORTION
332: PUNCH
334: DIE
335: CYLINDRICAL CONTAINER
342: FIRST PUNCH
344: FIRST DIE
345: FIRST DIAMETER-INCREASED CYLINDRICAL CONTAINER
352: SECOND PUNCH
354: SECOND DIE
355: SECOND DIAMETER-INCREASED CYLINDRICAL CONTAINER
362: PUNCH
363: COUNTER PUNCH
364: DIE
365: DIAMETER-REDUCED CYLINDRICAL CONTAINER
372: ROUGH TOOTH SHAPE-FORMING INNER PUNCH
373: ROUGH TOOTH SHAPE-FORMING OUTER PUNCH
374: ROUGH TOOTH SHAPE-FORMING COUNTER PUNCH
375: ROUGH TOOTH SHAPE-FORMING DIE
376: ROUGH TOOTH SHAPE-FORMED PRODUCT
382: COMPLETE TOOTH SHAPE-FORMING INNER PUNCH
383: COMPLETE TOOTH SHAPE-FORMING OUTER PUNCH
384: COMPLETE TOOTH SHAPE-FORMING KNOCKOUT
385: COMPLETE TOOTH SHAPE-FORMING DIE
421: TOOTH-SHAPED COMPONENT
421a: TOOTH TIP PORTION
421b: TOOTH BOTTOM PORTION
431: WORKPIECE
432: PUNCH
433: KNOCKOUT
434: DIE
435: CYLINDRICAL CONTAINER
442: FIRST PUNCH
443: FIRST KNOCKOUT
444: FIRST DIE
445: FIRST DIAMETER-INCREASED CYLINDRICAL CONTAINER
452: FIRST PUNCH
453: FIRST KNOCKOUT
454: FIRST DIE
455: SECOND DIAMETER-INCREASED CYLINDRICAL CONTAINER
462: PUNCH
463: COUNTER PUNCH
464: DIE
465: DIAMETER-REDUCED CYLINDRICAL CONTAINER
472: INNER PUNCH
473: OUTER PUNCH
474: COUNTER PUNCH
475: DIE
521: TOOTH-SHAPED COMPONENT
521a: TOOTH TIP PORTION
521b: TOOTH BOTTOM PORTION
531: WORKPIECE
532: PUNCH
533: KNOCKOUT
534: DIE
535: CYLINDRICAL CONTAINER
542: FIRST PUNCH
543: FIRST KNOCKOUT
544: FIRST DIE
545: FIRST DIAMETER-INCREASED CYLINDRICAL CONTAINER
552: FIRST PUNCH
553: FIRST KNOCKOUT
554: FIRST DIE
555: SECOND DIAMETER-INCREASED CYLINDRICAL CONTAINER
562: PUNCH
563: COUNTER PUNCH
564: DIE
565: DIAMETER-REDUCED CYLINDRICAL CONTAINER
572: ROUGH TOOTH SHAPE-FORMING INNER PUNCH
573: ROUGH TOOTH SHAPE-FORMING OUTER PUNCH
574: ROUGH TOOTH SHAPE-FORMING COUNTER PUNCH
575: ROUGH TOOTH SHAPE-FORMING DIE
576: ROUGH TOOTH-SHAPED COMPONENT
582: COMPLETE TOOTH SHAPE-FORMING INNER PUNCH
583: COMPLETE TOOTH SHAPE-FORMING OUTER PUNCH
584: COUNTER PUNCH FOR FORMING COMPLETE TOOTH SHAPE
585: COMPLETE TOOTH SHAPE-FORMING DIE

The invention claimed is:

1. A method of manufacturing a tooth-shaped component, comprising:

a drawing process of draw-forming a workpiece so as to obtain a cylindrical container which has a bottom surface portion and a side surface portion;

a diameter-reducing process of reducing a diameter of a particular part of the side surface portion in which a tooth tip portion is to be formed in the side surface portion of the cylindrical container, so as to increase a thickness of a corner portion between the bottom surface portion and the side surface portion;

a diameter-increasing process of increasing a diameter of the particular part of the cylindrical container obtained through the drawing process, between the drawing process and the diameter-reducing process; and a tooth shape-forming process of forming the tooth tip portion in the particular part of the cylindrical container reduced in diameter in the diameter-reducing process, so as to obtain a tooth-shaped component which has the bottom surface portion, the side surface portion, and the tooth tip portion, wherein in the diameter-reducing process, in a case where the cylindrical container is viewed in a cross section including a central axis direction and a radial direction of the cylindrical container, when an intersection point of a straight line L1 in parallel contact with the bottom surface portion of the cylindrical container and a straight line L2 in parallel contact with the side surface portion of the cylindrical container is defined as P0, a point at which the straight line L1 starts being separated from the bottom surface portion of the cylindrical container is defined as P1, a point at which the straight line L2 starts being separated from the side surface portion of the cylindrical container is defined as P2, the length between the intersection point P0 and the point P1 on the straight line L1 is defined as $\Delta R$, and the length between the intersection point P0 and the point P2 on the straight line L2 is defined as $\Delta H$, the corner portion is increased in thickness such that an external shape of the corner portion of the cylindrical container satisfies the following conditional expression $(\Delta R+\Delta H)\leq 2t$, wherein t is a plate thickness of the cylindrical container.

2. The method of manufacturing a tooth-shaped component according to claim 1, wherein the tooth shape-forming process a includes rough tooth shape-forming process of forming a rough tooth shape in the particular part of the cylindrical container reduced in diameter in the diameter-reducing process, and a complete tooth shape-forming process of forming a complete tooth shape as the tooth tip portion in the particular part by processing the rough tooth shape.

3. The method of manufacturing a tooth-shaped component according to claim 1, wherein the workpiece is a flat sheet which has peak portions and valley portions provided so as to alternately appear along a circumferential direction having a member axis as a center, and the peak portions are parts which protrude outwardly from the valley portions in a radial direction having the member axis as the center.

4. The method of manufacturing a tooth-shaped component according to claim 1, wherein the workpiece is a circular flat sheet or a polygonal flat sheet.

5. The method of manufacturing a tooth-shaped component according to claim 1, wherein the workpiece is a flat sheet which has peak portions and valley portions provided so as to alternately appear along a circumferential direction having a member axis as a center, and the peak portions are parts which protrude outwardly from the valley portions in a radial direction having the member axis as the center, wherein in the drawing process, the workpiece is draw-formed such that the peak portions and the valley portions are included in the side surface portion of the cylindrical container, and wherein in the diameter-reducing process, the peak portions included in the side surface portion of the cylindrical container obtained through the drawing process is reduced in diameter, as the particular part.

6. The method of manufacturing a tooth-shaped component according to claim 5, wherein in the drawing process, a punch and a die, having coaxially disposed central axes are used, wherein the punch has a punch flat surface portion parallel to a radial direction orthogonal to the central axis of the punch, and a punch side surface portion connected to the punch flat surface portion via a punch curved surface portion, wherein the punch side surface portions extends in a first direction parallel to the central axis of the punch, and peak sites and valley sites elongated in the first direction are formed in the punch side surface portion, wherein the die has a die flat surface portion parallel to a radial direction orthogonal to the central axis of the die, and a die side surface portion connected to the die flat surface portion and extending in the first direction of the punch, and peak sites and valley sites elongated in the first direction are formed in the die side surface portion, and wherein after the workpiece is positioned on the die such that the peak portions of the workpiece are positioned in the valley sites of the die, the punch is relatively moved in a direction of the die so as to obtain the cylindrical container in which the side surface portion stands upright with respect to the bottom surface portion.

7. The method of manufacturing a tooth-shaped component according to claim 5, wherein in the diameter-reducing process, a punch, a counter punch, and a die disposed in an outer circumference of the counter punch, having coaxially disposed central axes are used, wherein the punch has a punch flat surface portion parallel to a radial direction orthogonal to the central axis of the punch, and a punch side surface portion connected to the punch flat surface portion via a punch curved surface portion, extending in a first direction parallel to the central axis of the punch, and having a radius equal to an inner radius of the tooth tip portion of the tooth-shaped component, wherein the counter punch has a counter punch flat surface portion parallel to a radial direction orthogonal to the central axis of the counter punch, and a counter punch side surface portion connected to the counter punch flat surface portion, extending in an opposite direction of the first direction, and having a radius equal to an outer radius of the tooth tip portion of the tooth-shaped component, wherein the die has a die side surface portion extending in the first direction and having a radius equal to an outer radius of the tooth tip portion of the tooth-shaped component, and a die slope portion connected to the die side surface portion via a die curved surface portion, wherein the die side surface portion is widened in a direction orthogonal to the central axis of the die toward the first direction, and wherein in a state where the bottom surface portion of the cylindrical container obtained through the drawing process is interposed between the punch and the counter punch, the punch and the counter punch are relatively moved in a direction of the die so as to cause the peak portions included in the side surface portion of the cylindrical container to be reduced in diameter as the particular part.

8. The method of manufacturing a tooth-shaped component according to claim 5, wherein in the tooth shape-forming process, an inner punch, an outer punch disposed in an outer circumference of the inner punch, a counter punch, and a die disposed in an outer circumference of the counter punch, having coaxially disposed central axes are used, wherein the inner punch has an inner punch flat surface portion parallel to a radial direction orthogonal to the central axis of the inner punch, and an inner punch side surface portion connected to the inner punch flat surface portion via an inner punch curved surface portion, wherein the inner punch side surface portion extends in a first direction parallel to the central axis of the inner punch, and inner punch peak sites and inner punch valley sites extending in the first direction are formed in the inner punch side surface portion, wherein the die has a die side surface portion extending in the first direction and a die slope portion connected to the die side surface portion via a die curved surface portion, wherein the die side surface portion is widened in a direction orthogonal to the central axis of the die toward the first direction, and die valley sites and die peak sites extending in the first direction are formed in the die side surface portion, wherein the outer punch has an outer punch flat surface portion parallel to a radial direction orthogonal to the central axis of the outer punch, an outer punch first side surface portion connected to the outer punch flat surface portion and extending in the first direction along the inner punch side surface portion, and an outer punch second side surface portion connected to the outer punch flat surface portion and extending in the first direction along the die side surface portion, wherein the counter punch has a counter punch side surface portion extending in the first direction along the die side surface portion, and a counter punch flat surface portion connected to the counter punch side surface portion and parallel to a radial direction orthogonal to the central axis of the counter punch, and wherein in a state where the bottom surface portion of the cylindrical container is interposed between the inner punch flat surface portion and the counter punch flat surface portion such that the peak portions of the cylindrical container reduced in diameter in the diameter-reducing process are positioned in the die valley sites, after the outer punch flat surface portion is caused to abut an opening end of the cylindrical container, the inner punch, the outer punch, and the counter punch are relatively moved in a direction of the die, and after the outer punch flat surface portion passes through the die curved surface portion, in a state where the inner punch, the counter punch, and the die are fixed, the outer punch is relatively moved in a direction of the counter punch so as to form the tooth tip portion in the peak portions of the cylindrical container.

9. The method of manufacturing a tooth-shaped component according to claim 5,
wherein the tooth shape-forming process includes a rough tooth shape-forming process of forming a rough tooth shape in the peak portions of the cylindrical container reduced in diameter in the diameter-reducing process, and a complete tooth shape-forming process of forming a complete tooth shape as the tooth tip portion in the peak portions by processing the rough tooth shape.

10. The method of manufacturing a tooth-shaped component according to claim 9,
wherein in the rough tooth shape-forming process, a rough tooth shape-forming inner punch, a rough tooth shape-forming outer punch disposed around an outer circumference of the rough tooth shape-forming inner punch, a rough tooth shape-forming counter punch, and a rough tooth shape-forming die disposed around an outer circumference of the rough tooth shape-forming counter punch, having coaxially disposed central axes are used, wherein the rough tooth shape-forming inner punch has a rough tooth shape-forming inner punch flat surface portion parallel to a radial direction orthogonal to the central axis of the rough tooth shape-forming inner punch, a rough tooth shape-forming inner punch side surface portion connected to the rough tooth shape-forming inner punch flat surface portion via a rough tooth shape-forming inner punch curved surface portion, and the rough tooth shape-forming inner punch side surface portion extends in a first direction parallel to the central axis of the rough tooth shape-forming inner punch, and rough tooth shape-forming inner punch peak sites and rough tooth shape-forming inner punch valley sites extending in the first direction are formed in the rough tooth shape-forming inner punch side surface portion, wherein the rough tooth shape-forming die has a rough tooth shape-forming die side surface portion extending in the first direction, and a rough tooth shape-forming die slope portion connected to the rough tooth shape-forming die side surface portion via a rough tooth shape-forming die curved surface portion, wherein the rough tooth shape-forming die slope portion is widened in a direction orthogonal to the central axis of the rough tooth shape-forming die toward the first direction, and rough tooth shape-forming die valley sites and rough tooth shape-forming die peak sites extending in the first direction are formed in the rough tooth shape-forming die side surface portion, wherein the rough tooth shape-forming outer punch has a rough tooth shape-forming outer punch flat surface portion parallel to a radial direction orthogonal to the central axis of the rough tooth shape-forming outer punch, a rough tooth shape-forming outer punch first side surface portion connected to the rough tooth shape-forming outer punch flat surface portion and extending in the first direction along the rough tooth shape-forming inner punch side surface portion, and a rough tooth shape-forming outer punch second side surface portion connected to the rough tooth shape-forming outer punch flat surface portion and extending in the first direction along the rough tooth shape-forming die side surface portion, wherein the rough tooth shape-forming counter punch has a rough tooth shape-forming counter punch side surface portion extending in the first direction along the rough tooth shape-forming die side surface portion, and a rough tooth shape-forming counter punch flat surface portion connected to the rough tooth shape-forming counter punch side surface portion and parallel to a radial direction orthogonal to the central axis of the rough tooth shape-forming counter punch, and wherein in a state where the bottom surface portion of the cylindrical container is interposed between the rough tooth shape-forming inner punch flat surface portion and the rough tooth shape-forming counter punch flat surface portion such that the peak portions of the cylindrical container reduced in diameter in the diameter-reducing process are positioned in the rough tooth shape-forming die valley sites, after the rough tooth shape-forming outer punch flat surface portion is caused to abut an opening end of the cylindrical container, the rough tooth shape-forming inner punch, the rough tooth shape-forming outer punch, and the rough tooth shape-forming counter punch are relatively moved in a direction of the rough tooth shape-forming die so as to form the rough tooth shape in the peak portions of the cylindrical container.

11. The method of manufacturing a tooth-shaped component according to claim 10,
wherein in the complete tooth shape-forming process, a complete tooth shape-forming inner punch, a complete tooth shape-forming outer punch disposed around an outer circumference of the complete tooth shape-forming inner punch, and a complete tooth shape-forming die, having coaxially disposed central axes are used,
wherein the complete tooth shape-forming inner punch has a complete tooth shape-forming inner punch flat surface portion parallel to a radial direction orthogonal to the central axis of the complete tooth shape-forming inner punch, and a complete tooth shape-forming inner punch side surface portion connected to the complete tooth shape-forming inner punch flat surface portion via a complete tooth shape-forming inner punch curved surface portion, wherein the complete tooth shape-forming inner punch side surface portion extends in a first direction parallel to the central axis of the complete tooth shape-forming inner punch, and the complete tooth shape-forming inner punch side surface portion has the same shape and dimensions of a cross section orthogonal to the central axis of the complete tooth shape-forming inner punch as the rough tooth shape-forming inner punch side surface portion and has complete tooth shape-forming inner punch peak sites and complete tooth shape-forming inner punch valley sites elongated in the first direction of the complete tooth shape-forming inner punch,
wherein the complete tooth shape-forming die has a complete tooth shape-forming die flat surface portion parallel to a radial direction orthogonal to the central axis of the complete tooth shape-forming die, and a complete tooth shape-forming die side surface portion connected to the complete tooth shape-forming die flat surface portion and extending in the first direction of the complete tooth shape-forming inner punch, and the complete tooth shape-forming die side surface portion has the same shape and dimensions of a cross section orthogonal to the central axis of the complete tooth shape-forming die as the rough tooth shape-forming die side surface portion and has complete tooth shape-forming die peak sites and complete tooth shape-forming die valley sites elongated in the first direction of the complete tooth shape-forming inner punch,
wherein the complete tooth shape-forming outer punch has a complete tooth shape-forming outer punch flat surface portion parallel to a radial direction orthogonal to the central axis of the complete tooth shape-forming outer punch, a complete tooth shape-forming outer punch first side surface portion to the complete tooth shape-forming outer punch flat surface portion and extending in the first direction of the complete tooth shape-forming inner punch along the complete tooth shape-forming inner punch side surface portion, and a complete tooth shape-forming outer punch second side surface portion connected to the complete tooth shape-forming outer punch flat surface portion and extending in the first direction of the complete tooth shape-forming inner punch along the complete tooth shape-forming die side surface portion, and
wherein in a state where the bottom surface portion of the cylindrical container is interposed between the complete tooth shape-forming inner punch flat surface portion and the complete tooth shape-forming die flat surface portion such that the rough tooth shape formed in the peak portions of the cylindrical container in the rough tooth shape-forming process are positioned in the complete tooth shape-forming die valley sites, the complete tooth shape-forming outer punch flat surface portion is pressed to an opening end of the cylindrical container so as to form the complete tooth shape in the peak portions of the cylindrical container.

12. The method of manufacturing a tooth-shaped component according to claim 1,
wherein the workpiece is a flat sheet which has peak portions and valley portions provided so as to alternately appear along a circumferential direction having a member axis as a center, and the peak portions are parts which protrude outwardly from the valley portions in a radial direction having the member axis as the center,
wherein in the drawing process, the workpiece is draw-formed such that the peak portions and the valley portions are included in the side surface portion of the cylindrical container,
wherein in the diameter-increasing process, a projection portion realized by the deformed peak portion included in the side surface portion of the cylindrical container obtained through the drawing process is increased in diameter, as the particular part, and
wherein in the diameter-reducing process, the projection portion of the cylindrical container increased in diameter in the diameter-increasing process is reduced in diameter.

13. The method of manufacturing a tooth-shaped component according to claim 12,
wherein the diameter-increasing process includes a first step using a first punch and a first die having coaxially disposed central axes, and a second step using a second punch and a second die having coaxially disposed central axes,
wherein the first punch has a first punch flat surface portion parallel to a radial direction orthogonal to the central axis of the first punch, a first punch slope portion connected to the first punch flat surface portion via a first punch first curved surface portion, wherein the first punch slope portion is widened in the radial direction orthogonal to the central axis of the first punch toward a first direction parallel to the central axis of the first punch, and a first punch side surface portion connected to the first punch slope portion via a first punch second curved surface portion and the first punch side surface portion extends in the first direction, and peak sites and valley sites elongated in the first direction are formed in the first punch side surface portion,
wherein the first die has a first die flat surface portion parallel to a radial direction orthogonal to the central axis of the first die, and a first die side surface portion connected to the first die flat surface portion and extending in the first direction, wherein peak sites and valley sites elongated in the first direction are formed in the first die side surface portion, and the first die side surface portion is offset the radial direction of the first die from the first punch side surface portion by much as a plate thickness of the workpiece,
wherein the second punch has a second punch flat surface portion parallel to a radial direction orthogonal to the central axis of the second punch, and a second punch side surface portion connected to the second punch flat surface portion via a second punch curved surface portion and the second punch side surface portions extends in a first direction parallel to the central axis of the second punch, and the second punch side surface portion has the same shape and dimensions as the first punch side surface portion and a peak site and a valley site elongated in the first direction parallel to the central axis of the second punch are formed therein, wherein the second die has a second die flat surface portion parallel to a radial direction orthogonal to the central axis of the second die, and a second die side surface portion connected to the second die flat surface portion and extending in the first direction of the second punch, and the second die side surface portion has the same shape and dimensions as the first die side surface portion and peak sites and valley sites elongated in the first direction are formed therein, wherein in the first step, the cylindrical container is positioned on the first die such that the projection portion realized by the deformed peak portion of the cylindrical container obtained through the drawing process is positioned in the valley site of the first die, the first punch is relatively moved in a direction of the first die so as to increase a diameter of the projection portion, and wherein in the second step, the cylindrical container is positioned on the second die such that the diameter-increased projection portion is positioned in the valley site of the second die, the second punch is relatively moved in a direction of the second die so as to obtain the cylindrical container in which the side surface portion stands upright with respect to the bottom surface portion.

14. The method of manufacturing a tooth-shaped component according to claim 12, wherein in the diameter-reducing process, a punch, a counter punch, and a die disposed around an outer circumference of the counter punch, having coaxially disposed central axes are used, wherein the punch has a punch flat surface portion parallel to a radial direction orthogonal to the central axis of the punch, and a punch side surface portion connected to the punch flat surface portion via a punch curved surface portion, extending in a first direction parallel to the central axis of the punch, and having a radius equal to an inner radius of the tooth tip portion of the tooth-shaped component, wherein the counter punch has a counter punch flat surface portion parallel to a radial direction orthogonal to the central axis of the counter punch, and a counter punch side surface portion connected to the counter punch flat surface portion, extending in an opposite direction of the first direction, and having a radius equal to an outer radius of the tooth tip portion of the tooth-shaped component, wherein the die has a die side surface portion extending in the first direction and having a radius equal to an outer radius of the tooth tip portion of the tooth-shaped component, and a die slope portion connected to the die side surface portion via a die curved surface portion and widened in a direction orthogonal to the central axis of the die toward the first direction, and wherein in a state where the bottom surface portion of the cylindrical container having the projection portion increased in diameter through the diameter-increasing process is interposed between the punch and the counter punch, the punch and the counter punch are relatively moved in a direction of the die so as to cause the projection portion included in the side surface portion of the cylindrical container to be reduced in diameter.

15. The method of manufacturing a tooth-shaped component according to claim 12, wherein in the tooth shape-forming process, an inner punch, an outer punch disposed around an outer circumference of the inner punch, a counter punch, and a die disposed in an outer circumference of the counter punch, having coaxially disposed central axes are used, wherein the inner punch has an inner punch flat surface portion parallel to a radial direction orthogonal to the central axis of the inner punch, and an inner punch side surface portion connected to the inner punch flat surface portion via an inner punch curved surface portion and extending in a first direction parallel to the central axis of the inner punch, and an inner punch peak site and an inner punch valley site extending in the first direction are formed in the inner punch side surface portion, wherein the die has a die side surface portion extending in the first direction, and a die slope portion connected to the die side surface portion via a die curved surface portion and widened in a direction orthogonal to the central axis of the die toward the first direction, and die valley sites and die peak sites extending in the first direction are formed in the die side surface portion, wherein the outer punch has an outer punch flat surface portion parallel to a radial direction orthogonal to the central axis of the outer punch, an outer punch first side surface portion connected to the outer punch flat surface portion and extending in the first direction along the inner punch side surface portion, and an outer punch second side surface portion connected to the outer punch flat surface portion and extending in the first direction along the die side surface portion, wherein the counter punch has a counter punch side surface portion extending in the first direction along the die side surface portion, and a counter punch flat surface portion connected to the counter punch side surface portion and parallel to a radial direction orthogonal to the central axis of the counter punch, and wherein in a state where the bottom surface portion of the cylindrical container is interposed between the inner punch flat surface portion and the counter punch flat surface portion such that the projection portion reduced in diameter through the diameter-reducing process is positioned in the die valley sites, the outer punch flat surface portion is caused to abut an opening end of the cylindrical container, the inner punch, the outer punch, and the counter punch are relatively moved in a direction of the die, the outer punch flat surface portion passes through the die curved surface portion in a state where the inner punch, the counter punch, and the die are fixed, and the outer punch is relatively moved in a direction of the counter punch so as to form the tooth tip portion in the projection portion of the cylindrical container.

16. The method of manufacturing a tooth-shaped component according to claim 12, wherein the tooth shape-forming process includes a rough tooth shape-forming process of forming a rough tooth shape in the projection portion of the cylindrical container reduced in diameter in the diameter-reducing process, and a complete tooth shape-forming process of forming a complete tooth shape as the tooth tip portion in the projection portion by processing the rough tooth shape.

17. The method of manufacturing a tooth-shaped component according to claim 16,
wherein in the rough tooth shape-forming process, a rough tooth shape-forming inner punch, a rough tooth shape-forming outer punch disposed in an outer circumference of the rough tooth shape-forming inner punch, a rough tooth shape-forming counter punch, and a rough tooth shape-forming die disposed in an outer circumference of the rough tooth shape-forming counter punch, having coaxially disposed central axes are used,
wherein the rough tooth shape-forming inner punch has a rough tooth shape-forming inner punch flat surface portion parallel to a radial direction orthogonal to the central axis of the rough tooth shape-forming inner punch, a rough tooth shape-forming inner punch side surface portion connected to the rough tooth shape-forming inner punch flat surface portion via a rough tooth shape-forming inner punch curved surface portion and extending in a first direction parallel to the central axis of the rough tooth shape-forming inner punch, and rough tooth shape-forming inner punch peak sites and rough tooth shape-forming inner punch valley sites extending in the first direction are formed in the rough tooth shape-forming inner punch side surface portion,
wherein the rough tooth shape-forming die has a rough tooth shape-forming die side surface portion extending in the first direction, and a rough tooth shape-forming die slope portion connected to the rough tooth shape-forming die side surface portion via a rough tooth shape-forming die curved surface portion and widened in a direction orthogonal to the central axis of the rough tooth shape-forming die toward the first direction, and rough tooth shape-forming die valley sites and rough tooth shape-forming die peak sites extending in the first direction are formed in the rough tooth shape-forming die side surface portion,
wherein the rough tooth shape-forming outer punch has a rough tooth shape-forming outer punch flat surface portion parallel to a radial direction orthogonal to the central axis of the rough tooth shape-forming outer punch, a rough tooth shape-forming outer punch first side surface portion connected to the rough tooth shape-forming outer punch flat surface portion and extending in the first direction along the rough tooth shape-forming inner punch side surface portion, and a rough tooth shape-forming outer punch second side surface portion connected to the rough tooth shape-forming outer punch flat surface portion and extending in the first direction along the rough tooth shape-forming die side surface portion,
wherein the rough tooth shape-forming counter punch has a rough tooth shape-forming counter punch side surface portion extending in the first direction along the rough tooth shape-forming die side surface portion, and a rough tooth shape-forming counter punch flat surface portion continued to the rough tooth shape-forming counter punch side surface portion and parallel to a radial direction orthogonal to the central axis of the rough tooth shape-forming counter punch, and
wherein in a state where the bottom surface portion of the cylindrical container is interposed between the rough tooth shape-forming inner punch flat surface portion and the rough tooth shape-forming counter punch flat surface portion such that the projection portion reduced in diameter through the diameter-reducing process is positioned in the rough tooth shape-forming die valley sites, after the rough tooth shape-forming outer punch flat surface portion is caused to abut an opening end of the cylindrical container, the rough tooth shape-forming inner punch, the rough tooth shape-forming outer punch, and the rough tooth shape-forming counter punch are relatively moved in a direction of the rough tooth shape-forming die so as to form the rough tooth shape in the projection portion of the cylindrical container.

18. The method of manufacturing a tooth-shaped component according to claim 17,
wherein in the complete tooth shape-forming process, a complete tooth shape-forming inner punch, a complete tooth shape-forming outer punch disposed in an outer circumference of the complete tooth shape-forming inner punch, and a complete tooth shape-forming die, having coaxially disposed central axes are used,
wherein the complete tooth shape-forming inner punch has a complete tooth shape-forming inner punch flat surface portion parallel to a radial direction orthogonal to the central axis of the complete tooth shape-forming inner punch, and a complete tooth shape-forming inner punch side surface portion connected to the complete tooth shape-forming inner punch flat surface portion via a complete tooth shape-forming inner punch curved surface portion, wherein the complete tooth shape-forming inner punch side surface extends in a first direction parallel to the central axis of the complete tooth shape-forming inner punch, and the complete tooth shape-forming inner punch side surface portion has the same shape and dimensions of a cross section orthogonal to the central axis of the complete tooth shape-forming inner punch as the rough tooth shape-forming
inner punch side surface portion and has complete tooth shape-forming inner punch peak sites and complete tooth shape-forming inner punch valley sites elongated in the first direction of the complete tooth shape-forming inner punch,
wherein the complete tooth shape-forming die has a complete tooth shape-forming die flat surface portion parallel to a radial direction orthogonal to the central axis of the complete tooth shape-forming die, and a complete tooth shape-forming die side surface portion connected to the complete tooth shape-forming die flat surface portion and extending in the first direction of the complete tooth shape-forming inner punch, and the complete tooth shape-forming die side surface portion has the same shape and dimensions of a cross section orthogonal to the central axis of the complete tooth shape-forming die as the rough tooth shape-forming die side surface portion and has complete tooth shape-forming die peak sites and complete tooth shape-forming die valley sites elongated in the first direction of the complete tooth shape-forming inner punch,
wherein the complete tooth shape-forming outer punch has a complete tooth shape-forming outer punch flat surface portion parallel to a radial direction orthogonal to the central axis of the complete tooth shape-forming outer punch, a complete tooth shape-forming outer punch first side surface portion connected to the complete tooth shape-forming outer punch flat surface portion and extending in the first direction of the complete tooth shape-forming inner punch along the complete tooth shape-forming inner punch side surface portion, and a complete tooth shape-forming outer punch second side surface portion connected to the complete tooth shape-forming outer punch flat surface portion and extending in the first direction of the complete tooth shape-forming inner punch along the complete tooth shape-forming die side surface portion, and wherein in a state where the bottom surface portion of the cylindrical container is interposed between the complete tooth shape-forming inner punch flat surface portion and the complete tooth shape-forming die flat surface portion such that the rough tooth shape formed in the projection portion of the cylindrical container in the rough tooth shape-forming process is positioned in the complete tooth shape-forming die valley sites, the complete tooth shape-forming outer punch flat surface portion is pressed to an opening end of the cylindrical container so as to form the complete tooth shape in the projection portion of the cylindrical container.

19. The method of manufacturing a tooth-shaped component according to claim 1,
wherein in the drawing process, the workpiece which is a circular flat sheet is draw-formed so as to obtain the cylindrical container.

20. The method of manufacturing a tooth-shaped component according to claim 19,
wherein the diameter-increasing process includes a first step using a first punch and a first die having coaxially disposed central axes, and a second step using a second punch and a second die having coaxially disposed central axes,
wherein the first punch has a first punch flat surface portion parallel to a radial direction orthogonal to the central axis of the first punch, a first punch slope portion connected to the first punch flat surface portion via a first punch first curved surface portion, wherein the first punch slope portion is widened in a radial direction orthogonal to the central axis of the first punch toward a first direction parallel to the central axis of the first punch, and a first punch side surface portion connected to the first punch slope portion via a first punch second curved surface portion and elongated in the first direction, and peak sites and valley sites elongated in the first direction are formed in the first punch side surface portion,
wherein the first die has a first die first side surface portion elongated in the first direction, a first die flat surface portion connected to the first die first side surface portion and parallel to a radial direction orthogonal to the central axis of the first die, and a first die second side surface portion connected to the first die flat surface portion and elongated in the first direction, and the first die second side surface portion has peak sites and valley sites which are offset in the radial direction of the first die from the first punch side surface portion by as much as a plate thickness of the workpiece,
wherein the second punch has a second punch flat surface portion parallel to a radial direction orthogonal to the central axis, and a second punch side surface portion connected to the second punch flat surface portion via a second punch curved surface portion and elongated in the first direction, and the second punch side surface portion has the same shape and dimensions as the first punch side surface portion and peak sites and valley sites elongated in the first direction are formed therein,
wherein the second die has a second die first side surface portion elongated in the first direction, a second die flat surface portion connected to the second die first side surface portion and parallel to a radial direction orthogonal to the central axis of the second die, and a second die second side surface portion connected to the second die flat surface portion and elongated in the first direction, and the second die second side surface portion has the same shape and dimensions as the first die second side surface portion and peak sites and valley sites elongated in the first direction are formed therein,
wherein in the first step, after the cylindrical container obtained through the drawing process is positioned on the first die, the first punch is relatively moved in a direction of the first die so as to increase a diameter of the particular part included in the side surface portion due to the peak site of the first punch, and
wherein in the second step, after the cylindrical container is positioned on the second die flat surface portion such that the diameter-increased particular part is positioned in the valley sites of the second die, the second punch is relatively moved in a direction of the second die so as to obtain the cylindrical container in which the side surface portion stands upright with respect to the bottom surface portion.

21. The method of manufacturing a tooth-shaped component according to claim 19,
wherein in the diameter-reducing process, a punch, a counter punch having a central axis coaxially disposed with the punch, and a die disposed along an outer circumference of the counter punch are used,
wherein the punch has a punch flat surface portion parallel to a radial direction orthogonal to the central axis of the counter punch, and a punch side surface portion connected to the punch flat surface portion via a punch curved surface portion, wherein the punch side surface portion is elongated in a first direction parallel to the central axis along the central axis, and having a radius equal to an inner radius of the tooth tip portion of the tooth-shaped component,
wherein the counter punch has a counter punch flat surface portion parallel to a radial direction orthogonal to the central axis, and a counter punch side surface portion connected to the counter punch flat surface portion, elongated in an opposite direction of the first direction, and having a radius equal to an outer radius of the tooth tip portion of the tooth-shaped component,
wherein the die has a die side surface portion elongated in the first direction and having an inner radius equal to an outer radius of the tooth tip portion of the tooth-shaped component, and a die slope portion connected to the die side surface portion via a die curved surface portion, wherein the die slope portion is widened in a direction orthogonal to the central axis toward the first direction, and
wherein in a state where the bottom surface portion of the cylindrical container having the particular part increased in diameter through the diameter-increasing process is interposed between the punch and the counter punch, the punch and the counter punch are relatively moved in a direction of the die so as to cause the particular part included in the side surface portion of the cylindrical container to be reduced in diameter.

22. The method of manufacturing a tooth-shaped component according to claim 19,
wherein in the tooth shape-forming process, an inner punch, an outer punch disposed along an outer circumference of the inner punch, a counter punch disposed so as to face the inner punch, and a die disposed along an outer circumference of the counter punch having central axes coaxially disposed with each other are used, wherein the inner punch has an inner punch flat surface portion parallel to a radial direction orthogonal to the central axis of the inner punch, and an inner punch side surface portion connected to the inner punch flat surface portion via an inner punch curved surface portion and elongated in a first direction parallel to the central axis of the inner punch, and inner punch peak sites and inner punch valley sites extending in the first direction are formed in the inner punch side surface portion, wherein the die has a die side surface portion elongated in the first direction, and a die slope portion connected to the die side surface portion via a die curved surface portion and widened in a direction orthogonal to the central axis of the die toward the first direction, and die valley sites and die peak sites extending in the first direction are formed in the die side surface portion, wherein the outer punch has an outer punch first side surface portion having a tubular shape and elongated in the first direction along the inner punch side surface portion, an outer punch flat surface portion connected to the outer punch first side surface portion and parallel to a radial direction orthogonal to the central axis of the outer punch, and an outer punch second side surface portion connected to the outer punch flat surface portion and elongated in the first direction along the die side surface portion of the die, and the outer punch flat surface portion has a recess portion in which a part corresponding to a part between the tooth tip portions adjacent to each other is recessed, wherein the counter punch has a counter punch side surface portion elongated in the first direction along the die side surface portion, and a counter punch flat surface portion to the counter punch side surface portion and parallel to a radial direction orthogonal to the central axis of the counter punch, and wherein in a state where the bottom surface portion of the cylindrical container is interposed between the inner punch flat surface portion and the counter punch flat surface portion such that the particular part reduced in diameter through the diameter-reducing process is positioned in the die valley sites, after the outer punch flat surface portion is caused to abut an opening end of the cylindrical container, the inner punch, the outer punch, and the counter punch are relatively moved in a direction of the die, and after the outer punch flat surface portion passes through the die curved surface portion, in a state where the inner punch, the counter punch, and the die are fixed, the outer punch is relatively moved in a direction of the counter punch so as to form the tooth tip portion in the particular part of the cylindrical container.

23. The method of manufacturing a tooth-shaped component according to claim 19, wherein the tooth shape-forming process includes a rough tooth shape-forming process of forming a rough tooth shape in the particular part of the cylindrical container reduced in diameter in the diameter-reducing process, and a complete tooth shape-forming process of forming a complete tooth shape as the tooth tip portion in the particular part by processing the rough tooth shape.

24. The method of manufacturing a tooth-shaped component according to claim 23, wherein in the rough tooth shape-forming process, a rough tooth shape-forming inner punch, a rough tooth shape-forming outer punch disposed along an outer circumference of the rough tooth shape-forming inner punch, a rough tooth shape-forming counter punch disposed so as to face the rough tooth shape-forming inner punch, and a rough tooth shape-forming die disposed along an outer circumference of the rough tooth shape-forming counter punch having central axes coaxially disposed with each other are used, wherein the rough tooth shape-forming inner punch has a rough tooth shape-forming inner punch flat surface portion parallel to a radial direction orthogonal to the central axis of the rough tooth shape-forming inner punch, and a rough tooth shape-forming inner punch side surface portion connected to the rough tooth shape-forming inner punch flat surface portion via a rough tooth shape-forming inner punch curved surface portion and elongated in a first direction parallel to the central axis of the rough tooth shape-forming inner punch, and rough tooth shape-forming inner punch peak sites and rough tooth shape-forming inner punch valley sites extending in the first direction are formed in the rough tooth shape-forming inner punch side surface portion, wherein the rough tooth shape-forming die has a rough tooth shape-forming die side surface portion elongated in the first direction, and a rough tooth shape-forming die slope portion connected to the rough tooth shape-forming die side surface portion via a rough tooth shape-forming die curved surface portion and widened in a direction orthogonal to the central axis of the rough tooth shape-forming die toward the first direction, and rough tooth shape-forming die valley sites and rough tooth shape-forming die peak sites extending in the first direction are formed in the rough tooth shape-forming die side surface portion, wherein the rough tooth shape-forming outer punch has a rough tooth shape-forming outer punch first side surface portion having a tubular shape and elongated in the first direction along the rough tooth shape-forming inner punch side surface portion, a rough tooth shape-forming outer punch flat surface portion connected to the rough tooth shape-forming outer punch first side surface portion and parallel to a radial direction orthogonal to the central axis of the rough tooth shape-forming outer punch, and a rough tooth shape-forming outer punch second side surface portion connected to the rough tooth shape-forming outer punch flat surface portion and elongated in the first direction along the rough tooth shape-forming die side surface portion of the rough tooth shape-forming die, and the rough tooth shape-forming outer punch flat surface portion has a recess portion in which a part corresponding to a part between the tooth tip portions adjacent to each other is recessed, wherein the rough tooth shape-forming counter punch has a rough tooth shape-forming counter punch side surface portion elongated in the first direction along the rough tooth shape-forming die side surface portion, and a rough tooth shape-forming counter punch flat surface portion connected to the rough tooth shape-forming counter punch side surface portion and parallel to a radial direction orthogonal to the central axis of the rough tooth shape-forming counter punch, and wherein in a state where the bottom surface portion of the cylindrical container is interposed between the rough tooth shape-forming inner punch flat surface portion and the rough tooth shape-forming counter punch flat surface portion such that the particular part reduced in diameter through the diameter-reducing process is positioned in the rough tooth shape-forming die valley sites, after the rough tooth shape-forming outer punch flat surface portion is caused to abut an opening end of the cylindrical container, the rough tooth shape-forming inner punch, the rough tooth shape-forming outer punch, and the rough tooth shape-forming counter punch are relatively moved in a direction of the rough tooth shape-forming die so as to form the rough tooth shape in the particular part of the cylindrical container.

25. The method of manufacturing a tooth-shaped component according to claim 24,
wherein in the complete tooth shape-forming process, a complete tooth shape-forming inner punch, a complete tooth shape-forming outer punch disposed along an outer circumference of the complete tooth shape-forming inner punch, a complete tooth shape-forming knockout disposed so as to face the complete tooth shape-forming inner punch, and a complete tooth shape-forming die disposed along an outer circumference of the complete tooth shape-forming knockout having central axes coaxially disposed with each other are used,
wherein the complete tooth shape-forming inner punch has a complete tooth shape-forming inner punch flat surface portion parallel to a radial direction orthogonal to the central axis of the complete tooth shape-forming inner punch, and a complete tooth shape-forming inner punch side surface portion connected to the complete tooth shape-forming inner punch flat surface portion via a complete tooth shape-forming inner punch curved surface portion and elongated in a first direction parallel to the central axis of the complete tooth shape-forming inner punch, and the complete tooth shape-forming inner punch side surface portion has the same shape and dimensions of a cross section orthogonal to the central axis of the complete tooth shape-forming inner punch as the rough tooth shape-forming inner punch side surface portion and has complete tooth shape-forming inner punch peak sites and complete tooth shape-forming inner punch valley sites extending in the first direction of the complete tooth shape-forming inner punch,
wherein the complete tooth shape-forming die has a complete tooth shape-forming die first side surface portion elongated in the first direction of the complete tooth shape-forming inner punch, a complete tooth shape-forming die flat surface portion connected to the complete tooth shape-forming die first side surface portion and parallel to a radial direction orthogonal to the central axis of the complete tooth shape-forming die, a complete tooth shape-forming die second side surface portion connected to the complete tooth shape-forming die flat surface portion and elongated in the first direction of the complete tooth shape-forming inner punch, and the complete tooth shape-forming die second side surface portion has the same shape and dimensions of a cross section orthogonal to the central axis of the complete tooth shape-forming die as the rough tooth shape-forming die side surface portion and has complete tooth shape-forming die peak sites and complete tooth shape-forming die valley sites extending in the first direction of the complete tooth shape-forming inner punch,
wherein the complete tooth shape-forming outer punch has a complete tooth shape-forming outer punch first side surface portion having a tubular shape and elongated in the first direction of the complete tooth shape-forming inner punch along the complete tooth shape-forming inner punch side surface portion, a complete tooth shape-forming outer punch flat surface portion connected to the complete tooth shape-forming outer punch first side surface portion and parallel to a radial direction orthogonal to the central axis of the complete tooth shape-forming outer punch, and a complete tooth shape-forming outer punch second side surface portion connected to the complete tooth shape-forming outer punch flat surface portion and elongated in the first direction of the complete tooth shape-forming inner punch along the complete tooth shape-forming die second side surface portion, and the complete tooth shape-forming outer punch flat surface portion has a recess portion in which a part corresponding to a part between the tooth tip portions adjacent to each other is recessed, and
wherein in a state where the bottom surface portion of the cylindrical container is interposed between the complete tooth shape-forming inner punch flat surface portion and the complete tooth shape-forming die flat surface portion such that the rough tooth shape formed in the particular part of the cylindrical container in the rough tooth shape-forming process is positioned in the complete tooth shape-forming die valley sites, the complete tooth shape-forming outer punch flat surface portion is pressed to an opening end of the cylindrical container so as to form the complete tooth shape in the particular part of the cylindrical container.

26. The method of manufacturing a tooth-shaped component according to claim 19, further comprising:
a process of flattening and/or machining an end portion of the tooth-shaped component after the tooth shape-forming process.

27. A tooth-shaped component which is manufactured through the method of manufacturing a tooth-shaped component according to claim 1.

* * * * *